US010003846B2

(12) United States Patent
Harkness et al.

(10) Patent No.: US 10,003,846 B2
(45) Date of Patent: *Jun. 19, 2018

(54) METHODS, APPARATUS AND ARTICLES OF MANUFACTURE TO PROVIDE SECONDARY CONTENT IN ASSOCIATION WITH PRIMARY BROADCAST MEDIA CONTENT

(71) Applicant: THE NIELSEN COMPANY (US), LLC, Schaumburg, IL (US)

(72) Inventors: David Henry Harkness, Wilton, CT (US); Arun Ramaswamy, Tampa, FL (US); Jerome Samson, Belleair, FL (US); Jan Besehanic, Tampa, FL (US); Venugopal Srinivasan, Palm Harbor, FL (US); Alexander Pavlovich Topchy, New Port Richey, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/195,547

(22) Filed: Mar. 3, 2014

(65) Prior Publication Data

US 2014/0189724 A1 Jul. 3, 2014

Related U.S. Application Data

(63) Continuation of application No. 12/771,640, filed on Apr. 30, 2010, now Pat. No. 8,666,528.
(Continued)

(51) Int. Cl.
H04N 21/442 (2011.01)
H04N 21/258 (2011.01)
(Continued)

(52) U.S. Cl.
CPC .......... H04N 21/442 (2013.01); H04H 20/31 (2013.01); H04H 20/86 (2013.01); H04H 60/68 (2013.01);
(Continued)

(58) Field of Classification Search
CPC ................ G06Q 30/02; G06Q 30/0251; G06F 17/30743; G06F 17/30746; G10L 19/018;
(Continued)

(56) References Cited

U.S. PATENT DOCUMENTS 4,230,990 A 10/1980 Lert, Jr. et al.
4,647,974 A 3/1987 Butler et al.
(Continued)

FOREIGN PATENT DOCUMENTS

AU 8976601 2/2002
AU 9298201 4/2002
(Continued)

OTHER PUBLICATIONS

IP Australia, "Notice of Acceptance," issued in connection with Australian Patent Application No. 2009308304, dated Apr. 3, 2014, 2 pages.
(Continued)

Primary Examiner — Jesse A Elbin
(74) Attorney, Agent, or Firm — Hanley, Flight & Zimmerman, LLC

(57) ABSTRACT

Example methods, apparatus and articles of manufacture to provide media content are disclosed. A disclosed example method includes receiving an audio signal output by a first media presentation device, the audio signal being associated with first media content, decoding the audio signal to extract a code from the audio signal, the code identifying at least one of the first media content or a broadcaster of the first media content, setting a clock using a timestamp associated
(Continued)

with the code, obtaining second media content based on the code and the timestamp, the second media content comprising a plurality of pieces of secondary content for respective ones of a plurality of timestamps, and presenting, at a second media presentation device, a first of the plurality of pieces of secondary media when its respective timestamp substantially corresponds to a time value obtained from the clock.

21 Claims, 52 Drawing Sheets

Related U.S. Application Data

(60) Provisional application No. 61/174,787, filed on May 1, 2009.

(51) Int. Cl.
*H04N 21/439* (2011.01)
*H04N 21/41* (2011.01)
*H04N 21/658* (2011.01)
*H04N 7/173* (2011.01)
*H04H 20/86* (2008.01)
*H04H 20/31* (2008.01)
*H04H 60/14* (2008.01)
*H04H 60/68* (2008.01)

(52) U.S. Cl.
CPC ... *H04N 7/17327* (2013.01); *H04N 21/25891* (2013.01); *H04N 21/4126* (2013.01); *H04N 21/4394* (2013.01); *H04N 21/4398* (2013.01); *H04N 21/44222* (2013.01); *H04N 21/6582* (2013.01); *H04H 60/14* (2013.01); *H04H 2201/40* (2013.01)

(58) Field of Classification Search
CPC .............. H04H 60/58; H04N 1/32122; H04N 21/42203; H04N 21/4722; H04N 21/81; H04N 2201/3264; H04N 2201/3249
USPC ........... 700/94; 704/E19.009; 725/14, 18, 19
See application file for complete search history.

(56) References Cited

U.S. PATENT DOCUMENTS

| | | |
|---|---|---|
| 4,677,466 A | 6/1987 | Lert, Jr. et al. |
| 4,697,209 A | 9/1987 | Kiewit et al. |
| 4,745,468 A | 5/1988 | Von Kohorn |
| 4,876,592 A | 10/1989 | Von Kohorn |
| 4,876,736 A | 10/1989 | Kiewit |
| 4,926,255 A | 5/1990 | Von Kohorn |
| 4,973,952 A | 11/1990 | Malec et al. |
| 5,019,899 A | 5/1991 | Boles et al. |
| 5,023,929 A | 6/1991 | Call |
| 5,034,807 A | 7/1991 | Von Kohorn |
| 5,057,915 A | 10/1991 | Von Kohorn |
| 5,081,680 A | 1/1992 | Bennett |
| 5,117,228 A | 5/1992 | Ruchigami et al. |
| 5,128,752 A | 7/1992 | Von Kohorn |
| 5,157,489 A | 10/1992 | Lowe |
| 5,227,874 A | 7/1993 | Von Kohorn |
| 5,249,044 A | 9/1993 | Von Kohorn |
| 5,283,734 A | 2/1994 | Von Kohorn |
| 5,331,544 A | 7/1994 | Lu et al. |
| 5,373,315 A | 12/1994 | Defresne et al. |
| 5,401,946 A | 3/1995 | Weinblatt |
| 5,425,100 A | 6/1995 | Thomas et al. |
| 5,444,769 A | 8/1995 | Koen et al. |
| 5,450,490 A | 9/1995 | Jensen et al. |
| 5,453,790 A | 9/1995 | Vermeulen et al. |
| 5,481,294 A | 1/1996 | Thomas et al. |
| 5,485,199 A | 1/1996 | Elkind et al. |
| 5,512,933 A | 4/1996 | Wheatley et al. |
| 5,524,195 A | 6/1996 | Clanton, III et al. |
| 5,526,427 A | 6/1996 | Thomas et al. |
| 5,543,856 A | 8/1996 | Rosser et al. |
| 5,574,962 A | 11/1996 | Fardeau et al. |
| 5,579,124 A | 11/1996 | Aijala et al. |
| 5,594,934 A | 1/1997 | Lu et al. |
| 5,629,739 A | 5/1997 | Dougherty |
| 5,659,366 A | 8/1997 | Kerman |
| 5,666,293 A | 9/1997 | Metz et al. |
| 5,682,196 A | 10/1997 | Freeman |
| 5,719,634 A | 2/1998 | Keery et al. |
| 5,734,413 A | 3/1998 | Lappington et al. |
| 5,740,035 A | 4/1998 | Cohen et al. |
| 5,815,671 A | 9/1998 | Morrison |
| 5,841,978 A | 11/1998 | Rhoads |
| 5,848,155 A | 12/1998 | Cox |
| 5,850,249 A | 12/1998 | Massetti et al. |
| 5,872,588 A | 2/1999 | Aras et al. |
| 5,880,789 A | 3/1999 | Inaba |
| 5,889,548 A | 3/1999 | Chan |
| 5,893,067 A | 4/1999 | Bender et al. |
| 5,907,366 A | 5/1999 | Farmer et al. |
| 5,918,223 A | 6/1999 | Blum et al. |
| 5,930,369 A | 7/1999 | Cox et al. |
| 5,933,789 A | 8/1999 | Byun et al. |
| 5,956,674 A | 9/1999 | Smyth et al. |
| 5,956,716 A | 9/1999 | Kenner et al. |
| 5,966,120 A | 10/1999 | Arazi et al. |
| 5,974,380 A | 10/1999 | Smyth et al. |
| 5,974,396 A | 10/1999 | Anderson et al. |
| 5,978,855 A | 11/1999 | Metz et al. |
| 5,987,855 A | 11/1999 | Dey et al. |
| 6,005,490 A | 12/1999 | Higashihara |
| 6,029,045 A | 2/2000 | Picco et al. |
| 6,034,722 A | 3/2000 | Viney et al. |
| 6,035,177 A | 3/2000 | Moses et al. |
| 6,049,830 A | 4/2000 | Saib |
| 6,055,573 A | 4/2000 | Gardenswartz et al. |
| 6,097,441 A | 8/2000 | Allport |
| 6,128,597 A | 10/2000 | Kolluru et al. |
| 6,154,209 A | 11/2000 | Naughton et al. |
| 6,157,413 A | 12/2000 | Hanafee et al. |
| 6,208,735 B1 | 3/2001 | Cox et al. |
| 6,216,129 B1 | 4/2001 | Eldering |
| 6,221,881 B1 | 4/2001 | Garvey et al. |
| 6,263,505 B1 | 7/2001 | Walker et al. |
| 6,266,815 B1 | 7/2001 | Shen et al. |
| 6,286,036 B1 | 9/2001 | Rhoads |
| 6,286,140 B1 | 9/2001 | Ivanyi |
| 6,298,348 B1 | 10/2001 | Eldering |
| 6,300,888 B1 | 10/2001 | Chen et al. |
| 6,308,327 B1 | 10/2001 | Liu et al. |
| 6,311,876 B1 | 12/2001 | Koster et al. |
| 6,331,876 B1 | 12/2001 | Koster et al. |
| 6,335,736 B1 | 1/2002 | Wagner et al. |
| 6,363,159 B1 | 3/2002 | Rhoads |
| 6,389,055 B1 | 5/2002 | August et al. |
| 6,400,827 B1 | 6/2002 | Rhoads |
| 6,411,725 B1 | 6/2002 | Rhoads |
| 6,421,445 B1 | 7/2002 | Jensen et al. |
| 6,466,913 B1 | 10/2002 | Yasuda et al. |
| 6,467,089 B1 | 10/2002 | Aust et al. |
| 6,487,564 B1 | 11/2002 | Asai et al. |
| 6,505,160 B1 | 1/2003 | Levy et al. |
| 6,512,836 B1 | 1/2003 | Xie et al. |
| 6,513,014 B1 | 1/2003 | Walker et al. |
| 6,522,771 B2 | 2/2003 | Rhoads |
| 6,539,095 B1 | 3/2003 | Rhoads |
| 6,546,556 B1 | 4/2003 | Kataoka et al. |
| 6,553,127 B1 | 4/2003 | Kurowski |
| 6,553,178 B2 | 4/2003 | Abecassis |
| 6,607,136 B1 | 8/2003 | Atsmon et al. |
| 6,614,914 B1 | 9/2003 | Rhoads et al. |
| 6,621,881 B2 | 9/2003 | Srinivasan |
| 6,642,966 B1 | 11/2003 | Limaye |
| 6,647,269 B2 | 11/2003 | Hendrey et al. |
| 6,647,548 B1 | 11/2003 | Lu et al. |
| 6,651,253 B2 | 11/2003 | Dudkiewicz et al. |

(56) References Cited

U.S. PATENT DOCUMENTS

| | | |
|---|---|---|
| 6,654,480 B2 | 11/2003 | Rhoads |
| 6,665,873 B1 | 12/2003 | Van Gestel et al. |
| 6,675,383 B1 | 1/2004 | Wheeler et al. |
| 6,681,209 B1 | 1/2004 | Schmidt et al. |
| 6,683,966 B1 | 1/2004 | Tian et al. |
| 6,710,815 B1 | 3/2004 | Billmaier et al. |
| 6,714,683 B1 | 3/2004 | Tian et al. |
| 6,735,775 B1 | 5/2004 | Massetti |
| 6,741,684 B2 | 5/2004 | Kaars |
| 6,750,985 B2 | 6/2004 | Rhoads |
| 6,766,523 B2 | 7/2004 | Herley |
| 6,795,972 B2 | 9/2004 | Rovira |
| 6,804,379 B2 | 10/2004 | Rhoads |
| 6,804,566 B1 | 10/2004 | Colomes et al. |
| 6,823,310 B2 | 11/2004 | Ishito et al. |
| 6,829,368 B2 | 12/2004 | Meyer et al. |
| 6,853,634 B1 | 2/2005 | Davies et al. |
| 6,871,180 B1 | 3/2005 | Neuhauser et al. |
| 6,871,323 B2 | 3/2005 | Wagner et al. |
| 6,873,688 B1 | 3/2005 | Aarnio |
| 6,941,275 B1 | 9/2005 | Swierczek |
| 6,956,575 B2 | 10/2005 | Nakazawa et al. |
| 6,965,601 B1 | 11/2005 | Nakano et al. |
| 6,968,315 B1 | 11/2005 | Nakisa |
| 6,968,371 B1 | 11/2005 | Srinivasan |
| 6,968,564 B1 | 11/2005 | Srinivasan |
| 6,970,886 B1 | 11/2005 | Conwell et al. |
| 6,996,213 B1 | 2/2006 | De Jong |
| 7,003,731 B1 | 2/2006 | Rhoads et al. |
| 7,006,555 B1 | 2/2006 | Srinivasan |
| 7,039,932 B2 | 5/2006 | Eldering |
| 7,050,603 B2 | 5/2006 | Rhoads et al. |
| 7,051,086 B2 | 5/2006 | Rhoads et al. |
| 7,058,697 B2 | 6/2006 | Rhoads |
| 7,082,434 B2 | 7/2006 | Gosselin |
| 7,095,871 B2 | 8/2006 | Jones et al. |
| 7,131,007 B1 | 10/2006 | Johnston et al. |
| 7,143,949 B1 | 12/2006 | Hannigan |
| 7,158,943 B2 | 1/2007 | Van Der Riet |
| 7,171,018 B2 | 1/2007 | Rhoads et al. |
| 7,174,293 B2 | 2/2007 | Kenyon et al. |
| 7,185,201 B2 | 2/2007 | Rhoads et al. |
| 7,194,752 B1 | 3/2007 | Kenyon et al. |
| 7,197,156 B1 | 3/2007 | Levy |
| 7,203,338 B2 | 4/2007 | Ramaswamy et al. |
| 7,215,280 B1 | 5/2007 | Percy et al. |
| 7,221,405 B2 | 5/2007 | Basson et al. |
| 7,227,972 B2 | 6/2007 | Brundage et al. |
| 7,239,981 B2 | 7/2007 | Kolessar et al. |
| 7,248,715 B2 | 7/2007 | Levy |
| 7,254,249 B2 | 8/2007 | Rhoads et al. |
| 7,260,221 B1 | 8/2007 | Atsmon |
| 7,269,564 B1 | 9/2007 | Milsted et al. |
| 7,269,734 B1 | 9/2007 | Johnson et al. |
| 7,273,978 B2 | 9/2007 | Uhle |
| 7,280,970 B2 | 10/2007 | Tamir et al. |
| 7,317,716 B1 | 1/2008 | Boni et al. |
| 7,328,153 B2 | 2/2008 | Wells et al. |
| 7,328,160 B2 | 2/2008 | Nishio et al. |
| 7,334,735 B1 | 2/2008 | Antebi et al. |
| 7,346,512 B2 | 3/2008 | Li-Chun Wang et al. |
| 7,356,700 B2 | 4/2008 | Noridomi et al. |
| 7,363,278 B2 | 4/2008 | Schmelzer et al. |
| 7,369,678 B2 | 5/2008 | Rhoads |
| 7,383,297 B1 | 6/2008 | Atsmon et al. |
| 7,421,723 B2 | 9/2008 | Harkness et al. |
| 7,440,674 B2 | 10/2008 | Plotnick et al. |
| 7,443,292 B2 | 10/2008 | Jensen et al. |
| 7,463,143 B2 | 12/2008 | Forr et al. |
| 7,519,658 B1 | 4/2009 | Anglin et al. |
| 7,540,012 B1 | 5/2009 | Herzberg et al. |
| 7,577,195 B2 | 8/2009 | Hickey, Jr. |
| 7,592,908 B2 | 9/2009 | Zhang et al. |
| 7,623,823 B2 | 11/2009 | Zito et al. |
| 7,627,477 B2 | 12/2009 | Wang et al. |
| 7,941,480 B2 | 5/2011 | Atsmon et al. |
| 7,961,881 B2 | 6/2011 | Jensen et al. |
| RE42,627 E | 8/2011 | Neuhauser et al. |
| 8,019,609 B2 | 9/2011 | Tamir et al. |
| 8,065,260 B2 | 11/2011 | Herre et al. |
| 8,069,037 B2 | 11/2011 | Singhai |
| 8,121,830 B2 | 2/2012 | Srinivasan et al. |
| 8,132,224 B2 | 3/2012 | Bae et al. |
| 8,200,476 B2 | 6/2012 | Butterfield et al. |
| 8,229,159 B2 | 7/2012 | Tourapis et al. |
| 8,285,814 B2 | 10/2012 | Rehiman et al. |
| 8,350,971 B2 | 1/2013 | Malone et al. |
| 8,359,205 B2 | 1/2013 | Srinivasan et al. |
| 8,365,236 B2 | 1/2013 | Krikorian et al. |
| 8,369,972 B2 | 2/2013 | Topchy et al. |
| 8,554,545 B2 | 10/2013 | Srinivasan et al. |
| 8,666,528 B2 | 3/2014 | Harkness et al. |
| 8,700,407 B2 | 4/2014 | Wang et al. |
| 8,965,786 B1 * | 2/2015 | Frumkin ............ G06Q 30/0242 705/14.41 |
| 9,021,516 B2 | 4/2015 | Nielsen |
| 2001/0044899 A1 | 11/2001 | Levy |
| 2001/0056573 A1 | 12/2001 | Kovac et al. |
| 2002/0032734 A1 | 3/2002 | Rhoads |
| 2002/0033842 A1 | 3/2002 | Zetts |
| 2002/0053078 A1 | 5/2002 | Holtz et al. |
| 2002/0056094 A1 | 5/2002 | Dureau |
| 2002/0059218 A1 | 5/2002 | August et al. |
| 2002/0062382 A1 | 5/2002 | Rhoads et al. |
| 2002/0088011 A1 | 7/2002 | Lamkin et al. |
| 2002/0091991 A1 | 7/2002 | Castro |
| 2002/0102993 A1 | 8/2002 | Hendrey et al. |
| 2002/0108125 A1 | 8/2002 | Joao |
| 2002/0111934 A1 | 8/2002 | Narayan |
| 2002/0112002 A1 | 8/2002 | Abato |
| 2002/0124246 A1 | 9/2002 | Kaminsky et al. |
| 2002/0133562 A1 | 9/2002 | Newnam et al. |
| 2002/0138851 A1 | 9/2002 | Lord et al. |
| 2002/0144262 A1 | 10/2002 | Plotnick et al. |
| 2002/0144273 A1 | 10/2002 | Reto |
| 2002/0162118 A1 | 10/2002 | Levy et al. |
| 2002/0174425 A1 | 11/2002 | Markel et al. |
| 2002/0194592 A1 | 12/2002 | Tsuchida et al. |
| 2003/0021441 A1 | 1/2003 | Levy et al. |
| 2003/0039465 A1 | 2/2003 | Bjorgan et al. |
| 2003/0088674 A1 | 5/2003 | Ullman et al. |
| 2003/0103645 A1 | 6/2003 | Levy et al. |
| 2003/0105870 A1 | 6/2003 | Baum |
| 2003/0108200 A1 | 6/2003 | Sako |
| 2003/0115598 A1 | 6/2003 | Pantoja |
| 2003/0131350 A1 | 7/2003 | Peiffer et al. |
| 2003/0177488 A1 | 9/2003 | Smith et al. |
| 2003/0185232 A1 | 10/2003 | Moore et al. |
| 2003/0195851 A1 | 10/2003 | Ong |
| 2003/0229900 A1 | 12/2003 | Reisman |
| 2004/0004630 A1 | 1/2004 | Kalva et al. |
| 2004/0006696 A1 | 1/2004 | Shin et al. |
| 2004/0008615 A1 | 1/2004 | Oh |
| 2004/0024588 A1 | 2/2004 | Watson et al. |
| 2004/0031058 A1 | 2/2004 | Srinivasan et al. |
| 2004/0037271 A1 | 2/2004 | Liscano et al. |
| 2004/0038692 A1 | 2/2004 | Muzaffar |
| 2004/0058675 A1 | 3/2004 | Lu et al. |
| 2004/0059918 A1 | 3/2004 | Xu |
| 2004/0059933 A1 | 3/2004 | Levy |
| 2004/0064319 A1 | 4/2004 | Neuhauser et al. |
| 2004/0073916 A1 | 4/2004 | Petrovic et al. |
| 2004/0073951 A1 | 4/2004 | Bae et al. |
| 2004/0120417 A1 | 6/2004 | Lunch et al. |
| 2004/0125125 A1 | 7/2004 | Levy |
| 2004/0128514 A1 | 7/2004 | Rhoads |
| 2004/0137929 A1 | 7/2004 | Jones et al. |
| 2004/0143844 A1 | 7/2004 | Brant et al. |
| 2004/0146161 A1 | 7/2004 | De Jong |
| 2004/0162720 A1 | 8/2004 | Jang et al. |
| 2004/0184369 A1 | 9/2004 | Herre et al. |
| 2004/0199387 A1 | 10/2004 | Wang et al. |
| 2004/0236819 A1 | 11/2004 | Anati et al. |
| 2004/0267533 A1 | 12/2004 | Hannigan et al. |

(56) References Cited

U.S. PATENT DOCUMENTS

| | | |
|---|---|---|
| 2005/0028189 A1 | 2/2005 | Heine et al. |
| 2005/0033758 A1 | 2/2005 | Baxter |
| 2005/0036653 A1 | 2/2005 | Brundage et al. |
| 2005/0058319 A1 | 3/2005 | Rhoads et al. |
| 2005/0086488 A1 | 4/2005 | Kori et al. |
| 2005/0086682 A1 | 4/2005 | Burges et al. |
| 2005/0144004 A1 | 6/2005 | Bennett et al. |
| 2005/0169497 A1 | 8/2005 | Gustafson et al. |
| 2005/0192933 A1 | 9/2005 | Rhoads et al. |
| 2005/0216346 A1 | 9/2005 | Kusumoto et al. |
| 2005/0234728 A1 | 10/2005 | Tachibana et al. |
| 2005/0234774 A1 | 10/2005 | Dupree |
| 2005/0254453 A1 | 11/2005 | Barneah |
| 2005/0262351 A1 | 11/2005 | Levy |
| 2005/0271246 A1 | 12/2005 | Sharma et al. |
| 2006/0059277 A1 | 3/2006 | Zito et al. |
| 2006/0083403 A1 | 4/2006 | Zhang et al. |
| 2006/0089912 A1 | 4/2006 | Spagna et al. |
| 2006/0095401 A1 | 5/2006 | Krikorian et al. |
| 2006/0107195 A1 | 5/2006 | Ramaswamy et al. |
| 2006/0107302 A1 | 5/2006 | Zdepski |
| 2006/0136564 A1 | 6/2006 | Ambrose |
| 2006/0153041 A1 | 7/2006 | Miyashita et al. |
| 2006/0156002 A1 | 7/2006 | Bruekers et al. |
| 2006/0167747 A1 | 7/2006 | Goodman et al. |
| 2006/0168613 A1 | 7/2006 | Wood et al. |
| 2006/0212290 A1 | 9/2006 | Ide |
| 2006/0212710 A1 | 9/2006 | Baum et al. |
| 2006/0221173 A1 | 10/2006 | Duncan |
| 2006/0224798 A1 | 10/2006 | Klein et al. |
| 2007/0006250 A1 | 1/2007 | Croy et al. |
| 2007/0016918 A1 | 1/2007 | Alcorn et al. |
| 2007/0052560 A1 | 3/2007 | Van Der Veen et al. |
| 2007/0055987 A1 | 3/2007 | Lu et al. |
| 2007/0061577 A1 | 3/2007 | Van De Kerkhof et al. |
| 2007/0064937 A1 | 3/2007 | Van Leest et al. |
| 2007/0070429 A1 | 3/2007 | Hein, III et al. |
| 2007/0110089 A1 | 5/2007 | Essafi et al. |
| 2007/0118375 A1 | 5/2007 | Kenyon et al. |
| 2007/0124771 A1 | 5/2007 | Shvadron |
| 2007/0127717 A1 | 6/2007 | Herre et al. |
| 2007/0129952 A1 | 6/2007 | Kenyon et al. |
| 2007/0133223 A1 | 6/2007 | Fredley et al. |
| 2007/0143778 A1 | 6/2007 | Covell et al. |
| 2007/0149114 A1 | 6/2007 | Danilenko |
| 2007/0162927 A1 | 7/2007 | Ramaswamy et al. |
| 2007/0198738 A1 | 8/2007 | Angiolillo et al. |
| 2007/0201835 A1 | 8/2007 | Rhoads |
| 2007/0226760 A1 | 9/2007 | Neuhauser et al. |
| 2007/0240234 A1 | 10/2007 | Watson |
| 2007/0242826 A1 | 10/2007 | Rassool |
| 2007/0250310 A1 | 10/2007 | Sato et al. |
| 2007/0250716 A1 | 10/2007 | Brunk |
| 2007/0274523 A1 | 11/2007 | Rhoads |
| 2007/0276925 A1 | 11/2007 | La Joie et al. |
| 2007/0276926 A1 | 11/2007 | La Joie et al. |
| 2007/0288476 A1 | 12/2007 | Flanagan, III et al. |
| 2007/0294057 A1 | 12/2007 | Crystal et al. |
| 2007/0294132 A1 | 12/2007 | Zhang et al. |
| 2007/0294705 A1 | 12/2007 | Gopalakrishnan et al. |
| 2007/0294706 A1 | 12/2007 | Neuhauser et al. |
| 2008/0019560 A1 | 1/2008 | Rhoads |
| 2008/0022114 A1 | 1/2008 | Moskowitz |
| 2008/0027734 A1 | 1/2008 | Zhao et al. |
| 2008/0028223 A1 | 1/2008 | Rhoads |
| 2008/0028474 A1 | 1/2008 | Horne et al. |
| 2008/0040354 A1 | 2/2008 | Ray et al. |
| 2008/0059160 A1 | 3/2008 | Saunders et al. |
| 2008/0065507 A1 | 3/2008 | Morrison et al. |
| 2008/0071530 A1 | 3/2008 | Ehara |
| 2008/0077956 A1 | 3/2008 | Morrison et al. |
| 2008/0082510 A1 | 4/2008 | Wang et al. |
| 2008/0082922 A1 | 4/2008 | Biniak et al. |
| 2008/0083003 A1 | 4/2008 | Biniak et al. |
| 2008/0086304 A1* | 4/2008 | Neuhauser ............ G10L 19/018 704/231 |
| 2008/0101454 A1 | 5/2008 | Luff et al. |
| 2008/0117975 A1 | 5/2008 | Sasai et al. |
| 2008/0133223 A1 | 6/2008 | Son et al. |
| 2008/0137749 A1 | 6/2008 | Tian et al. |
| 2008/0139182 A1 | 6/2008 | Levy et al. |
| 2008/0140573 A1 | 6/2008 | Levy et al. |
| 2008/0168503 A1 | 7/2008 | Sparrell |
| 2008/0209219 A1 | 8/2008 | Rhein |
| 2008/0209491 A1 | 8/2008 | Hasek |
| 2008/0215333 A1 | 9/2008 | Tewfik et al. |
| 2008/0219496 A1 | 9/2008 | Tewfik |
| 2008/0235077 A1 | 9/2008 | Harkness et al. |
| 2008/0240490 A1 | 10/2008 | Finkelstein et al. |
| 2008/0243590 A1 | 10/2008 | Rich |
| 2008/0292134 A1 | 11/2008 | Sharma et al. |
| 2008/0319739 A1 | 12/2008 | Mehrotra et al. |
| 2009/0007159 A1 | 1/2009 | Rangarajan et al. |
| 2009/0031134 A1 | 1/2009 | Levy |
| 2009/0063250 A1 | 3/2009 | Burgess et al. |
| 2009/0070408 A1 | 3/2009 | White |
| 2009/0070587 A1 | 3/2009 | Srinivasan et al. |
| 2009/0119723 A1 | 5/2009 | Tinsman |
| 2009/0125310 A1 | 5/2009 | Lee et al. |
| 2009/0150553 A1 | 6/2009 | Collart et al. |
| 2009/0240505 A1 | 9/2009 | Villemoes et al. |
| 2009/0259325 A1 | 10/2009 | Topchy et al. |
| 2009/0265214 A1 | 10/2009 | Jobs et al. |
| 2009/0281815 A1 | 11/2009 | Zopf |
| 2009/0306920 A1 | 12/2009 | Zwinger et al. |
| 2009/0307061 A1 | 12/2009 | Monighetti et al. |
| 2009/0307084 A1 | 12/2009 | Monighetti et al. |
| 2009/0326960 A1 | 12/2009 | Breebaat |
| 2010/0008500 A1 | 1/2010 | Lisanke et al. |
| 2010/0027837 A1 | 2/2010 | Levy et al. |
| 2010/0030838 A1 | 2/2010 | Atsmon et al. |
| 2010/0106510 A1 | 4/2010 | Topchy et al. |
| 2010/0106718 A1 | 4/2010 | Topchy et al. |
| 2010/0131970 A1 | 5/2010 | Falcon |
| 2010/0134278 A1 | 6/2010 | Srinivasan et al. |
| 2010/0135638 A1 | 6/2010 | Mio |
| 2010/0166120 A1 | 7/2010 | Baum et al. |
| 2010/0223062 A1 | 9/2010 | Srinivasan et al. |
| 2010/0226526 A1 | 9/2010 | Modro et al. |
| 2010/0268540 A1 | 10/2010 | Arshi et al. |
| 2010/0280641 A1 | 11/2010 | Harkness et al. |
| 2010/0324708 A1 | 12/2010 | Ojanpera |
| 2011/0035462 A1 | 2/2011 | Akella |
| 2011/0126222 A1 | 5/2011 | Wright et al. |
| 2011/0314486 A1 | 12/2011 | Lu et al. |
| 2012/0078396 A1 | 3/2012 | Case, Jr. et al. |
| 2012/0101827 A1 | 4/2012 | Topchy et al. |
| 2012/0159541 A1 | 6/2012 | Carton et al. |
| 2012/0203363 A1 | 8/2012 | McKenna et al. |
| 2012/0203559 A1 | 8/2012 | McKenna et al. |
| 2012/0233646 A1 | 9/2012 | Coniglio et al. |
| 2012/0266187 A1 | 10/2012 | Deng |
| 2012/0275621 A1 | 11/2012 | Elko |
| 2012/0278651 A1 | 11/2012 | Muralimanohar et al. |
| 2013/0013737 A1 | 1/2013 | Rehiman et al. |
| 2013/0014141 A1 | 1/2013 | Bhatia et al. |
| 2013/0096706 A1 | 4/2013 | Srinivasan et al. |
| 2013/0144709 A1 | 6/2013 | Narasimhan et al. |
| 2014/0026159 A1 | 1/2014 | Cuttner et al. |
| 2014/0226814 A1 | 8/2014 | Fernando |
| 2014/0259039 A1 | 9/2014 | Nielsen |
| 2014/0270195 A1 | 9/2014 | Nielsen |
| 2014/0282640 A1 | 9/2014 | Nielsen |

FOREIGN PATENT DOCUMENTS

| | | |
|---|---|---|
| AU | 2003230993 | 11/2003 |
| AU | 2006203639 | 9/2006 |
| BR | 0112901 | 6/2003 |
| BR | 0309598 | 2/2005 |
| CA | 2293957 | 7/2000 |
| CA | 2483104 | 11/2003 |
| CN | 1149366 | 5/1997 |

(56) References Cited

FOREIGN PATENT DOCUMENTS

| | | |
|---|---|---|
| CN | 1303547 | 7/2001 |
| CN | 1372682 | 10/2002 |
| CN | 1497876 | 5/2004 |
| CN | 1592906 | 3/2005 |
| CN | 1647160 | 7/2005 |
| CN | 1672172 | 9/2005 |
| CN | 1795494 | 6/2006 |
| CN | 1282152 | 10/2006 |
| CN | 101243688 | 8/2008 |
| EP | 0713335 | 5/1996 |
| EP | 0769749 | 4/1997 |
| EP | 0967803 | 12/1999 |
| EP | 1026847 | 8/2000 |
| EP | 1267572 | 12/2002 |
| EP | 0883939 | 5/2003 |
| EP | 1349370 | 10/2003 |
| EP | 1406403 | 4/2004 |
| EP | 1463220 | 9/2004 |
| EP | 1307833 | 6/2006 |
| EP | 1703460 | 9/2006 |
| EP | 1742397 | 1/2007 |
| EP | 1745464 | 10/2007 |
| EP | 1704695 | 2/2008 |
| EP | 1504445 | 8/2008 |
| EP | 2351271 | 12/2016 |
| JP | 2000307530 | 11/2000 |
| JP | 2002521702 | 7/2002 |
| JP | 2002247610 | 8/2002 |
| JP | 2003208187 | 7/2003 |
| JP | 2003536113 | 12/2003 |
| JP | 2006154851 | 6/2006 |
| JP | 2007318745 | 12/2007 |
| WO | 95/27349 | 10/1995 |
| WO | 97/02672 | 1/1997 |
| WO | 00/04662 | 1/2000 |
| WO | 00/19699 | 4/2000 |
| WO | 0072309 | 11/2000 |
| WO | 01/19088 | 3/2001 |
| WO | 01/24027 | 4/2001 |
| WO | 01/31497 | 5/2001 |
| WO | 01/40963 | 6/2001 |
| WO | 01/53922 | 7/2001 |
| WO | 01/75743 | 10/2001 |
| WO | 01/91109 | 11/2001 |
| WO | 01/99109 | 12/2001 |
| WO | 02/05517 | 1/2002 |
| WO | 02/11123 | 2/2002 |
| WO | 02/15081 | 2/2002 |
| WO | 02/17591 | 2/2002 |
| WO | 02/19625 | 3/2002 |
| WO | 02/27600 | 4/2002 |
| WO | 02/37381 | 5/2002 |
| WO | 02/45034 | 6/2002 |
| WO | 02/061652 | 8/2002 |
| WO | 02/65305 | 8/2002 |
| WO | 02/65318 | 8/2002 |
| WO | 02/69121 | 9/2002 |
| WO | 03/009277 | 1/2003 |
| WO | 03/091990 | 11/2003 |
| WO | 03/94499 | 11/2003 |
| WO | 03/096337 | 11/2003 |
| WO | 2004/010352 | 1/2004 |
| WO | 2004010376 | 1/2004 |
| WO | 2004/040416 | 5/2004 |
| WO | 2004/040475 | 5/2004 |
| WO | 2005/025217 | 3/2005 |
| WO | 2005/064885 | 7/2005 |
| WO | 2005/101243 | 10/2005 |
| WO | 2005/111998 | 11/2005 |
| WO | 2006/012241 | 2/2006 |
| WO | 2006/025797 | 3/2006 |
| WO | 2007/056531 | 5/2007 |
| WO | 2007/056532 | 5/2007 |
| WO | 2008/042953 | 4/2008 |
| WO | 2008/044664 | 4/2008 |
| WO | 2008/045950 | 4/2008 |
| WO | 2008/110002 | 9/2008 |
| WO | 2008/110790 | 9/2008 |
| WO | 2009/011206 | 1/2009 |
| WO | 2009/061651 | 5/2009 |
| WO | 2009/064561 | 5/2009 |
| WO | 2010048458 | 4/2010 |

OTHER PUBLICATIONS

State Intellectual Property Office of China, "2nd Office Action," issued in connection with Chinese Patent Application No. 200980152518.4, dated Apr. 14, 2014, 7 pages.

Intellectual Property Australia, "Patent Examination Report No. 1," issued in connection with Australian patent application No. 2013203838, dated Nov. 24, 2014, 6 pages.

State Intellectual Property Office of China, "Notice of Decision of Granting Patent Rights for Invention" issued in connection with Chinese patent application No. 200980152518.4, dated Oct. 13, 2014, with English translation, 5 pages.

European Patent Office, "Examination Report," issued in connection with European patent application No. 09748893.6, dated Oct. 6, 2014, 4 pages.

Intellectual Property Australia, "Notice of Grant," issued in connection with Australian patent application No. 2009308256, dated Jul. 10, 2014, 2 pages.

Intellectual Property Australia, "Patent Examination Report No. 1," issued in connection with Australian patent application No. 2013203820, dated Nov. 28, 2014, 3 pages.

State Intellectual Property Office of China, "Notice of Decision of Granting Patent Right for Invention," issued in connection with Chinese patent application No. 200980148637.2, dated Sep. 9, 2014, with English translation, 5 pages.

European Patent Office, "Examination Report," issued in connection with European patent application No. 09747953.9, dated Oct. 15, 2014, 5 pages.

Intellectual Property Australia, "Notice of Grant," issued in connection with Australian patent application No. 2009308304, dated Jul. 31, 2014, 2 pages.

Intellectual Property Australia, "Patent Examination Report No. 1," issued in connection with Australian patent application No. 2013203674, dated Dec. 2, 2014, 4 pages.

The State Intellectual Property Office of China, "3rd Notification of Office Action," issued in connection with Chinese patent application No. 200980152527.3, dated Aug. 6, 2014, with English translation, 13 pages.

Intellectual Property Australia, "Notice of Acceptance," issued in connection with Australian patent application No. 2010242814, dated Jul. 22, 2014, 3 pages.

Intellectual Property Australia, "Notice of Acceptance," issued in connection with Australian patent application No. 2013203888, dated Feb. 2, 2015, 2 pages.

Canadian Intellectual Property Office, "Office Action," issued in connection with Canadian patent application No. 2760677, dated Sep. 29, 2014, 3 pages.

State Intellectual Property Office of China, "Notice of Decision of Granting Patent Right for Invention," issued in connection with Chinese patent application No. 201080029773.2, dated Nov. 26, 2014, with English translation, 5 pages.

Canadian Intellectual Property Office, "Office Action," issued in connection with Canadian patent application No. 2,741,391, dated Mar. 13, 2015, 4 pages.

State Intellectual Property Office of China, "Notice of Decision of Granting Patent Right for Invention," issued in connection with Chinese patent application No. 200980152527.3, dated Feb. 26, 2015, with English translation, 5 pages.

United States Patent and Trademark Office, "Non-final Office Action," issued in connection with U.S. Appl. No. 13/708,578, dated Dec. 3, 2014, 13 pages.

United States Patent and Trademark Office, "Final Office Action," issued in connection with U.S. Appl. No. 13/708,578, dated Apr. 21, 2015, 19 pages.

(56) References Cited

OTHER PUBLICATIONS

Canadian Patent Office, "Office Action," issued in connection with Canadian Patent Application No. 2,741,342 dated Jun. 10, 2015 (4 pages).
IP Australia, "Certificate of Grant," issued in connection with Australian Patent Application No. 2009308304, dated Jul. 31, 2014 (1 pages).
United States Patent and Trademark Office, "Notice of Allowability," issued in connection with U.S. Appl. No. 12/771,640, dated Feb. 3, 2014 (4 pages).
Patents Registry, Intellectual Property Department, The Government of The Hong Kong Special Adminstrative Region, "Notice of Publication of the Registration and Grant of a Standard Patent," issued in connection with Hong Kong Patent Application No. 13101413.2, dated Jul. 17, 2015 (2 pages).
United States Patent and Trademark Office, "Non-Final Office Action," issued in connection with U.S. Appl. No. 14/023,221, dated Jun. 29, 2015 (10 pages).
United States Patent and Trademark Office, "Non-Final Office Action," issued in connection with U.S. Appl. No. 12/464,811, dated Jul. 6, 2015 (16 pages).
Fink et al., "Social- and Interactive-Television Applications Based on Real-Time Ambient-Audio Identification," EuroITV, 2006 (10 pages).
Claburn, "Google Researchers Propose TV Monitoring," Information Week, Jun. 7, 2006 (3 pages).
Anderson, "Google to compete with Nielsen for TV-ratings info?," Ars Technica, Jun. 19, 2006 (2 pages).
"What is Jacked?," http://www.jacked.com/, retrieved on Dec. 3, 2009 (1 page).
Sullivan, "Google Cozies Up to SMBs for Digital Content," MediaPost News, Mar. 18, 2009, (2 pages).
Wang, "An Industrial-Strength Audio Search Algorithm," Shazam Entertainment, Ltd., in Proceedings of the Fourth International Conference on Music Information Retrieval, Baltimore, Oct. 26-30, 2003 (7 pages).
Boehret, "Yahoo Widgets Lend Brains to Boob Tube," The Wall Street Journal, Mar. 25, 2009 (3 pages).
Stross, "Apple Wouldn't Rist Its Cool Over a Gimmick, Would It?," The New York Times, Nov. 14, 2009 (3 pages).
Stultz, "Handheld Captioning at Disney World Theme Parks," article retrieved on Mar. 19, 2009, http://goflorida.about.com/od/disneyworld/a/wdw_captioning.htm, (2 pages).
Kane, "Entrepreneur Plans On-Demand Videogame Service," The Wall Street Journal, Mar. 24, 2009 (2 pages).
Shazam, "Shazam turns up the volume on mobile music," http://www.shazam.com/music/web/newsdetail.html?nid=NEWS137, Nov. 28, 2007 (1 page).
Shazam, "Shazam and VidZone Digital Media announce UK1s first fixed price mobile download service for music videos," http://www.shazam.com/music/web/newsdetail.html?nid=NEWS136, Feb. 11, 2008 (1 page).
Shazam, "Shazam launches new music application for Facebook fans," http://www.shazam.com/music/web/newsdetail.html?nid=NEWS135, Feb. 18, 2008 (1 page).
Canadian Intellectual Property Office, "Office Action," issued in connection with application No. CA 2,760,677, dated Sep. 30, 2013, 3 pages.
International Searching Authority, "International Search Report," issued in connection with counterpart international application No. PCT/US2010/033201, dated Oct. 1, 2010 (5 pages).
International Searching Authority, "Written Opinion," issued in connection with counterpart international application No. PCT/US2010/033201, dated Oct. 1, 2010 (8 pages).
International Search Report, issued in PCT/US2009/061749, dated May 26, 2010, 6 pages.
Written Opinion of the International Search Report, issued in PCT/US2009/061749, dated May 26, 2010, 9 pages.
International Search Report, issued in PCT/US2009/061750, dated Mar. 9, 2010, 3 pages.
Written Opinion of the International Search Report, issued in PCT/US2009/061750, dated Mar. 9, 2010, 7 pages.
International Search Report, issued in PCT/US2009/061827, dated Mar. 15, 2010, 4 pages.
Written Opinion of the International Search Report, issued in PCT/US2009/061827, dated May 15, 2010, 8 pages.
United States Patent and Trademark Office, "Notice of Allowance," issued in connection with U.S. Appl. No. 12/771,640, dated Sep. 16, 2013 (25 pages).
Patent Cooperation Treaty, International Preliminary Report on Patentability and Written Opinion, for corresponding application No. PCT/US2009/061827, dated Apr. 26, 2011, 9 pages.
Patent Cooperation Treaty, International Preliminary Report on Patentability and Written Opinion, for corresponding application No. PCT/US2009/061749, dated Apr. 26, 2011, 10 pages.
Patent Cooperation Treaty, International Preliminary Report on Patentability and Written Opinion, for corresponding application No. PCT/US2009/061750, dated Apr. 26, 2011, 8 pages.
United States Patent and Trademark Office, "Notice of Allowance," issued in connection with parent U.S. Appl. No. 12/604,176, dated Oct. 24, 2011 (25 pages).
United States Patent and Trademark Office, "Supplemental Notice of Allowability," issued in connection with parent U.S. Appl. No. 12/604,176, dated Nov. 8, 2011 (6 pages).
United States Patent and Trademark Office, "Notice of Allowance," issued in connection with U.S. Appl. No. 12/604,176, dated Oct. 24, 2011 (25 pages).
Australian Patent Office, "Patent Examination Report No. 1," issued in connection with application No. AU 2009308256, dated Jun. 25, 2012 (6 pages).
Japanese Patent Office, "Notice of Reasons for Rejection," issued in connection with application No. JP 2011-533363, dated Oct. 2, 2012 (6 pages).
Japanese Patent Office, "Final Rejection," issued in connection with application No. JP 2011-533363, dated Mar. 19, 2013 (4 pages).
United States Patent and Trademark Office, "Non-Final Office Action," issued in connection with U.S. Appl. No. 12/551,220 dated Apr. 26, 2012 (39 pages).
United States Patent and Trademark Office, "Notice of Allowance," issued in connection with U.S. Appl. No. 12/551,220, dated Dec. 5, 2012 (24 pages).
Australian Patent Office, "Patent Examination Report No. 1," issued in connection with application No. AU 2009308305, dated Jun. 25, 2012 (5 pages).
Japanese Patent Office, "Notice of Reasons for Rejection," issued in connection with application No. JP 2011-533357, dated Aug. 7, 2012 (5 pages).
Japanese Patent Office, "Final Rejection," issued in connection with application No. JP 2011-533357, dated Mar. 19, 2013 (4 pages).
Canadian Intellectual Property Office, "Office Action," issued in connection with application No. CA 2,741,536, dated Feb. 22, 2013 (2 pages).
Australian Patent Office, "Examination Report No. 1," issued in connection with application AU 2009308304, dated Jun. 29, 2012 (11 pages).
Japanese Patent Office, "Notice of Reasons for Rejection," issued in connection with application No. JP 2011-533356, dated Jul. 31, 2012 (9 pages).
United States Patent and Trademark Office, "Non-Final Office Action," issued in connection with U.S. Appl. No. 12/464,811, dated Aug. 31, 2012 (47 pages).
United States Patent and Trademark Office, "Non-Final Office Action," issued in connection with U.S. Appl. No. 12/464,811, dated Apr. 1, 2013 (23 pages).
European Patent Office, "Communication Pursuant to Article 94(3) EPC," issued in connection with application No. EP 10725310.6, dated Apr. 17, 2013 (7 pages).
European Patent Office, "Communication Pursuant to Rules 161(1) and 162 EPC," issued in connection with application No. EP 10725310.6, dated Jan. 20, 2012 (2 pages).
International Bureau of WIPO, "International Preliminary Report on Patentability and Written Opinion," issued in connection with PCT/US2010/033201, dated Nov. 10, 2011 (9 pages).

(56) References Cited

OTHER PUBLICATIONS

United States Patent and Trademark Office, "Non-Final Office Action," issued in connection with U.S. Appl. No. 12/771,640, dated Apr. 4, 2013 (51 pages).
United States Patent and Trademark Office, "Non-Final Office Action," issued in connection with U.S. Appl. No. 10/530,233, dated Mar. 25, 2013 (28 pages).
Japanese Patent Office, "Notice of Reasons for Rejection," issued in connection with application No. JP 2011-533356, dated May 7, 2013 (5 pages).
IP Australia, "Patent Examination Report No. 1," issued in connection with application No. AU 2010242814, dated May 10, 2013 (5 pages).
IP Australia, "Patent Examination Report No. 1," issued in connection with application No. AU 2013203888, dated May 15, 2013 (4 pages).
State Intellectual Property Office of China, "First Notification of Office Action," issued in connection with application No. CN 200980148637.2, dated Jul. 2, 2013 (7 pages).
Japanese Patent Office, "Notice of Reasons for Rejection," issued in connection with application No. JP 2012-508780, dated Jul. 2, 2013 (9 pages).
United States Patent and Trademark Office, "Non-Final Office Action," issued in connection with U.S. Appl. No. 13/341,092, dated Aug. 30, 2012 (18 pages).
United States Patent and Trademark Office, "Notice of Allowance," issued in connection with U.S. Appl. No. 13/341,092, dated May 10, 2013 (16 pages).
Intellectual Property Office of China, "Office Action," issued in connection with application No. CN 200981052527.3, dated Jun. 24, 2013 (6 pages).
Intellectual Property Office of China, "Search Report," issued in connection with application No. CN 200981052527.3, dated Jun. 8, 2013 (2 pages).
Canadian Intellectual Property Office, "Office Action," issued in connection with application No. CA 2,741,342, dated Jul. 29, 2013 (3 pages).
IP Australia, "Notice of Acceptance," issued in connection with application No. AU 2009308305, dated Aug. 19, 2013 (2 pages).
State Intellectual Property Office of China, "First Office Action," issued in connection with application No. CN 200980152518.4, dated Aug. 9, 2013 (10 pages).
IP Australia, "Examination Report No. 2," issued in connection with application No. AU 2009308304, dated Aug. 21, 2013 (6 pages).
Heuer, et al., "Adaptive Multimedia Messaging based on MPEG-7—The M3-Box," Nov. 9-10, 2000, Proc. Second Int'l Symposium on Mobile Multimedia Systems Applications, pp. 6-13 (8 pages).
Wactlar et al., "Digital Video Archives: Managing Through Metadata" Building a National Strategy for Digital Preservation: Issues in Digital Media Archiving, Apr. 2002, pp. 84-88. [http://www.informedia.cs.cmu.edu/documents/Wactlar-CLIR-final.pdf, retrieved on Jul. 20, 2006] (14 pages).
Mulder, "The Integration of Metadata From Production to Consumer," EBU Technical Review, Sep. 2000, pp. 1-5. [http://www.ebu.ch/en/technical/trev/trev_284-contents.html, retrieved on Jul. 20, 2006] (5 pages).
Hopper, "EBU Project Group P/META Metadata Exchange Standards," EBU Technical Review, Sep. 2000, pp. 1-24. [http://www.ebu.ch/en/technical/trev_284-contents.html, retrieved on Jul. 20, 2006] (24 pages).
Evain, "TV-Anytime Metadata—A Preliminary Specification on Schedule!," EBU Technical Review, Sep. 2000, pp. 1-14. [http://www.ebu.ch/en/technical/trev/trev_284-contents,html, retrieved on Jul. 20, 2006] (14 pages).
"EBU Technical Review (Editorial)," No. 284 Sep. 2000, pp. 1-3. [http://www.ebu.ch/technical/trev/trev_284-contents.html, retrieved on Jul. 20, 2006] (3 pages).
International Preliminary Examing Authority, "International Preliminary Examination Report," issued in connection with PCT Application Serial No. PCT/US03/31180, dated Aug. 17, 2004 (4 pages).
International Searching Authority, "International Search Report," issued in connection with PCT Serial No. PCT/US03/31180, dated Jun. 8, 2004 (5 pages).
U.S. Patent and Trademark Office, "Non-final Office Action," issued in connection with U.S. Appl. No. 10/530,233, dated Sep. 16, 2009 (8 pages).
U.S. Patent and Trademark Office, "Final Office Action," issued in connection with U.S. Appl. No. 10/530,233, dated Mar. 18, 2010 (9 pages).
Intellectual Property Australia, "Patent Examination Report No. 1," issued in connection with application No. AU 2009308256, dated Jun. 25, 2012 (6 pages).
United States Patent and Trademark Office, "Final Rejection," issued in connection with U.S. Appl. No. 10/530,233, dated Nov. 7, 2013, 14 pages.
United States Patent and Trademark Office, "Advisory Action," issued in connection with U.S. Appl. No. 10/530,233, dated Feb. 20, 2014, 5 pages.
United States Patent and Trademark Office, "Supplemental Notice of Allowability," issued in connection with U.S. Appl. No. 13/341,092, dated Sep. 9, 2013, 6 pages.
IP Australia, "Notice of Acceptance," issued in connection with Australian Patent Application No. 2009308256, dated Mar. 12, 2014, 2 pages.
State Intellectual Property Office of China, "2nd Office Action," issued in connection with Chinese Patent Application No. 200980148637.2, dated Mar. 5, 2014, 9 pages.
Canadian Intellectual Property Office, "Notice of Allowance," issued in connection with Canadian Patent Application No. 2,741,536, dated Mar. 4, 2014, 1 page.
State Intellectual Property Office of China, "Search Report," issued in connection with Chinese Patent Application No. 200980152518.4, dated Jul. 31, 2013, 2 pages.
State Intellectual Property Office of China, "1st Office Action," issued in connection with Chinese Patent Application No. 201080029773.2, dated Mar. 4, 2014, 5 pages.
State Intellectual Property Office of China, "Search Report," issued in connection with Chinese Patent Application No. 201080029773.2, dated Feb. 25, 2014, 2 pages.
United States Patent and Trademark Office, "Notice of Allowance," issued in connection with U.S. Appl. No. 12/771,640, dated Oct. 22, 2013, 10 pages.
Japanese Patent Office, "Notice of Final Rejection," issued in connection with Japanese Patent Application No. 2012-508780, dated Dec. 3, 2013, 1 page.
United States Patent and Trademark Office, "Final Rejection," issued in connection with U.S. Appl. No. 12/464,811, dated Dec. 17, 2013, 17 pages.
State Intellectual Property Office of China, "2nd Office Action," issued in connection with Chinese Patent Application No. 200980152527.3, dated Jan. 24, 2014, 9 pages.
Canadian Patent Office, "Office Action," issued in connection with Canadian Patent Application No. 2,760,677 dated Nov. 9. 2015 (4 pages).
IP Australia, "Patent Examination Report No. 1," issued in connection with Australian Patent Application No. 2015202561, dated Sep. 22, 2015 (3 pages).
Patents Registry, Intellectual Property Department, The Government of the Hong Kong Special Adminstrative Region, "Certificate of Grant of a Standard Patent," issued in connection with Hong Kong Patent Application No. 13101413.2, dated Aug. 21, 2015 (2 pages).
United States Patent and Trademark Office, "Final Office Action," issued in connection with U.S. Appl. No. 12/464,811, dated Mar. 10, 2016 (14 pages).
European Patent Office, "Communication Pursuant to Article 94(3) EPC," issued in connection with European Patent Application No. 09748892.8, dated Dec. 21, 2015 (7 pages).

(56) References Cited

OTHER PUBLICATIONS

United States Patent and Trademark Office, "Non-Final Office Action," issued in connection with U.S. Appl. No. 13/708,578, dated Nov. 17, 2015 (12 pages).
IP Australia, "Notice of Acceptance," issued in connection with Australian Patent Application No. 2013203674, dated Jan. 5, 2016 (2 pages).
Canadian Intellectual Property Office, "Office Action," issued in connection with application No. 2760677, dated Nov. 21, 2016, 3 pages.
United States Patent and Trademark Office, "Notice of Allowance", issued in connection with U.S. Appl. No. 12/464,811, dated Sep. 23, 2016, 38 pages.
European Patent Office, "Decision to Grant", issued in connection with European Patent application No. 09748892.8, dated Nov. 10, 2016, 1 page.
Canadian Patent Office, "Office Action," issued in connection with Canadian Patent Application No. 2,741,342 dated May 19, 2016, 3 pages.
Arbitron, "Critical Band Encoding Technology Audio Encoding System From Arbitron," Document #1050-1054, Revision E, Feb. 2008 (27 pages).
United States Patent and Trademark Office, "Final Office Action," issued in connection with U.S. Appl. No. 11/618,245, dated Dec. 31, 2013, 34 pages.
IP Australia, "Notice of Acceptance," issued in connection with application No. AU 2013203838, dated Aug. 25, 2016, 2 pages.
Canadian Patent Office, "Office action", issued in connection with Canadian patent application No. 2,741,342, dated Apr. 3, 2017, 4 pages.
European Patent Office, "Decision to Grant", issued in connection with European Patent application No. 39748892.8, dated Oct. 11, 2016, 1 page.
Canadian Patent Office, "Office Action," issued in connection with Canadian Patent Application No. 2,741,391 dated Feb. 29, 2016, 4 pages.
European Patent Office, "Intention to Grant," issued in connection with European Patent Application No. 09748892.8 dated Jun. 9, 2016, 7 pages.
European Patent Office, "Examination Report" issued in connection with European Patent Application No. 09748893.6 dated Apr. 5, 2016, 5 pages.
Hong Kong Patents Registry, "Certificate of Grant of Standard Patent," issued in connection with Hong Kong Patent Application No. 12105179.8, dated Mar. 18, 2016, 3 pages.
IP Australia, "Notice of Acceptance" issued in connection with Australian Patent Application No. 2015202561, dated May 16, 2016 (2 pages).
IP Australia, "Notice of Grant" issued in connection with Australian Patent Application No. 2013203888, dated May 28, 2015 (2 pages).
IP Australia, "Notice of Grant" issued in connection with Australian Patent Application No. 2015202561, dated Sep. 8, 2016 (3 pages).
United State Patent and Trademark Office, "Notice of Allowance," issued in connection with U.S. Appl. No. 12/464,811, dated Sep. 23, 2016 (38 pages).
United States Patent and Trademark Office, "Non-Final Office Action," issued in connection with U.S. Appl. No. 13/955,245, dated Jun. 24, 2016 (12 pages).
United State Patent and Trademark Office, "Non-Final Office Action," issued in connection with U.S. Appl. No. 13/955,438, dated Sep. 9, 2016 (13 pages).
United State Patent and Trademark Office, "Non-Final Office Action," issued in connection with U.S. Appl. No. 14/023,221, dated Aug. 31, 2016 (13 pages).
United States Patent and Trademark Office, "Final Office Action," issued in connection with U.S. Appl. No. 13/708,578, dated Apr. 29, 2016 (14 pages).
The State Intellectual Property Office of China, "First Notification of Office action", issued in connection with Chinese Patent application No. 201410725324.1, dated Feb. 4, 2017, 16 pages.
United States Patent and Trademark Office, "Advisory Action," issued in connection with U.S. Appl. No. 13/708,578, dated Aug. 23, 2017, 7 pages.
United States Patent and Trademark Office, "Non-Final Office Action," issued in connection with U.S. Appl. No. 15/331,168, dated Oct. 6, 2017, 109 pages.
The State Intellectual Property Office of China, "First Notification of Office action", issued in connection with Chinese application No. 201410725835.3, dated Dec. 12, 2016, 16 pages.
IP Australia, "Certificate of Grant", issued in connection with Australian patent application No. 2013203838, Dec. 22, 2016, 1 page.
Intellectual Property India, First Examination Report, issued in connection with Indian Patent Application No. 8465/DELNP/2011, dated Jun. 28, 2017, 7 pages.
State Intellectual Property Office of China, "Second Notification of Office Action," issued in connection with Chinese Patent Application No. 201410725835.3, dated Aug. 1, 2017, 9 pages.
European Patent Office, "Invitation pursuant to Article 94(3) and Rule 71(1) EPC", issued in connection with European patent application No. 09748893.6, dated Feb. 28, 2017, 5 pages.
United States Patent and Trademark Office, "Final Office Action," issued in connection with U.S. Appl. No. 13/708,578 dated Jun. 7, 2017, 17 pages.
United States Patent and Trademark Office, "Non-Final Office action", issued in connection with U.S. Appl. No. 13/708,578, dated Jan. 23, 2017, 14 pages.
State Intellectual Property Office of China, "Notice of Decision of Granting Patent Right for Invention,", issued in connection with Chinese Patent Application No. 201410725324.1, dated Oct. 10, 2017, 5 pages.
Canadian Patent Office, "Notice of Allowance", issued in connection with Canadian Patent application No. 2,741,391, dated Mar. 10, 2017, 1 page.

\* cited by examiner

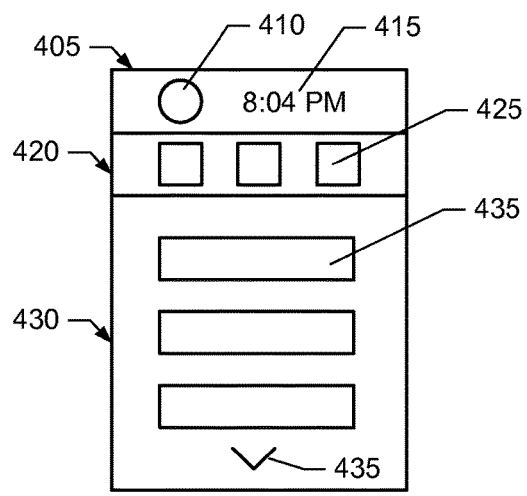 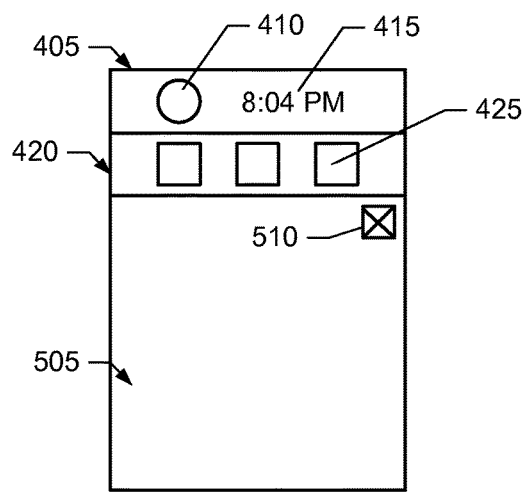
FIG. 4     FIG. 5

|          | 2004 ↓ | | | | | | |
|----------|------|------|------|---|---|---|------|
| STATES   | S1   | S2   | S3   |   |   |   | S144 |
|          | FREQUENCY INDICES |||||||
| CODE BAND 0 | 360  | 361  | 362  |   |   |   | 503  |
| CODE BAND 1 | 504  | 505  | 506  |   |   |   | 647  |
| CODE BAND 2 | 648  | 649  | 650  |   |   |   | 791  |
| CODE BAND 3 | 792  | 793  | 794  |   |   |   | 935  |
| CODE BAND 4 | 936  | 937  | 938  |   |   |   | 1079 |
| CODE BAND 5 | 1080 | 1081 | 1082 |   |   |   | 1223 |
| CODE BAND 6 | 1224 | 1225 | 1226 |   |   |   | 1366 |

FIG. 20A

| STATES | S1 | S2 | S3 | S4 |
|--------|----|----|----|----|
|        | FREQUENCY INDICES ||||
| CODE BAND 0 | 10 | 11 | 12 | 13 |
| CODE BAND 1 | 14 | 15 | 16 | 17 |
| CODE BAND 2 | 18 | 19 | 20 | 21 |
| CODE BAND 3 | 22 | 23 | 24 | 25 |
| CODE BAND 4 | 26 | 27 | 28 | 29 |
| CODE BAND 5 | 30 | 31 | 32 | 33 |
| CODE BAND 6 | 34 | 35 | 36 | 37 |

FIG. 20B

| STATES | S1 | S2 | S3 | | | | S23 | S24 |
|---|---|---|---|---|---|---|---|---|
| | FREQUENCY INDICES | | | | | | | |
| CODE BAND 0 | 60 | 61 | | | | | 82 | 83 |
| CODE BAND 1 | 84 | 85 | | | | | 106 | 107 |
| CODE BAND 2 | 108 | 109 | | | | | 130 | 131 |
| CODE BAND 3 | 132 | 133 | | | | | 154 | 155 |
| CODE BAND 4 | 156 | 157 | | | | | 178 | 179 |
| CODE BAND 5 | 180 | 181 | | | | | 202 | 203 |
| CODE BAND 6 | 204 | 205 | | | | | 226 | 227 |

FIG. 20C

```
<schedule>
<station sid="9588" name="Food Network" logo="food-network-logo.png">
<program airdate="05/04/2009-13:00:00" name="Emeril Live"
shortname="Emeril" duration="00:30:00" >
<offer id="000000001" type="spot" duration="00:01-00:15"
ticstart="1238613840:46" ticend="1238613904:25" category="food and
drinks" subcategory="recipes" name="Kraft" banner="kraft-invite.png"
archivable="yes" expires="never">
  <action type="app" object="ifood/#A23EF19083BB" />
</offer>
<offer id="000000002" type="placement" duration="01:01-01:11"
ticstart="1238613904:41" ticend="1238613904:51" category="home"
subcategory="cooking" name="foodnetwork.com" banner="store-invite.png"
archivable="yes" expires="05/08/2009-23:59:59">
  <action type="web" object="foodnetwork-store.html" />
</offer>
<offer id="000000003" type="placement" duration="01:50-02:19"
ticstart="1238613968:27" ticend="1238613968:55" category="home"
subcategory="appliances" name="viking mixer" banner="viking-invite.png"
archivable="yes" expires="never">
  <action type="web" object="viking.html" />
</offer>
<offer id="000000004" type="placement" duration="02:27-03:31"
ticstart="1238613968:63" ticend="1238614032:63" category="general"
subcategory="community" name="Guinness Beer" banner="guinness-
invite.png" archivable="no" expires="05/04/2009-14:00:00">
  <action type="survey" object="guinness.html" />
</offer>
<offer id="000000005" type="program" duration="05:29-05:40"
ticstart="1238614160:53" ticend="1238614224:01" category="food and
drinks" subcategory="recipes" name="Emeril today's recipe"
banner="recipes-invite.png" archivable="yes" expires="never">
  <action type="web" object="crumble.html" />
</offer>
  </program>
  </station>
  </schedule>
```

FIG. 27

| USER | R1 | S1 | R2 | S2 | R3 | S3 |
|------|----|----|----|----|----|----|
| 1 | X |  | X |  | X |  |
| 2 | X |  |  |  |  |  |
| 3 | X | X | X |  |  |  |
| 4 |  |  | X |  | X |  |
| 5 |  | X |  | X |  |  |
| 6 | X | X |  | X |  |  |
| 7 | X | X |  | X | X | X |
| 8 | X | X | X | X | X | X |
| 9 |  |  |  |  |  | X |
| 10 |  |  | X | X |  |  |

3305 spans columns R1–S3; 3310 spans rows 1–10.

| USER | S/(R+S) | PGMS |
|------|---------|------|
| 1 | 0/3 | 3/6 |
| 2 | 0/1 | 1/6 |
| 3 | 1/3 | 3/6 |
| 4 | 0/2 | 2/6 |
| 5 | 2/2 | 2/6 |
| 6 | 2/3 | 3/6 |
| 7 | 3/5 | 5/6 |
| 8 | 3/6 | 6/6 |
| 9 | 1/1 | 1/6 |
| 10 | 1/2 | 2/6 |

| Symbols | \ | \ | \ Frequency Indices \ | \ | \ | \ |
|---|---|---|---|---|---|---|
| 0 | 188 | 296 | 360 | 403 | 469 | 546 | 614 |
| 1 | 216 | 252 | 360 | 437 | 473 | 579 | 615 |
| 2 | 216 | 253 | 361 | 438 | 474 | 578 | 614 |
| 3 | 216 | 254 | 362 | 439 | 475 | 577 | 613 |
| 4 | 216 | 255 | 363 | 440 | 476 | 576 | 612 |
| 5 | 216 | 257 | 365 | 432 | 468 | 584 | 620 |
| 6 | 216 | 258 | 366 | 433 | 469 | 583 | 619 |
| 7 | 216 | 259 | 367 | 434 | 470 | 582 | 618 |
| 8 | 216 | 260 | 368 | 435 | 471 | 581 | 617 |
| 9 | 216 | 288 | 324 | 401 | 509 | 543 | 651 |
| 10 | 216 | 289 | 325 | 402 | 510 | 542 | 650 |
| 11 | 216 | 290 | 326 | 403 | 511 | 541 | 649 |
| 12 | 216 | 291 | 327 | 404 | 512 | 540 | 648 |
| 13 | 216 | 293 | 329 | 396 | 504 | 548 | 656 |
| 14 | 216 | 294 | 330 | 397 | 505 | 547 | 655 |
| 15 | 216 | 295 | 331 | 398 | 506 | 546 | 654 |
| 16 | 216 | 296 | 332 | 399 | 507 | 545 | 653 |
| 17 | 217 | 252 | 361 | 439 | 476 | 584 | 619 |
| 18 | 217 | 253 | 360 | 440 | 475 | 583 | 620 |
| 19 | 217 | 254 | 363 | 437 | 474 | 582 | 617 |
| 20 | 217 | 255 | 362 | 438 | 473 | 581 | 618 |
| 21 | 217 | 257 | 366 | 434 | 471 | 579 | 614 |
| 22 | 217 | 258 | 365 | 435 | 470 | 578 | 615 |
| 23 | 217 | 259 | 368 | 432 | 469 | 577 | 612 |
| 24 | 217 | 260 | 367 | 433 | 468 | 576 | 613 |
| 25 | 217 | 288 | 325 | 403 | 512 | 548 | 655 |
| 26 | 217 | 289 | 324 | 404 | 511 | 547 | 656 |
| 27 | 217 | 290 | 327 | 401 | 510 | 546 | 653 |
| 28 | 217 | 291 | 326 | 402 | 509 | 545 | 654 |
| 29 | 217 | 293 | 330 | 398 | 507 | 543 | 650 |
| 30 | 217 | 294 | 329 | 399 | 506 | 542 | 651 |
| 31 | 217 | 295 | 332 | 396 | 505 | 541 | 648 |
| 32 | 217 | 296 | 331 | 397 | 504 | 540 | 649 |
| 33 | 218 | 252 | 362 | 440 | 474 | 543 | 649 |
| 34 | 218 | 253 | 363 | 439 | 473 | 542 | 648 |
| 35 | 218 | 254 | 360 | 438 | 476 | 541 | 651 |
| 36 | 218 | 255 | 361 | 437 | 475 | 540 | 650 |
| 37 | 218 | 257 | 367 | 435 | 469 | 548 | 654 |
| 38 | 218 | 258 | 368 | 434 | 468 | 547 | 653 |
| 39 | 218 | 259 | 365 | 433 | 471 | 546 | 656 |
| 40 | 218 | 260 | 366 | 432 | 470 | 545 | 655 |
| 41 | 218 | 288 | 326 | 404 | 510 | 579 | 613 |
| 42 | 218 | 289 | 327 | 403 | 509 | 578 | 612 |

FIG. 40

| Symbols | Frequency Indices | | | | | | |
|---|---|---|---|---|---|---|---|
| 43 | 218 | 290 | 324 | 402 | 512 | 577 | 615 |
| 44 | 218 | 291 | 325 | 401 | 511 | 576 | 614 |
| 45 | 218 | 293 | 331 | 399 | 505 | 584 | 618 |
| 46 | 218 | 294 | 332 | 398 | 504 | 583 | 617 |
| 47 | 218 | 295 | 329 | 397 | 507 | 582 | 620 |
| 48 | 218 | 296 | 330 | 396 | 506 | 581 | 619 |
| 49 | 219 | 252 | 363 | 438 | 475 | 548 | 653 |
| 50 | 219 | 253 | 362 | 437 | 476 | 547 | 654 |
| 51 | 219 | 254 | 361 | 440 | 473 | 546 | 655 |
| 52 | 219 | 255 | 360 | 439 | 474 | 545 | 656 |
| 53 | 219 | 257 | 368 | 433 | 470 | 543 | 648 |
| 54 | 219 | 258 | 367 | 432 | 471 | 542 | 649 |
| 55 | 219 | 259 | 366 | 435 | 468 | 541 | 650 |
| 56 | 219 | 260 | 365 | 434 | 469 | 540 | 651 |
| 57 | 219 | 288 | 327 | 402 | 511 | 584 | 617 |
| 58 | 219 | 289 | 326 | 401 | 512 | 583 | 618 |
| 59 | 219 | 290 | 325 | 404 | 509 | 582 | 619 |
| 60 | 219 | 291 | 324 | 403 | 510 | 581 | 620 |
| 61 | 219 | 293 | 332 | 397 | 506 | 579 | 612 |
| 62 | 219 | 294 | 331 | 396 | 507 | 578 | 613 |
| 63 | 219 | 295 | 330 | 399 | 504 | 577 | 614 |
| 64 | 219 | 296 | 329 | 398 | 505 | 576 | 615 |
| 65 | 221 | 252 | 365 | 401 | 504 | 582 | 613 |
| 66 | 221 | 253 | 366 | 402 | 505 | 581 | 612 |
| 67 | 221 | 254 | 367 | 403 | 506 | 584 | 615 |
| 68 | 221 | 255 | 368 | 404 | 507 | 583 | 614 |
| 69 | 221 | 257 | 360 | 396 | 509 | 577 | 618 |
| 70 | 221 | 258 | 361 | 397 | 510 | 576 | 617 |
| 71 | 221 | 259 | 362 | 398 | 511 | 579 | 620 |
| 72 | 221 | 260 | 363 | 399 | 512 | 578 | 619 |
| 73 | 221 | 288 | 329 | 437 | 468 | 546 | 649 |
| 74 | 221 | 289 | 330 | 438 | 469 | 545 | 648 |
| 75 | 221 | 290 | 331 | 439 | 470 | 548 | 651 |
| 76 | 221 | 291 | 332 | 440 | 471 | 547 | 650 |
| 77 | 221 | 293 | 324 | 432 | 473 | 541 | 654 |
| 78 | 221 | 294 | 325 | 433 | 474 | 540 | 653 |
| 79 | 221 | 295 | 326 | 434 | 475 | 543 | 656 |
| 80 | 221 | 296 | 327 | 435 | 476 | 542 | 655 |
| 81 | 222 | 252 | 366 | 403 | 507 | 577 | 617 |
| 82 | 222 | 253 | 365 | 404 | 506 | 576 | 618 |
| 83 | 222 | 254 | 368 | 401 | 505 | 579 | 619 |
| 84 | 222 | 255 | 367 | 402 | 504 | 578 | 620 |
| 85 | 222 | 257 | 361 | 398 | 512 | 582 | 612 |

FIG. 41

| Symbols | Frequency Indices | | | | | | |
|---|---|---|---|---|---|---|---|
| 86 | 222 | 258 | 360 | 399 | 511 | 581 | 613 |
| 87 | 222 | 259 | 363 | 396 | 510 | 584 | 614 |
| 88 | 222 | 260 | 362 | 397 | 509 | 583 | 615 |
| 89 | 222 | 288 | 330 | 439 | 471 | 541 | 653 |
| 90 | 222 | 289 | 329 | 440 | 470 | 540 | 654 |
| 91 | 222 | 290 | 332 | 437 | 469 | 543 | 655 |
| 92 | 222 | 291 | 331 | 438 | 468 | 542 | 656 |
| 93 | 222 | 293 | 325 | 434 | 476 | 546 | 648 |
| 94 | 222 | 294 | 324 | 435 | 475 | 545 | 649 |
| 95 | 222 | 295 | 327 | 432 | 474 | 548 | 650 |
| 96 | 222 | 296 | 326 | 433 | 473 | 547 | 651 |
| 97 | 223 | 252 | 367 | 404 | 505 | 546 | 651 |
| 98 | 223 | 253 | 368 | 403 | 504 | 545 | 650 |
| 99 | 223 | 254 | 365 | 402 | 507 | 548 | 649 |
| 100 | 223 | 255 | 366 | 401 | 506 | 547 | 648 |
| 101 | 223 | 257 | 362 | 399 | 510 | 541 | 656 |
| 102 | 223 | 258 | 363 | 398 | 509 | 540 | 655 |
| 103 | 223 | 259 | 360 | 397 | 512 | 543 | 654 |
| 104 | 223 | 260 | 361 | 396 | 511 | 542 | 653 |
| 105 | 223 | 288 | 331 | 440 | 469 | 582 | 615 |
| 106 | 223 | 289 | 332 | 439 | 468 | 581 | 614 |
| 107 | 223 | 290 | 329 | 438 | 471 | 584 | 613 |
| 108 | 223 | 291 | 330 | 437 | 470 | 583 | 612 |
| 109 | 223 | 293 | 326 | 435 | 474 | 577 | 620 |
| 110 | 223 | 294 | 327 | 434 | 473 | 576 | 619 |
| 111 | 223 | 295 | 324 | 433 | 476 | 579 | 618 |
| 112 | 223 | 296 | 325 | 432 | 475 | 578 | 617 |
| 113 | 224 | 252 | 368 | 402 | 506 | 541 | 655 |
| 114 | 224 | 253 | 367 | 401 | 507 | 540 | 656 |
| 115 | 224 | 254 | 366 | 404 | 504 | 543 | 653 |
| 116 | 224 | 255 | 365 | 403 | 505 | 542 | 654 |
| 117 | 224 | 257 | 363 | 397 | 511 | 546 | 650 |
| 118 | 224 | 258 | 362 | 396 | 512 | 545 | 651 |
| 119 | 224 | 259 | 361 | 399 | 509 | 548 | 648 |
| 120 | 224 | 260 | 360 | 398 | 510 | 547 | 649 |
| 121 | 224 | 288 | 332 | 438 | 470 | 577 | 619 |
| 122 | 224 | 289 | 331 | 437 | 471 | 576 | 620 |
| 123 | 224 | 290 | 330 | 440 | 468 | 579 | 617 |
| 124 | 224 | 291 | 329 | 439 | 469 | 578 | 618 |
| 125 | 224 | 293 | 327 | 433 | 475 | 582 | 614 |
| 126 | 224 | 294 | 326 | 432 | 476 | 581 | 615 |
| 127 | 224 | 295 | 325 | 435 | 473 | 584 | 612 |

FIG. 42

| 4602 | 4604 | 4606 |
|---|---|---|
| AAC CRITICAL BAND INDEX | SHORT BLOCK (512 SAMPLES) INDEX RANGE | LONG BLOCK (9216 SAMPLES) INDEX RANGE |
| 5 | 10,11 | 180-216 |
| 6 | 12,13 | 217-252 |
| 7 | 14,15 | 253-288 |
| 8 | 16,17 | 289-324 |
| 9 | 18,19 | 325-360 |
| 10 | 20,21 | 361-396 |
| 11 | 22,23 | 397-432 |
| 12 | 24,25 | 433-468 |
| 13 | 26,27 | 469-504 |
| 14 | 28,29 | 505-540 |
| 15 | 30,31 | 541-576 |
| 16 | 32,33 | 577-612 |
| 17 | 34,35 | 613-648 |
| 17 | 36,37 | 649-684 |

| SLIDING INDEX | 0 | 1 | 2 | 3 | 4 | 5 | 6 | 7 | SAMPLE INDEX |
|---|---|---|---|---|---|---|---|---|---|
| 0 | 129 | 129 | 32 | 129 | 35 | 129 | 129 | 129 | 35400 |
| ...3... | 37 | 23 | 47 | 0 | 128 | 57 | 22 | 111 | 35672 |
| 37 | 37 | 23 | 47 | 0 | 128 | 57 | 22 | 111 | 35680 |
| 38 | 37 | 23 | 47 | 0 | 128 | 57 | 22 | 111 | 35688 |
| 39 | | | | | | | | | |
| ...191... | 129 | 129 | 129 | 129 | 129 | 129 | 129 | 129 | 36904 |

CURRENT LOCATION → (column 3)

| SLIDING INDEX | 0 | 1 | SAMPLE INDEX |
|---|---|---|---|
| 0 | 129 | 129 | 38472 |
| ...3... | | | |
| 37 | 254 | 68 | 38744 |
| 38 | 254 | 68 | 38752 |
| 39 | 254 | 68 | 38760 |
| ...191... | 129 | 129 | 39976 |

CURRENT LOCATION → (column 1)

FIG. 54

| MESSAGE INDEX | D0 | D1 | D2 | D3 | D4 | D5 | D6 | SAMPLE INDEX | VALIDATION FLAG |
|---|---|---|---|---|---|---|---|---|---|
| M0 | 57 | 22 | 111 | 37 | 23 | 47 | 0 | 35680 | VALIDATED |
| | | | | | | | | | |
| | | | | | | | | | |
| | | | | | | | | | |
| | | | | | | | | | |
| M7 | 57 | 13 | 111 | 37 | 23 | 33 | 3 | 67670 | PARTIALLY VALIDATED |
| | | | | | | | | | |

FIG. 56

```xml
<?xml version="1.0" encoding="utf-16"?>
<xsd:schema attributeFormDefault="unqualified" elementFormDefault="qualified"
        version="1.0" xmlns:xsd="http://www.w3.org/2001/XMLSchema">
 <xsd:element name="schedule" type="scheduleType" />
 <xsd:complexType name="scheduleType">
  <xsd:sequence>
   <xsd:element name="station" type="stationType" />
  </xsd:sequence>
 </xsd:complexType>
 <xsd:complexType name="stationType">
  <xsd:sequence>
   <xsd:element name="program" type="programType" />
  </xsd:sequence>
  <xsd:attribute name="sid" type="xsd:int" />
  <xsd:attribute name="name" type="xsd:string" />
  <xsd:attribute name="logo" type="xsd:string" />
 </xsd:complexType>
 <xsd:complexType name="programType">
  <xsd:sequence>
   <xsd:element maxOccurs="unbounded" name="offer" type="offerType" />
  </xsd:sequence>
  <xsd:attribute name="airdate" type="xsd:string" />
  <xsd:attribute name="name" type="xsd:string" />
  <xsd:attribute name="shortname" type="xsd:string" />
  <xsd:attribute name="duration" type="xsd:dateTime" />
 </xsd:complexType>
 <xsd:complexType name="offerType">
  <xsd:sequence>
   <xsd:element name="action" type="actionType" />
  </xsd:sequence>
  <xsd:attribute name="id" type="xsd:int" />
  <xsd:attribute name="type" type="xsd:string" />
  <xsd:attribute name="duration" type="xsd:dateTime" />
  <xsd:attribute name="ticstart" type="xsd:string" />
  <xsd:attribute name="ticend" type="xsd:string" />
  <xsd:attribute name="category" type="xsd:string" />
  <xsd:attribute name="subcategory" type="xsd:string" />
  <xsd:attribute name="name" type="xsd:string" />
  <xsd:attribute name="banner" type="xsd:string" />
  <xsd:attribute name="archivable" type="xsd:string" />
  <xsd:attribute name="expires" type="xsd:string" />
 </xsd:complexType>
 <xsd:complexType name="actionType">
  <xsd:attribute name="type" type="xsd:string" />
  <xsd:attribute name="object" type="xsd:string" />
 </xsd:complexType>
</xsd:schema>
```

FIG. 58

METHODS, APPARATUS AND ARTICLES OF MANUFACTURE TO PROVIDE SECONDARY CONTENT IN ASSOCIATION WITH PRIMARY BROADCAST MEDIA CONTENT

RELATED APPLICATION

This patent arises from a continuation of U.S. patent application Ser. No. 12/771,640, entitled "METHODS, APPARATUS AND ARTICLES OF MANUFACTURE TO PROVIDE SECONDARY CONTENT IN ASSOCIATION WITH PRIMARY BROADCAST MEDIA CONTENT," filed Apr. 30, 2010, which claims the benefit of U.S. provisional patent application Ser. No. 61/174,787, entitled "Methods and Apparatus To Provide Secondary Content in Association with Primary Broadcast Media Content," and filed on May 1, 2009. U.S. patent application Ser. No. 12/771,640 and U.S. provisional patent application Ser. No. 61/174,787 are hereby incorporated by reference in their entirety.

FIELD OF THE DISCLOSURE

This disclosure relates generally to content delivery and, more particularly, to methods and apparatus to provide secondary content in association with primary broadcast media content.

BACKGROUND

Identifying media content (e.g., television (TV) programs, radio programs, advertisements, commentary, audio/video content, movies, commercials, advertisements, etc.) is useful for assessing audience exposure to such content. For example, in audience metering applications, a code may be inserted into the audio or video of media content (e.g., a program or advertisement), wherein the code is later detected at one or more monitoring sites when the media content is presented (e.g., played at monitored households). The information payload of the code/watermark embedded into an original signal can include unique program identification, source identification, and/or time of broadcast. Monitoring sites may include locations such as, households, stores, places of business and/or any other public and/or private facilities, where media content exposure and/or consumption of media content is monitored. For example, at a monitoring site, codes from the audio and/or video are captured. The collected codes may then be sent to a central data collection facility for analysis.

BRIEF DESCRIPTION OF THE DRAWINGS

FIGS. 4 and 5 illustrate example user interfaces that may be used to present secondary content at the example secondary content presentation device of FIGS. 1 and 3.

FIGS. 20A-20C are charts illustrating different example code frequency configurations that may be used by the code frequency selector of FIG. 19.

FIGS. 26 and 27 illustrate example data structures that may be used to implement a secondary content schedule.

FIG. 40 illustrates example machine-accessible instructions that may be executed by, for example, a processor, to implement the example decoder of FIG. 39.

FIGS. 40-42 are charts illustrating different example code frequency configurations that may be generated by the machine-accessible instructions of FIG. 45 and used in conjunction with the code frequency selector of FIG. 39.

FIG. 46 is a chart illustrating critical band indices and how they correspond to short and long block sample indices.

FIG. 53 illustrates an example set of circular buffers that may store message symbols.

FIG. 54 illustrates an example set of pre-existing code flag circular buffers that may store message symbols.

FIG. 56 illustrates an example filter stack that may store identified messages in the decoder of FIG. 48.

FIG. 58 illustrates an example eXtensible Markup Language (XML) schema that may be used to construct a secondary content schedule XML document.

DETAILED DESCRIPTION

Figure 1:
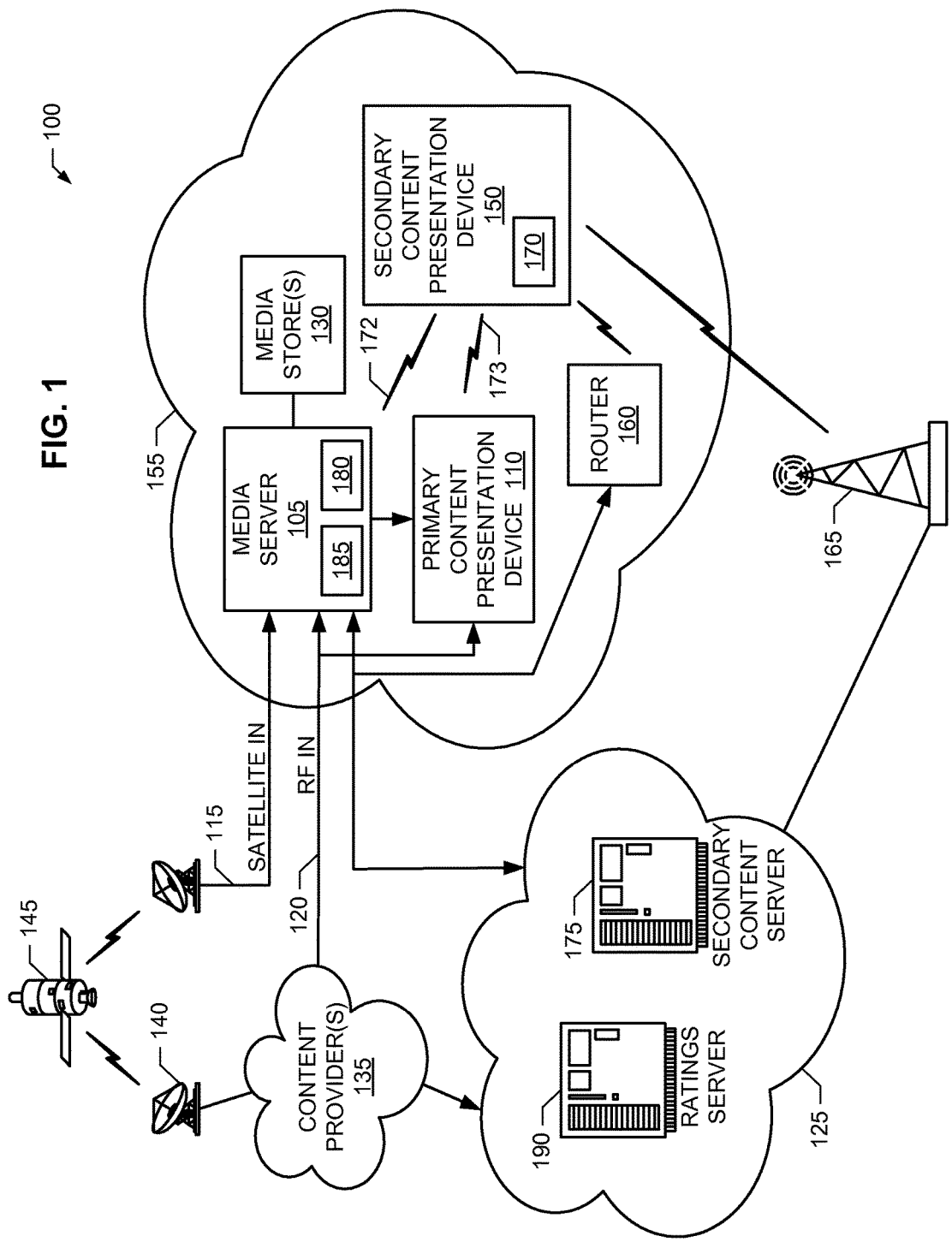
FIG. 1 is a schematic illustration of an example primary media content and secondary content delivery system constructed in accordance with the teachings of this disclosure.

Example methods, apparatus and articles of manufacture to provide secondary content in association with primary broadcast media content are disclosed. A disclosed example method includes receiving an audio signal output by a first media presentation device, the audio signal being associated with first media content, decoding the audio signal to extract a code from the audio signal, the code identifying at least one of the first media content or a broadcaster of the first media content, setting a clock using a timestamp associated with the code, obtaining second media content based on the code and the timestamp, the second media content comprising a plurality of pieces of secondary content for respective ones of a plurality of timestamps, and presenting, at a second media presentation device, a first of the plurality of pieces of secondary media when its respective timestamp substantially corresponds to time value obtained from the clock.

Another example method includes receiving an audio signal output by a first media presentation device, the audio signal being associated with first media content, decoding the audio signal to extract a code from the audio signal, the code representative of at least one of the first media content or a broadcaster of the first media content, and transmitting a wireless signal to a second media presentation device, the signal including the extracted code, the signal to trigger the second media presentation device to obtain second media content based on the code and to present the second media content at the second media presentation device.

Still another example methods includes receiving audio output by a first media presentation device, obtaining at least one of a Nielsen code or an Arbitron® code from the audio, the obtained code being representative of at least one of the first media content or a broadcaster of the first media content, obtaining second media content based on the extracted code, and presenting the second media content on a second media presentation device different from the first media presentation device.

A disclosed example apparatus includes an audio interface to receive an audio signal output by a first media presentation device, the audio signal being associated with first media content, a decoder to decode the audio signal to extract a code from the audio signal, the code representative of at least one of the first media content or a broadcaster of the first media content, the decoder to obtain a timestamp associated with the code, a secondary content module to obtain second media content based on the code and the timestamp, the second media content comprising a plurality of pieces of secondary content for respective ones of a plurality of timestamps, and a user interface module to present a first of the plurality of pieces of secondary content media when its respective timestamp substantially corresponds to a time value determined from the timestamp.

Another example apparatus includes an audio interface to receive an audio signal output by a first media presentation device, the audio signal being associated with first media content, a decoder to decode the audio signal to extract a code, the code being associated with at least one of the first media content or a broadcaster of the first media content, and a wireless interface to transmit a wireless signal to a second media presentation device, the signal including the extracted code, the signal to trigger the second media presentation device to obtain second media content based on the code and to present the second media content at the second media presentation device.

Still another example apparatus includes an audio input interface to receive audio output by a first media presentation device, a decoder to obtain at least one of a Nielsen code or an Arbitron code from the audio, the obtained code corresponding to at least one of the first media content or a broadcaster of the first media content, a secondary content module to obtain second media content based on the extracted code, and a user interface module to present the second media content on a second media presentation device different from the first media presentation device.

The following description makes reference to audio encoding and decoding that is also known as audio watermarking and watermark detection, respectively. It should be noted that in this context, audio is any type of signal having a frequency falling within the normal human audibility spectrum. For example, audio may be speech, music, an audio portion of an audio and/or video program or work (e.g., a television (TV) program, a movie, an Internet video, a radio program, a commercial spot, etc.), noise, or any other sound.

In general, encoding of audio refers to inserting one or more codes into the audio. In some examples, the code is psycho-acoustically masked so that the code is inaudible to human hearers of the audio. However, there may be certain situations in which the code may be audible to certain human listeners. Additionally, these codes may also be referred to as watermarks. The codes that are embedded in audio may be of any suitable length, and any suitable technique for mapping information (e.g., a channel identifier, a station identifier, a program identifier, a timestamp, a broadcast identifier, etc.) to the codes may be utilized. Furthermore, the codes may be converted into symbols that are represented by signals having selected frequencies that are embedded in the audio. Any suitable encoding and/or error correcting technique may be used to convert codes into symbols. A Nielsen code is any code embedded into any media content by and/or in association with The Nielsen Company (US), LLC or any affiliate of The Nielsen Company (US), LLC.

While the following examples are described with reference to broadcast audio/video media content (e.g., a TV program, a commercial, a movie, etc.) that include codes embedded and/or encoded into the audio portion thereof, such examples are merely illustrative. For example, codes may, additionally or alternatively, be embedded and/or encoded into other types of primary media content such as, but not limited to, video content, graphical content, an image, a game, a survey, and/or a webpage. For example, codes can be hidden and/or placed in non-viewable portions of video by, for instance, inserting codes into a vertical blanking interval and/or a horizontal retrace interval. Moreover, the methods and apparatus described herein may be used to detect codes embedded in any number and/or type(s) of additional and/or alternative primary media content (e.g., a radio broadcast, an audio announcement, etc.) and to trigger the display of secondary content associated with such broadcasted primary media. Further, primary media content need not be broadcast in order to trigger the presentation of secondary media content. For example, primary media content may be distributed via any number and/or type(s) of tangible medium, such as a digital versatile disc (DVD) and/or a compact disc (CD), that includes embedded codes that can trigger the presentation of secondary media content contained on the tangible medium, on a local media store, and/or on a media store accessible via, for example, the Internet and/or a local area network (LAN). Further still, non-media content data associated with the primary media content may be used to trigger the display of secondary media content associated with the primary media content. For example, data, variables and/or identifiers contained in one or more headers associated with a stream of packets transporting the primary media content (e.g., program and system information protocol (PSIP) information, a transport stream identifier, a program identifier (PID), a station identifier (SID), a timestamp, a CRC, etc.) can be used to trigger the display of secondary media content. It should be understood that such header information is carried along side and/or in connection with the data that represents the primary media content and, thus, occurs in a non-payload portion of a stream transporting the primary media content.

In the examples described herein, before and/or during transmission and/or broadcasting, the primary media content is encoded to include one or more codes indicative of the source of the primary media content, the broadcast time of the primary media content, the distribution channel of the primary media content, an identifier for the primary media content, a link (e.g., a URL, an ASCII reference to URL, etc.), particular portions of the primary media content, and/or any other information deemed relevant to the operator of the system. When the primary media content is presented on a primary content presentation device (e.g., played through a TV, a radio, a computing device, a cellular telephone, a hand-held device, and/or any other suitable device), persons in the area of the presentation are exposed not only to the primary media content, but, unbeknownst to them, are also exposed to the code(s) embedded in the primary media content. As described herein, in addition to the primary media device presenting the broadcasted media content (referred to herein as the "primary media content" or "primary broadcast media content"), persons may be provided with and/or utilize a secondary content presentation device (e.g., handheld, mobile and/or otherwise portable devices such as a hand-held computer, a personal digital assistant (PDA), a cellular telephone, a smartphone, a laptop computer, a netbook computer, an iPod™, a iPad™, and/or any other type(s) of hand-held, mobile and/or portable user device capable to present media content to a person). Some example secondary content presentation devices include a microphone and a decoder, and use free-field detection to detect the code(s) embedded in the primary media content. Additionally or alternatively, secondary content presentation devices can obtain and/or receive primary content identifiers (e.g., codes, signatures, non-payload information, etc.) via other methods and/or interfaces, such as a network interface, a Bluetooth interface, etc. Based on the detected code(s), the secondary content presentation device retrieves and presents secondary content related to the primary media content identified by the codes. The secondary content may or may not be related to the primary media content and may itself include media content, user interfaces, advertisements, and/or applications. In some examples, the secondary content presentation device may be implemented by and/or within the primary presentation device.

Further still, while the examples described herein utilize embedded audience measurement codes to identify primary media content, any number and/or type(s) of additional and/or alternative methods may be used to identify primary media content. For example, one or more signatures and/or fingerprints may be computed from and/or based on the primary media content and compared with a database of signatures to identify the primary media content. An example signature is computed via data compression applied to an audio portion of the primary media content. Example methods, apparatus and articles of manufacture to compute signatures and/or to identify media using signatures are described in U.S. patent application Ser. No. 12/110,951, entitled "Methods and Apparatus For Generating Signatures" and filed Apr. 28, 2008; and U.S. patent application Ser. No. 12/034,489, entitled "Methods and Apparatus For Characterizing Media" and filed Feb. 20, 2008. Each of U.S. patent application Ser. Nos. 12/110,951 and 12/034,489 is hereby incorporated by reference in its entirety.

FIG. 1 illustrates an example primary media content and secondary content delivery system 100. To allow a person to play, view and/or record primary media content, the example system 100 of FIG. 1 includes any number and/or type(s) of media servers (one of which is designated at reference numeral 105), and any number and/or type(s) of primary media content presentation devices (one of which is designated at reference numeral 110). The example media servers 105 of FIG. 1 are customer-premises devices, consumer devices, and/or user devices and may be located, implemented and/or operated in, for example, a house, an apartment, a place of business, a school, a government office, a medical facility, a church, etc. Example media servers 105 include, but are not limited to, a set top box (STB), a digital video recorder (DVR), a video cassette recorder (VCR), a DVD player, a CD player, a personal computer (PC), a game console, a radio, an advertising device, an announcement system, and/or any other type(s) of a media player. Example primary media content presentation devices 110 include, but are not limited to, a speaker, an audio system, a TV and/or a monitor. In some examples, the example media server 105 of FIG. 1 outputs audio and/or video signals via the primary content presentation device 110. For instance, a DVD player 105 may display a movie via a screen and a speaker (not shown) of a TV 110 and/or a speaker of an audio system 110. Example primary media content includes, but is not limited to, TV programs, movies, videos, commercials, advertisements, audio, video, games, web pages, advertisements and/or surveys.

In the example delivery system 100 of FIG. 1, the example media server 105 receives primary media content via any number and/or type(s) of sources such as, for example: a satellite receiver and/or antenna 115; a radio frequency (RF) input signal 120 received via any number and/or type(s) of cable TV signal(s) and/or terrestrial broadcast(s); a terrestrial and/or satellite radio broadcast; any number and/or type(s) of data communication network(s) such as the Internet 125; any number and/or type(s) of local or remote data and/or media store(s) 130 such as, for example, a hard disk drive (HDD), a VCR cassette, a DVD, a CD, a flash memory device, etc. In the example delivery system 100 of FIG. 1, at least some of the primary media content (regardless of its source and/or type) includes embedded audience measurement codes and/or watermarks that were purposefully inserted by a content provider, audience measurement entity and/or broadcaster 135 to facilitate audience measurement and/or audience rating determinations for the primary media content. Example methods and apparatus to insert and/or embed audience measurement codes such as Nielsen codes in primary content are described below in connection with FIGS. 18-21 and 38-47. Other example methods and apparatus to insert and/or embed audience measurement codes in primary content are described in U.S. patent application Ser. No. 12/604,176, entitled "Methods and Apparatus to Extract Data Encoded in Media Content," and filed Oct. 22, 2009, which is hereby incorporated by reference in its entirety. A preferred example of such audience measurement codes include the Nielsen Audio Encoding System (NAES) codes (a.k.a. Nielsen codes) that are proprietary to The Nielsen Company (US), LLC, the assignee of the present patent. Example NAES codes include the NAES II and NAES V audio code systems. However, any past, present and/or future NAES codes may be used. Other example audience measurement codes include, but are not limited to, those associated with the Arbitron audio encoding system.

To provide and/or broadcast primary media content, the example delivery system 100 of FIG. 1 includes any number and/or type(s) of content provider(s) and/or broadcaster(s) 135 such as, for example, RF TV stations, Internet protocol TV (IPTV) broadcasters, digital TV (DTV) broadcasters, cable TV broadcasters, satellite TV broadcasters, movie studios, terrestrial radio broadcasters, satellite radio broadcasters, etc. In the illustrated example of FIG. 1, the content provider(s) and/or broadcaster(s) 135 deliver and/or otherwise provide the primary media content to the example media server 105 via any desired medium (e.g., a satellite broadcast using a satellite transmitter 140 and a satellite and/or satellite relay 145, a terrestrial broadcast, a cable TV broadcast, the Internet 125, and/or the media store(s) 130).

To provide secondary content, which may or may not be related to primary media content being presented at and/or via the media server 105 and/or the primary content presentation device 110, the example primary media content and secondary content delivery system 100 of FIG. 1 includes any number and/or type(s) of secondary content presentation devices, one of which is designated with reference numeral 150. The example secondary content presentation devices 150 of FIG. 1 are customer-premises devices, consumer devices, and/or user devices. Example secondary content presentation devices 150 include, but are not limited to, a hand-held computer, a PDA, a cellular telephone, a smartphone, a laptop computer, a netbook computer, and/or any other type(s) of hand-held, mobile and/or portable secondary content presentation device capable to present primary media content and/or secondary content to a person. In the illustrated example of FIG. 1, the secondary content presentation device 150 can communicate with other devices of a LAN 155 (e.g., the media server 105) via any number and/or type(s) of wireless router(s) and/or wireless access point(s), one of which is designated at reference numeral 160. The example secondary content presentation device 150 can communicate with the Internet 125 via the example LAN 155 and/or via a cellular base station 165. Moreover, while not depicted in FIG. 1, the secondary content presentation device 150 can be communicatively coupled to the LAN 155 via a wired communication protocol and/or communication signal.

To provide secondary content identified via primary broadcast media content, the example secondary content presentation device 150 of FIG. 1 includes a secondary content module 170. The example secondary content module 170 of FIG. 1 detects the presence of codes and/or watermarks in free-field radiating audio signals 172 and 173 emitted by, for example, one or more speaker(s) of the media server 105 and/or the primary content presentation device 110. When a code is detected, the example secondary content module 170 obtains secondary content associated with the detected code and/or watermark from a secondary content server 175 and/or the media server 105 via the wireless router 160 and/or the base station 165, and presents the thus obtained secondary content on a display 330 (FIG. 3) of the secondary content presentation device 150. Example manners of implementing the example secondary content module 170 and/or, more generally, the example secondary content presentation device 150 are described below in connection with FIGS. 3, 17 and 25. Example methods and apparatus to detect and decode codes and/or watermarks embedded in the audio signals 172 and 173 are described below in connection with FIGS. 18, 22, 23, 38, and 48-56. Other example methods and apparatus to detect and decode codes and/or watermarks embedded in the audio signals 172 and 173 are described in U.S. patent application Ser. No. 12/604,176, entitled "Methods and Apparatus to Extract Data Encoded in Media Content," and filed Oct. 22, 2009.

As described below in connection with FIG. 2, in some examples, the media server 105 includes a secondary content triggerer 180 that detects and decodes codes and/or watermarks embedded in primary media content and/or in non-payload portions of primary media content (e.g., a header of a data stream transporting the primary media content), and triggers the secondary content presentation device 150 to retrieve and/or present secondary content via, for example, a Bluetooth signal and/or a wireless LAN signal. Such triggers include and/or identify the code(s) detected and/or decoded by the secondary content triggerer 180. In some examples, the detecting and/or decoding of codes at the media server 105 occurs simultaneous to the presentation of the primary media content via the primary content presentation device 110. When the secondary content presentation device 150 is triggered by the secondary content presentation triggerer 180, the secondary content presentation device 150 retrieves and presents secondary content associated with the detected code, as described above. Alternatively, the triggering include a push of the secondary content from the media server 105 to the secondary content presentation device 150 so that the secondary content presentation device 150 need not request the secondary media content. The methods and apparatus described below in connection with FIGS. 18, 22, 23, 38, and 48-56, and/or U.S. patent application Ser. No. 12/604,176 may be used to implement the example secondary content triggerer 180. An example manner of implementing the example media server 105 of FIG. 1 is described below in connection with FIG. 2.

Additionally or alternatively, the example media server 105 of FIG. 1 may implement a secondary content serving module 185 that allows the example secondary content module 170 to obtain secondary content from the media server 105 and/or from the secondary content server 175. Thus, the secondary content module 170 and/or, more generally, the example secondary content presentation device 150 can present locally cached and/or available secondary content as well as secondary content available via the Internet 125.

The example secondary content server 175 of FIG. 1 responds to queries for secondary content. For example, when the secondary content presentation device 150 of FIG. 1 provides a code and/or watermark decoded from primary media content, the secondary content server 175 provides one or more links (e.g., a URL) to secondary content, provides one or more pieces of secondary content (e.g., a webpage, a banner, an image, a video clip, etc.), and/or provides tuning information (e.g., to a mobile DTV signal, channel and/or broadcast, and/or an IPTV signal, channel, and/or multicast) that may be used to obtain the secondary media content to the secondary content presentation device 150. The secondary content presentation device 150 preferably automatically activates the URLs and/or the tuning information to automatically obtain and start displaying the secondary media content. As discussed below, a filter may be utilized to determine whether given URL and/or tuning information is automatically activated. In some examples, the secondary content server 175 and/or the ratings server 190 identify the primary media content and/or portion(s) of the primary media content associated with the code and/or watermark. This identification is useful for audience measurement purposes. An example manner of implementing the example secondary content server 175 of FIG. 1 is described below in connection with FIGS. 11 and 32.

To determine audience rating information, the example delivery system of FIG. 1 includes the example ratings server 190. Using, among other things, embedded codes, computed signatures and/or non-payload data and/or information detected, decoded, extracted and/or computed by the secondary content presentation device 150, the media server 105, an audience measurement device associated with the media server 105 (not shown), an audience measurement device associated with the primary content presentation device 110 (not shown), and/or similar devices at other locations, the example rating server 190 of FIG. 1 develops meaningful content exposure statistics. For instance, the example ratings server 190 can determine the overall effectiveness, reach and/or audience demographics of primary media content and/or secondary content by processing the collected data (e.g., codes, URLs, person identification information, etc.) using any number and/or type(s) of statistical method(s). These ratings may relate to the primary content, the secondary content or both the primary and secondary content. In some examples, the media server 105 and/or the secondary content presentation device 150 store a log of audience measurement data and periodically (e.g., once a day) and/or aperiodically send the collected data to the ratings server 190 for processing. Additionally or alternatively, as each code, signatures and/or non-payload information is detected, extracted, computed and/or decoded it may be provided to the ratings server 190. Access to secondary content by, for example, activating a URL is also preferably logged and provided to the rating server 190.

Figure 2:
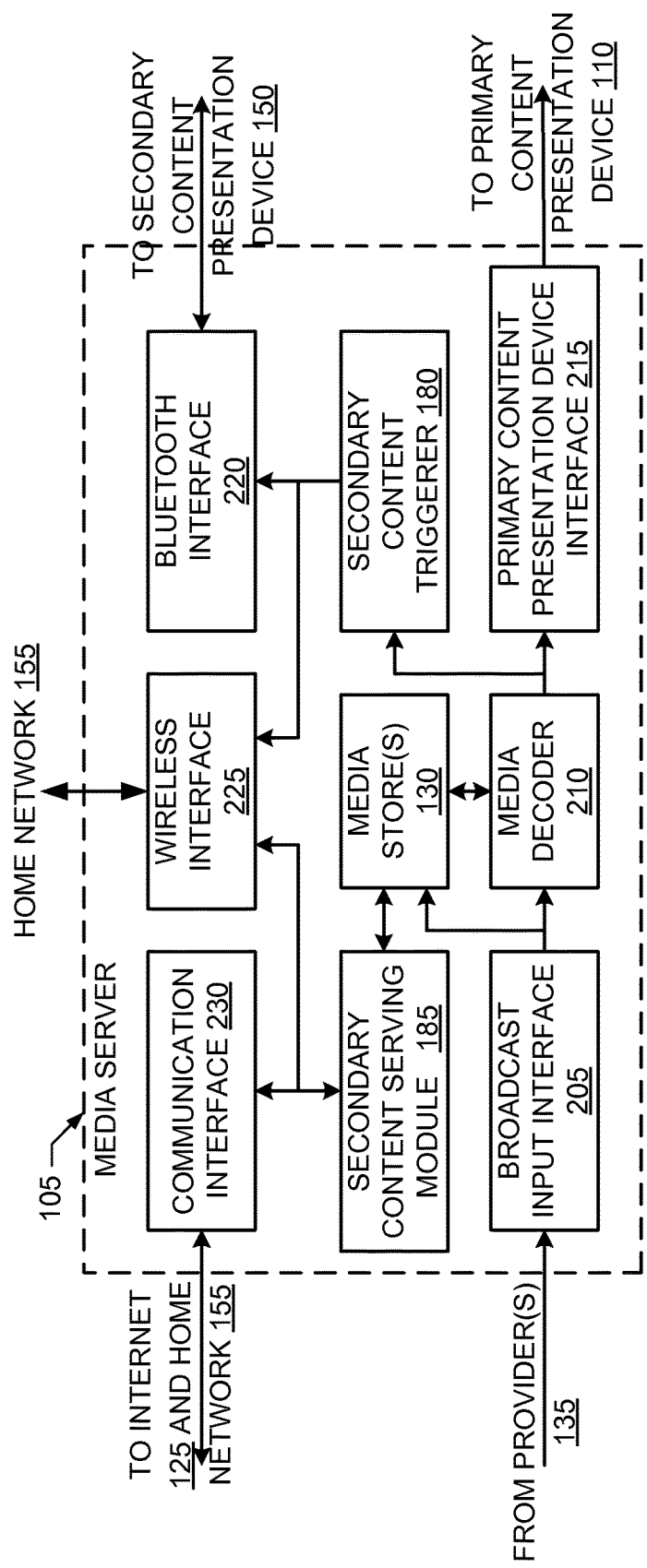
FIG. 2 illustrates an example manner of implementing the example media server of FIG. 1.

FIG. 2 illustrates an example manner of implementing the example media server 105 of FIG. 2. To receive primary broadcast media content and/or secondary content from the content provider(s) 135, the example media server 105 of FIG. 2 includes any number and/or type(s) of broadcast input interfaces, one of which is designated at reference numeral 205. The example broadcast input interface 205 of FIG. 2 receives broadcast primary media content via any number and/or type(s) of device(s), module(s), circuit(s) and/or interface(s) (e.g., a RF tuner configurable to receive a selected terrestrially broadcast TV signal).

To decode primary media signals, the example media server 105 of FIG. 2 includes a media decoder 210. When a media signal received via the broadcast input interface 205 is encoded and/or encrypted, the example media decoder 210 decodes and/or decrypts the primary media signal into, for example, a form suitable for output to the example primary content presentation device 110 via a presentation device interface 215. Example presentation device interfaces 215 include, but are not limited to, an RF output module, a component video output module, and/or a high-definition multimedia interface (HDMI) module.

To store received media content, the example media server 105 of FIG. 2 includes the example media store(s) 130. Additionally or alternatively, the media server 105 may be communicatively coupled to removable media stores, such as a DVD reader or a CD reader, and/or be communicatively coupled to an external storage device. An example media store 130 is a HDD.

To trigger the example secondary content presentation device 150 to retrieve and present secondary content related to primary media content, the example media server 105 of FIG. 2 includes the example secondary content triggerer 180. When the example secondary content triggerer 180 of FIG. 2 detects a code embedded in primary media content and/or an identifier contained in a non-payload portion of the primary media content (e.g., a PID, a SID and/or a timestamp contained in one or more packet headers), which may be currently being presented, the secondary content triggerer 180 notifies the secondary content presentation device 150 via, for example, any type of short-range wireless interface, such as a Bluetooth interface 220, and/or any type of wireless LAN interface 225. Some examples exclude the secondary content triggerer 180 and instead rely on the secondary content presentation device 150 to detect inaudible codes and utilize the same to retrieve secondary content. The trigger sent by the secondary content triggerer 180 to the secondary content presentation device 150 may include the code detected in the primary media content, a signature and/or fingerprint computed based on the primary media content, and/or an identifier contained in a non-payload portion of the primary media content (e.g., a PID, a SID and/or a timestamp contained in one or more packet headers).

To provide secondary content, the example media server 105 of FIG. 2 includes the example secondary content serving module 185. When a request for secondary content is received from the example secondary content presentation device 150 via the wireless interface 225 and/or any type of wired communication interface 230, the secondary content serving module 185 of FIG. 2 queries the example media store(s) 130 for secondary content associated with a detected code, and returns the secondary content to the secondary content presentation device 150. The request for the secondary content is preferably triggered by the detection of the inaudible code as explained above. The secondary content may or may not be related to the primary media content. The secondary content may be received by the media server 105 via the broadcast input interface 205 and be stored and/or cached in the media store(s) 130. In some examples, the secondary content may be received at the media server 105 in conjunction with the primary media content (e.g., on a minor channel of a DTV broadcast). Additionally or alternatively, the secondary content may be received via one or more separate program stream(s) using the same or a different communication medium as the primary content stream, and/or may be pushed to the media server 105 by the secondary content server 175. Some examples exclude the secondary content serving module 185 and instead rely on the secondary content presentation device 150 to detect inaudible codes and utilize the same to retrieve secondary content from the secondary content server 175.

While an example manner of implementing the example media server 105 of FIG. 1 has been illustrated in FIG. 2, one or more of the interfaces, data structures, elements, processes and/or devices illustrated in FIG. 2 may be combined, divided, re-arranged, omitted, eliminated and/or implemented in any other way. Further, the broadcast input interface 205, the example media decoder 210, the example presentation device interface 215, the example Bluetooth interface 220, the example wireless interface 225, the example communication interface 230, the example media store(s) 130, the example secondary content triggerer 180, the example secondary content serving module 185 and/or, more generally, the example media server 105 of FIG. 2 may be implemented by hardware, software, firmware and/or any combination of hardware, software and/or firmware. Thus, for example, any of the broadcast input interface 205, the example media decoder 210, the example presentation device interface 215, the example Bluetooth interface 220, the example wireless interface 225, the example communication interface 230, the example media store(s) 130, the example secondary content triggerer 180, the example secondary content serving module 185 and/or, more generally, the example media server 105 may be implemented by one or more circuit(s), programmable processor(s), application-specific integrated circuit(s) (ASIC(s)), programmable logic device(s) (PLD(s)), field-programmable logic device(s) (FPLD(s)), and/or field-programmable gate array(s) (FPGA(s)), etc. When any apparatus claim of this patent incorporating one or more of these elements is read to cover a purely software and/or firmware implementation, at least one of the broadcast input interface 205, the example media decoder 210, the example presentation device interface 215, the example Bluetooth interface 220, the example wireless interface 225, the example communication interface 230, the example media store(s) 130, the example secondary content triggerer 180, the example secondary content serving module 185 and/or, more generally, the example media server 105 are hereby expressly defined to include a tangible article of manufacture such as a tangible computer-readable medium such as those described below in connection with FIG. 17 storing the firmware and/or software. Further still, the example media server 105 may include interfaces, data structures, elements, processes and/or devices instead of, or in addition to, those illustrated in FIG. 2 and/or may include more than one of any or all of the illustrated interfaces, data structures, elements, processes and/or devices.

Figure 3:
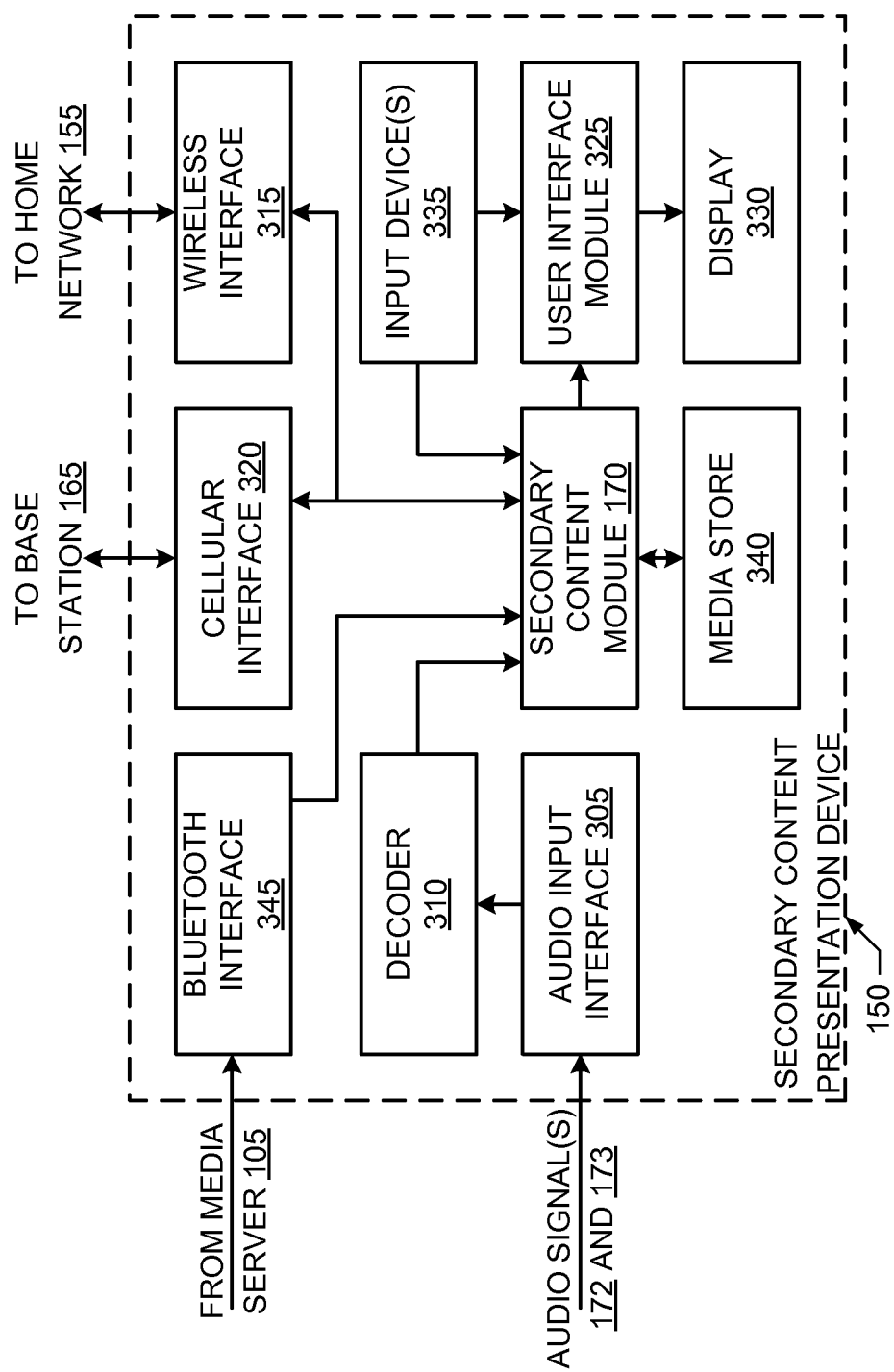
FIG. 3 illustrates an example manner of implementing the example secondary content presentation device of FIG. 1.

FIG. 3 illustrates an example manner of implementing the example secondary content presentation device 150 of FIG. 1. To receive the free-field radiating audio signals 172 and 173 of FIG. 1, the example secondary content presentation device 150 of FIG. 3 includes any type of audio input interface 305, such as a microphone. To detect and/or decode codes and/or watermarks present in the audio signals 172 and 173, the example secondary content presentation device 150 of FIG. 3 includes a decoder 310. Example apparatus and methods that may be used to implement the example decoder 310 of FIG. 3 are described below in connection with FIGS. 18, 22, 23, 38, and 48-56. In some examples, to conserve battery life, the decoder 310 does not operate continuously. Instead, the decoder 310 may be aperiodically and/or periodically activated to determine whether the primary media content has changed. During time intervals when the decoder 310 is turned off and/or in a stand-by mode, and/or to compensate for or accommodate delays in transferring or receiving secondary content, the secondary content module 170 can continue presenting secondary content according to a secondary-content schedule, such as those described below in connection with FIGS. 26 and 27. In some examples, the secondary-content schedule is used to deliver secondary content to the secondary content presentation device 150 prior to when the secondary content is to be presented to accommodate content delivery delays and/or interruption(s) of network connectivity. That is, secondary content may be delivered in non real-time (e.g., early) even though the secondary content is presented substantially in real-time at a specified location in the primary media content.

It should be apparent that turning off the decoder 310 might affect how promptly the secondary content presentation device 150 can detect a change in primary media content. To reduce such effects, the decoder 310 could continuously operate to detect SIDs thereby remaining responsive to, for example, channels changes while less frequently detecting, decoding and/or validating timestamps. How often timestamps are detected, decoded and/or validated may be adjusted depending on the time duration encompassed by a particular secondary content schedule, and/or to achieve a desired level of time synchronization between primary and secondary media content. For example, timestamps may be continuously detected in order to accommodate the skipping of commercials and/or other portions of the primary media content when the primary media content was, for example, pre-recorded.

To retrieve and present secondary content, the example secondary content presentation device 150 of FIG. 3 includes the example secondary content module 170. When the example decoder 310 detects an embedded code and/or watermark, the example secondary content module 170 of FIG. 3 queries the secondary content server 175 and/or the example media server 105 via any type of wireless LAN interface 315 and/or any type of cellular interface 320. In response to the query, the example secondary content module 170 receives one or more pieces of secondary content and/or one or more links (e.g., URLs) to secondary content.

An example manner of implementing the example secondary content module 170 is described below in connection with FIG. 25.

To present, among other things, secondary content, the example secondary content presentation device 150 of FIG. 3 includes any type of user interface module 325, and any type of display 330. The example secondary content module 170 of FIG. 3 generates and provides to the user interface module 325 one or more user interfaces that represent, depict and/or allow a user to view, select and/or activate secondary content. Example user interfaces that may be used to represent, depict, present and/or allow a user to select secondary content are described below in connection with FIGS. 4 and 5. The example user interfaces generated by the example secondary content module 170 may be responsive to user inputs and/or selections received via any number and/or type(s) of input device(s) 335.

In some examples, the user interface module 325 of FIG. 3 is implemented in conjunction with an operating system (OS) executing on a processor (not shown) of the secondary content presentation device 150. In such an example, the secondary content module 170 may be implemented as a software application executing within the OS that accesses an application programming interface (API) implemented by the OS to cause a user interface to be displayed on the display 330 and to receive user inputs via the input device(s) 335. Example machine-accessible instructions that may be executed to implement the example secondary content module 170 of FIG. 3 are described below in connection with FIG. 17.

To store, among other things, primary and/or secondary media content received by and/or obtained by the secondary content module 170, the example secondary content presentation device 150 of FIG. 3 includes any number and/or type(s) of media stores, one of which is designated at reference numeral 340. In some examples, secondary content may be obtained, cached, and/or pushed to the secondary content presentation device 150, and stored on the media store 340, prior to presentation and/or after presentation via the user interface module 325 and the display 330.

In some examples, the example secondary content module 170 of FIG. 3 may be triggered to obtain, receive and/or present secondary content and/or links to secondary content via any type of short-range wireless interface, such as a Bluetooth interface 345, and/or via the example wireless LAN interface 315. The trigger received via the Bluetooth interface 345 and/or the wireless LAN interface 315 includes the embedded code and/or non-payload code (e.g., a PID, a SID and/or a timestamp extracted from one or more packet headers) detected at the media server 105.

While an example manner of implementing the example secondary content presentation device 150 of FIG. 1 has been illustrated in FIG. 3, one or more of the interfaces, data structures, elements, processes and/or devices illustrated in FIG. 3 may be combined, divided, re-arranged, omitted, eliminated and/or implemented in any other way. Further, the example audio input interface 305, the example decoder 310, the example wireless interface 315, the example cellular interface 320, the example user interface module 325, the example display 330, the example input device(s) 335, the example media store 340, the example Bluetooth interface 345, the example secondary content module 170 and/or, more generally, the example secondary content presentation device 150 of FIG. 3 may be implemented by hardware, software, firmware and/or any combination of hardware, software and/or firmware. Thus, for example, any of the example audio input interface 305, the example decoder 310, the example wireless interface 315, the example cellular interface 320, the example user interface module 325, the example display 330, the example input device(s) 335, the example media store 340, the example Bluetooth interface 345, the example secondary content module 170 and/or, more generally, the example secondary content presentation device 150 may be implemented by one or more circuit(s), programmable processor(s), ASIC(s), PLD(s), FPLD(s), and/or FPGA(s), etc. When any apparatus claim of this patent incorporating one or more of these elements is read to cover a purely software and/or firmware implementation, at least one of the example audio input interface 305, the example decoder 310, the example wireless interface 315, the example cellular interface 320, the example user interface module 325, the example display 330, the example input device(s) 335, the example media store 340, the example Bluetooth interface 345, the example secondary content module 170 and/or, more generally, the example secondary content presentation device 150 are hereby expressly defined to include a tangible article of manufacture such as a tangible computer-readable medium such as those described below in connection with FIG. 17 storing the firmware and/or software. Further still, the example secondary content presentation device 150 may include interfaces, data structures, elements, processes and/or devices instead of, or in addition to, those illustrated in FIG. 3 and/or may include more than one of any or all of the illustrated interfaces, data structures, elements, processes and/or devices.

FIGS. 4 and 5 illustrate example user interfaces that may be presented via the example display 330 of FIG. 3 to present secondary content to a user. Each of the example user interfaces of FIGS. 4 and 5 include an upper banner portion 405 that includes a broadcast source identifier 410 and the current time 415. An example broadcast source identifier 410 is a logo associated with a broadcaster and/or content provider 135.

Each of the example user interfaces of FIGS. 4 and 5 also include a middle tool bar portion 420 that includes one or more buttons and/or activatable user interface elements, one of which is designated at reference numeral 425. Example buttons 425 allow a user to control settings associated with the example secondary content module 170, access and/or utilize social networking features implemented by the secondary content module 170, save secondary content for subsequent retrieval, get information related to persons appearing in a primary media content, etc.

The example user interface of FIG. 4 includes a lower portion 430 that displays one or more user selectable and/or activatable elements (e.g., icons, bitmap images, text, links, etc.), one of which is designated at reference numeral 435. When a particular link 435 is activated and/or selected by a user, the lower portion of the example user interface of FIG. 4 is replaced with the secondary content 505 associated with that element 435, as shown in FIG. 5. For example, the secondary content 505 may display a webpage associated with and/or facilitating purchase of a particular product advertised in a commercial portion of primary media content currently being presented at the primary content presentation device 110. As shown in FIG. 5, a button 510 is provided to stop display of the secondary content 505 and return to the list of selected elements 435 shown in FIG. 4. When more secondary content elements are to be displayed than fit within the display area of the lower portion 430, the example user interface of FIG. 4 may include navigation elements 440 to allow a user to navigate through the selectable elements 435.

While user interfaces are illustrated in FIGS. 4 and 5, any number and/or type(s) of additional and/or alternative user interfaces may be used to present secondary content. For example, one or more of the depicted elements may be combined, divided, re-arranged, omitted, eliminated and/or implemented in any other way. Moreover, the example user interfaces may include elements instead of, or in addition to, those illustrated in FIGS. 4 and/or 5, and/or may include more than one of any or all of the illustrated elements.

FIGS. 6, 7, 8, 9 and 10 illustrates example secondary content delivery scenarios that may be carried out by the example delivery system 100 of FIG. 1. While the examples illustrated in FIGS. 6-10 are depicted in a serial fashion, as discussed below in connection with FIG. 17, the activities of the activities of detecting codes, detecting timestamps t(n), obtaining secondary content, obtaining links to secondary content, obtaining secondary content schedules, displaying secondary content links, displaying secondary content offers can occur substantially in parallel. Moreover, secondary content may be presented without providing and/or presenting an intervening link and/or offer to that content. As described below in connection with FIGS. 25-31, secondary content may, additionally or alternatively, be provided and/or displayed based on a schedule of secondary content. A schedule of secondary content defines at what times within primary media content secondary media content is to be presented. The secondary content schedule may be used to obviate the need for repeated, ongoing and/or continual interactions that can consume network bandwidth, can cause a lack of synchronization between the secondary content server 175 and/or the secondary content presentation device 150, and/or may make the example system 100 of FIG. 1 more sensitive to bandwidth constraints and/or transmission latencies. Thus, while the example scenarios of FIGS. 6-10 are described with reference to particular secondary media content items, the example scenarios of FIGS. 6-10 could, additionally or alternatively, used to provide a schedule of secondary content.

Figure 6:
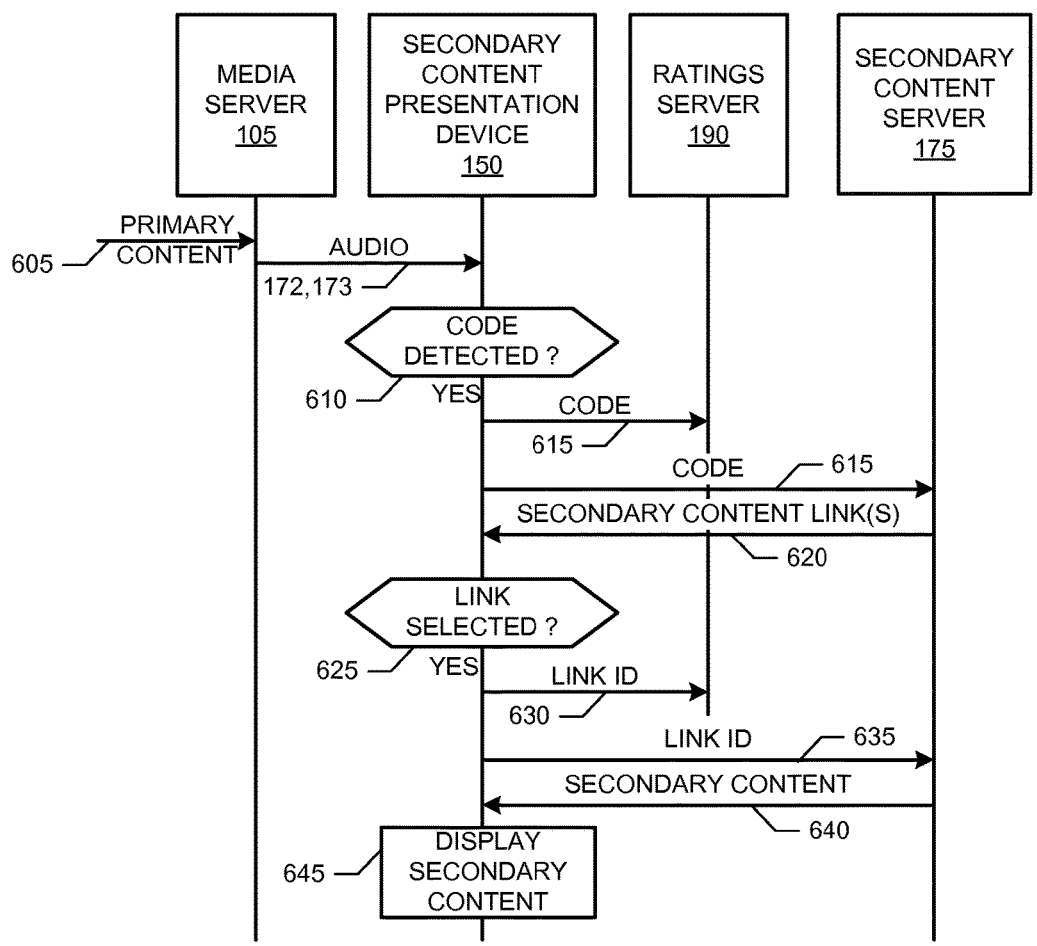
FIGS. 6-10 illustrate example secondary content delivery scenarios that may be implemented by the example delivery system of FIG. 1.

The example secondary content delivery scenario of FIG. 6 begins with the example media server 105 receiving primary media content 605 via the example broadcast input interface 205. The example media server 105 and/or the example primary content presentation device 110 emits and/or outputs the free-field radiating audio signal 172, 173 associated with the primary media content 605 via, for example, one or more speakers.

When the example decoder 310 of the secondary content presentation device 150 detects a code 615 in the audio 172, 173 (block 610), the secondary content module 170 provides the code 615 to the example ratings server 190 to facilitate audience measurement. The example secondary content module 170 also queries the secondary content server 175 based on the code 615 to receive one or more links 620 to secondary content. The user interface module 325 and the example secondary content module 170 display the obtained links 620 using, for example, the example user interface of FIG. 4. When one of the links 620 is selected and/or activated by a user (block 625), the secondary content module 170 sends an identifier 630 associated with the link to the ratings server 190, also obtains the secondary content associated with the selected and/or activated link from the secondary content server 175 (lines 635 and 640), and displays the obtained secondary content 640 using, for example, the user interface of FIG. 5 (block 645). If the collection of audience measurement data is not desired, the interaction with the ratings server 190 may be omitted in the illustrated example of FIG. 6.

Figure 7:
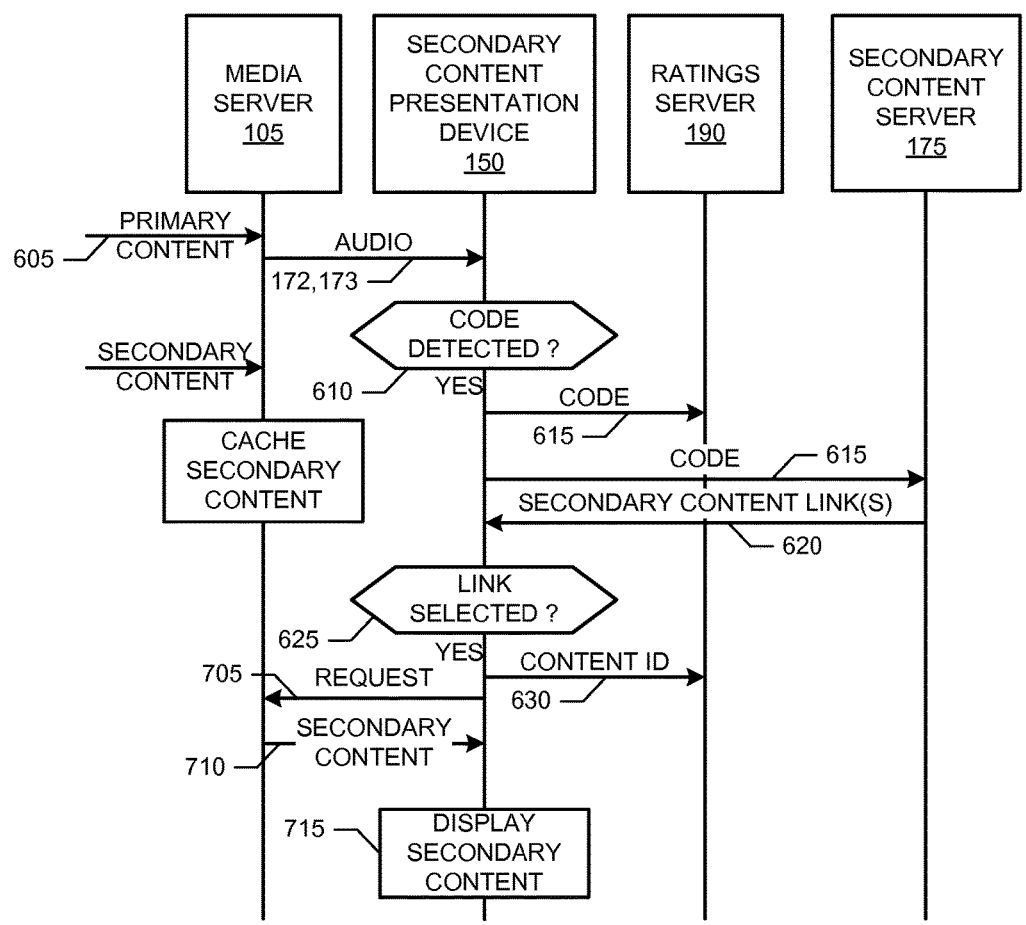

Turning to FIG. 7, the first portion of the example scenario of FIG. 7 is identical to the first portion of the example scenario of FIG. 6. Accordingly, identical references numerals have been used in the first portions of FIGS. 6 and 7, and the interested reader is referred to the discussion presented above in connection with FIG. 6 for descriptions of the identically numbered elements.

In the illustrated example of FIG. 7, links 620 to secondary content are retrieved from the secondary content server 175; however, the secondary content 710 is retrieved and/or obtained from the media server 105 rather than from the secondary content server 175. Thus, when a particular link 620 is selected and/or activated (block 625), the secondary content module 170 sends a request 705 for the secondary content 710 associated with the selected link 620 to the media server 105, and receives the secondary content 710 from the media server 105. The secondary content module 170 then displays the secondary content 710 obtained from the media server 105 using, for example, the user interface of FIG. 5 (block 715). If the collection of audience measurement data is not desired, the interaction with the ratings server 190 may be omitted in the illustrated example of FIG. 7.

Figure 8:
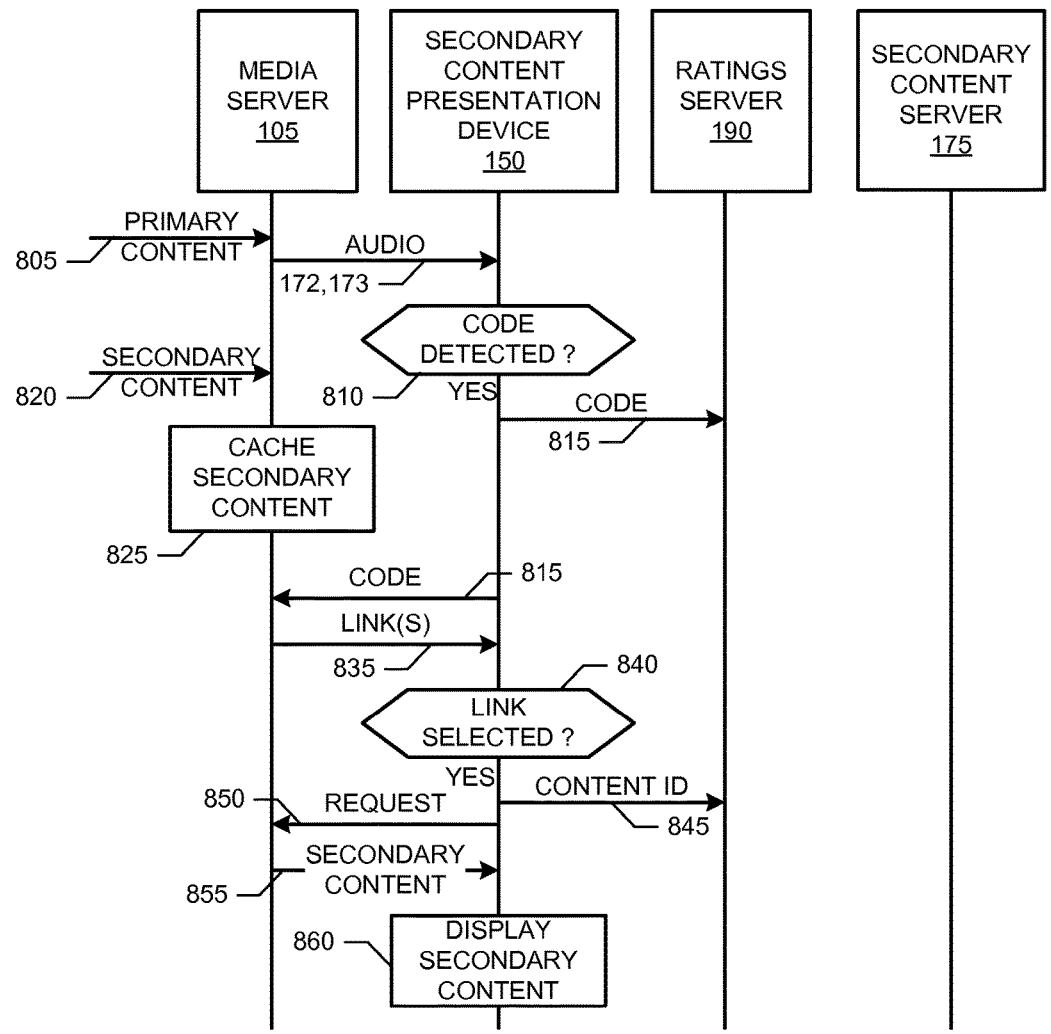

In the illustrated example of FIG. 8, the secondary content presentation device 150 obtains secondary content and links to secondary content from the media server 105 rather than from the secondary content server 175. Thus, in the illustrated example of FIG. 8 the secondary content presentation device 150 need not interact with the secondary content server 175. The example secondary content delivery scenario of FIG. 8 begins with the example media server 105 receiving primary media content 805 via the example broadcast input interface 205. The example media server 105 and/or the example primary content presentation device 110 emits and/or outputs the free-field radiating audio signal 172, 173 associated with the primary media content 805 via, for example, one or more speakers.

When the example secondary content serving module 185 receives secondary content 820, the secondary content serving module 185 stores and/or caches the secondary content 820 in the media store(s) 130 (block 825).

When the example decoder 310 of the secondary content presentation device 150 detects a code 815 in the audio 172, 173 (block 810), the secondary content module 170 provides the code 815 to the example ratings server 190 to facilitate audience measurement. The example secondary content module 170 queries the secondary content serving module 185 based on the code 815, and receives one or more links 835 to secondary content. The user interface module 325 and the example secondary content module 170 display the obtained links 835 using, for example, the example user interface of FIG. 4. When one of the links 835 is selected and/or activated (block 840), the secondary content module 170 sends an identifier 845 associated with the selected link 835 to the ratings server 190, obtains the content 855 associated with the selected and/or activated link 835 from the media server 105 (lines 850 and 855), and displays the obtained content 855 using, for example, the user interface of FIG. 5 (block 860). If the collection of audience measurement data is not desired, the interaction with the ratings server 190 may be omitted in the illustrated example of FIG. 8.

Figure 9:
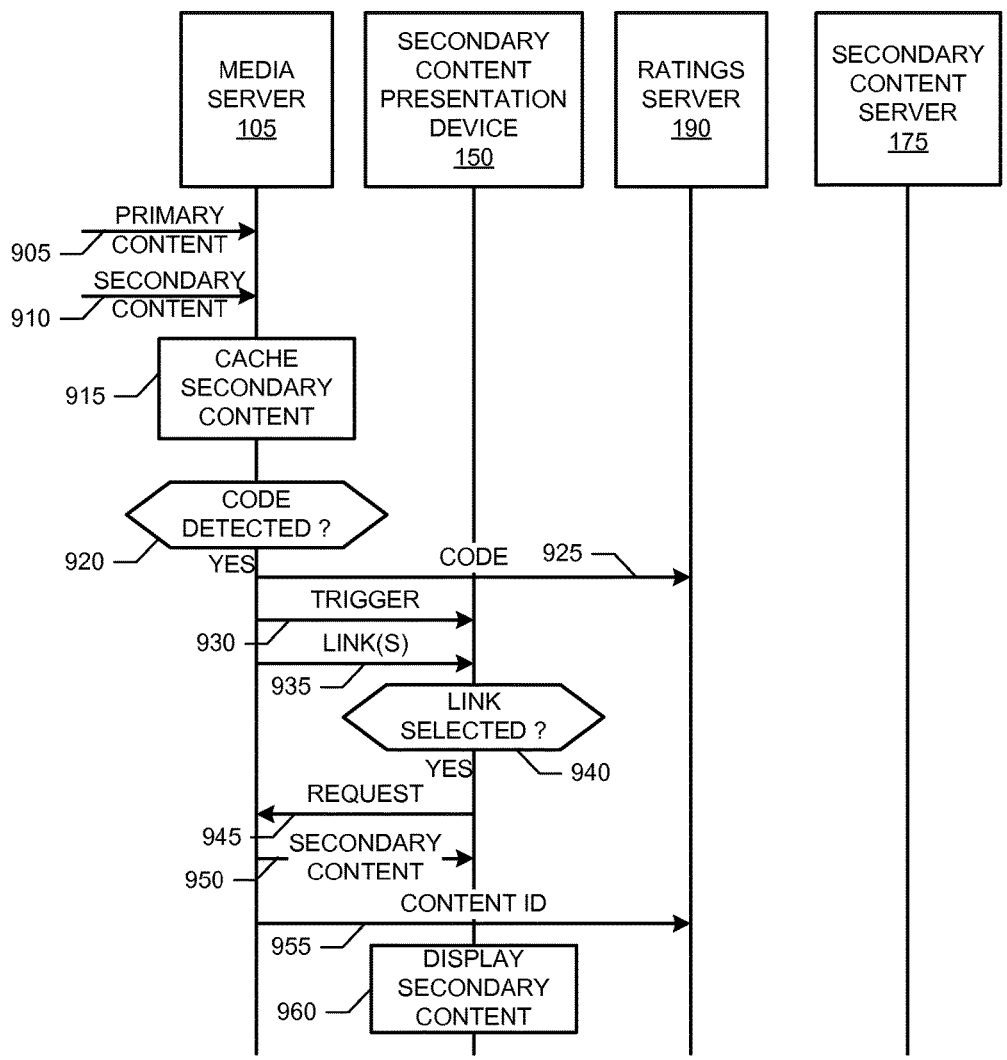

In the illustrated example of FIG. 9, the media server 105 detects codes in primary media content and triggers the presentation of secondary content at the secondary content presentation device 150. The example secondary content delivery scenario of FIG. 9 begins with the example media server 105 receiving primary media content 905 via the example broadcast input interface 205. When the example secondary content serving module 185 receives secondary content 910, the secondary content serving module 185 stores and/or caches the secondary content 910 in the media store(s) 130 (block 915).

When the secondary content triggerer 180 detects a code 925 in the primary media content 905 (block 920), the secondary content serving module 185 sends the code 925 to the ratings server 192, and the secondary content triggerer 180 sends a trigger 930 to the secondary content presentation device 150 via the Bluetooth interface 220 and/or the wireless interface 225. The secondary content serving module 185 also sends links 935 associated with the detected code 925 to the secondary content presentation device 150. In alternative examples, rather than sending links and/or the trigger 930, the secondary content serving module 185 pushes the secondary content to the secondary content presentation device 150. The trigger 930 sent by the secondary content triggerer 180 to the secondary content presentation device 150 may, additionally or alternatively, include the code detected in the primary media content 905, a signature and/or fingerprint computed based on the primary media content 905, and/or an identifier contained in a non-payload portion of the primary media content 905 (e.g., a PID, a SID and/or a timestamp contained in one or more packet headers).

The user interface module 325 and the example secondary content module 170 display the provided links 935 (or the secondary content) using, for example, the example user interface of FIG. 4. When one of the links 935 is selected and/or activated (block 940), the secondary content module 170 obtains the secondary content 950 associated with the selected and/or activated link 935 from the media server 105 (lines 945 and 950), and displays the obtained secondary content 950 using, for example, the user interface of FIG. 5 (block 960). In response to the request 945, the secondary content serving module 185 sends a content identifier 955 associated with the selected and/or activated link 935 to the ratings server 190. If the collection of audience measurement data is not desired, the interaction with the ratings server 190 may be omitted in the illustrated example of FIG. 9.

Figure 10:
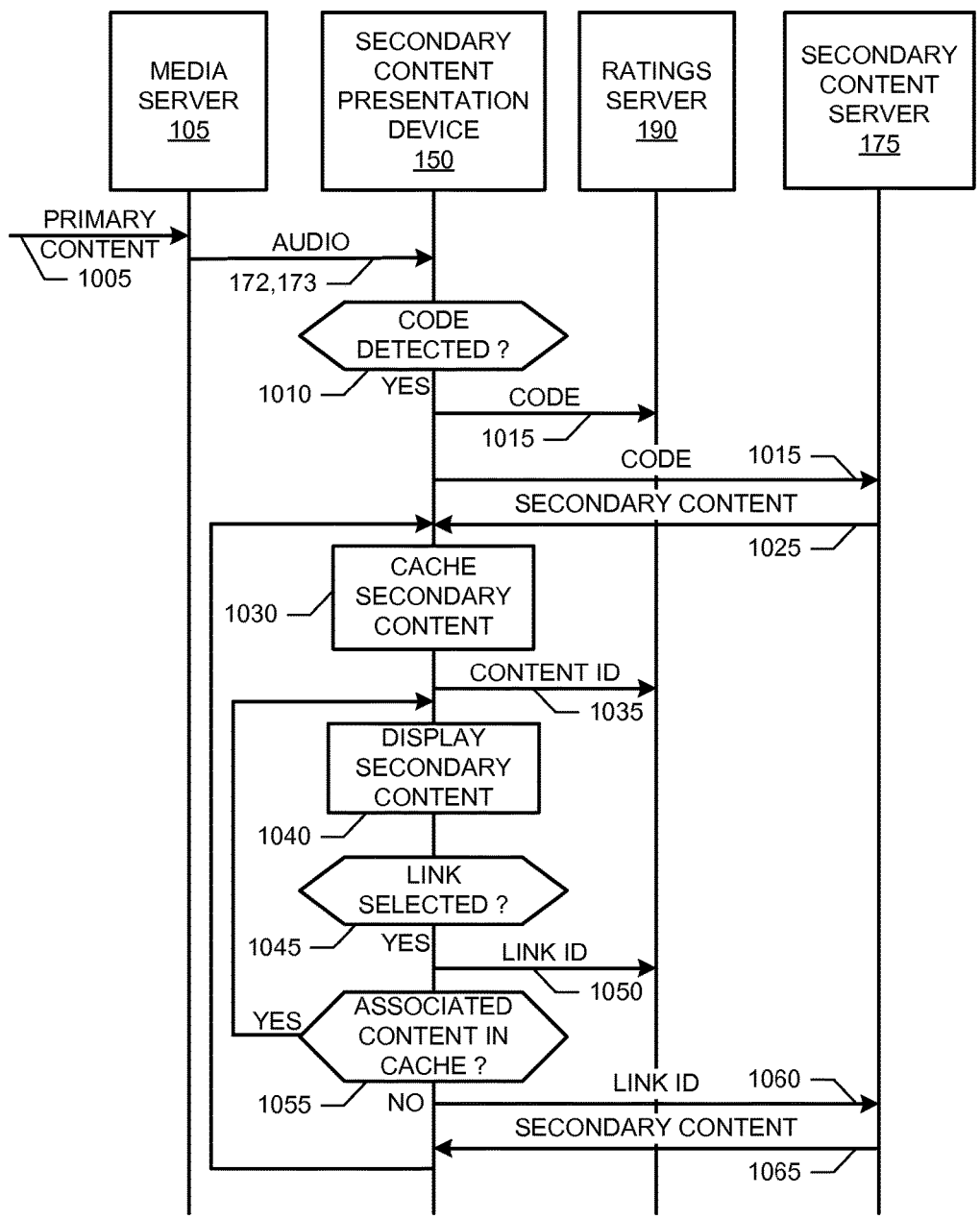

In the illustrated example of FIG. 10, content server 175 caches and/or pre-stores secondary content on the secondary content presentation device 150 for identified primary media content. The example secondary content delivery scenario of FIG. 10 begins with the example media server 105 receiving primary media content 1005 via the example broadcast input interface 205. The example media server 105 and/or the example primary content presentation device 110 emits and/or outputs the free-field radiating audio signal 172, 173 associated with the primary media content 1005 via, for example, one or more speakers.

When the example decoder 310 of the secondary content presentation device 150 detects a code 1015 in the audio 172, 173 (block 1010), the secondary content module 170 provides the code 1015 to the example ratings server 190 to facilitate audience measurement. The example secondary content module 170 queries the secondary content server 175 based on the code 1015 and receives secondary content 1025 for the primary media content 1005. The secondary content 1025 is stored and/or cached in the example media store 340 (block 1030). In the example of FIG. 10, the secondary content presentation device 150 sends a content identifier 1035 to the ratings server 190.

The user interface module 325 and the example secondary content module 170 displays the secondary content 1025 using, for example, the example user interface of FIG. 5, and/or displays links 435 associated with the secondary content 1025 using, for example, the example user interface of FIG. 4 (block 1040). In some examples, the secondary content 1025 when displayed may contain one or more selectable and/or activatable links. When a particular link is selected (block 1045), the secondary content module 170 sends an identifier 1050 for the selected and/or activated link to the ratings server 190, and checks whether the secondary content associated with the identifier 1050 is cached (block 1055). If the secondary content associated with the selected link is cached in the media store 340 (block 1055), the secondary content module 170 retrieves the secondary content 1025 associated with the selected link from the media store 340 and displays the retrieved secondary content using, for example, the user interface of FIG. 5 (block 1040). If the secondary content associated with the selected link is not available in the media store 340 (block 1055), the secondary content module 170 queries the secondary content server 175 based on an identifier 1060 associated with the selected link and receives the secondary content 1065 associated with the selected link from the secondary content server 175.

In alternative examples, rather than retrieving links and/or secondary content in response to the code 1015, the secondary content server 175 may push the secondary content to the secondary content presentation device 150 independent of any code detection at the secondary presentation device 150. In such alternatives, the secondary content module 170 can query the media store 340 for the secondary content 1025 associated with the detected code 1015 before querying the secondary content server 175 for the secondary content 1025. If the collection of audience measurement data is not desired, the interaction with the ratings server 190 may be omitted in the illustrated example of FIG. 9.

Figure 11:
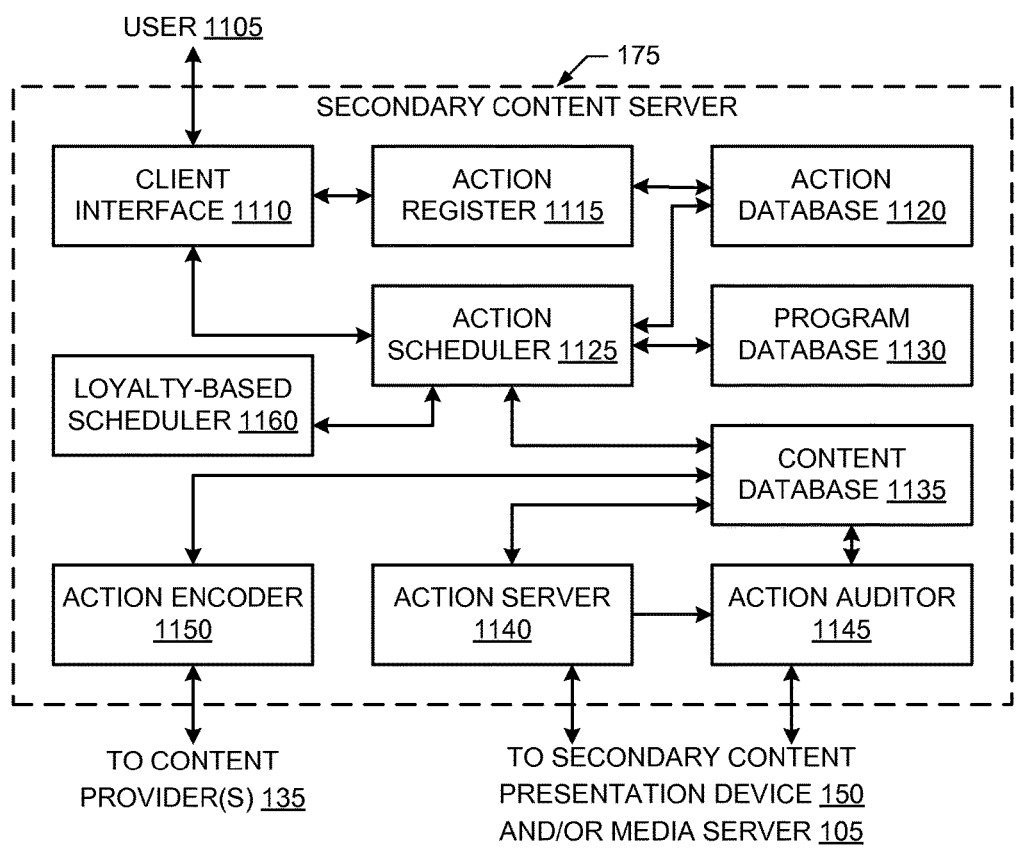
FIG. 11 illustrates an example manner of implementing the example secondary content server of FIG. 1.

FIG. 11 illustrates an example manner of implementing the example secondary content server 175 of FIG. 1. To allow a person 1105 to define secondary content and/or to associate secondary content with primary media content and/or portions of primary media content. The example secondary content server 175 of FIG. 11 includes a client interface 1110. The example client interface 1110 of FIG. 11 is a web-based interface and/or a customized API that allows the person 1105 to interact with an action register 1115 to define "actions," (e.g., particular pieces of secondary content) and to store such defined actions in an action database 1120. An example data structure that may be used to implement the example action database 1120 is described below in connection with FIG. 12.

The example client interface 1110 of FIG. 11 also allows the person 1105 to interact with an action scheduler 1125 to associate defined actions stored in the action database 1120 with particular primary media content and/or portions of primary media content identified in a program database 1130. Associations of actions to primary media content and/or primary media content portions are stored in a content database 1135. In some examples, the price(s) of associating an action with particular primary media content and/or portion(s) thereof depends on time of day, day of week, number of times action is to be associated, etc. An example data structure that may be used to implement the example content database 1135 is described below in connection with FIG. 13.

In some examples, the action scheduler 1125 of FIG. 11 builds and/or compiles a schedule of secondary content to be provided in response to identified primary media content.

Such a secondary content schedule defines one or more secondary content items to be presented at and/or during particular times of the identified primary media content. Example data structures that may be used to represent a secondary content schedule are described below in connection with FIGS. 26 and 27.

To allow the example media server 105 and/or the secondary content presentation device 150 to query for and/or obtain secondary content, the example secondary content server 175 of FIG. 11 includes an action server 1140. When a code and an optional timestamp is received from the media server 105 or from the secondary content presentation device 150, the example action server 1140 identifies the primary media content and/or portion of primary media content associated with the received code. Based on the identified primary media content and/or portion thereof, the action server 1140 queries the content database 1135 to identify the action(s) (e.g., secondary content) and/or a schedule of secondary content associated with the code and the optional timestamp. The action server 1140 returns the identified action(s) and/or the identified secondary content schedule to the requesting media server 105 or secondary content presentation device 150. In some examples, the action server 1140 provides information regarding which codes have triggered the access of secondary content to an action auditor 1145, which may be located or otherwise associated with the ratings server 190.

Based on access information provided by the example action server 1140 and/or based on secondary content access and/or selection information provided by the example secondary content presentation device 150 and/or the example media server 105, the example action auditor 1145 of FIG. 11 tabulates data representative of exposures (e.g., invitations to view secondary content) and/or secondary content consumption (e.g., actual "click-throughs") that have occurred. Such information can be used to determine, for example, the effectiveness of an advertising campaign. Moreover, such information may be used to adjust and/or determine the cost(s) to the user 1105 for associating secondary content with primary media content and/or portions thereof.

To encode actions, secondary content, invitations for secondary content, and/or links to secondary content into primary media content, the example secondary content server 175 includes an action encoder 1150. Thus, codes in primary media content are not restricted to only identifying the primary media content for audience measurement purposes but may, additionally or alternatively, be dual use codes corresponding to secondary content and/or links thereto. An example of implementing the example action encoder 1150 of FIG. 11 is described below in connection with FIGS. 18-21, and 38-47.

To build and/or add secondary content items to a secondary content schedule based on loyalty and/or affinity groups, the example secondary content server 175 of FIG. 11 includes a loyalty-based scheduler 1160. The example loyalty-based scheduler 1160 of FIG. 11 tabulates which primary media content is viewed by different persons and selects secondary content based on their loyalty and/or frequency of consuming particular programs, particular advertisements and/or programs associated with particular content providers 135. Additionally or alternatively, the example loyalty-based scheduler 1160 may add secondary media content to a secondary content schedule based on a person's affinity to consume and/or respond to the same programs, advertisements and/or content providers 135 as another person. An example manner of implementing the example loyalty-based scheduler 1160 is described below in connection with FIG. 32.

The example loyalty-based scheduler 1160 may be used to reward certain users with special offers based the degree of loyalty that a user exhibits towards certain primary media content and/or content provider(s) 130. Loyalty may be determined based on any number and/or type(s) of criteria including, but not limited to, number of hours spent consuming certain primary media content and/or episodes/telecasts of certain primary media content, the diversity of shows watched on a particular content delivery network, how often the user activates and/or selects secondary content offers, etc. Loyalty may be expressed on any number and/or type(s) of scales based on any number and/or type(s) of gradations. For example, loyalty may be expressed as the number of times an episode of a particular TV show has been watched in the last ten days.

While an example manner of implementing the example secondary content server 175 of FIG. 1 has been illustrated in FIG. 11, one or more of the interfaces, data structures, elements, processes and/or devices illustrated in FIG. 11 may be combined, divided, re-arranged, omitted, eliminated and/or implemented in any other way. Further, the example client interface 1110, the example action register 1115, the example action database 1120, the example action scheduler 1125, the example program database 1130, the example content database 1135, the example action server 1140, the example action auditor 1145, the example action encoder 1150, the example loyalty-based scheduler 1160 and/or, more generally, the example secondary content server 175 of FIG. 11 may be implemented by hardware, software, firmware and/or any combination of hardware, software and/or firmware. Thus, for example, any of the example client interface 1110, the example action register 1115, the example action database 1120, the example action scheduler 1125, the example program database 1130, the example content database 1135, the example action server 1140, the example action auditor 1145, the example action encoder 1150, the example loyalty-based scheduler 1160 and/or, more generally, the example secondary content server 175 may be implemented by one or more circuit(s), programmable processor(s), ASIC(s), PLD(s), FPLD(s), and/or FPGA(s), etc. When any apparatus claim of this patent incorporating one or more of these elements is read to cover a purely software and/or firmware implementation, at least one of the example client interface 1110, the example action register 1115, the example action database 1120, the example action scheduler 1125, the example program database 1130, the example content database 1135, the example action server 1140, the example action auditor 1145, the example action encoder 1150, the example loyalty-based scheduler 1160 and/or, more generally, the example secondary content server 175 are hereby expressly defined to include a tangible article of manufacture such as a tangible computer-readable medium such as those described below in connection with FIG. 17 storing the firmware and/or software. Further still, the example secondary content server 175 may include interfaces, data structures, elements, processes and/or devices instead of, or in addition to, those illustrated in FIG. 11 and/or may include more than one of any or all of the illustrated interfaces, data structures, elements, processes and/or devices.

Figure 12:
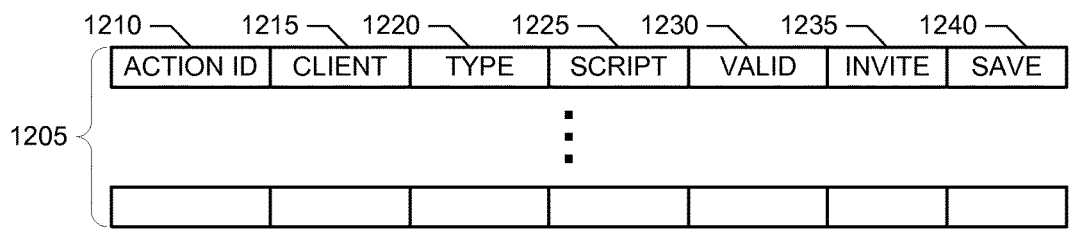
FIG. 12 illustrates an example data structure that may be used to implement the example action database of FIG. 11.

FIG. 12 illustrates an example data structure that may be used to implement the example action database 1120 of FIG. 11. The example data structure of FIG. 12 includes a plurality of entries 1205 for respective actions. To identify an action, each of the example entries 1205 of FIG. 12 includes an action identifier (ID) field 1210. Each of the example action ID fields 1210 of FIG. 12 contains one or more numbers and/or letters that uniquely identify a particular action (e.g., particular secondary content and/or a link to particular secondary content).

To identify a client, person and/or organization associated with an action, each of the example entries 1205 of FIG. 12 includes a client field 1215. Each of the example client fields 1215 of FIG. 12 includes one or more numbers and/or letters that uniquely identify a particular user, person, client and/or organization that is associated with, defined, leased, purchased and/or owns the code time slot and/or the secondary content associated with the action 1205.

To identify an action type, each of the example entries 1205 of FIG. 12 includes a type field 1220. Each of the example type fields 1220 of FIG. 12 includes one or more numbers, letters and/or codes that identify a type of the action 1205. Example action types include, but are not limited to, web access, phone dialing, and/or pass through to a local applet.

To specify the action, each of the example entries 1205 of FIG. 12 includes a script field 1225. Each of the example script fields 1225 of FIG. 12 includes text and/or command(s) that define the action 1205. Example scripts include, but are not limited to, a URL, a phone number, a target applet, and/or an OS command.

To define when an action is valid, each of the example entries 1205 of FIG. 12 includes a valid field 1230. Each of the example valid fields 1230 of FIG. 12 includes one or more times and/or dates that define one or more time periods during which the action 1205 is valid and/or activatable.

To define how the action is presented, each of the example entries 1205 of FIG. 12 includes an invite field 1235. Each of the example invite fields 1235 of FIG. 12 defines how an invitation to the action 1205 is to be displayed in, for example, the lower portion 430 of the example user interface of FIG. 4. For example, the invite field 1235 may define and/or reference a bit-mapped image to be displayed.

To define whether the action may be saved, each of the example entries 1205 of FIG. 12 includes a save field 1240. Each of the example save fields 1240 of FIG. 12 contains a value that represents whether the action can be saved at the secondary content presentation device 150 and/or the media server 105 for subsequent retrieval and/or display at the secondary content presentation device 150 and/or the media server 105. In some examples, the save field 1240 defines a time period during which the action 1205 may be saved at the secondary content presentation device 150 and/or the media server 105 and/or a time at which the action 1205 is to be flushed from the cache.

While an example data structure that may be used to implement the example action database 1120 of FIG. 11 has been illustrated in FIG. 12, one or more of the entries and/or fields may be combined, divided, re-arranged, omitted, eliminated and/or implemented in any other way. Moreover, the example data structure of FIG. 12 may include fields instead of, or in addition to, those illustrated in FIG. 12 and/or may include more than one of any or all of the illustrated fields.

Figure 13:
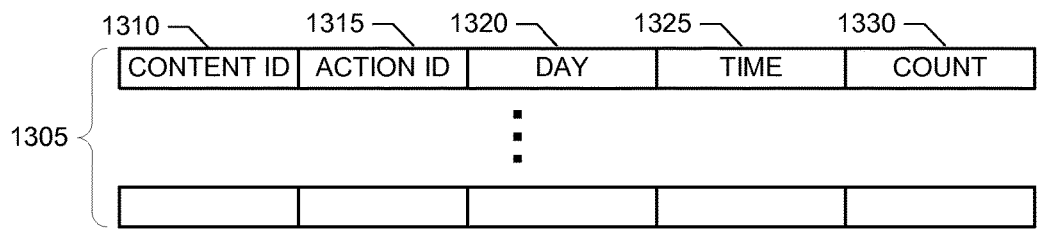
FIG. 13 illustrates an example data structure that may be used to implement the example secondary content database of FIG. 11.

FIG. 13 illustrates an example data structure that may be used to implement the example content database 1135 of FIG. 11. The example data structure of FIG. 13 includes a plurality of entries 1305 for respective combinations of primary media content and actions (e.g., secondary content). To identify primary media content and/or any portion thereof, each of the example entries 1305 of FIG. 13 includes a content ID field 1310. Each of the example content ID fields 1310 of FIG. 13 contains one or more numbers and/or letters that uniquely identify a particular primary media content and/or portion thereof. Example content IDs identify particular primary media content and/or a particular segment of primary media content.

To identify an action, each of the example entries 1305 of FIG. 13 includes an action ID field 1315. Each of the example action ID fields 1315 of FIG. 13 contains one or more numbers and/or letters that uniquely identify a particular action (e.g., particular secondary content and/or a link to particular secondary content) that has been associated with the primary media content and/or portion thereof identified in the content ID field 1310.

To identify when the action ID 1315 is validly associated with the content ID 1310, each of the example entries 1305 of FIG. 13 includes a day field 1320 and a time field 1325. Each of the example day fields 1320 of FIG. 13 lists and/or defines one or more particular days on which the action ID 1315 is validly associable with the content ID 1310. In particular, if a request for secondary content associated with the content ID 1310 is received, the secondary content associated with the action ID 1315 is only returned if the current day falls within the range and/or set of days defined by the day field 1320. Likewise, each of the example time fields 1325 list and/or define one or time portions on which the action ID 1315 is validly associable with the content ID 1310.

To record access of the secondary content, each of the example entries 1305 of FIG. 13 includes a count field 1330. Each of the example count fields 1330 of FIG. 13 includes one or move values that represent the number of times that an invitation has been presented for the secondary content (e.g., displayed in an example user interface of FIG. 4), and the number of times that the corresponding secondary content was presented (e.g., displayed in the example user interface of FIG. 5).

While an example data structure that may be used to implement the example content database 1135 of FIG. 11 has been illustrated in FIG. 13, one or more of the entries and/or fields may be combined, divided, re-arranged, omitted, eliminated and/or implemented in any other way. Moreover, the example data structure of FIG. 13 may include fields instead of, or in addition to, those illustrated in FIG. 13 and/or may include more than one of any or all of the illustrated fields.

Figure 14:
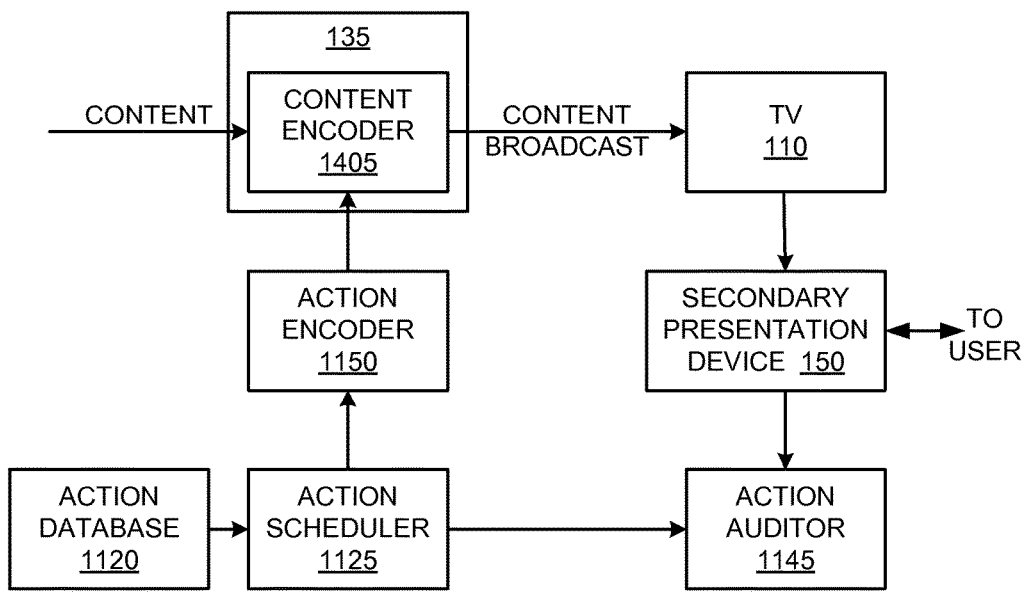
FIGS. 14-16 illustrate example secondary content delivery flows that may be implemented using the example secondary content server of FIGS. 1 and 11.
Figure 15:
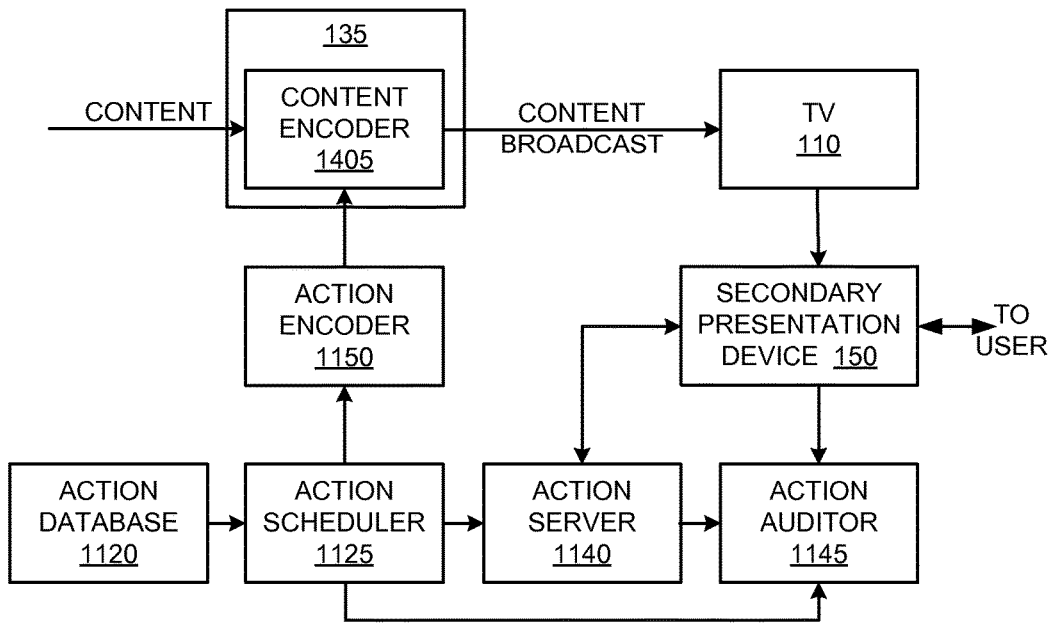
Figure 16:
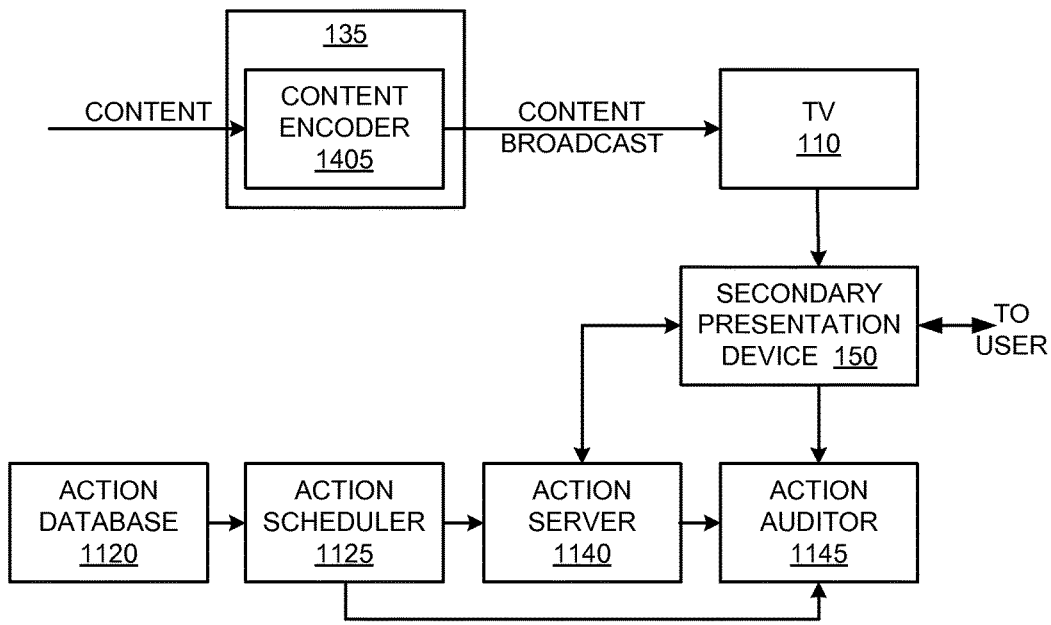

FIGS. 14, 15 and 16 illustrate example secondary content delivery flows that may be implemented using the example secondary content server 175 of FIGS. 1 and 11. In the illustrated example of FIG. 14, actions and/or secondary content are encoded by the example action encoder 1150 and included in primary media content broadcast by a content provider 135. Thus, the data and/or information embedded into the primary media content represents actual secondary content as opposed to simply being a code, identifier and/or index that may be used to subsequently retrieve a link to secondary content and/or to retrieve the secondary content. In such circumstances, the secondary content presentation device 150 can, by decoding such codes, directly obtain the secondary content and/or actions without having to query the example secondary content server 175 for the links and/or secondary content. The data and/or information embedded by the example action encoder 1150 may be in addition to and/or instead of codes embedded into the primary media content by a content encoder 1405 associated with the content provider 135. As illustrated in FIG. 14, the example secondary content presentation device 150 notifies the example action auditor 1145 of presentation of the secondary content for accounting, audience measurement and/or auditing purposes.

In the illustrated example of FIG. 15, the action encoder 1150 encodes identifiers (e.g., a link) into the primary media content, which may be used to obtain secondary media content. Thus, the embedded information indirectly represents secondary content. Accordingly, when the secondary content presentation device 150 detects an embedded link associated with secondary content, it can utilize the link to obtain the secondary content rather than having to first query the secondary content server 175 to obtain the link based on a detected, decoded and/or extracted code and/or identifier.

In the illustrated example of FIG. 16, the querying for and obtaining of secondary content by the secondary content presentation device 150 is responsive to only those codes embedded by the content provider 135. Accordingly, when the secondary content presentation device 150 detects a code it interacts with the action server 1140 to retrieve the secondary content and/or links to secondary content associated with the detected code.

Figure 17:
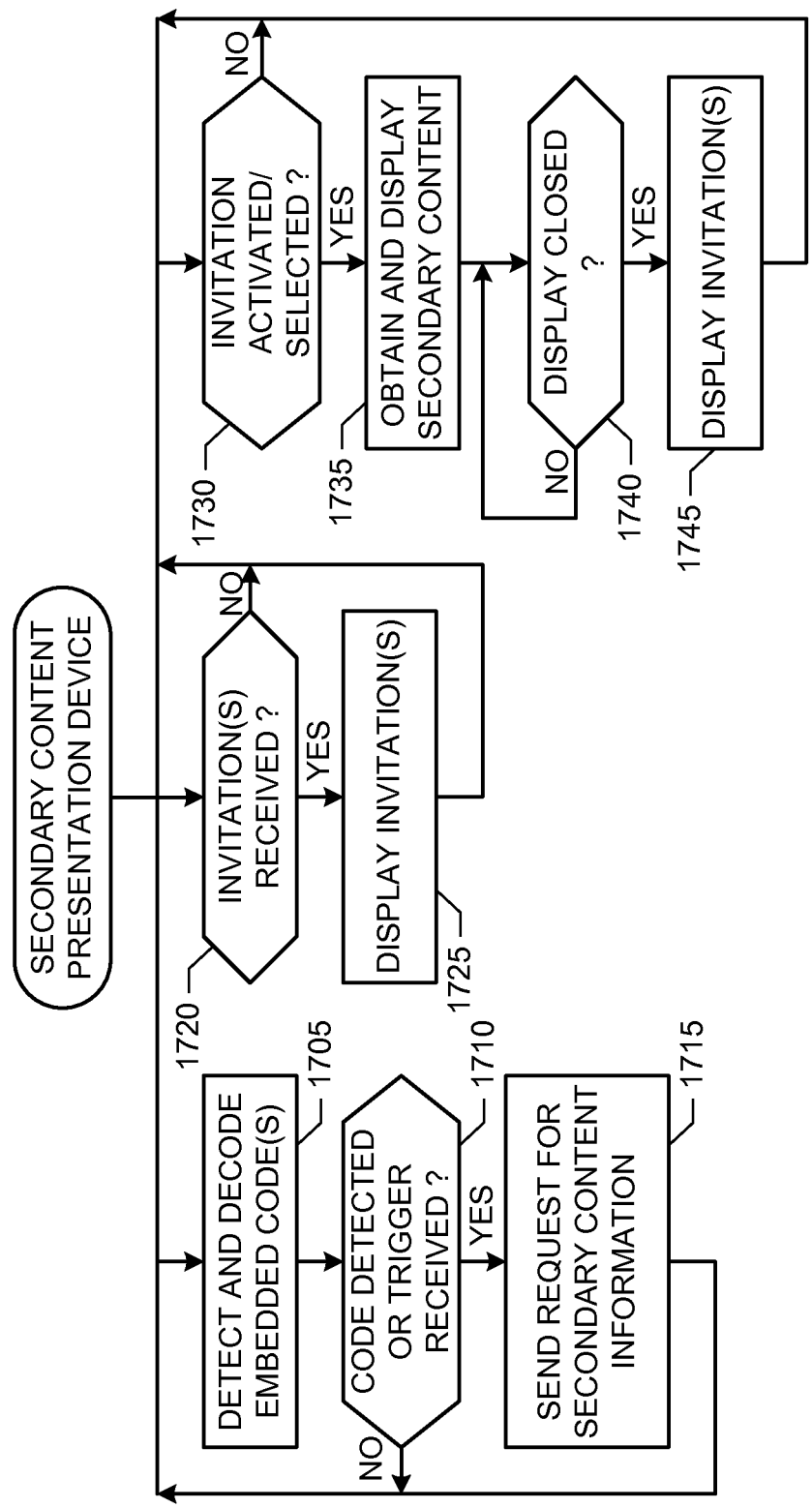
FIG. 17 is a flowchart representative of example machine-accessible instructions that may be executed by, for example, a processor, to implement the example secondary content presentation device of FIGS. 1 and 3.

FIG. 17 illustrates example machine-accessible instructions that may be executed to implement the example secondary content presentation device 150 of FIGS. 1 and 3. A processor, a controller and/or any other suitable processing device may be used and/or programmed to execute the example machine-accessible instructions of FIG. 17. For example, the machine-accessible instructions of FIG. 17 may be embodied in coded instructions stored on a tangible computer-readable medium. As used herein, the term tangible computer-readable medium is expressly defined to include any type of computer readable storage and to exclude propagating signals. Example tangible computer readable medium include any type of volatile and/or non-volatile physical memory and/or physical memory device, a flash memory, a CD, a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, a cache, and/or any other storage media in which information is stored for any duration (e.g., for extended time periods, permanently, brief instances, for temporarily buffering, and/or for caching of the information) and which can be accessed by a processor, a computer and/or other machine having a processor, such as the example processor platform P100 discussed below in connection with FIG. 24. As used herein, the term non-transitory computer readable medium is expressly defined to include any type of computer readable medium and to exclude propagating signals. Combinations of the above are also included within the scope of computer-readable media. Machine-readable instructions comprise, for example, instructions and data that cause a processor, a computer and/or a machine have a processor to perform one or more particular processes. Alternatively, some or all of the example machine-accessible instructions of FIG. 17 may be implemented using any combination(s) of ASIC(s), PLD(s), FPLD(s), FPGA(s), discrete logic, hardware, firmware, etc. Also, some or all of the example process of FIG. 17 may be implemented manually or as any combination of any of the foregoing techniques, for example, any combination of firmware, software, discrete logic and/or hardware. Further, many other methods of implementing the example operations of FIG. 17 may be employed. For example, the order of execution of the blocks may be changed, and/or one or more of the blocks described may be changed, eliminated, sub-divided, or combined. Additionally, any or all of the example machine-accessible instructions of FIG. 17 may be carried out sequentially and/or carried out in parallel by, for example, separate processing threads, processors, devices, discrete logic, circuits, etc.

The example machine-accessible instructions of FIG. 17 may be executed to implement three parallel processes that may be implemented by, for example, separate substantially asynchronous processes executing within an OS. In a first process, the example machine-accessible instructions of FIG. 17 begin with the example decoder 310 detecting and decoding any codes present in the audio signals 172 and 173 (block 1705). When a code is detected and/or a trigger received from the example media server 105 (block 1710), the secondary content module 170 sends a request for secondary content to the example media server 105 and/or the example secondary content server 175 (block 1715). Control then returns to block 1705 to continue detecting and decoding codes.

In a second process, the example machine-accessible instructions of FIG. 17 begins when the example secondary content module 170 receives links to and/or invitations for secondary content from, for example, the example media server 105 and/or the example secondary content server 175 (block 1720). The secondary content module 170 displays the received links and/or invitations via the example user interface module 325 and the display 330 using, for example, the example user interface of FIG. 4 (block 1725). Control then returns to the block 1720 to wait for additional secondary content information.

In a third process, the example machine-accessible instructions of FIG. 17 begin when a user selects and/or activates a secondary content link via the input device(s) 335 (block 1730). The secondary content module 170 obtains and displays the secondary content associated with the selected and/or activated link from a local cache 340, the example media server 105 and/or the example secondary content server 175 (block 1735). When display of the secondary content is ended by the user (e.g., using the example close button 510 of FIG. 5) (block 1740), the secondary content module 170 displays previously received links and/or invitations via the example user interface module 325 and the display 330 using, for example, the example user interface of FIG. 4 (block 1745). Control then returns to the block 1730 to wait for another link to be selected and/or activated.

Audio Codes and Watermarks

Figure 18:
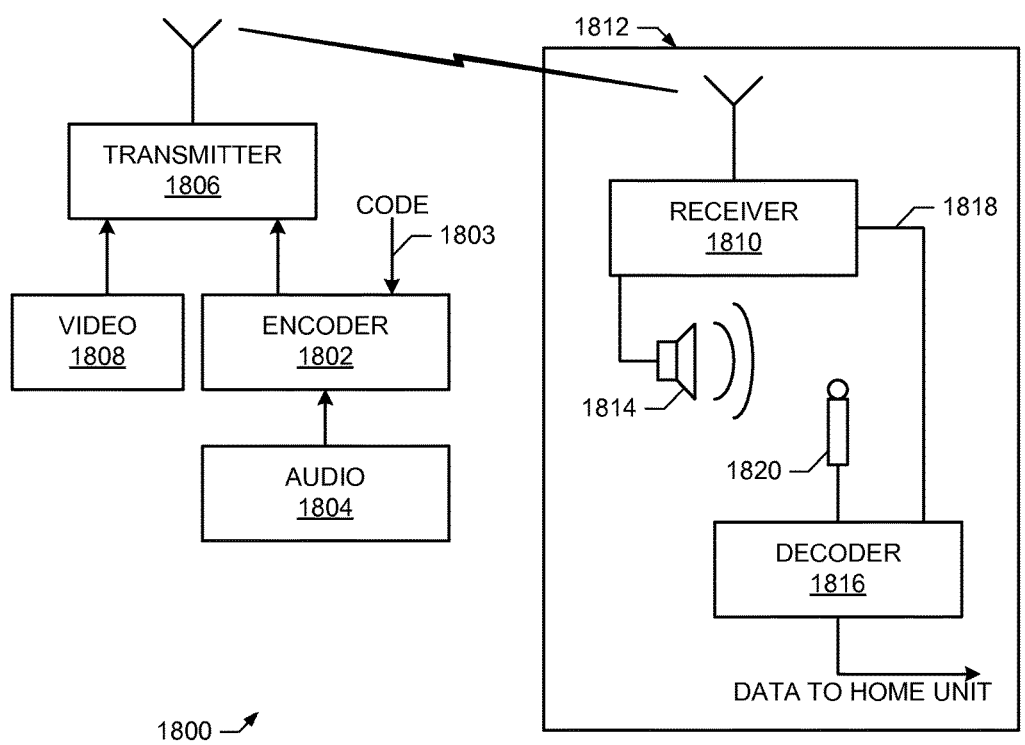
FIG. 18 is a schematic illustration of an example broadcast audience measurement system employing a program identifying code added to the audio portion of a composite television signal.

An example encoding and decoding system 1800 is shown in FIG. 18. The example system 1800 may be, for example, a television audience measurement system, which will serve as a context for further description of the encoding and decoding processes described herein. The example system 1800 of FIG. 18 includes an encoder 1802 that adds a code 1803 to an audio signal 1804 to produce an encoded audio signal. The code 1803 may be representative of any selected information. For example, in a media monitoring context, the code 1803 may be representative of and/or identify broadcast primary media content such as a television broadcast, a radio broadcast, or the like. Additionally, the code 1803 may include timing information indicative of a time at which the code 1803 was inserted into audio or a media broadcast time. Alternatively, as described below, the code may include control information that is used to control the behavior of one or more target devices. It should be understood that the example encoder 1802 of FIGS. 18 and 19 and/or the example encoders 3802 of FIGS. 38 and 39 may be used to implement the example content provider(s)

135 of FIG. 1 and/or the example action encoder 1150 of FIG. 11. Other example encoders that may be used to implement the example content provider(s) 135 are described in U.S. patent application Ser. No. 12/604,176, entitled "Methods and Apparatus to Extract Data Encoded in Media Content," and filed Oct. 22, 2009.

The audio signal 1804 may be any form of audio including, for example, voice, music, noise, commercial advertisement audio, audio associated with a television program, live performance, etc. In the example of FIG. 18, the encoder 1802 passes the encoded audio signal to a transmitter 1806. The transmitter 1806 transmits the encoded audio signal along with any video signal 1808 associated with the encoded audio signal. While, in some instances, the encoded audio signal may have an associated video signal 1808, the encoded audio signal need not have any associated video.

Although the transmit side of the example system 1800 shown in FIG. 18 shows a single transmitter 1806, the transmit side may be much more complex and may include multiple levels in a distribution chain through which the audio signal 1804 may be passed. For example, the audio signal 1804 may be generated at a national network level and passed to a local network level for local distribution. Accordingly, although the encoder 1802 is shown in the transmit lineup prior to the transmitter 1806, one or more encoders may be placed throughout the distribution chain of the audio signal 1804. Thus, the audio signal 1804 may be encoded at multiple levels and may include embedded codes associated with those multiple levels. Further details regarding encoding and example encoders are provided below.

The transmitter 1806 may include one or more of a radio frequency (RF) transmitter that may distribute the encoded audio signal through free space propagation (e.g., via terrestrial or satellite communication links) or a transmitter used to distribute the encoded audio signal through cable, fiber, etc. In some examples, the transmitter 1806 may be used to broadcast the encoded audio signal throughout a broad geographical area. In other cases, the transmitter 1806 may distribute the encoded audio signal through a limited geographical area. The transmission may include up-conversion of the encoded audio signal to radio frequencies to enable propagation of the same. Alternatively, the transmission may include distributing the encoded audio signal in the form of digital bits or packets of digital bits that may be transmitted over one or more networks, such as the Internet, wide area networks, or local area networks, as described above in connection with FIG. 1. Thus, the encoded audio signal may be carried by a carrier signal, by information packets or by any suitable technique to distribute the audio signals.

When the encoded audio signal is received by a receiver 1810, which, in the media monitoring context, may be located at a statistically selected metering site 1812, the audio signal portion of the received program signal is processed to recover the code, even though the presence of that code is imperceptible (or substantially imperceptible) to a listener when the encoded audio signal is presented by speakers 1814 of the receiver 1810. To this end, a decoder 1816 is connected either directly to an audio output 1818 available at the receiver 1810 or to a microphone 1820 placed in the vicinity of the speakers 1814 through which the audio is reproduced. The received audio signal can be either in a monaural or stereo format. Further details regarding decoding and example decoders are provided below. It should be understood that the example decoder 1816 and the example microphone 1820 of FIGS. 18 and 22 and/or the example microphone 3820 of FIG. 38 may be used to implement the example decoder 310 and the example audio input interface 305 of FIG. 3, respectively, and/or the example secondary content triggerer 180 of FIG. 1. Other example decoders that may be used to implement the example decoder 310 are described in U.S. patent application Ser. No. 12/604,176, entitled "Methods and Apparatus to Extract Data Encoded in Media Content," and filed Oct. 22, 2009.

Audio Encoding

Figure 19:
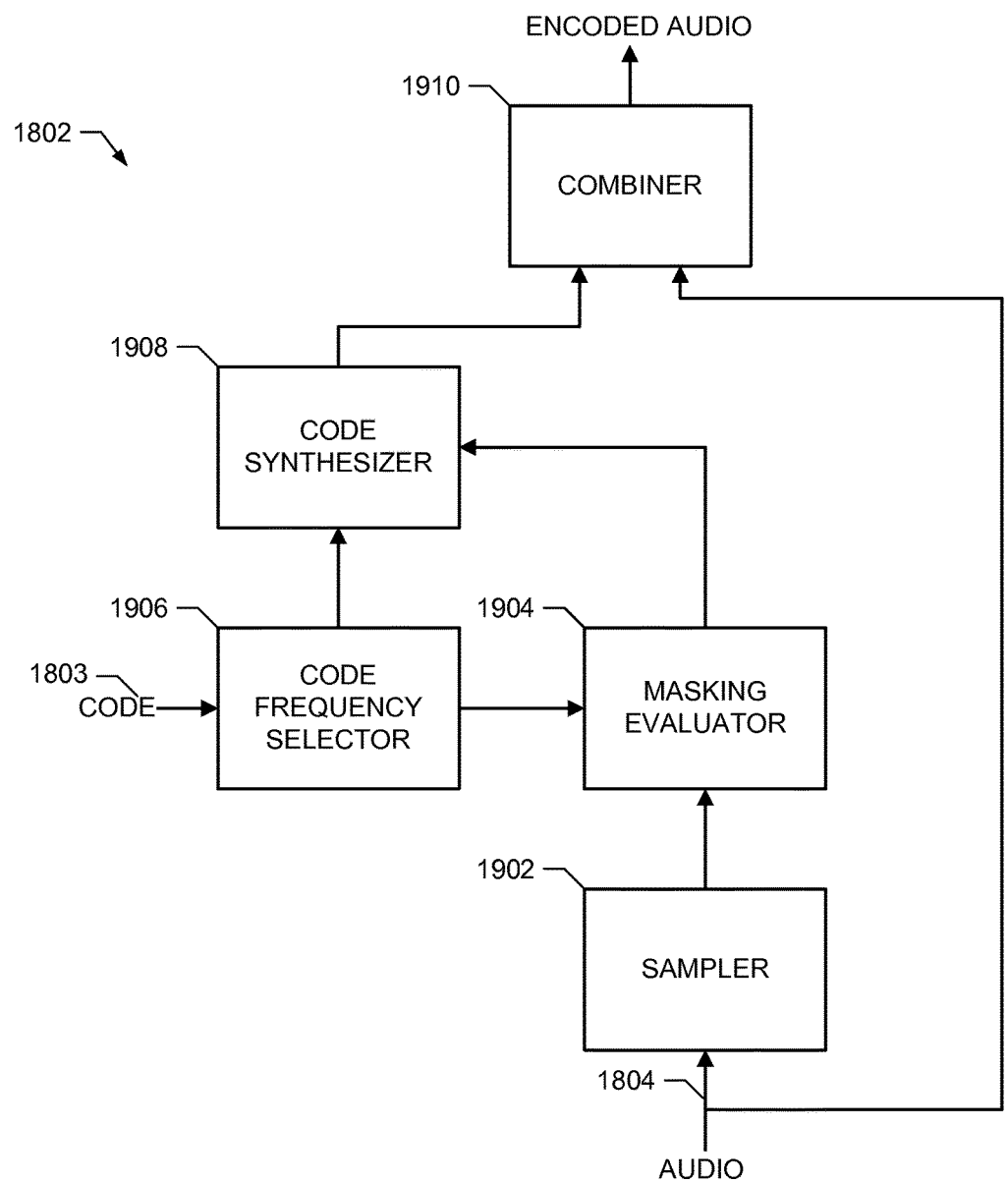
FIG. 19 illustrates an example manner of implementing the example encoder of FIG. 18.

As explained above, the encoder 1802 inserts one or more inaudible (or substantially inaudible) codes into the audio 1804 to create encoded audio. An example manner of implementing the example encoder 1802 of FIG. 18 is shown in FIG. 19. In some implementations, the example encoder 1802 of FIG. 19 includes a sampler 1902 that receives the audio 1804. The sampler 1902 is coupled to a masking evaluator 1904, which evaluates the ability of the sampled audio to hide codes therein. The code 1803 is provided to a code frequency selector 1906 that determines audio code frequencies that are used to represent the code 1803 to be inserted into the audio. The code frequency selector 1906 may include conversion of codes into symbols and/or any suitable detection or correction encoding. An indication of the designated code frequencies that will be used to represent the code 1803 are passed to the masking evaluator 1904 so that the masking evaluator 1904 is aware of the frequencies for which masking by the audio 1804 should be determined. Additionally, the indication of the code frequencies is provided to a code synthesizer 1908 that produces sine wave signals having frequencies designated by the code frequency selector 1906. A combiner 1910 receives both the synthesized code frequencies from the code synthesizer 1908 and the audio that was provided to the sampler and combines the two to produce encoded audio.

In some examples in which the audio 1804 is provided to the encoder 1802 in analog form, the sampler 1902 is implemented using an analog-to-digital (A/D) converter or any other suitable digitizer. The sampler 1902 may sample the audio 1804 at, for example, 48,000 Hertz (Hz) or any other sampling rate suitable to sample the audio 1804 while satisfying the Nyquist criteria. For example, if the audio 1804 is frequency-limited at 15,000 Hz, the sampler 1902 may operate at 30,000 Hz. Each sample from the sampler 1902 may be represented by a string of digital bits, wherein the number of bits in the string indicates the precision with which the sampling is carried out. For example, the sampler 1902 may produce 8-bit, 16-bit, 24-bit, or 32-bit.

In addition to sampling the audio 1804, the example sampler 1902 accumulates a number of samples (i.e., an audio block) that are to be processed together. For example, the example sampler 1902 accumulates a 512 sample audio block that is passed to the masking evaluator 1904 at one time. Alternatively, in some examples, the masking evaluator 1904 may include an accumulator in which a number of samples (e.g., 512) may be accumulated in a buffer before they are processed.

The masking evaluator 1904 receives or accumulates the samples (e.g., 512 samples) and determines an ability of the accumulated samples to hide code frequencies to human hearing. That is, the masking evaluator determines if code frequencies can be hidden within the audio represented by the accumulated samples by evaluating each critical band of the audio as a whole to determine its energy and determining the noise-like or tonal-like attributes of each critical band and determining the sum total ability of the critical bands to mask the code frequencies. Critical frequency bands, which were determined by experimental studies carried out on human auditory perception, may vary in width from single frequency bands at the low end of the spectrum to bands containing ten or more adjacent frequencies at the upper end of the audible spectrum. If the masking evaluator 1904 determines that code frequencies can be hidden in the audio 1804, the masking evaluator 1904 indicates the amplitude levels at which the code frequencies can be inserted within the audio 1804, while still remaining hidden and provides the amplitude information to the code synthesizer 1908.

In some examples, the masking evaluator 1904 conducts the masking evaluation by determining a maximum change in energy $E_b$ or a masking energy level that can occur at any critical frequency band without making the change perceptible to a listener. The masking evaluation carried out by the masking evaluator 1904 may be carried out as outlined in the Moving Pictures Experts Group—Advanced Audio Encoding (MPEG-AAC) audio compression standard ISO/IEC 13818-7:1997, for example. The acoustic energy in each critical band influences the masking energy of its neighbors and algorithms for computing the masking effect are described in the standards document such as ISO/IEC 13818-7:1997. These analyses may be used to determine for each audio block the masking contribution due to tonality (e.g., how much the audio being evaluated is like a tone) as well as noise like (i.e., how much the audio being evaluated is like noise) features. Further analysis can evaluate temporal masking that extends masking ability of the audio over short time, typically, for 50-100 ms. The resulting analysis by the masking evaluator 1904 provides a determination, on a per critical band basis, the amplitude of a code frequency that can be added to the audio 1804 without producing any noticeable audio degradation (e.g., without being audible).

In some examples, the code frequency selector 1906 is implemented using a lookup table that relates an input code 1803 to a state, wherein each state is represented by a number of code frequencies that are to be emphasized in the encoded audio signal. For example, the code frequency selector 1906 may include information relating symbols or data states to sets of code frequencies that redundantly represent the data states. The number of states selected for use may be based on the types of input codes. For example, an input code representing two bits may be converted to code frequencies representing one of four symbols or states (e.g., $2^2$). In other examples, an input code representing four bits of information is represented by one of 16 symbols or states (e.g., $2^4$). Some other encoding may be used to build in error correction when converting the code 1803 to one or more symbols or states. Additionally, in some examples, more than one code may be embedded in the audio 1804.

An example chart illustrating a code frequency configuration is shown in FIG. 20A at reference numeral 2000. The chart includes frequency indices that range in value from 360 to 1366. These frequency indices correspond to frequencies of the sine waves to be embedded into an audio signal when viewed in the frequency domain via a Discrete Fourier transform (DFT) of a block of 18,432 samples. The reason that reference is made to frequency indices rather than actual frequencies is that the frequencies to which the indices correspond vary based on the sampling rate used within the encoder 1802 and the number of samples processed by the decoder 1816. The higher the sampling rate, the closer in frequency each of the indices is to its neighboring indices. Conversely, a low sampling rate results in adjacent indices that are relatively widely space in frequency. For example, at a sampling rate of 48,000 Hz, the spacing between the indices shown in the chart 2000 of FIG. 20A is 2.6 Hz. Thus, frequency index 360 corresponds to 936 Hz (2.6 Hz×360). Of course, other sampling rates and frequency indices may be selected. For example, one or more ranges of frequency indices may be selected and/or used to avoid interfering with frequencies used to carry other codes and/or watermarks. Moreover, the selected and/or used ranges of frequencies need not be contiguous. In some examples, frequencies in the ranges 0.8 kilohertz (kHz) to 1.03 kHz and 2.9 kHz to 4.6 kHz are used. In other examples, frequencies in the ranges 0.75 kHz to 1.03 kHz and 2.9 kHz to 4.4 kHz are used.

As shown in FIG. 20A, the chart 2000 includes a top row 2002 listing 144 different states or symbols represented in columns, wherein the chart 2000 shows the first three states and the last state. The states are selected to represent codes or portions of codes. The states between the third state and the last state are represented by dashed boxes for the sake of clarity. Each of the states occupies a corresponding column in the chart 2000. For example, state S1 occupies a column denoted with reference numeral 2004. Each column includes a number of frequency indices representing a frequency in each of seven different code bands, which are denoted in the left-hand column 2006 of the chart 2000. For example, as shown in column 2004, the state S1 is represented by frequency indices 360, 504, 648, 792, 936, 1080, and 1224. To send one of the 144 states, the code indices in the column of the selected state are emphasized in a block of 18,432 samples. Thus, to send state S1, indices 360, 504, 6489, 792, 936, 1080, and 1224 are emphasized. In some example encoders 1802, only the indices of one of the states are ever emphasized at one time.

As shown in FIG. 20A, each code band includes sequentially numbered frequency indices, one of which corresponds to each state. That is, Code Band 0 includes frequency indices 360-503, each corresponding to one of the 144 different states/symbols shown in the chart 2000. Additionally, adjacent code bands in the system are separated by one frequency index. For example, Code Band 0 ranges from index 360 to index 503 and adjacent Code Band 1 ranges from index 504 to index 647. Thus, Code Band 0 is spaced one frequency index from adjacent Code Band 1. Advantageously, the code frequencies shown in FIG. 20A are close to one another in frequency and, thus, are affected in relatively the same manner by multipath interference. Additionally, the high level of redundancy in the chart 2000 enhances the ability to recover the code.

Thus, if the code frequency selector 1906 operates premised on the chart 2000 of FIG. 20A, when an input code to the code frequency selector 1906 is encoded or mapped to state S1, the code frequency selector 1906 indicates to the masking evaluator 1904 and the code synthesizer 1908 that frequency indices 360, 504, 648, 792, 936, 1080, and 1224 should be emphasized in the encoded signal and, therefore, the code synthesizer 1908 should produce sine waves having frequencies corresponding to the frequency indices 360, 504, 648, 792, 936, 1080, and 1224, and that such sine waves should be generated with amplitudes specified by the masking evaluator 1904 so that the generated sine waves can be inserted into the audio 1804, but will be inaudible (or substantially inaudible). By way of further example, when an input code identifies that state 5144 should be encoded into the audio 1804, the code frequency selector 1906 identifies frequency indices 503, 647, 791, 935, 1079, 1223, and 1366 to the masking evaluator 1904 and the code synthesizer 1908 so that corresponding sine waves can be generated with appropriate amplitudes.

The encoding used to select states in the chart 2000 to convey information may include data blocks and synchronization blocks. For example, the message to be encoded by the system using these 144 different states includes a synchronization block that is followed by several data blocks. Each of the synchronization block and the data blocks is encoded into 18,432 samples and is represented by emphasizing the indices of one of the states shown in one column of the chart 2000.

For example, a synchronization block is represented by emphasizing the indices of one of 16 states selected to represent synchronization information. That is, the synchronization block indicates the start of one of 16 different message types. For example, when considering media monitoring, network television stations may use a first state to represent synchronization and a local affiliate may use a second state to represent synchronization. Thus, at the start of a transmission, one of 16 different states is selected to represent synchronization and transmitted by emphasizing the indices associated with that state. Information payload data follows synchronization data.

In the foregoing example, with regard to how these 16 states representing synchronization information are distributed throughout the 144 states, in some examples the 16 states are selected so that a frequency range including first code frequencies representing each of those 16 states is larger than a frequency amount separating that frequency range from an adjacent frequency range including second code frequencies also representing each of those 16 states. For example, the 16 states representing the synchronization information may be spaced every 9 states in the table above, such that states S1, S10, S19, S28, S37, S46, S54, S63, S72, S81, S90, S99, S108, S117, S126, S135 represent possible states that the synchronization information may take. In Code Band 0 and Code Band 1, this corresponds to a width in frequency indices of 135 indices. The frequency spacing between the highest possible synchronization state (S135) of Code Band 0 and the lowest possible synchronization state (S1) of Code Band 1 is 10 frequency indices. Thus, the range of each collection of frequency indices representing the synchronization information is much larger (e.g., 135 indices) than the amount separating adjacent collections (e.g., 10 indices).

In this example, the remaining 128 states of the 144 state space that are not used to represent synchronization may be used to transmit information data. The data may be represented by any number of suitable states required to represent the number of desired bits. For example, 16 states may be used to represent four bits of information per state, or 128 states may be used to represent seven bits of information per state. In some examples, the states selected to represent data are selected such that a frequency range including first code frequencies representing each of the data states is larger than a frequency amount separating that frequency range from an adjacent frequency range including second code frequencies also representing each of the data states. Thus, states used to represent potential data include at least one substantially low numbered state (e.g., S2) and at least one substantially high numbered state (e.g., S144). This ensures that the ranges including states that may be used to represent data occupy a wide bandwidth within their respective code bands, and that the spacing between adjacent ranges are narrow.

The encoder 1802 may repeat the encoding process and, thereby, encode a number of audio blocks with a particular code. That is, the selected code frequencies may be inserted into several consecutive 512-sample audio blocks. In some examples, the code frequencies representing symbols may be repeated in 36 consecutive audio blocks of 512 samples or 72 overlapping blocks of 256 samples. Thus, at the receive side, when 18,432 samples are processed by a Fourier transform such as a DFT, the emphasized code frequencies will be visible in the resulting spectrum.

FIG. 20B shows an example alternative chart 2030 that may be used by the code frequency selector 1908, wherein the chart 2030 lists four states in the first row 2032, each of which includes corresponding frequency indices listed in seven code bands 2034. These frequency indices correspond to frequencies of the sinusoids to be embedded into an audio signal when viewed in the frequency domain via a Fourier transform such as a DFT of a block of 512 samples. By way of example, when state S1 is to be sent, the code frequency selector 1906 indicates that frequency indices 10, 14, 18, 22, 26, 30, and 34 are to be used. As described above, the indication of these frequencies is communicated to the masking evaluator 1904 and the code synthesizer 1908, so that sine waves having the proper amplitude and corresponding to the indicated frequency indices may be generated for addition to the audio 1804. In example encoders 1802 operating according to the chart 2030, the code frequencies corresponding to the desired symbol are encoded into 19 overlapping blocks of 256 samples in order to make it detectable.

As with the chart 2000 of FIG. 20A, the chart 2030 indicates that the code bands are separated by the same frequency distance as the frequency indices representing adjacent symbol. For example, Code Band 0 includes a code frequency component having a frequency index of 13, which is one frequency index from the Code Band 1 frequency index 14 representing the state S1.

Chart 2060 of FIG. 20C shows another example that may be used by the code frequency selector 1908, wherein the chart 2060 lists 24 states in the first row 2062, each of which includes corresponding frequency indices listed in seven code bands 2064. These frequency indices correspond to frequencies of the sinusoids to be embedded into an audio signal when viewed in the frequency domain via a Fourier transform such as a DFT of a block of 3072 samples. By way of example, when state S1 is to be sent, the code frequency selector 1906 indicates that frequency indices 60, 84, 108, 132, 156, 180, and 204 are to be used. As described above, the indication of these frequencies is communicated to the masking evaluator 1904 and the code synthesizer 1908, so that sine waves having the proper amplitude and corresponding to the indicated frequency indices may be generated for addition to the audio 1804.

In example encoders 1802 operating according to the chart 2060 of FIG. 20C, the code frequencies corresponding to the desired symbol are encoded in 182 overlapping blocks of 256 samples. In such implementations the first 16 columns may be used as data symbols and the 17th column may be used as a synchronization symbol. The remaining seven columns could be used for special data such as Video On Demand—for example, columns 18, 19, 20, 21, 22, 23 could be used as auxiliary data symbols and these will be decoded as such only when an auxiliary synchronization symbol is present in column 24.

As with the charts 2000 and 2030 described above, the chart 2060 indicates that the code bands are separated by the same frequency distance as the frequency indices representing adjacent symbol. For example, Code Band 0 includes a code frequency component having a frequency index of 83, which is one frequency index from the Code Band 1 frequency index 84 representing the state S1.

Returning now to FIG. 19, as described above, the code synthesizer 1908 receives from the code frequency selector 1906 an indication of the frequency indices required to be included to create an encoded audio signal including an indication of the input code. In response to the indication of the frequency indices, the code synthesizer 1908 generates a number of sine waves (or one composite signal including multiple sine waves) having the identified frequencies. The synthesis may result in sine wave signals or in digital data representative of sine wave signals. In some examples, the code synthesizer 1908 generates the code frequencies with amplitudes dictated by the masking evaluator 1904. In other examples, the code synthesizer 1908 generates the code frequencies having fixed amplitudes and those amplitudes may be adjusted by one or more gain blocks (not shown) that are within the code sequencer 1908 or are disposed between the code synthesizer 1908 and the combiner 1910.

While the foregoing describes an example code synthesizer 1908 that generates sine waves or data representing sine waves, other example implementations of code synthesizers are possible. For example, rather than generating sine waves, another example code synthesizer 1908 may output frequency domain coefficients that are used to adjust amplitudes of certain frequencies of audio provided to the combiner 1910. In this manner, the spectrum of the audio may be adjusted to include the requisite sine waves.

The combiner 1910 receives both the output of the code synthesizer 1908 and the audio 1804 and combines them to form encoded audio. The combiner 1910 may combine the output of the code synthesizer 1908 and the audio 1804 in an analog or digital form. If the combiner 1910 performs a digital combination, the output of the code synthesizer 1908 may be combined with the output of the sampler 1902, rather than the audio 1804 that is input to the sampler 1902. For example, the audio block in digital form may be combined with the sine waves in digital form. Alternatively, the combination may be carried out in the frequency domain, wherein frequency coefficients of the audio are adjusted in accordance with frequency coefficients representing the sine waves. As a further alternative, the sine waves and the audio may be combined in analog form. The encoded audio may be output from the combiner 1910 in analog or digital form. If the output of the combiner 1910 is digital, it may be subsequently converted to analog form before being coupled to the transmitter 1806.

While an example manner of implementing the example encoder 1802 of FIG. 18 has been illustrated in FIG. 19, one or more of the interfaces, data structures, elements, processes and/or devices illustrated in FIG. 19 may be combined, divided, re-arranged, omitted, eliminated and/or implemented in any other way. Further, the example sampler 1902, the example masking evaluator 1904, the example code frequency selector 1906, the example code synthesizer 1908, the example combiner 1910 and/or, more generally, the example encoder 1802 of FIG. 19 may be implemented by hardware, software, firmware and/or any combination of hardware, software and/or firmware. Thus, for example, any of the example sampler 1902, the example masking evaluator 1904, the example code frequency selector 1906, the example code synthesizer 1908, the example combiner 1910 and/or, more generally, the example encoder 1802 may be implemented by one or more circuit(s), programmable processor(s), ASIC(s), PLD(s), FPLD(s), and/or FPGA(s), etc. When any apparatus claim of this patent incorporating one or more of these elements is read to cover a purely software and/or firmware implementation, at least one of the example sampler 1902, the example masking evaluator 1904, the example code frequency selector 1906, the example code synthesizer 1908, the example combiner 1910 and/or, more generally, the example encoder 1802 are hereby expressly defined to include a tangible article of manufacture such as a tangible computer-readable medium such as those described above in connection with FIG. 17 storing the firmware and/or software. Further still, the example encoder 1802 may include interfaces, data structures, elements, processes and/or devices instead of, or in addition to, those illustrated in FIG. 19 and/or may include more than one of any or all of the illustrated interfaces, data structures, elements, processes and/or devices.

Figure 21:
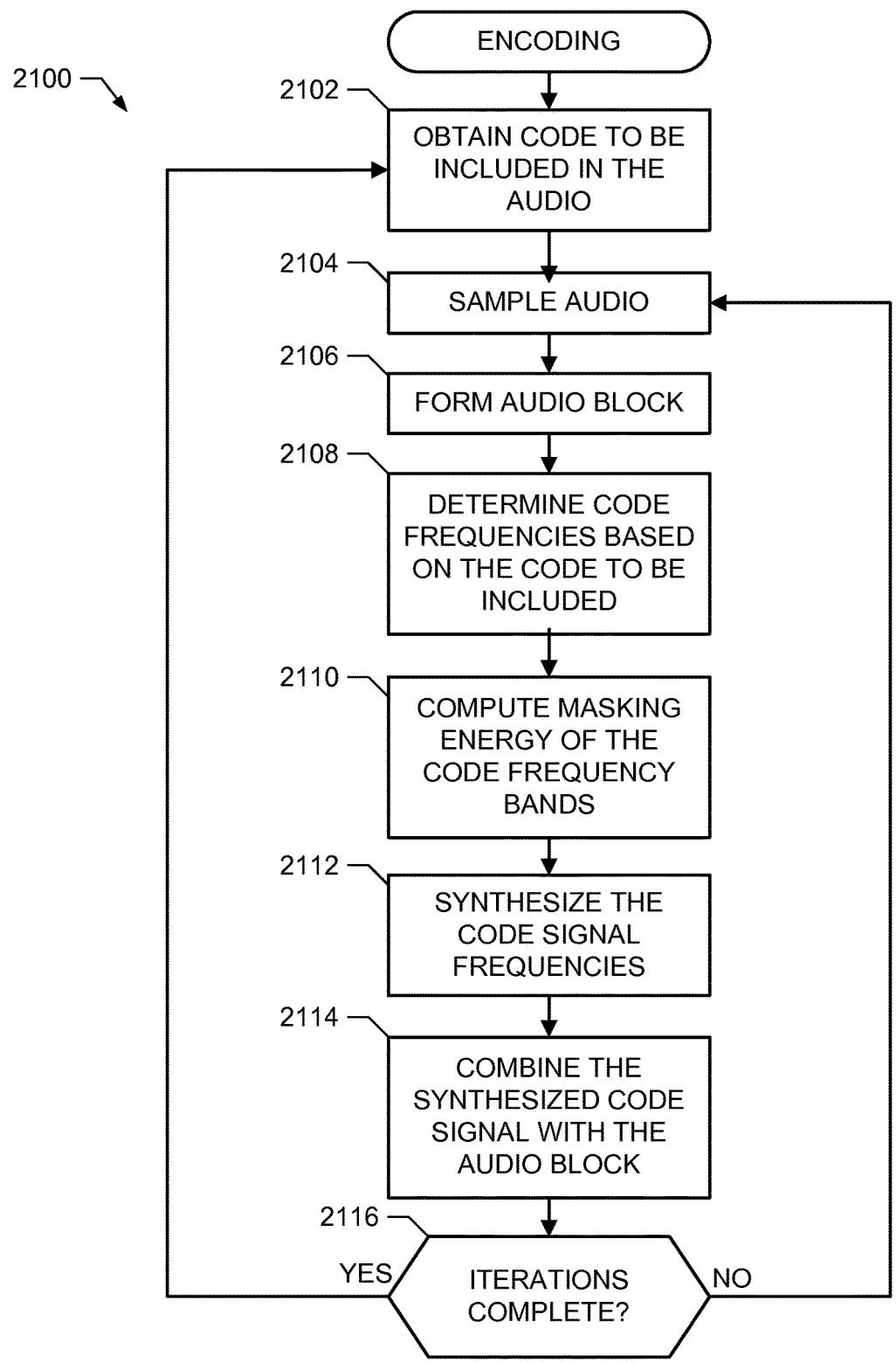
FIG. 21 illustrates example machine-accessible instructions that may be executed by, for example, a processor, to implement the example encoder of FIG. 19.

FIG. 21 illustrates example machine-accessible instructions 2100 that may be executed to implement the example encoder 1802 of FIGS. 18 and 19. A processor, a controller and/or any other suitable processing device may be used and/or programmed to execute the example machine-accessible instructions of FIG. 21. For example, the machine-accessible instructions of FIG. 21 may be embodied in coded instructions stored on any combination of tangible article of manufacture such as a tangible computer-readable medium discussed above in connection with FIG. 17. Machine-readable instructions comprise, for example, instructions and data that cause a processor, a computer and/or a machine having a processor (e.g., the example processor platform P100 discussed below in connection with FIG. 24) to perform one or more particular processes. Alternatively, some or all of the example machine-accessible instructions of FIG. 21 may be implemented using any combination(s) of ASIC(s), PLD(s), FPLD(s), FPGA(s), discrete logic, hardware, firmware, etc. Also, some or all of the example process of FIG. 21 may be implemented manually or as any combination of any of the foregoing techniques, for example, any combination of firmware, software, discrete logic and/or hardware. Further, many other methods of implementing the example operations of FIG. 21 may be employed. For example, the order of execution of the blocks may be changed, and/or one or more of the blocks described may be changed, eliminated, sub-divided, or combined. Additionally, any or all of the example machine-accessible instructions of FIG. 21 may be carried out sequentially and/or carried out in parallel by, for example, separate processing threads, processors, devices, discrete logic, circuits, etc.

The example process 2100 of FIG. 21 begins when the code to be included in the audio is obtained (block 2102). The code may be obtained via a data file, a memory, a register, an input port, a network connection, or any other suitable technique. After the code is obtained (block 2102), the example process 2100 samples the audio into which the code is to be embedded (block 2104). The sampling may be carried out at 48,000 Hz or at any other suitable frequency. The example process 2100 then assembles the audio samples into a block of audio samples (block 2106). The block of samples may include, for example, 512 audio samples. In some examples, blocks of samples may include both old samples (e.g., samples that have been used before in encoding information into audio) and new samples (e.g., samples that have not been used before in encoding information into audio). For example, a block of 512 audio samples may include 256 old samples and 256 new samples. Upon a subsequent iteration of the example process 400, the 256 new samples from a prior iteration may be used as the 256 old samples of the next iteration of the example process 2100.

The example process 2100 then determines the code frequencies that will be used to include the code (obtained at block 2102) into the audio block (obtained at block 2106) (block 2108). This is an encoding process in which a code or code bits are converted into symbols that will be represented by frequency components. As described above, the example process 2100 may use one or more lookup tables to convert codes to be encoded into symbols representative of the codes, wherein those symbols are redundantly represented by code frequencies in the audio spectrum. As described above, seven frequencies may be used to redundantly represent the selected symbol in the block of audio. The selection of symbols to represent codes may include consideration of the block number being processed error coding, etc.

Having obtained the audio into which the codes are to be included (block 2106), as well as the code frequencies that are to be used to represent the codes (block 2108), the process 2100 computes the ability of the audio block to mask the selected code frequencies (block 2110). As explained above, the masking evaluation may include conversion of the audio block to the frequency domain and consideration of the tonal or noise-like properties of the audio block, as well as the amplitudes at various frequencies in the block. Alternatively, the evaluation may be carried out in the time domain. Additionally, the masking may also include consideration of audio that was in a previous audio block. As noted above, the masking evaluation may be carried out in accordance with the MPEG-AAC audio compression standard ISO/IEC 13818-7:1997, for example. The result of the masking evaluation is a determination of the amplitudes or energies of the code frequencies that are to be added to the audio block, while such code frequencies remain inaudible or substantially inaudible to human hearing.

Having determined the amplitudes or energies at which the code frequencies should be generated (block 2110), the example process 2100 synthesizes one or more sine waves having the code frequencies (block 2112). The synthesis may result in actual sine waves or may result in digital data equivalent representative of sine waves. Some example sine waves are synthesized with amplitudes specified by the masking evaluation. Alternatively, the code frequencies may be synthesized with fixed amplitudes and then amplitudes of the code frequencies may be adjusted subsequent to synthesis.

The example process 2100 then combines the synthesized code frequencies with the audio block (block 2114). The combination may be carried out through addition of data representing the audio block and data representing the synthesized sine waves, or may be carried out in any other suitable manner.

In another example, the code frequency synthesis (block 2112) and the combination (block 2114) may be carried out in the frequency domain, wherein frequency coefficients representative of the audio block in the frequency domain are adjusted per the frequency domain coefficients of the synthesized sine waves.

As explained above, the code frequencies are redundantly encoded into consecutive audio blocks. In some examples, a particular set of code frequencies is encoded into 36 consecutive blocks. Thus, the example process 2100 monitors whether it has completed the requisite number of iterations (block 2116) (e.g., the process 2100 determines whether the example process 2100 has been repeated 36 times to redundantly encode the code frequencies). If the example process 2100 has not completed the requisite iterations (block 2116), the example process 2100 samples audio (block 2104), analyses the masking properties of the same (block 2110), synthesizes the code frequencies (block 2112) and combines the code frequencies with the newly acquired audio block (block 2114), thereby encoding another audio block with the code frequencies.

However, when the requisite iterations to redundantly encode the code frequencies into audio blocks have completed (block 2116), the example process 2100 obtains the next code to be included in the audio (block 2102) and the example process 2100 iterates. Thus, the example process 2100 encodes a first code into a predetermined number of audio blocks, before selecting the next code to encode into a predetermined number of audio blocks, and so on. It is, however, possible, that there is not always a code to be embedded in the audio. In that instance, the example process 2100 may be bypassed. Alternatively, if no code to be included is obtained (block 2102), no code frequencies will by synthesized (block 2112) and, thus, there will be no code frequencies to alter an audio block. Thus, the example process 2100 may still operate, but audio blocks may not always be modified—especially when there is no code to be included in the audio.

Audio Decoding

In general, the decoder 1816 detects the code signal that was inserted into the audio 1804 to form encoded audio at the encoder 1802. That is, the decoder 1816 looks for a pattern of emphasis in code frequencies it processes. Once the decoder 1816 has determined which of the code frequencies have been emphasized, the decoder 1816 determines, based on the emphasized code frequencies, the symbol present within the encoded audio. The decoder 1816 may record the symbols, or may decode those symbols into the codes that were provided to the encoder 1802 for insertion into the audio.

Figure 22:
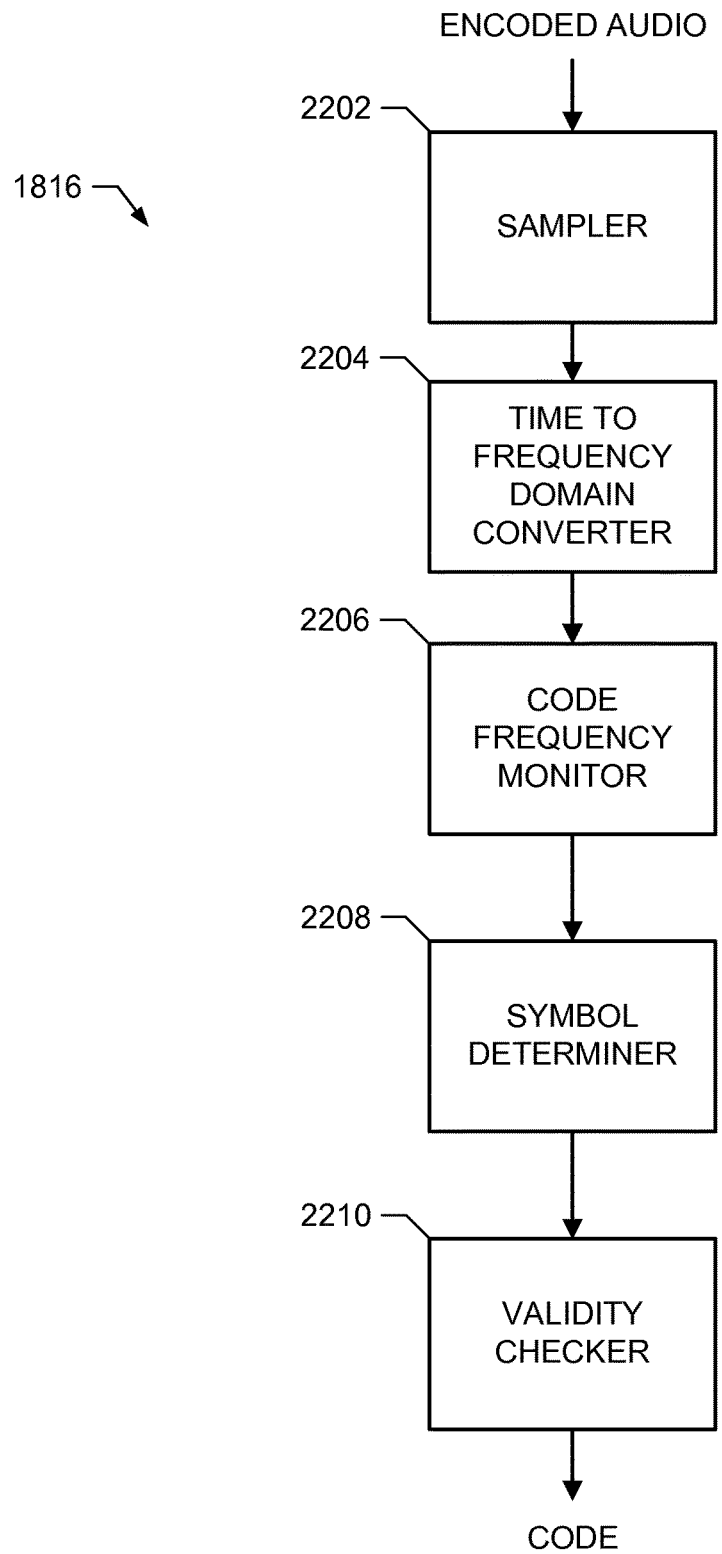
FIG. 22 illustrates an example manner of implementing the example decoder of FIG. 18.

FIG. 22 illustrates an example manner of decoding Nielsen codes and/or implementing the example decoder 1816 of FIG. 22, the example decoder 310 of FIG. 3 and/or the example secondary content triggerer 180 of FIGS. 1 and 2. While the decoder illustrated in FIG. 22 may be used to implement any of the decoders 1816, 310 and 180, for ease of discussion the decoder of FIG. 22 will be referred to as decoder 1816. As shown in FIG. 22, an example decoder 1816 includes a sampler 2202, which may be implemented using an A/D or any other suitable technology, to which encoded audio is provided in analog format. As shown in FIG. 18, the encoded audio may be provided by a wired or wireless connection to the receiver 1810. The sampler 2202 samples the encoded audio at, for example, a sampling frequency of 48,000 Hz. Of course, lower sampling frequencies may be advantageously selected in order to reduce the computational load at the time of decoding. For example, at a sampling frequency of 8 kHz the Nyquist frequency is 4 kHz and therefore all the embedded code signal is preserved because its spectral frequencies are lower than the Nyquist frequency. The 18,432-sample DFT block length at 48 kHz sampling rate is reduced to 3072 samples at 8 kHz sampling rate. However even at this modified DFT block size the code frequency indices are identical to the original and range from 360 to 1367.

The samples from the sampler 2202 are provided to a time to frequency domain converter 2204. The time to frequency domain converter 2204 may be implemented using a DFT, or any other suitable technique to convert time-based information into frequency-based information. In some examples, the time to frequency domain converter 2204 may be implemented using a sliding DFT in which a spectrum is calculated each time a new sample is provided to the example time to frequency converter 2204. In some examples, the time to frequency domain converter 2204 uses 18,432 samples of the encoded audio and determines a spectrum therefrom. The resolution of the spectrum produced by the time to frequency domain converter 2204 increases as the number of samples used to generate the spectrum. Thus, the number of samples processed by the time to frequency domain converter 2204 should match the resolution used to select the indices in the charts of FIG. 20A, 20B, or 20C.

The spectrum produced by the time to frequency domain converter 2204 passes to a code frequency monitor 2206, which monitors all the frequencies or spectral lines corresponding to the frequency indices that can potentially carry codes inserted by the example encoder 1802. For example, if the example encoder 1802 sends data based on the chart of FIG. 20A, the code frequency monitor 2206 monitors the frequencies corresponding to indices 360-1366.

The monitoring of the code frequencies includes evaluating the spectral energies at each of the code frequencies. Thus, the code frequency monitor 2206 normalizes the energies for a specific row of the chart of FIG. 20A to a maximum energy in that row of the chart. For example, considering the frequency indices corresponding to Code Band 0 of the chart of FIG. 20A, if the frequency corresponding to frequency index 360 has the maximum energy of the other frequencies in the row representing Code Band 0 (e.g., frequency indices 361, 362 . . . 503) each of the energies at the other frequencies corresponding to the indices in Code Band 0 divided by the energy of the frequency corresponding to frequency index 360. Thus, the normalized energy for frequency index 360 will have a value of 1 and all of the remaining frequencies corresponding to frequency indices in Code Band 0 will have values smaller than 1. This normalization process is repeated for each row of the chart 2000. That is, each Code Band in the chart of FIG. 20A will include one frequency having its energy normalized to 1, with all remaining energies in that Code Band normalized to something less than 1.

Based on the normalized energies produced by the code frequency monitor 2206, a symbol determiner 2208 to determines the symbol that was present in the encoded audio. In some examples, the symbol determiner 2208 sums all of the normalized energies corresponding to each state. That is, the symbol determiner 2208 creates 144 sums, each corresponding to a column, or state, in the chart 2000. The column or state having the highest sum of normalized energies is determined to be the symbol that was encoded. The symbol determiner 2208 may use a lookup table similar to the lookup table of FIG. 20A that can be used to map emphasized frequencies to the symbols to which they correspond. For example, if state S1 was encoded into the audio, the normalized energies will generally result in a value of one for each frequency index representing state S1. That is, in general, all other frequencies in the Code Bands that do not correspond to state S1 will have a value less than one. However, while this is generally true, not every frequency index corresponding to state S1 will have a value of one. Thus, a sum of the normalized energies is calculated for each state. In this manner, generally, the normalized energies corresponding to the frequency indices representing state S1 will have a greater sum than energies corresponding to the frequency indices representing other states. If the sum of normalized energies corresponding to the frequency indices representing state S1 exceeds a threshold of 4.0 for detection, state S1 is determined to be the most probable symbol that was embedded in the encoded audio. If, however, the sum does not exceed the threshold, there is insufficient confidence that state S1 was encoded, and no state is determined to be the most probable state. Thus, the output of the symbol determiner 2208 is a stream of most probable symbols that were encoded into the audio. Under ideal conditions, the code frequencies of S1 will yield a normalized score of 7.0

The most probable symbols are processed by the validity checker 2210 to determine if the received symbols correspond to valid data. That is, the validity checker 2210 determines if bits corresponding to the most probable symbol are valid given the encoding scheme used to convert the code into a symbol at the code frequency selector 1906 of the encoder 1802. The output of the validity checker 2210 is the code, which corresponds to the code provided to the code frequency selector 1906 of FIG. 19.

While an example manner of implementing the example decoder 1816 of FIG. 18 has been illustrated in FIG. 22, one or more of the interfaces, data structures, elements, processes and/or devices illustrated in FIG. 22 may be combined, divided, re-arranged, omitted, eliminated and/or implemented in any other way. Further, the example sampler 2202, the example time to frequency domain converter 2204, the example code frequency monitor 2206, the example symbol determiner 2208, the example validity checker 2210 and/or, more generally, the example decoder 1816 of FIG. 22 may be implemented by hardware, software, firmware and/or any combination of hardware, software and/or firmware. Thus, for example, any of the example sampler 2202, the example time to frequency domain converter 2204, the example code frequency monitor 2206, the example symbol determiner 2208, the example validity checker 2210 and/or, more generally, the example decoder 1816 may be implemented by one or more circuit(s), programmable processor(s), ASIC(s), PLD(s), FPLD(s), and/or FPGA(s), etc. When any apparatus claim of this patent incorporating one or more of these elements is read to cover a purely software and/or firmware implementation, at least one of the example sampler 2202, the example time to frequency domain converter 2204, the example code frequency monitor 2206, the example symbol determiner 2208, the example validity checker 2210 and/or, more generally, the example decoder 1816 are hereby expressly defined to include a tangible article of manufacture such as a tangible computer-readable medium such as those described above in connection with FIG. 17 storing the firmware and/or software. Further still, the example decoder 1816 may include interfaces, data structures, elements, processes and/or devices instead of, or in addition to, those illustrated in FIG. 22 and/or may include more than one of any or all of the illustrated interfaces, data structures, elements, processes and/or devices.

Figure 23:
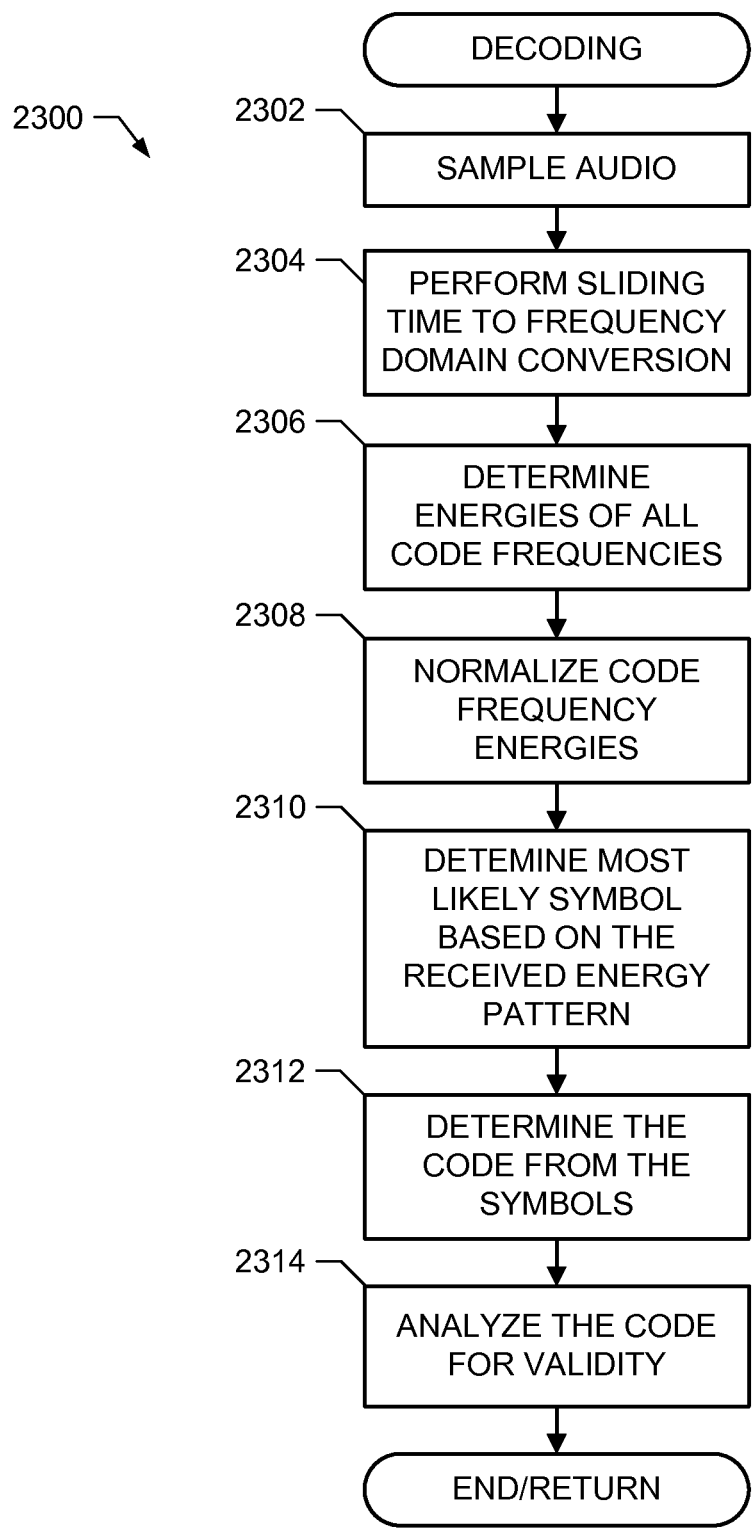
FIG. 23 illustrates example machine-accessible instructions that may be executed by, for example, a processor, to implement the example decoder of FIG. 22.

FIG. 23 illustrates example machine-accessible instructions 2300 that may be executed to implement the example decoder 1816 of FIGS. 18 and 22. A processor, a controller and/or any other suitable processing device may be used and/or programmed to execute the example machine-accessible instructions of FIG. 23. For example, the machine-accessible instructions of FIG. 23 may be embodied in coded instructions stored on any combination of tangible article of manufacture such as a tangible computer-readable medium discussed above in connection with FIG. 17. Machine-readable instructions comprise, for example, instructions and data that cause a processor, a computer and/or a machine having a processor (e.g., the example processor platform P100 discussed below in connection with FIG. 24) to perform one or more particular processes. Alternatively, some or all of the example machine-accessible instructions of FIG. 23 may be implemented using any combination(s) of ASIC(s), PLD(s), FPLD(s), FPGA(s), discrete logic, hardware, firmware, etc. Also, some or all of the example process of FIG. 23 may be implemented manually or as any combination of any of the foregoing techniques, for example, any combination of firmware, software, discrete logic and/or hardware. Further, many other methods of implementing the example operations of FIG. 23 may be employed. For example, the order of execution of the blocks may be changed, and/or one or more of the blocks described may be changed, eliminated, sub-divided, or combined. Additionally, any or all of the example machine-accessible instructions of FIG. 23 may be carried out sequentially and/or carried out in parallel by, for example, separate processing threads, processors, devices, discrete logic, circuits, etc.

The example process 2300 of FIG. 23 begins by sampling audio (block 2302). The audio may be obtained via an audio sensor, a hardwired connection, via an audio file, or through any other suitable technique. As explained above the sampling may be carried out at 48,000 Hz, or any other suitable frequency.

As each sample is obtained, a sliding time to frequency conversion is performed on a collection of samples including numerous older samples and the newly added sample obtained at block 2302 (block 2304). In some examples, a sliding DFT is used to process streaming input samples including 18,431 old samples and the one newly added sample. In some examples, the DFT using 18,432 samples results in a spectrum having a resolution of 2.6 Hz.

After the spectrum is obtained through the time to frequency conversion (block 2304), the energies of the code frequencies are determined (block 2306). In some examples, the energies may be obtained by taking the magnitude of the result of the time to frequency conversion (block 2304) for the frequency components that may be emphasized to encode the audio. To save processing time and minimize memory consumption, only frequency information corresponding to the code frequencies may be retained and processed further, because those frequencies are the only frequencies at which encoded information may be located. Of course, the example process 2300 may use other information than the energies. For example, the example process 2300 could retain both magnitude and phase information and process the same.

Additionally, the frequencies that are processed in the process 2300 may be further reduced by considering a previously-received synchronization symbol. For example, if a particular synchronization symbol is always followed by one of six different symbols, the frequencies that are processed may be reduced to those of the six different symbols after that particular synchronization symbol is received.

After the energies are determined (block 2306), the example process 2300 normalizes the code frequency energies of each Code Block based on the largest energy in that Code Block (block 2308). That is, the maximum energy of a code frequency in a Code Block is used as a divisor against itself and all other energies in that Code Block. The normalization results in each Code Block having one frequency component having a normalized energy value of one, with all other normalized energy values in that Code Block having values less than one. Thus, with reference to FIG. 20A, each row of the chart 2000 will have one entry having a value of one and all other entries will have values less than one.

The example process 2300 then operates on the normalized energy values to determine the most likely symbol based thereon (block 2310). As explained above, this determination includes, for example, summing the normalized energy values corresponding to each symbol, thereby resulting in the same number of sums as symbols (e.g., in consideration of the chart of FIG. 20A, there would be 144 sums, each of which corresponds to one of the 144 symbols). The largest sum is then compared to a threshold (e.g., 4.0) and if the sum exceeds the threshold, the symbol corresponding to the largest sum is determined to be the received symbol. If the largest sum does not exceed the threshold, no symbol is determined to be the received symbol.

After having determined the received symbol (block 2310), the example process 2300 determines the code corresponding to the received symbol (block 2312). That is, the example process 2300 decodes the encoding of a code into a symbol that was carried out by the example encoding process 2100 (e.g., the encoding performed by block 2108).

After the decoding is complete and codes are determined from symbols (block 2312), the example process 2300 analyzes the code for validity (block 2314). For example, the received codes may be examined to determine if the code sequence is valid based on the encoding process by which codes are sent. Valid codes are logged and may be sent back to a central processing facility at a later time, along with a time and date stamp indicating when the codes were received. Additionally or alternatively, as described above in connection with FIGS. 1-17, the valid codes may be used to obtain and present secondary content for the primary media content associated with the decoded audio.

Figure 24:
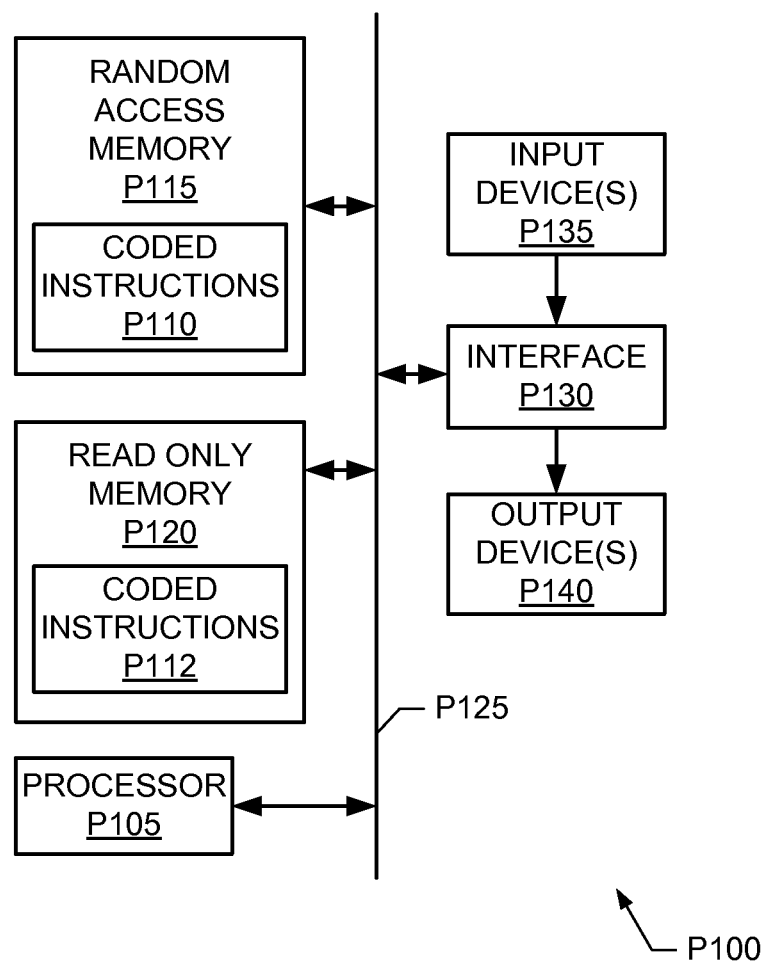
FIG. 24 is a schematic illustration of an example processor platform that may be used and/or programmed to carry out the example machine-accessible instructions of FIGS. 17, 21, 23, 28, 29, 36, 37, 43, 45, 49-52 and 55, the example operations of FIGS. 6-10, 30 and 31, the example flows of FIGS. 14-16, and/or to implement any or all of the example methods, apparatus and/or articles of manufacture described herein.

FIG. 24 is a schematic diagram of an example processor platform P100 that may be used and/or programmed to implement any of the example apparatus disclosed herein. For example, one or more general-purpose processors, processor cores, microcontrollers, etc can implement the processor platform P100.

The processor platform P100 of the example of FIG. 24 includes at least one programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example machine-accessible instructions of FIGS. 17, 21, 23, 28, 29, 36, 37, 43, 45, 4-52 and 55, the example operations of FIGS. 6-10, 30 and 31, the example flows of FIGS. 14-16, to deliver secondary content for primary media contents, to encode audio, and/or to decode audio as described herein.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller (not shown). The example memory P115 may be used to, for example, implement the example media stores 130, 340 and/or the example databases 1120, 1130 and 1135.

The processor platform P100 also includes an interface circuit P130. Any type of interface standard, such as an external memory interface, serial port, general-purpose input/output, etc, may implement the interface circuit P130. One or more input devices P135 and one or more output devices P140 are connected to the interface circuit P130. The input devices P135 and the output devices P140 may be used to implement any of the example broadcast input interface 205, the example Bluetooth interface 220, the example wireless interface 225, the example communication interface 230, the example audio input interface 305, the example display 330, the example input device(s) 335, the example wireless interface 315, the example cellular interface 320 and/or the example Bluetooth interface 345.

Figure 25:
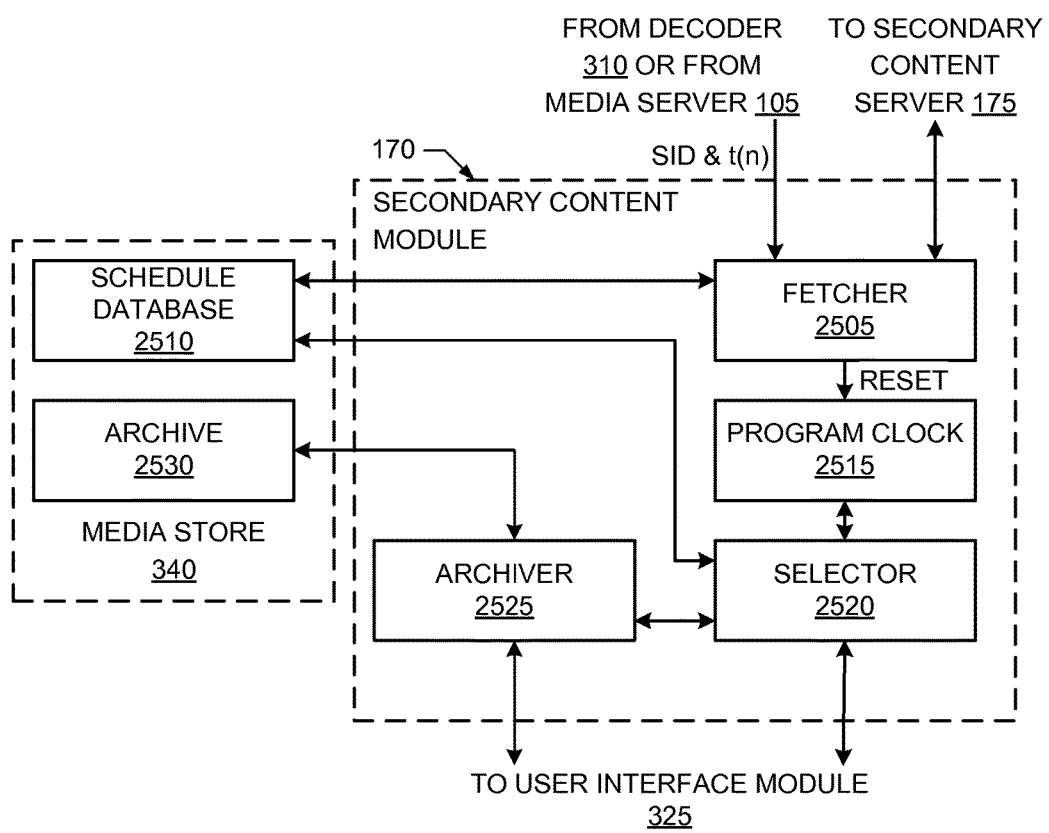
FIG. 25 illustrates an example manner of implementing the example secondary content module of FIGS. 1 and 3.

FIG. 25 illustrates an example manner of implementing the example secondary content module 170 of FIGS. 1 and 3. To fetch a schedule of secondary content, the example secondary content module 170 of FIG. 25 includes a fetcher 2505. In response to a SID and a timestamp t(n) received from the example decoder 310 (FIG. 3) and/or from the example media server 105 via, for example, the Bluetooth interface 345, the example fetcher 2505 of FIG. 25 interacts with the example secondary content server 175 based on the SID and timestamp t(n) to obtain a schedule of secondary content. The example fetcher 2505 stores the received secondary content schedules in a schedule database 2510 in the example media store 340. Example data structures that may be used by the secondary content server 175 to provide the secondary content schedule to the fetcher 2505 and/or by the fetcher 2505 to store the received secondary content schedule in the schedule database 2510 are described below in connection with FIGS. 26 and 27.

To identify a portion of and/or location within primary media content, the example secondary content module 170 of FIG. 25 includes a program clock 2515. When the example fetcher 2505 receives a timestamp t(n) during primary media content, the example program clock 2515 of FIG. 25 is (re)set so that its time value substantially corresponds to the received timestamp t(n). Subsequently, the program clock 2515 can be used to identify later portions of and/or locations within the primary media content.

To select secondary content to be displayed, the example secondary content module 170 of FIG. 25 includes a selector 2520. The example selector 2520 of FIG. 25 compares time values provided by the program clock 2515 to timestamp values associated with each secondary content items in the secondary content schedule stored in the schedule database 2510 to identify one or more secondary content offers to display via, for example, the example user interface of FIG. 4. As described below in connection with FIGS. 26 and 27, each secondary content offer listed in the schedule has an associated start timestamp and an associated end timestamp. When the current time value generated by the program clock 2515 falls within such a range, the example selector 2520 selects the corresponding secondary content offer for display.

To archive secondary content and/or secondary content offers, the example secondary content module 170 of FIG. 25 includes an archiver 2525 and an archive 2530. As configured and/or operated by a person via the example user interface module 325, the example archiver 2525 stores particular secondary content and/or secondary content offers in the example archive 2530 for subsequent retrieval. For example, the person may configure that certain categories of secondary content and/or secondary content offers be automatically archived and/or may individually select particular secondary content and/or secondary content offers for archival. For example, the person can indicate that all recipe and cooking related secondary content offers be archived. The person can also interact with the archiver 2525 to query, search and/or identify secondary content in the archive 2530 for presentation. For example, the person can search by type of secondary content, date, time, etc.

Example machine-accessible instructions that may be executed to implement the example secondary content module 170 of FIG. 25 are described below in connection with FIGS. 28 and 29.

While an example manner of implementing the example secondary content module 170 of FIGS. 1 and 3 has been illustrated in FIG. 25, one or more of the interfaces, data structures, elements, processes and/or devices illustrated in FIG. 25 may be combined, divided, re-arranged, omitted, eliminated and/or implemented in any other way. Further, the example fetcher 2505, the example program clock 2515, the example selector 2520, the example archiver 2525, the example schedule database 2510, the example archive 2530 and/or, more generally, the example secondary content module 170 of FIG. 25 may be implemented by hardware, software, firmware and/or any combination of hardware, software and/or firmware. Thus, for example, any of the example fetcher 2505, the example program clock 2515, the example selector 2520, the example archiver 2525, the example schedule database 2510, the example archive 2530 and/or, more generally, the example secondary content module 170 may be implemented by one or more circuit(s), programmable processor(s), ASIC(s), PLD(s), FPLD(s), and/or FPGA(s), etc. When any apparatus claim of this patent incorporating one or more of these elements is read to cover a purely software and/or firmware implementation, at least one of the example fetcher 2505, the example program clock 2515, the example selector 2520, the example archiver 2525, the example schedule database 2510, the example archive 2530 and/or, more generally, the example secondary content module 170 are hereby expressly defined to include a tangible article of manufacture such as a tangible computer-readable medium such as those described above in connection with FIG. 17 storing the firmware and/or software. Further still, the example secondary content module 170 may include interfaces, data structures, elements, processes and/or devices instead of, or in addition to, those illustrated in FIG. 25 and/or may include more than one of any or all of the illustrated interfaces, data structures, elements, processes and/or devices.

Figure 26:
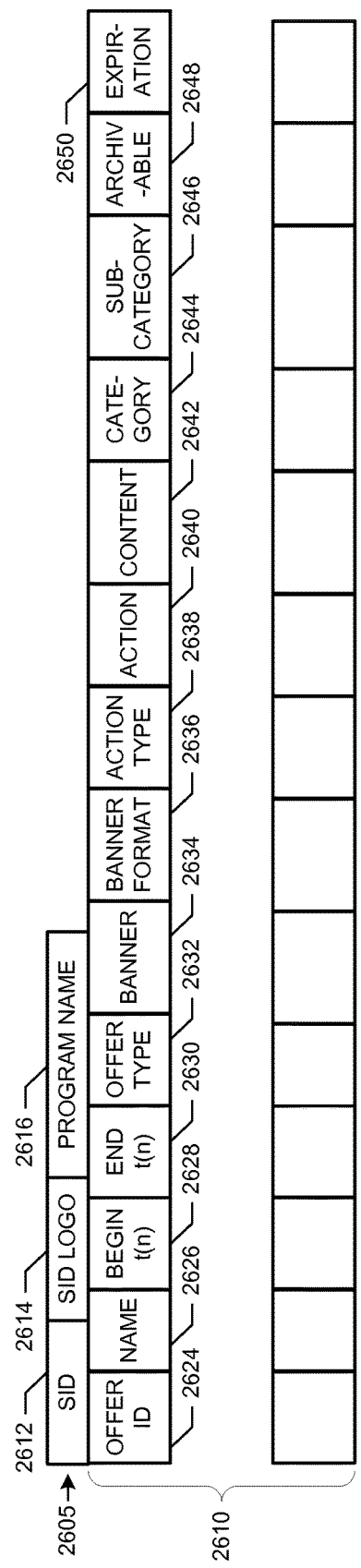

FIGS. 26 and 27 illustrate example data structures that may be used to implement a secondary content schedule. The example data structures of FIGS. 26 and 27 may be used by the example secondary content server 175 to send a secondary content schedule to the example media server 105 and/or the example secondary content presentation device 150, and/or to store a secondary content schedule at any device of the example content delivery system 100 of FIG. 1.

The example data structure of FIG. 26 contains fields 2605 that identify particular primary media content, and includes a plurality of entries 2610 for respective secondary content offers. To identify primary media content, the example data structure of FIG. 26 includes a SID field 2612. The example SID field 2612 of FIG. 26 contains a SID corresponding to particular primary media content. To represent a logo associated with the identified primary media content, the example data structure of FIG. 26 includes a SID logo field 2614. The example SID logo field 2614 contains data representing a logo and/or contains one or more characters identifying a file and/or a link to the logo. To further identify the primary media content, the example data structure of FIG. 26 includes a program name field 2616. The example program name field 2616 of FIG. 26 contains one or more alphanumeric characters that represent the name of the identified primary media content and/or the name of a content provider 135 associated with the primary media content.

To identify a secondary content offer, each of the example entries 2610 of FIG. 26 includes an offer ID field 2624. Each of the example offer ID fields 2624 of FIG. 26 contains one or more alphanumeric characters that uniquely identify a secondary content offer. To further identify the secondary content offer, each of the example entries 2610 of FIG. 26 includes a name field 2626. Each of the example name fields 2626 of FIG. 26 contains one or more alphanumeric characters representing a name of the identified secondary content offer.

To identify times within the primary media content identified in the SID field 2612 during which the secondary content offer is to be displayed, each of the example entries 2610 of FIG. 26 includes a begin field 2628 and an end field 2630. Each of the example begin fields 2628 of FIG. 26 contains a time corresponding to when the secondary content offer may begin being presented. Each of the example end fields 2630 of FIG. 26 contains a time corresponding to when the secondary content offer is no longer to be presented.

To specify an offer type, each of the example entries 2610 of FIG. 26 includes an offer type field 2632. Each of the example offer type fields 2632 of FIG. 26 contains one or more alphanumeric characters that represent a type of secondary content offer. Example secondary content offer types include, but are not limited to, related to primary media content, related to product placement, related to a commercial, related to a user loyalty level, related to a user affinity group, etc.

To specify a banner to be displayed to present an offer (e.g., in the example user interface of FIG. 4), each of the example entries 2610 of FIG. 26 includes a banner field 2634 and a banner format field 2636. Each of the example banner fields 2634 of FIG. 26 contains data representing a banner to be presented and/or contains one or more characters identifying a file and/or a link to the banner. Each of the example banner type fields 2636 of FIG. 26 contains one or more alphanumeric characters representing a type of banner. Example banner types include, but are not limited to, bitmap, shockwave flash, flash video, portable network graphics, etc.

To identify an action type, each of the example entries 2610 of FIG. 26 includes a type field 2638. Each of the example type fields 2638 of FIG. 26 includes one or more numbers, letters and/or codes that identify a type of action 2640. Example action types include, but are not limited to, web access, web link, local module ID, phone dialing, and/or pass through to a local applet.

To specify an action, each of the example entries 2610 of FIG. 26 includes an action field 2640. Each of the example action fields 2640 of FIG. 26 includes text and/or command(s) that define an action and/or secondary content corresponding to the identified offer. Example scripts include, but are not limited to, a URL, a phone number, a target applet, and/or an OS command. When the corresponding secondary content offer is selected and/or activated, the action 2610 is activated and/or used to obtain the corresponding secondary content.

To identify content to be cached, each of the example entries 2610 of FIG. 26 includes a content field 2642. Each of the example content fields 2642 of FIG. 26 identifies, for example, a set of web pages and/or other secondary content to be cached on the secondary content presentation device 150.

To categorize the secondary content, each of the example entries 2610 of FIG. 26 includes a category field 2644 and a sub-category field 2646. Each of the example category fields 2644 and the sub-category fields 2646 of FIG. 26 contain one or more alphanumeric characteristics useful for categorizing secondary content. Example categories include, but are not limited to, news, cooking, sports, information, educational, infomercial, etc.

To define whether the secondary content and/or secondary content offer may be saved, each of the example entries 2610 of FIG. 26 includes an archivable field 2648. Each of the example archivable fields 2648 of FIG. 26 contains a value that represents whether the secondary content and/or secondary content offer can be saved at the secondary content presentation device 150 and/or the media server 105 for subsequent retrieval and/or display at the secondary content presentation device 150 and/or the media server 105. In some examples, the archivable field 2648 defines a time period during which the action 1205 may be saved at the secondary content presentation device 150 and/or the media server 105 and/or a time at which the secondary content and/or secondary content offer is to be flushed from the cache.

To identify an expiration date and/or time, each of the example entries 2610 of FIG. 26 includes an expiration field 2650. Each of the example expiration fields 2650 of FIG. 26 includes a day and/or time at which the identified secondary content and/or secondary content offer expires and, thus, no longer valid for presentation and/or retrieval.

FIG. 27 illustrates example secondary content schedule eXtensible Markup Language (XML) document that represents and/or implements a secondary content schedule using a data structure similar to that described above in connection with FIG. 26. Because identical elements are depicted in FIGS. 26 and 27, the descriptions of identical elements are not repeated here. Instead the interested reader is referred to the descriptions presented above in connection with FIG. 26. An XML document (e.g., the example XML document of FIG. 27) used to represent a secondary content schedule may be constructed and/or generated according to and/or using grammar defined by a secondary content schedule XML schema. FIG. 58 illustrates an example secondary content schedule XML schema that defines one or more constraints on the structure and/or content of secondary content schedule XML documents, beyond the conventional syntactical constraints imposed by XML. Example constraints are expressed as one or more combinations of grammatical rules that govern the order of elements, one or more Boolean predicates that the content must satisfy, one or more data types that govern the content of elements and attributes, and/or one or more specialized rules such as uniqueness and referential integrity constraints.

While example data structures that may be used to implement a secondary content schedule have been illustrated in FIGS. 26, 27 and 58, one or more of the entries and/or fields may be combined, divided, re-arranged, omitted, eliminated and/or implemented in any other way. Moreover, the example data structures of FIGS. 26, 27 and/or 58 may include fields instead of, or in addition to, those illustrated in FIGS. 26, 27 and/or 58, and/or may include more than one of any or all of the illustrated fields.

Figure 28:
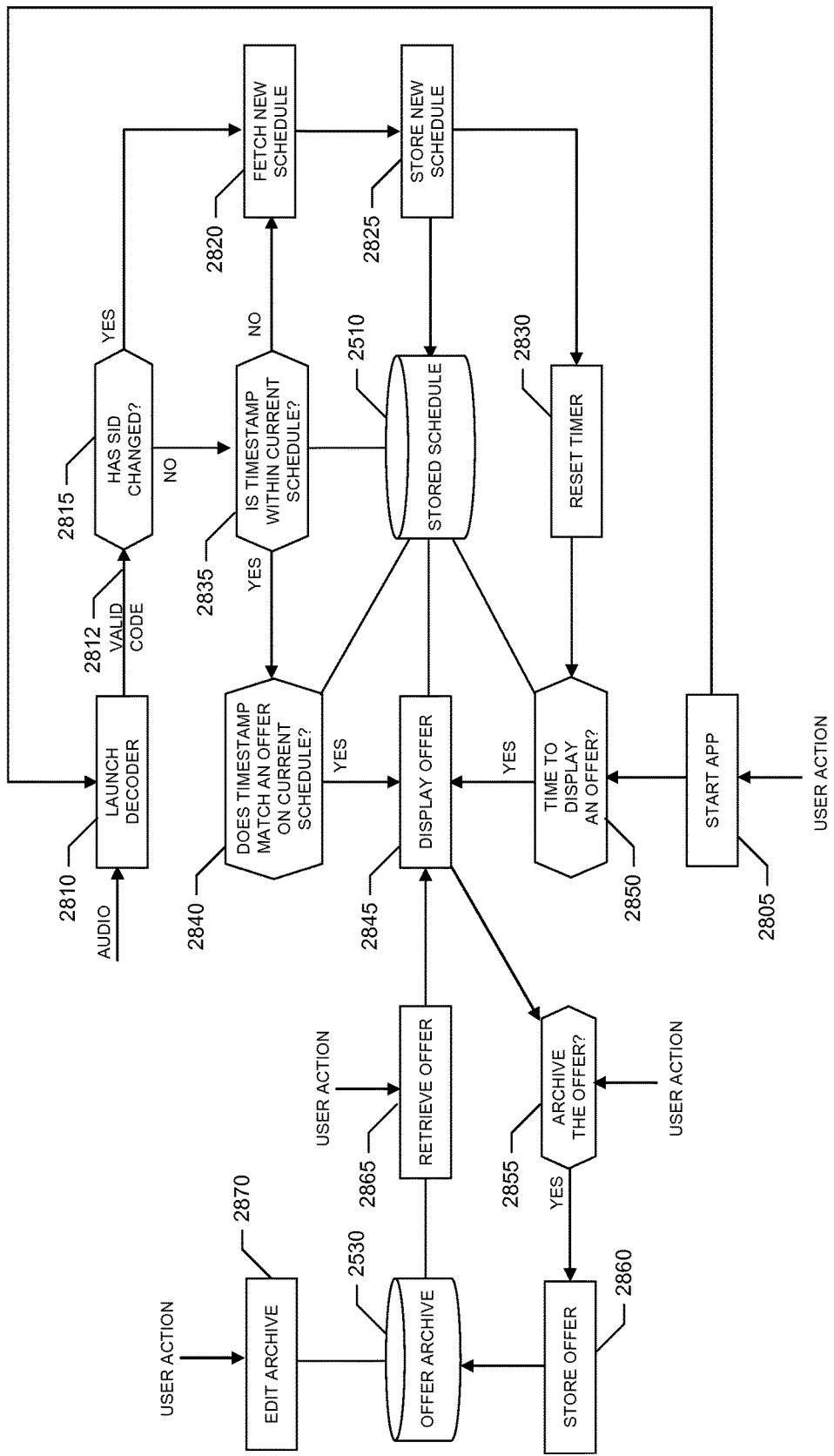
FIGS. 28 and 29 illustrate example machine-accessible instructions that may be executed by, for example, a processor, to implement the example secondary content module of FIGS. 1, 3 and 25.
Figure 29:
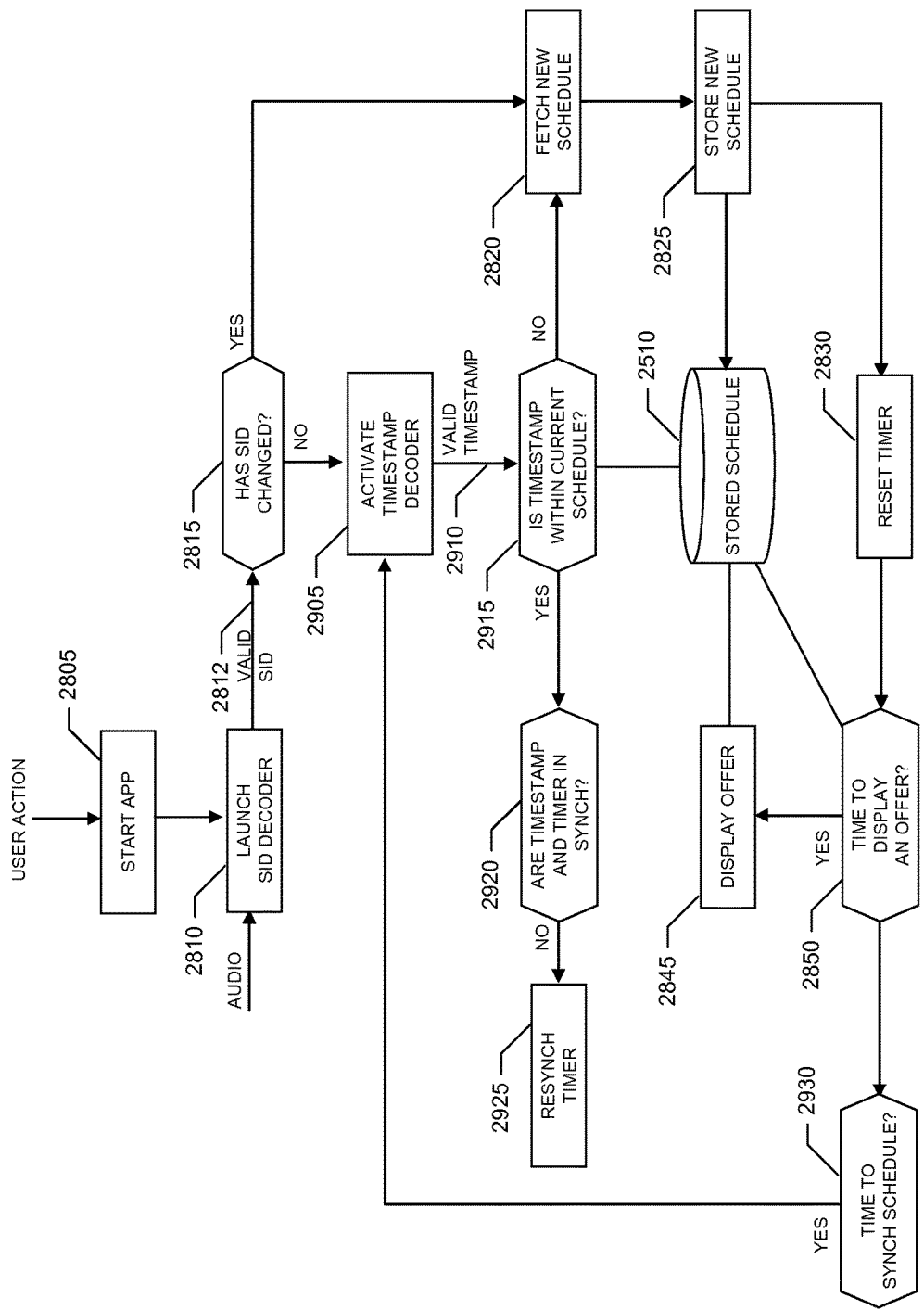

FIGS. 28 and 29 illustrate example machine-accessible instructions that may be executed to implement the example secondary content module 170 of FIGS. 1, 3 and 25. A processor, a controller and/or any other suitable processing device may be used and/or programmed to execute the example machine-accessible instructions of FIGS. 28 and 29. For example, the machine-accessible instructions of FIGS. 28 and 29 may be embodied in coded instructions stored on any combination of tangible article of manufacture such as a tangible computer-readable medium discussed above in connection with FIG. 17. Machine-readable instructions comprise, for example, instructions and data that cause a processor, a computer and/or a machine having a processor (e.g., the example processor platform P100 discussed above in connection with FIG. 24) to perform one or more particular processes. Alternatively, some or all of the example machine-accessible instructions of FIGS. 28 and 29 may be implemented using any combination(s) of ASIC(s), PLD(s), FPLD(s), FPGA(s), discrete logic, hardware, firmware, etc. Also, some or all of the example processes of FIGS. 28 and 29 may be implemented manually or as any combination of any of the foregoing techniques, for example, any combination of firmware, software, discrete logic and/or hardware. Further, many other methods of implementing the example operations of FIGS. 28 and 29 may be employed. For example, the order of execution of the blocks may be changed, and/or one or more of the blocks described may be changed, eliminated, sub-divided, or combined. Additionally, any or all of the example machine-accessible instructions of FIGS. 28 and 29 may be carried out sequentially and/or carried out in parallel by, for example, separate processing threads, processors, devices, discrete logic, circuits, etc.

The example machine-accessible instructions of FIG. 28 begin when a user initiates and/or starts an application on the secondary content presentation device 150 that implements the example secondary content module 170 (block 2805). The secondary content module 170 starts and/or enables the decoder 310 (block 2810).

When the decoder 310 detects a valid code (e.g., a SID) 2812, the example fetcher 2505 determines whether the SID has changed and/or is different from a preceding SI (block 2815). If the SID has changed (block 2815), the fetcher 2505 fetches a new secondary content schedule from the secondary content server 175 (block 2820), stores the received schedule in the schedule database 2510 (block 2825), and sets the program clock 2515 to correspond to the timestamp t(n) detected by the decoder 310 (block 2830).

Returning to block 2815, if the SID has not changed (block 2815), the fetcher 2505 determines whether the current timestamp t(n) falls within the time interval defined and/or encompassed by the secondary content schedule stored in the schedule database 2510 (block 2835). If the current timestamp t(n) is falls within the secondary content schedule (block 2835), the selector 2520 determines whether the timestamp t(n) corresponds to an offer (e.g., secondary content) in the schedule (block 2840). If the timestamp t(n) corresponds to a secondary content offer in the schedule (block 2840), the selector 2520 obtains the corresponding secondary content from the schedule 2510, and displays the corresponding secondary content via the user interface module 325 (block 2845).

The example selector 2520 compares time values generated by the program clock 2515 to the begin times 2628 (FIG. 26) and the end times 2630 in the schedule database 2510 to determine whether it is time to display any secondary content offers (block 2850). If it is time to one or more display secondary content offers (block 2850), the selector 2520 obtains the secondary content offer(s) from the schedule 2510 and displays the secondary content offer(s) via the user interface module 325 (block 2845).

If the user indicates via the user interface module 325 that an offer and/or secondary content is to be archived, and/or an offer is to be automatically archived (e.g., based on archive settings) (block 2855), the archiver 2525 stores the secondary content offer(s) and/or secondary content in the archive 2530 (block 2860).

If the user indicates via the user interface module 325 that an secondary content offer and/or secondary content is to be retrieved (e.g., by providing search query criteria), the archiver 2525 retrieves the secondary content offer and/or secondary content from the archive 2530 (block 2865), and the selector 2520 displays the retrieved secondary content via the user interface module 325 (block 2845).

If the user indicates via the user interface module 325 that the archive 2530 is to be edited and/or modified (e.g., items removed), the archiver 2525 makes corresponding changes to the archive 2530 (block 2870).

Portions of the example machine-accessible instructions of FIG. 29 are identical to those of FIG. 28. Identical portions of FIGS. 28 and 29 are identified with identical reference numerals, and descriptions of the identical portions is not repeated here. Instead, the reader is referred to the descriptions of the identical portions presented above in connection with FIG. 28. Compared to FIG. 28, the decoding of timestamps t(n) is not continually performed in the example machine-accessible instructions of FIG. 29.

At block 2815 (FIG. 29), if the SID has not changed (block 2815), the secondary content module 170 activates timestamp decoding (block 2905). If a valid timestamp t(n) 2910 is decoded, the fetcher 2505 determines whether the timestamp t(n) falls within the time interval defined and/or encompassed by the secondary content schedule stored in the schedule database 2510 (block 2915). If the timestamp t(n) falls within the schedule (block 2915), the program timer 2510 determines whether the timestamp t(n) matches an output of the program timer 2510 (block 2920). If the timestamp t(n) does not substantially correspond to the output of the program timer 2510 (block 2920), the program timer 2510 is reset to match the timestamp t(n) (block 2925).

Returning to block 2915, if the timestamp t(n) does not fall within the secondary content schedule (block 2915), the fetcher 2505 fetches a new secondary content schedule (block 2820).

Aperiodically and/or periodically, the fetcher 2505 determines whether it is time to synchronize schedules (block 2930). If it is time to synchronize schedules (block 2930), control proceeds to block 2905 to decode another timestamp t(n).

Figure 30:
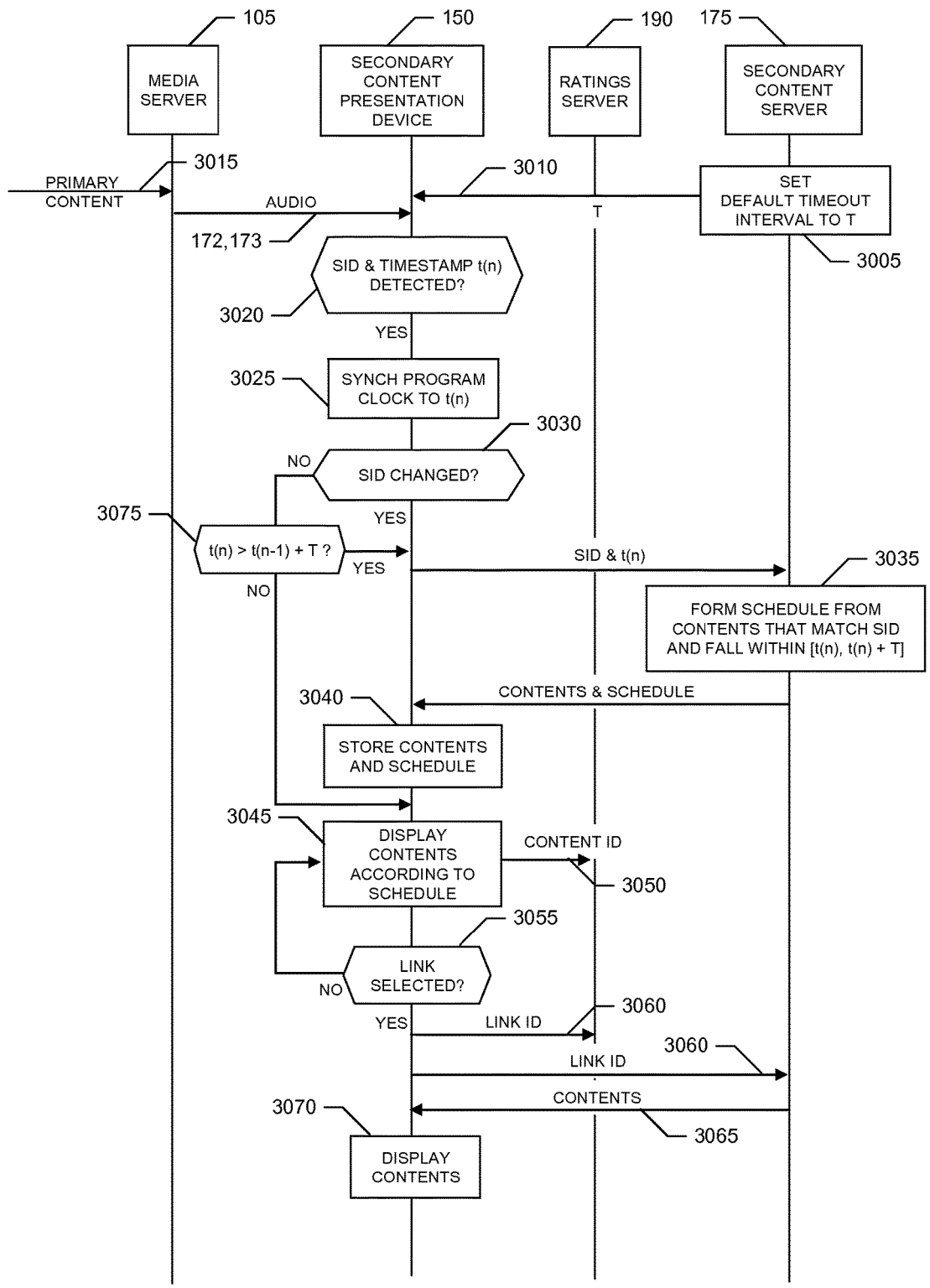
FIGS. 30 and 31 illustrate example schedule-based secondary content delivery scenarios that may be implemented by the example content delivery system of FIG. 1.
Figure 31:
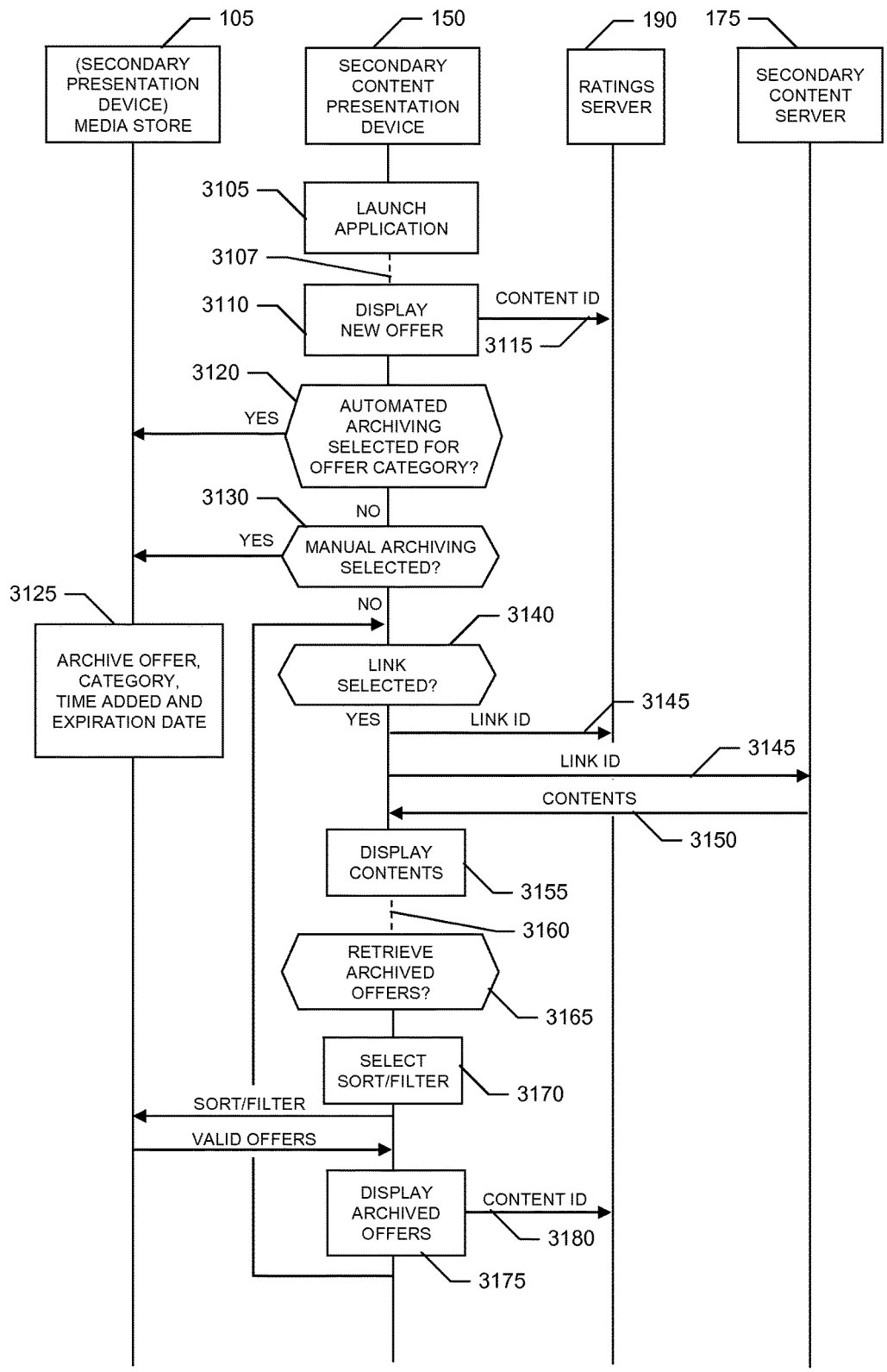

FIGS. 30 and 31 illustrates example schedule-based secondary content delivery scenarios that may be carried out by the example delivery system 100 of FIG. 1. While the examples illustrated in FIGS. 30 and 31 are depicted in a serial fashion, as discussed above in connection with FIG. 17, the activities of detecting codes, detecting timestamps t(n), obtaining secondary content, obtaining links to secondary content, obtaining secondary content schedules, displaying secondary content links, displaying secondary content offers, and displaying secondary content can occur substantially in parallel. Moreover, secondary content may be presented without providing and/or presenting an intervening link and/or offer to that content. In some examples, variations of the example scenarios of FIGS. 30 and 31 similar to those discussed above in connection with FIGS. 7-11 are implemented.

The example secondary content delivery scenario of FIG. 30 begins with the example secondary content server 175 setting and/or selecting a default timeout interval T (block 3005), and sending a value 3010 representative of the timeout T to the secondary content presentation device 150.

The example media server 105 receives primary media content 3015 via the example broadcast input interface 205. The example media server 105 and/or the example primary content presentation device 110 emits and/or outputs the free-field radiating audio signal 172, 173 associated with the primary media content 3015 via, for example, one or more speakers.

When the example decoder 310 of the secondary content presentation device 150 detects a SID in the audio 172, 173 (block 3020), the program clock 2515 synchronizes its output to the timestamp t(n) (block 3025). If the SID has changed (block 3030), the fetcher 2505 sends the SID and timestamp t(n) to the secondary content server 175. The secondary content server 175 forms a schedule of secondary content based on the SID and timestamp t(n) (block 3035), and sends the secondary content schedule to the fetcher 2505. The fetcher 2505 stores the secondary content schedule received from the secondary content server 175 in the schedule database 2510 (block 3040).

The example selector 2520 displays secondary content offers according to the received secondary content schedule using, for example, the example user interface of FIG. 4 (block 3045). As secondary content offers are displayed, the selector 2520 sends corresponding content IDs 3050 to the ratings server 190. If any displayed link and/or offer is selected and/or activated by a user (block 3055), a corresponding link ID 3060 is sent to the ratings server 190 and the secondary content server 175. In response to the link ID 3060, the secondary content server 175 provides to the secondary content presentation device 150 secondary content 3065 associated with the link ID 3060. The secondary content presentation device 150 displays the received secondary content 3065 (block 3070). If the collection of audience measurement data is not desired, the interactions with the ratings server 190 may be omitted in the illustrated example of FIG. 30.

Returning to block 3030, if the SID has not changed (block 3030), the fetcher 2505 determines whether the new timestamp t(n) is greater than a sum of the previous timestamp t(n−1) and the timeout interval T (block 3075). If the new timestamp t(n) is greater than the sum (block 3075), the fetcher 2505 sends the SID and timestamp t(n) to the secondary content server 175 to request an updated secondary content schedule. If the new timestamp t(n) is not greater than the sum (block 3075), control proceeds to block 3045 to select and display secondary content.

FIG. 31 displays additional scenarios that may be carried out to select and display secondary content. The additional scenarios of FIG. 31 may be implemented in addition to and/or instead of the process of selecting and displaying secondary content illustrated in FIG. 30. The example operations of FIG. 31 occur subsequent to launch, startup and/or initiation of an application that implements the example secondary content module 170 (block 3105).

At some subsequent time (depicted by a dashed line 3107), and after a secondary content schedule has been received using, for example, the example process of FIG. 30 up to and including block 3040, the example selector 2520 displays a secondary content offer (block 3110) and sends a content ID 3115 corresponding to the offer to the rating server 190.

If automatic archiving is enabled for the category of offers including the displayed offer (block 3120), the archiver 2525 archives the offer in the archive 2530 (block 3125). If automatic archiving is not applicable (block 3120), but the user has indicated that the offer is to be archived (block 3130), the archiver 2525 archives the offer in the archive 2530 (block 3125).

If any displayed link and/or secondary content offer is selected and/or activated by a user (block 3140), a corresponding link ID 3145 is sent to the ratings server 190 and the secondary content server 175. In response to the link ID 3145, the secondary content server 175 provides to the secondary content presentation device 150 secondary content 3150 associated with the link ID 3060. The secondary content presentation device 150 displays the received secondary content 3150 (block 3155).

If at some subsequent time (depicted by a dashed line 3160), the user desires to retrieve one or more archived secondary content offers (block 3165), the archiver 2525 retrieves and/or sorts offers corresponding to one or more criteria provided by the user (block 3170). The example selector 2520 displays the retrieved and/or sorted secondary content offers (block 3175) and sends a content ID 3180 corresponding to the offer to the rating server 190. If the collection of audience measurement data is not desired, the interactions with the ratings server 190 may be omitted in the illustrated example of FIG. 31.

Figure 32:
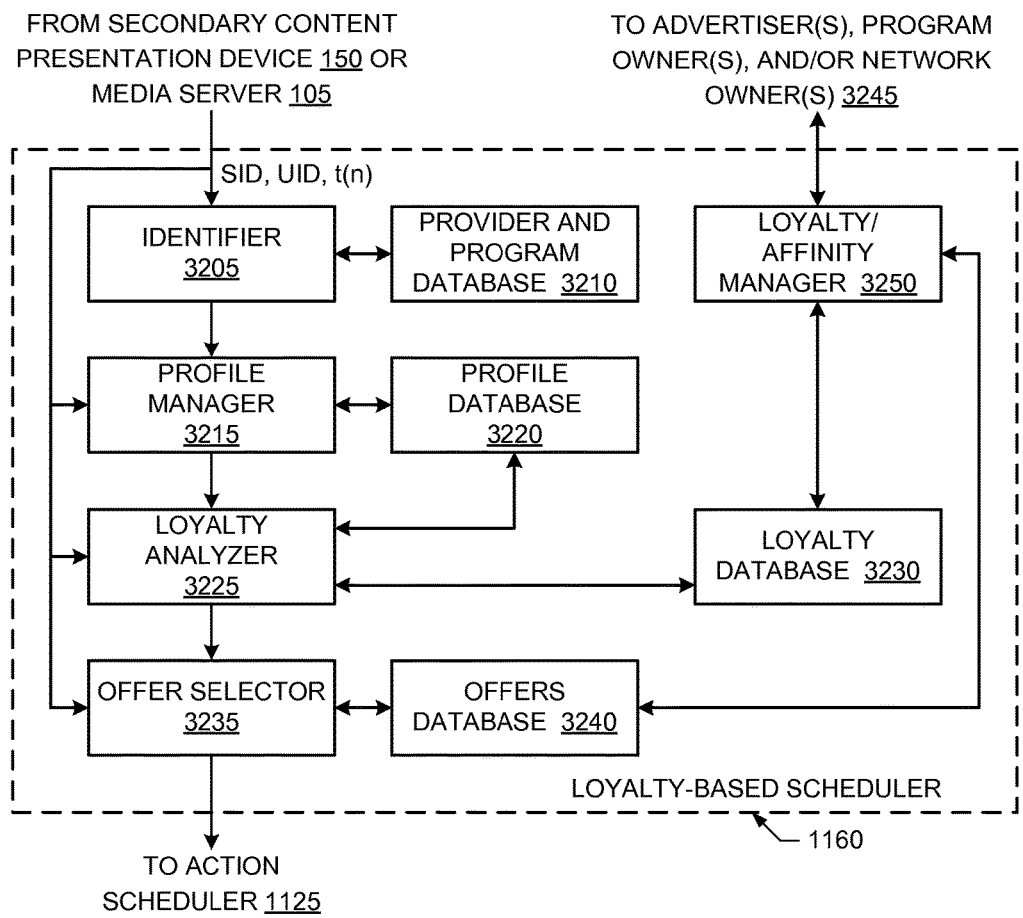
FIG. 32 illustrates an example manner of implementing the example loyalty-based scheduler of FIG. 11.

FIG. 32 illustrates an example manner of implementing the example loyalty-based scheduler 1160 of FIG. 11. To identify primary media content, the example loyalty-based scheduler 1160 of FIG. 32 includes an identifier 3205. Based on a SID and timestamp t(n) received from the media server 105 and/or the secondary content presentation device 150, the example identifier 3205 queries a content provider and program database 3210 to identify the corresponding primary media content.

To create user profiles, the example loyalty-based scheduler 1160 of FIG. 32 includes a profile manager 3215. As primary media content is identified by the example identifier 3205, the example profile manager 3215 updates a user profile corresponding to a user ID (UID) received with the SID and timestamp t(n). The user profile represents and/or stores which primary media content has been at least partially consumed by the user associated with the UID. The example profile manager 3215 stores and/or maintains the user profile in a profile database 3220.

Figures 33, 34, 35:
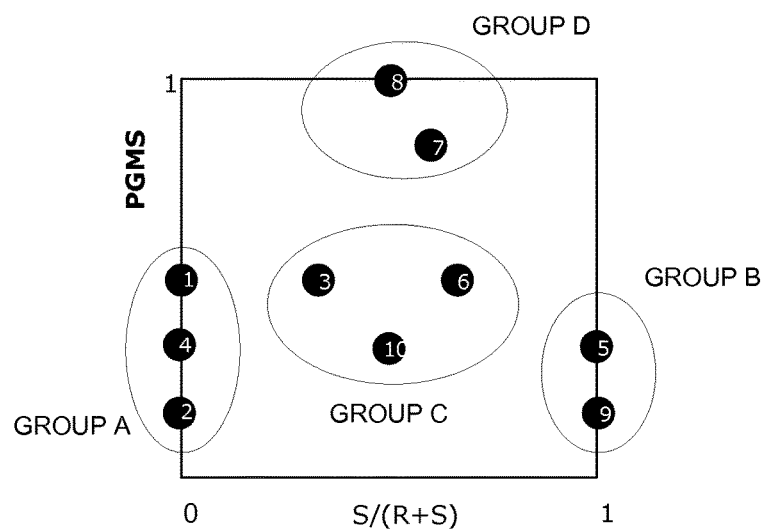
FIG. 33 illustrates an example data structure that may be used to tabulate programs viewed by different persons.
FIGS. 34 and 35 illustrate an example process to define affinity groups.

An example data structure that may be used to implement the example profile database 3220 is illustrated in FIG. 33. The example data structure of FIG. 33 is a table that records which of a plurality of primary media content 3305 have been consumed by each of a plurality of users 3310.

Returning to FIG. 32, to develop user loyalty and/or user affinity group metrics, the example loyalty-based scheduler 1160 of FIG. 32 includes a loyalty analyzer 3225. The example loyalty analyzer 3225 of FIG. 32 analyzes a user's behavior to determine their level of loyalty to particular primary media content and/or content providers 130. Additionally or alternatively, the loyalty analyzer 3225 analyzes a group of user's behavior to determine and/or identify affinity groups, and to identify each group's likelihood of consuming particular primary media content, and/or responding to and/or consuming particular secondary media content.

For a given loyalty metric (e.g., number of episodes of a TV show that were watched during a period of time), the example loyalty analyzer 3225 segments the users of the secondary content server 175 into, for example, three groups of equal size. An example group represents the users who are most loyal and, thus, may be presented additional and/or special secondary content offers. In some examples, a user is only credited with consuming primary media content when a certain percentage of the primary media content has been consumed (e.g., watched and/or listened to). In some examples, loyalty groups are defined in a loyalty database 3230 and the loyalty analyzer 3225 compares a user's profile with the defined loyalty groups to determine their level of loyalty.

In some examples, affinity groups (e.g., those who watch sports a lot, those who tend to watch a lot of movies, those who watch primarily during the day, etc.) can be identified and/or defined manually. Additionally or alternatively, data mining techniques can be applied to the user profiles stored in the profile database 3220 to automatically define affinity groups.

An example process that may be carried out to perform data mining to define affinity groups can be illustrated with reference to the example user profiles of FIG. 33. In the example of FIG. 33 there are three reality programs R1, R2 and R3, and three sports programs S1, S2 and S3. As shown, different users may watch different combinations of these six programs.

The example loyalty analyzer 3225 performs dimensional analysis to develop indicators of a user's volume of media consumption, and their propensity and/or affinity to watch one type of program versus other types of programs. As shown in FIG. 34, the volume of a user's media consumption can be expressed as a ratio PGMS of the number of shows consumed by the user and the total number of possible shows. In the example of FIG. 33, the propensity of the user to watch sports rather than reality shows can be expressed by the ratio S/(R+S), where S is the number of sports programs watched by the user and R is the number of reality programs watched by the user. For example, user #1 watched all three of the reality programs and none of sports programs, resulting in S/(R+S)=0/3 and PGMS=3/6.

The media consumption volume ratios PGMS and propensity ratios S/(R+S) can be used to identify and/or define clusters and/or affinity groups of users, as illustrated in FIG. 35. As shown in FIG. 35, the ten users are clustered into four example groups: Group A—watch reality program exclusively, Group B—watch sports exclusively, Group C—watch a variety of programs in limited quantity, and Group D—watch a variety of programs in large quantity.

While the example process of defining groups described and illustrated in connection with FIGS. 33-35 has been simplified for ease of discussion, it should be apparent to those of ordinary skill in the art that the described example methods are readily extendible to include any number of users and/or any number of dimensions. It should also be apparent that affinity group clusters may change over time. Moreover, the affinity group(s) to which users belong may change over time. In some examples, to minimize disruptions to advertisers due to affinity group changes, the example loyalty analyzer 3225 may apply one or more filters to smooth the data used to define affinity groups, and/or to restrict how quickly affinity groups can change.

Returning to FIG. 32, loyalty and/or affinity group analysis may be performed and/or updated each time a SID, UID and timestamp t(n) is received. Additionally or alternatively, it may run "offline" on a periodic or aperiodic basis to reduce computing time, to take advantage of additional user profile information, and/or to reduce how long it takes the loyalty-based scheduler 1160 to identify loyalty and/or affinity based offers in response to a received SID, UID and t(n) combination.

To select secondary content offers for the received SID, UID and timestamp t(n) combination, the example loyalty-based scheduler 1160 of FIG. 32 includes an offer selector 3235. Based on the loyalty level(s) and/or affinity group membership(s) identified by the loyalty analyzer 3225, the example offer selector 3235 queries an offer database 3240 to select one or more secondary content offers. The secondary content offers selected by the offer selector 3235 may be in addition to or instead of those selected by the action server 1140 based only on the UID and timestamp t(n).

To allow any number and/or type(s) of advertiser(s), program owner(s), content creator(s) and/or content provider(s) 3245 to define, specify and/or provide secondary content offers for particular loyalty and/or affinity groups, the example loyalty-based scheduler 1160 includes a loyalty/affinity manager 3250. The example loyalty/affinity manager 3250 implements any number and/or type(s) of API(s) and/or web-based interface(s) that allow the advertiser(s), program owner(s), content creator(s) and/or content provider(s) 3245 to interact with the database 3230 and 3240 to add, create, modify, remove and/or specify loyalty and/or affinity based secondary content offers.

The example databases 3210, 3220, 3230 and 3240 of FIG. 32 may be implemented using any number and/or type(s) of tangible article of manufacture such as a tangible computer-readable media including, but not limited to, volatile and/or non-volatile memory(-ies) and/or memory device(s).

While an example manner of implementing the example loyalty-based scheduler 1160 of FIG. 11 has been illustrated in FIG. 32, one or more of the interfaces, data structures, elements, processes and/or devices illustrated in FIG. 32 may be combined, divided, re-arranged, omitted, eliminated and/or implemented in any other way. Further, the example identifier 3205, the example provider and program database 3210, the example profile manager 3215, the example profile database 3220, the example loyalty analyzer 3225, the example loyalty database 3230, the example offer selector 3235, the example offers database 3240, the example loyalty/affinity manager 3250 and/or, more generally, the example loyalty-based scheduler 1160 of FIG. 32 may be implemented by hardware, software, firmware and/or any combination of hardware, software and/or firmware. Thus, for example, any of the example identifier 3205, the example provider and program database 3210, the example profile manager 3215, the example profile database 3220, the example loyalty analyzer 3225, the example loyalty database 3230, the example offer selector 3235, the example offers database 3240, the example loyalty/affinity manager 3250 and/or, more generally, the example loyalty-based scheduler 1160 may be implemented by one or more circuit(s), programmable processor(s), ASIC(s), PLD(s), FPLD(s), and/or FPGA(s), etc. When any apparatus claim of this patent incorporating one or more of these elements is read to cover a purely software and/or firmware implementation, at least one of the example identifier 3205, the example provider and program database 3210, the example profile manager 3215, the example profile database 3220, the example loyalty analyzer 3225, the example loyalty database 3230, the example offer selector 3235, the example offers database 3240, the example loyalty/affinity manager 3250 and/or, more generally, the example loyalty-based scheduler 1160 are hereby expressly defined to include a tangible article of manufacture such as a tangible computer-readable medium such as those described above in connection with FIG. 17 storing the firmware and/or software. Further still, the example loyalty-based scheduler 1160 may include interfaces, data structures, elements, processes and/or devices instead of, or in addition to, those illustrated in FIG. 32 and/or may include more than one of any or all of the illustrated interfaces, data structures, elements, processes and/or devices.

Figure 36:
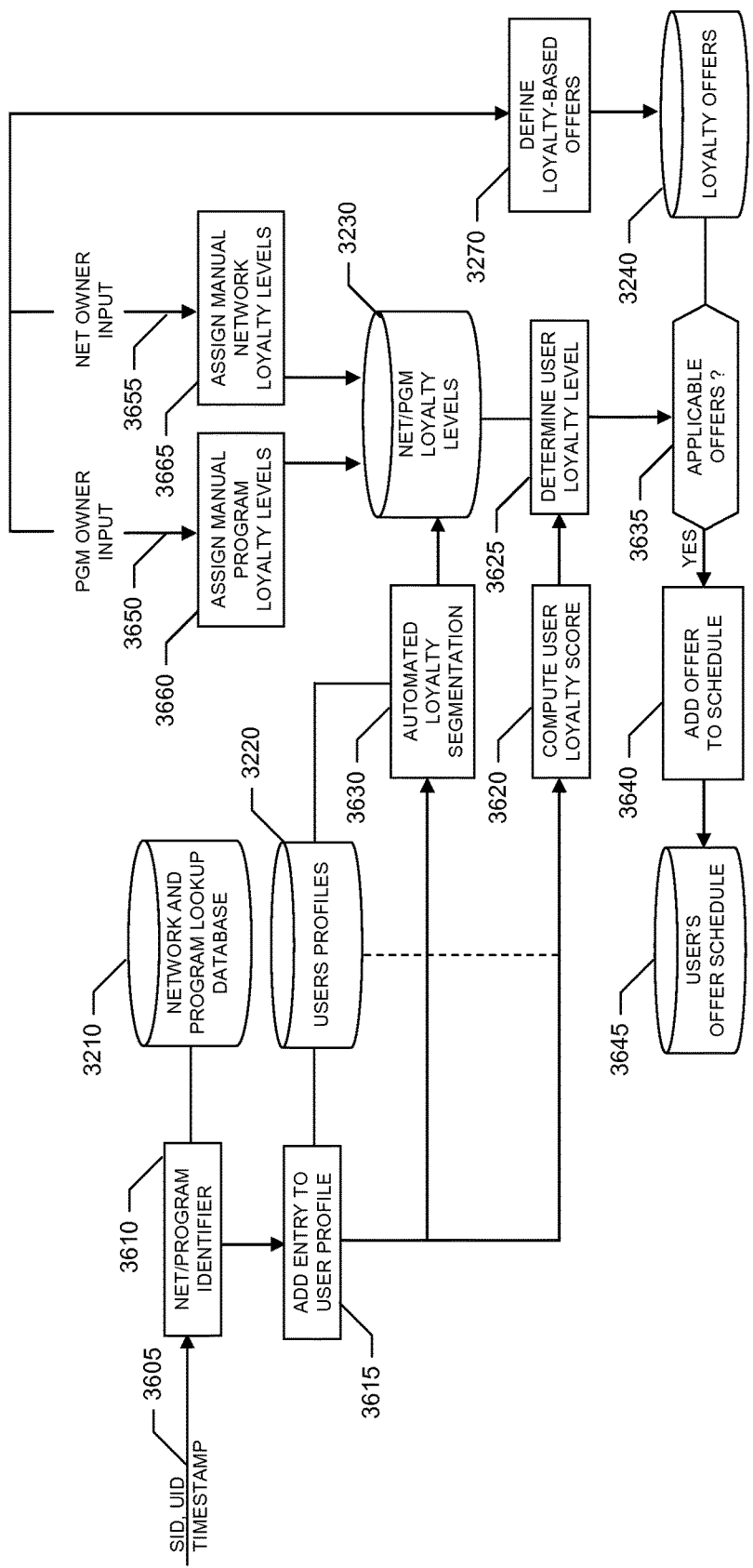
FIGS. 36 and 37 illustrate example machine-accessible instructions that may be executed by, for example, a processor, to implement the example loyalty-based scheduler of FIGS. 11 and 32.
Figure 37:
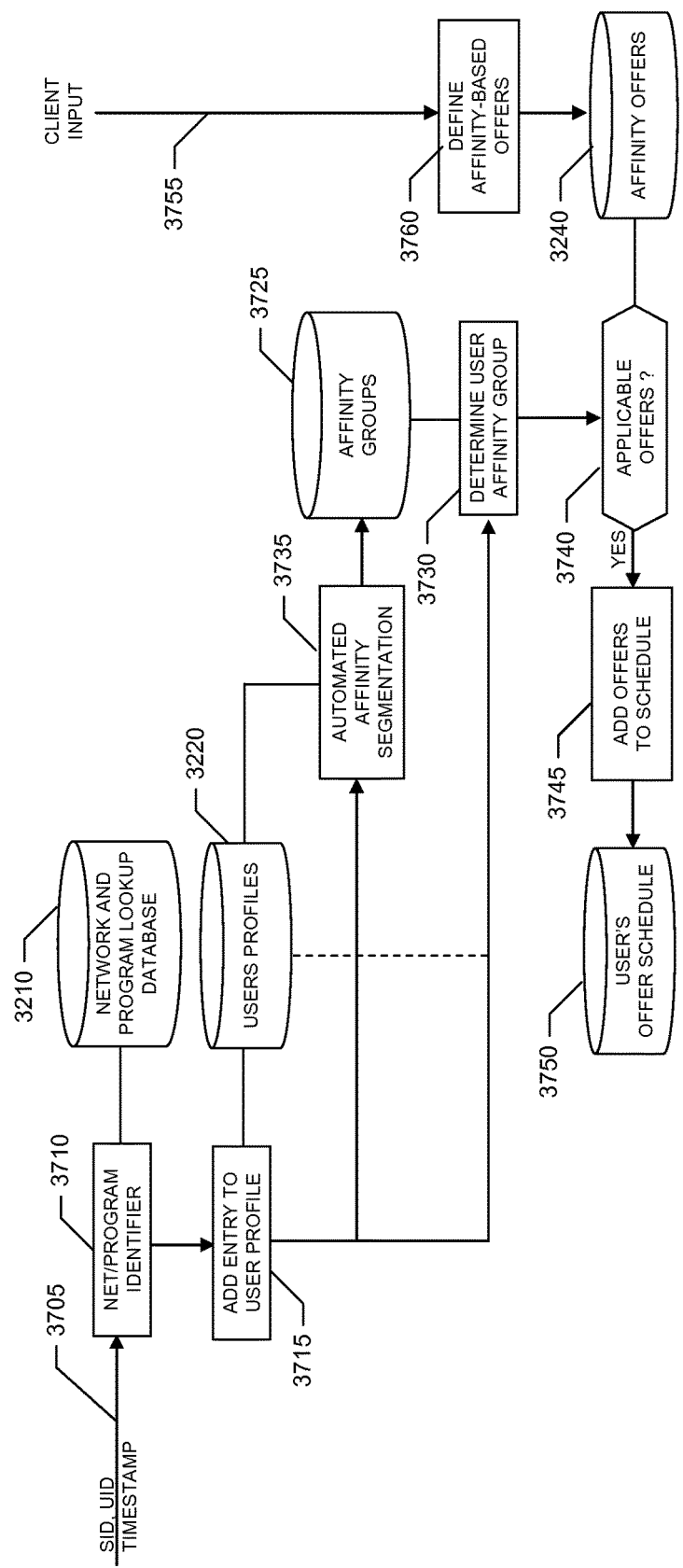

FIGS. 36 and 37 illustrate example machine-accessible instructions that may be executed to implement the example loyalty-based scheduler 1160 of FIGS. 11 and 32. A processor, a controller and/or any other suitable processing device may be used and/or programmed to execute the example machine-accessible instructions of FIGS. 36 and 37. For example, the machine-accessible instructions of FIGS. 36 and 37 may be embodied in coded instructions stored on any combination of tangible article of manufacture such as a tangible computer-readable medium discussed above in connection with FIG. 17. Machine-readable instructions comprise, for example, instructions and data that cause a processor, a computer and/or a machine having a processor (e.g., the example processor platform P100 discussed above in connection with FIG. 24) to perform one or more particular processes. Alternatively, some or all of the example machine-accessible instructions of FIGS. 36 and 37 may be implemented using any combination(s) of ASIC(s), PLD(s), FPLD(s), FPGA(s), discrete logic, hardware, firmware, etc. Also, some or all of the example processes of FIGS. 36 and 37 may be implemented manually or as any combination of any of the foregoing techniques, for example, any combination of firmware, software, discrete logic and/or hardware. Further, many other methods of implementing the example operations of FIGS. 36 and 37 may be employed. For example, the order of execution of the blocks may be changed, and/or one or more of the blocks described may be changed, eliminated, sub-divided, or combined. Additionally, any or all of the example machine-accessible instructions of FIGS. 36 and 37 may be carried out sequentially and/or carried out in parallel by, for example, separate processing threads, processors, devices, discrete logic, circuits, etc.

The example machine-accessible instructions of FIG. 36 begin when a SID, UID and timestamp t(n) 3605 are received. The example identifier 3205 identifies the primary media content corresponding to the received SID and timestamp t(n) 3605 (block 3610). The example profile manager 3215 updates the user profile associated with the received UID 3605 in the profile database 3220 (block 3615).

The loyalty analyzer 3225 computes and/or determines the user's loyalty score (e.g., number of times they have watched an episode of a TV show) (block 3620) and computes and/or determines the user's loyalty level based on the loyalty score (block 3625). In some examples, the loyalty analyzer 3225 automatically segments the user profiles into loyalty levels (block 3630).

Based on the loyalty score determined by the loyalty analyzer 3225 (block 3625), the offer selector 3235 queries the offers database 3240 to determine whether there are any applicable loyalty-based secondary content offers (block 3635). If there is an applicable loyalty-based secondary content offer (block 3635), the offer selector 3235 adds the identified offer(s) to the user's schedule 3645 (block 3640).

If a primary content owner and/or a content provider provide loyalty input(s) 3650 and 3655, respectively, the loyalty/affinity manager 3250 updates the loyalty database 3230 (blocks 3660 and 3665, respectively). If the primary content owner and/or the content provider provide loyalty-based offer(s) 3650 and 3655, respectively, the loyalty/affinity manager 3250 updates the offer database 3240 (blocks 3670).

The example machine-accessible instructions of FIG. 37 begin when a SID, UID and timestamp t(n) 3705 are received. The example identifier 3205 identifies the primary media content corresponding to the received SID and timestamp t(n) 3705 (block 3710). The example profile manager 3215 updates the user profile associated with the received UID 3705 in the profile database 3220 (block 3715).

The example loyalty analyzer 3225 compares the user's profile to one or more affinity groups 3725 to determine whether the user belongs to any affinity groups (block 3730). The loyalty analyzer 3225 periodically or aperiodically analyzes the user profiles stored in the profile database 3220 to define the one or more affinity groups 3725 (block 3735).

Based on the affinity group determination by the loyalty analyzer 3225 (block 3730), the offer selector 3235 queries the offers database 3240 to determine whether there are any applicable affinity group based secondary content offers (block 3740). If there is an applicable affinity-based secondary content offer (block 3740), the offer selector 3235 adds the identified offer(s) to the user's schedule 3750 (block 3745).

If a user provides an affinity group based offer 3755, the loyalty/affinity manager 3250 updates the offers database 3240 (block 3760).

Figure 38:
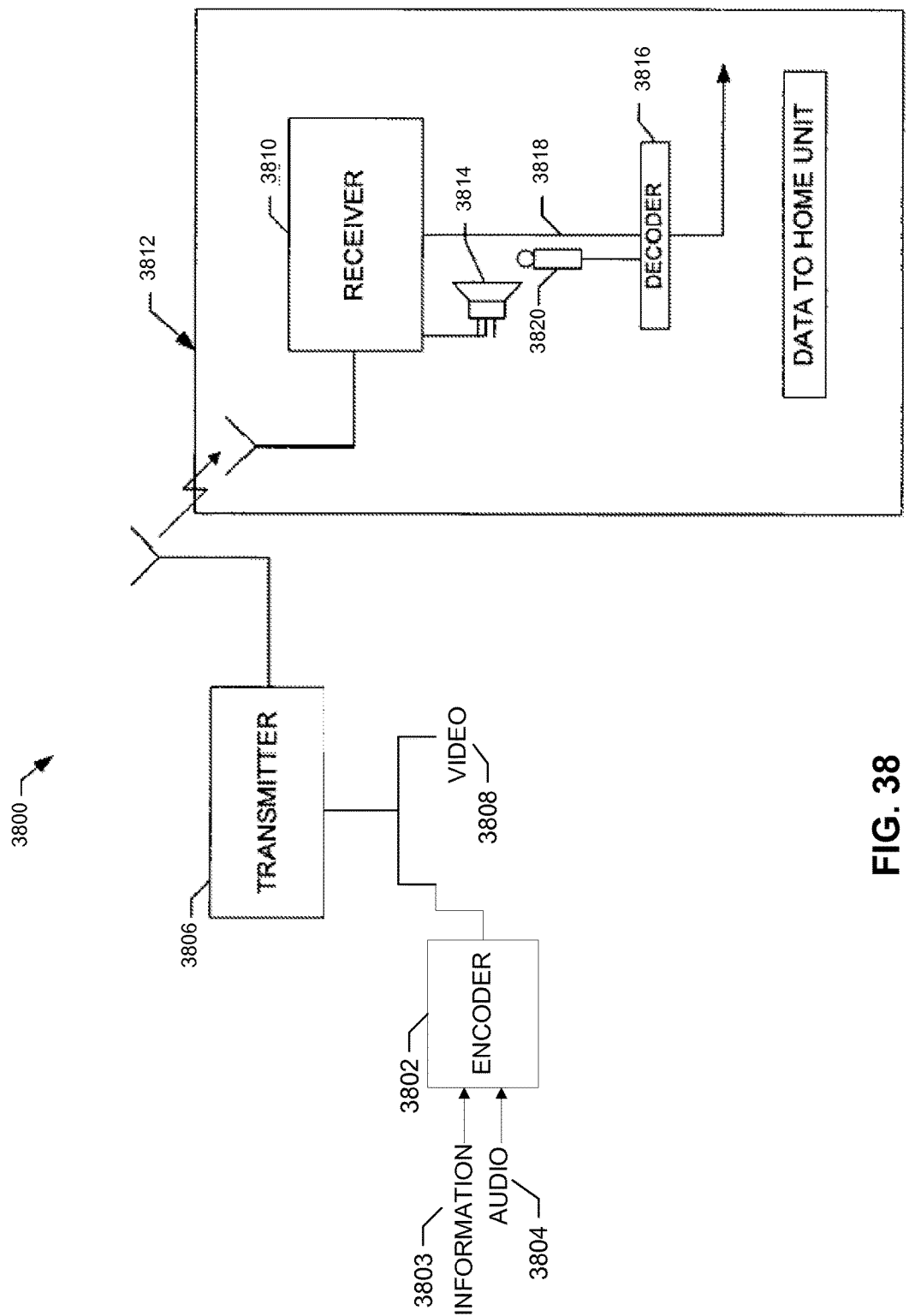
FIG. 38 is a schematic depiction of a broadcast audience measurement system employing a program identifying code added to the audio portion of a composite television signal.

An example encoding and decoding system 3800 is shown in FIG. 38. The example system 3800 may be, for example, a television audience measurement system, which will serve as a context for further description of the encoding and decoding processes described herein. The example system 3800 includes an encoder 3802 that adds a code or information 3803 to an audio signal 3804 to produce an encoded audio signal. The information 3803 may be any selected information. For example, in a media monitoring context, the information 3803 may be representative of and/or identify a broadcast media program such as a television broadcast, a radio broadcast, or the like. Additionally, the information 3803 may include timing information indicative of a time at which the information 3803 was inserted into audio or a media broadcast time. Alternatively, the code may include control information that is used to control the behavior of one or more target devices. Furthermore, information 3803 from more than one source may be multiplexed and encoded into the audio 3804. For example, information 3803 provided by a TV network facility may be interleaved with information 3803 from, for example, a local station. In some examples, TV network facility information 3803 is encoded into each third message slot of the encoded audio. Moreover, the audio 3804 may be received with the TV network facility information 3803 already encoded, and a subsequent encoder 3802 can encode additional information 3803 using a remaining message slot (if any) of each 3 message slot interval. It should be understood that the example encoder 3802 of FIGS. 38 and 39 may be used to implement the example content provider(s) 135 of FIG. 1 and/or the example action encoder 1150 of FIG. 11.

The audio signal 3804 may be any form of audio including, for example, voice, music, noise, commercial advertisement audio, audio associated with a television program, live performance, etc. In the example of FIG. 38, the encoder 3802 passes the encoded audio signal to a transmitter 3806. The transmitter 3806 transmits the encoded audio signal along with any video signal 3808 associated with the encoded audio signal. While, in some instances, the encoded audio signal may have an associated video signal 3808, the encoded audio signal need not have any associated video.

Some example audio signals 3804 are a digitized version of an analog audio signal, wherein the analog audio signal has been sampled at 48 kHz. As described below in detail, two seconds of audio, which correspond to 96,000 audio samples at the 48 kHz sampling rate, may be used to carry one message, which may be a synchronization message and 49 bits of information. Using an encoding scheme of 7 bits per symbol, the message requires transmission of eight symbols of information. Alternatively, in the context of overwriting described below, one synchronization symbol is used and one information symbol conveying one of 128 states follows the synchronization symbol. As described below in detail, according to one example, one 7-bit symbol of information is embedded in a long block of audio samples, which corresponds to 9216 samples. Some such long blocks include 36 overlapping short blocks of 256 samples, wherein in a 50% overlapping block 256 of the samples are old and 256 samples are new.

Although the transmit side of the example system 3800 shown in FIG. 38 shows a single transmitter 3806, the transmit side may be much more complex and may include multiple levels in a distribution chain through which the audio signal 3804 may be passed. For example, the audio signal 3804 may be generated at a national network level and passed to a local network level for local distribution. Accordingly, although the encoder 3802 is shown in the transmit lineup prior to the transmitter 3806, one or more encoders may be placed throughout the distribution chain of the audio signal 3804. Thus, the audio signal 3804 may be encoded at multiple levels and may include embedded codes associated with those multiple levels. Further details regarding encoding and example encoders are provided below.

The transmitter 3806 may include one or more of a radio frequency (RF) transmitter that may distribute the encoded audio signal through free space propagation (e.g., via terrestrial or satellite communication links) or a transmitter used to distribute the encoded audio signal through cable, fiber, etc. Some example transmitters 3806 are used to broadcast the encoded audio signal throughout a broad geographical area. In other examples, the transmitter 3806 may distribute the encoded audio signal through a limited geographical area. The transmission may include up-conversion of the encoded audio signal to radio frequencies to enable propagation of the same. Alternatively, the transmission may include distributing the encoded audio signal in the form of digital bits or packets of digital bits that may be transmitted over one or more networks, such as the Internet, wide area networks, or local area networks. Thus, the encoded audio signal may be carried by a carrier signal, by information packets or by any suitable technique to distribute the audio signals.

When the encoded audio signal is received by a receiver 3810, which, in the media monitoring context, may be located at a statistically selected metering site 3812, the audio signal portion of the received program signal is processed to recover the code, even though the presence of that code is imperceptible (or substantially imperceptible) to a listener when the encoded audio signal is presented by speakers 3814 of the receiver 3810. To this end, a decoder 3816 is connected either directly to an audio output 3818 available at the receiver 3810 or to a microphone 3820 placed in the vicinity of the speakers 3814 through which the audio is reproduced. The received audio signal can be either in a monaural or stereo format. Further details regarding decoding and example decoders are provided below. It should be understood that the example decoder 3816 and the example microphone 3820 of FIGS. 38 and 48 may be used to implement the example decoder 310 and the example audio input interface 305 of FIG. 3, respectively, and/or the example secondary content triggerer 180 of FIG. 1

Audio Encoding

Figure 39:
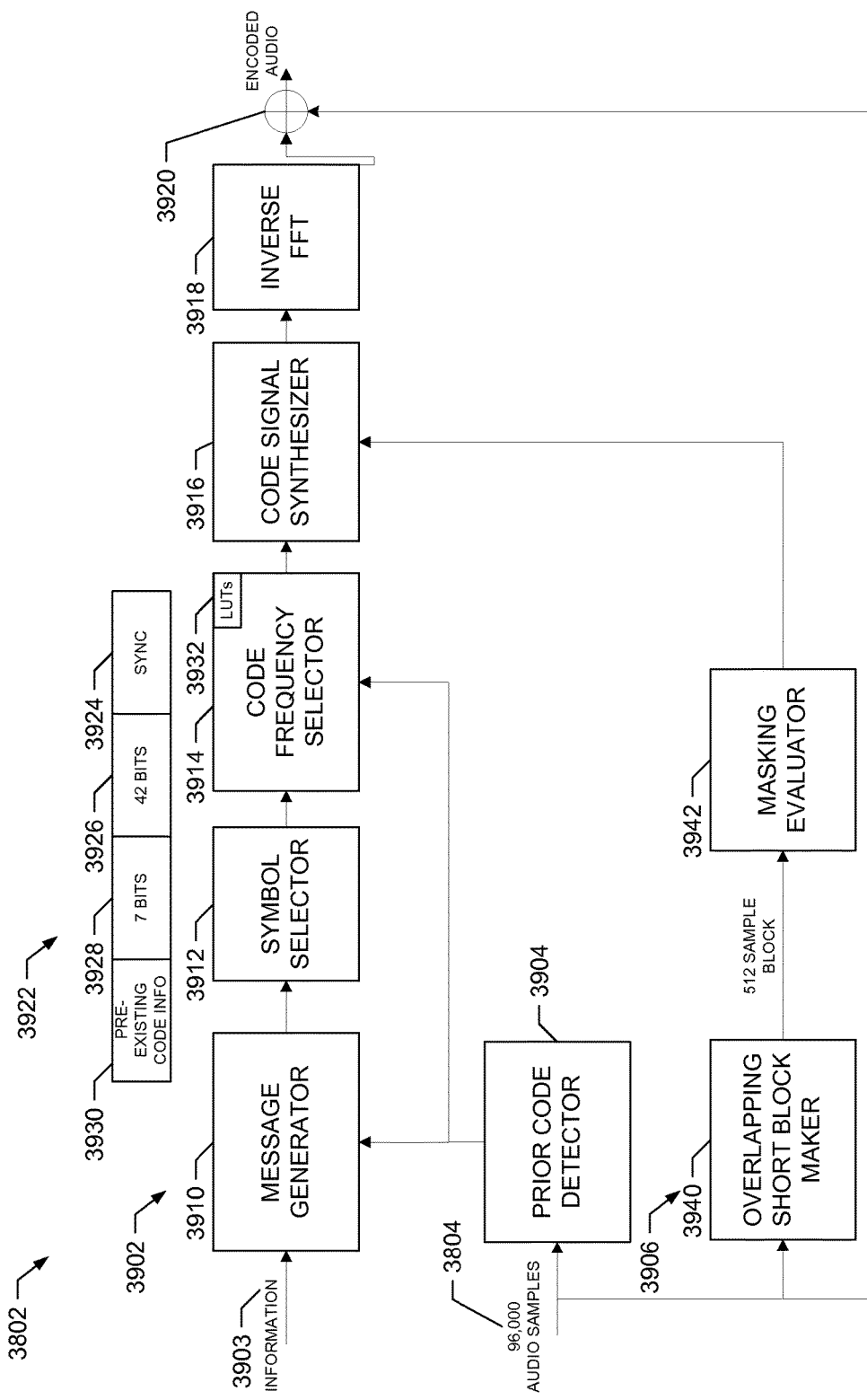
FIG. 39 illustrates an example manner of implementing the example encoder of FIG. 38.

As explained above, the encoder 3802 inserts one or more inaudible (or substantially inaudible) codes into the audio 3804 to create encoded audio. One example encoder 3802 is shown in FIG. 39. In one implementation, the example encoder 3802 of FIG. 39 may be implemented using, for example, a digital signal processor programmed with instructions to implement an encoding lineup 3902, the operation of which is affected by the operations of a prior code detector 3904 and a masking lineup 3906, either or both of which can be implemented using a digital signal processor programmed with instructions. Of course, any other implementation of the example encoder 3802 is possible. For example, the encoder 3802 may be implemented using one or more processors, programmable logic devices, or any suitable combination of hardware, software, and firmware.

In general, during operation, the encoder 3802 receives the audio 3804 and the prior code detector 3904 determines if the audio 3804 has been previously encoded with information, which will make it difficult for the encoder 3802 to encode additional information into the previously encoded audio. For example, a prior encoding may have been performed at a prior location in the audio distribution chain (e.g., at a national network level). The prior code detector 3904 informs the encoding lineup 3902 as to whether the audio has been previously encoded. The prior code detector 3904 may be implemented by a decoder as described herein.

The encoding lineup 3902 receives the information 3803 and produces code frequency signals based thereon and combines the code frequency signal with the audio 3804. The operation of the encoding lineup 3902 is influenced by the output of the prior code detector 3904. For example, if the audio 3804 has been previously encoded and the prior code detector 3904 informs the encoding lineup 3902 of this fact, the encoding lineup 3902 may select an alternate message that is to be encoded in the audio 3804 and may also alter the details by which the alternate message is encoded (e.g., different temporal location within the message, different frequencies used to represent symbols, etc.).

The encoding lineup 3902 is also influenced by the masking lineup 3906. In general, the masking lineup 3906 processes the audio 3804 corresponding to the point in time at which the encoding lineup 3902 wants to encode information and determines the amplitude at which the encoding should be performed. As described below, the masking lineup 3906 may output a signal to control code frequency signal amplitudes to keep the code frequency signal below the threshold of human perception.

As shown in the example of FIG. 39, the encoding lineup includes a message generator 3910, a symbol selector 3912, a code frequency selector 3914, a synthesizer 3916, an inverse Fourier transform 3918, and a combiner 3920. The message generator 3910 is responsive to the information 3803 and outputs messages having the format generally shown at reference numeral 3922. The information 3803 provided to the message generator may be the current time, a television or radio station identification, a program identification, etc. Some example message generators 3910 output a message every two seconds. Of course, other messaging intervals such as 1.6 seconds are possible.

Some example message formats 3922 representative of messages output from the message generator 3910 include a synchronization symbol 3924. The synchronization symbol 3924 is used by decoders, examples of which are described below, to obtain timing information indicative of the start of a message. Thus, when a decoder receives the synchronization symbol 3924, that decoder expects to see additional information following the synchronization symbol 3924.

In the example message format 3922 of FIG. 39, the synchronization symbol 3924, is followed by 42 bits of message information 3926. This information may include a binary representation of a station identifier and coarse timing information. Some example timing information represented in the 42 bits of message information 3926 change every 64 seconds, or 32 message intervals. Thus, the 42 bits of message information 3926 remain static for 64 seconds. The seven bits of message information 3928 may be high resolution time that increments every two seconds.

The message format 3922 also includes pre-existing code flag information 3930. However, the pre-existing code flag information 3930 is only selectively used to convey information. When the prior code detector 3904 informs the message generator 3910 that the audio 3804 has not been previously encoded, the pre-existing code flag information 3930 is not used. Accordingly, the message output by the message generator only includes the synchronization symbol 3924, the 42 bits of message information 3926, and the seven bits of message information 3928; the pre-existing code flag information 3930 is blank or filled by unused symbol indications. In contrast, when the prior code detector 3904 provides to the message generator 3910 an indication that the audio 3804 into which the message information is to be encoded has previously been encoded, the message generator 3910 will not output the synchronization symbol 3924, the 42 bits of message information 3926, or the seven bits of message information 3928. Rather, the message generator 3910 will utilize only the pre-existing code flag information 3930. Some example pre-existing code flags information include a pre-existing code flag synchronization symbol to signal that pre-existing code flag information is present. The pre-existing code flag synchronization symbol is different from the synchronization symbol 3924 and, therefore, can be used to signal the start of pre-existing code flag information. Upon receipt of the pre-existing code flag synchronization symbol, a decoder can ignore any prior-received information that aligned in time with a synchronization symbol 3924, 42 bits of message information 3926, or seven bits of message information 3928. To convey information, such as a channel indication, a distribution identification, or any other suitable information, a single pre-existing code flag information symbol follows the pre-existing code flag synchronization symbol. This pre-existing code flag information may be used to provide for proper crediting in an audience monitoring system.

The output from the message generator 3910 is passed to the symbol selector 3912, which selects representative symbols. When the synchronization symbol 3924 is output, the symbol selector may not need to perform any mapping because the synchronization symbol 3924 is already in symbol format. Alternatively, if bits of information are output from the message generator 3910, the symbol selector may use straight mapping, wherein, for example seven bits output from the message generator 3910 are mapped to a symbol having the decimal value of the seven bits. For example, if a value of 1010101 is output from the message generator 3910, the symbol selector may map those bits to the symbol 85. Of course other conversions between bits and symbols may be used. In certain examples, redundancy or error encoding may be used in the selection of symbols to represent bits. Additionally, any other suitable number of bits than seven may be selected to be converted into symbols. The number of bits used to select the symbol may be determined based on the maximum symbol space available in the communication system. For example, if the communication system can only transmit one of four symbols at a time, then only two bits from the message generator 3910 would be converted into symbols at a time.

Figure 57:
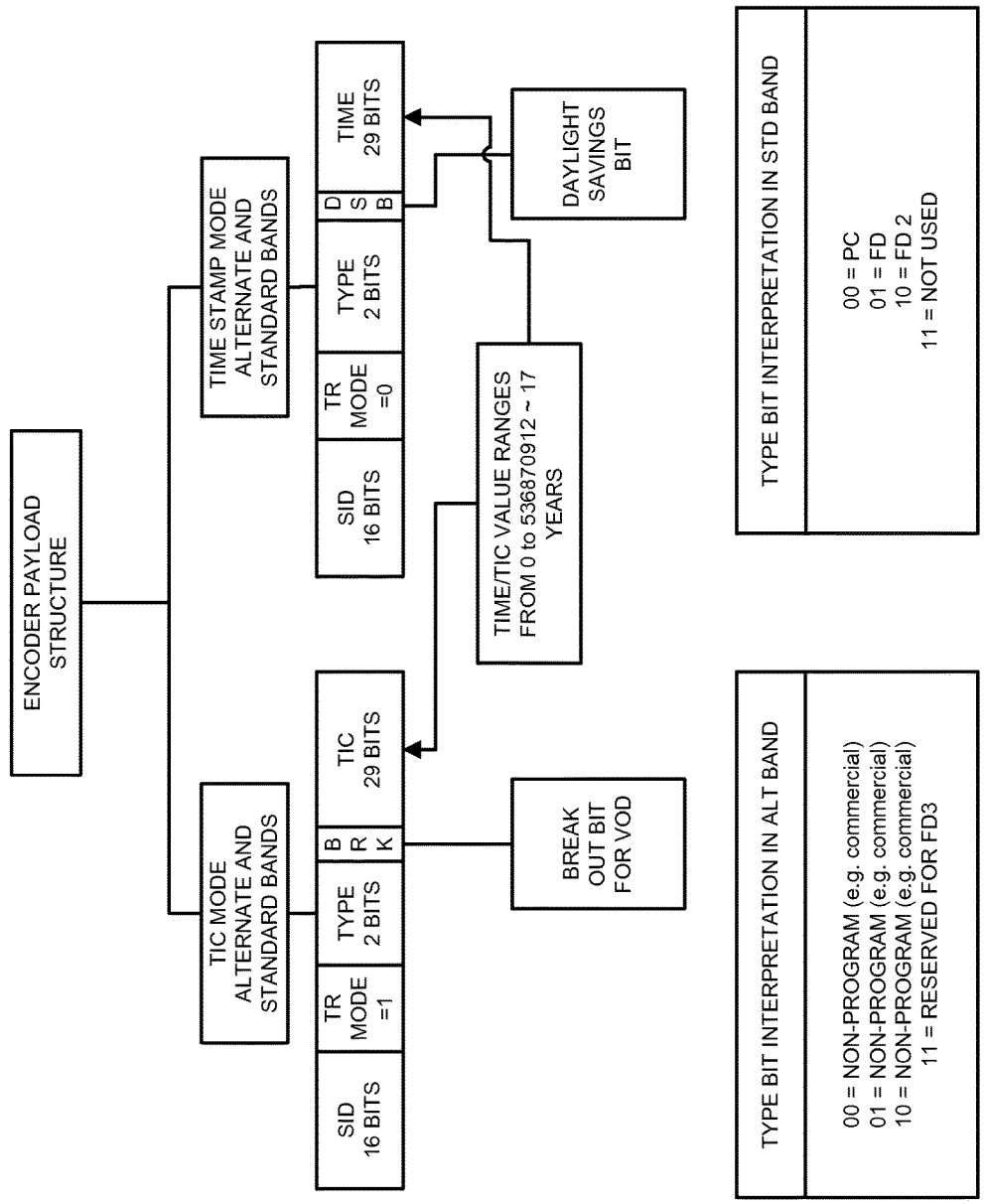
FIG. 57 illustrates an example message payload.

Another example message includes 8 long blocks followed by several null short blocks to pad the duration of the message to approximately 1.6 seconds. The first of the 8 long blocks represents the synchronization symbol followed by 7 long blocks representing, for example, the payload or message content depicted in FIG. 57. The example message format of FIG. 57 may be used to represent and/or encode 7*7=49 bits of data.

The symbols from the symbol selector 3912 are passed to the code frequency selector 3914 that selects code frequencies that are used to represent the symbol. The symbol selector 3912 may include one or more look up tables (LUTs) 3932 that may be used to map the symbols into code frequencies that represent the symbols. That is, a symbol is represented by a plurality of code frequencies that the encoder 3802 emphasizes in the audio to form encoded audio that is transmitted. Upon receipt of the encoded audio, a decoder detects the presence of the emphasized code frequencies and decodes the pattern of emphasized code frequencies into the transmitted symbol. Thus, the same LUT selected at the encoder 3910 for selecting the code frequencies needs to be used in the decoder. An example LUT is described in conjunction with FIGS. 40-42. Additionally, example techniques for generating LUTs are provided in conjunction with FIGS. 44-46.

The code frequency selector 3914 may select any number of different LUTs depending of various criteria. For example, a particular LUT or set of LUTs may be used by the code frequency selector 3914 in response to the prior receipt of a particular synchronization symbol. Additionally, if the prior code detector 3904 indicates that a message was previously encoded into the audio 3804, the code frequency selector 3914 may select a lookup table that is unique to pre-existing code situations to avoid confusion between frequencies used to previously encode the audio 3804 and the frequencies used to include the pre-existing code flag information.

An indication of the code frequencies that are selected to represent a particular symbol is provided to the synthesizer 3916. The synthesizer 3916 may store, for each short block constituting a long block, three complex Fourier coefficients representative of each of the possible code frequencies that the code frequency selector 3914 will indicate. These coefficients represent the transform of a windowed sinusoidal code frequency signal whose phase angle corresponds to the starting phase angle of code sinusoid in that short block.

While the foregoing describes an example code synthesizer 3908 that generates sine waves or data representing sine waves, other example implementations of code synthesizers are possible. For example, rather than generating sine waves, another example code synthesizer 3908 may output Fourier coefficients in the frequency domain that are used to adjust amplitudes of certain frequencies of audio provided to the combiner 3920. In this manner, the spectrum of the audio may be adjusted to include the requisite sine waves.

The three complex amplitude-adjusted Fourier coefficients corresponding to the symbol to be transmitted are provided from the synthesizer 3916 to the inverse Fourier transform 3918, which converts the coefficients into time-domain signals having the prescribed frequencies and amplitudes to allow their insertion into the audio to convey the desired symbols are coupled to the combiner 3920. The combiner 3920 also receives the audio. In particular, the combiner 3920 inserts the signals from the inverse Fourier transform 3918 into one long block of audio samples. As described above, for a given sampling rate of 48 kHz, a long block is 9216 audio samples. In the provided example, the synchronization symbol and 49 bits of information require a total of eight long blocks. Because each long block is 9216 audio samples, only 73,728 samples of audio 3804 are needed to encode a given message. However, because messages begin every two seconds, which is every 96,000 audio samples, there will be many samples at the end of the 96,000 audio samples that are not encoded. The combining can be done in the digital domain, or in the analog domain.

However, in the case of a pre-existing code flag, the pre-existing code flag is inserted into the audio 3804 after the last symbol representing the previously inserted seven bits of message information. Accordingly, insertion of the pre-existing code flag information begins at sample 73,729 and runs for two long blocks, or 18,432 samples. Accordingly, when pre-existing code flag information is used, fewer of the 96,000 audio samples 3804 will be unencoded.

The masking lineup 3906 includes an overlapping short block maker that makes short blocks of 512 audio samples, wherein 256 of the samples are old and 256 samples are new. That is, the overlapping short block maker 3940 makes blocks of 512 samples, wherein 256 samples are shifted into or out of the buffer at one time. For example, when a first set of 256 samples enters the buffer, the oldest 256 samples are shifted out of the buffer. On a subsequent iteration, the first set of 256 samples are shifted to a latter position of the buffer and 256 samples are shifted into the buffer. Each time a new short block is made by shifting in 256 new samples and removing the 256 oldest samples, the new short block is provided to a masking evaluator 3942. The 512 sample block output from the overlapping short block maker 3940 is multiplied by a suitable window function such that an "overlap-and-add" operation will restore the audio samples to their correct value at the output. A synthesized code signal to be added to an audio signal is also similarly windowed to prevent abrupt transitions at block edges when there is a change in code amplitude from one 512-sample block to the next overlapped 512-sample block. These transitions if present create audible artifacts.

The masking evaluator 3942 receives samples of the overlapping short block (e.g., 512 samples) and determines an ability of the same to hide code frequencies to human hearing. That is, the masking evaluator determines if code frequencies can be hidden within the audio represented by the short block by evaluating each critical band of the audio as a whole to determine its energy and determining the noise-like or tonal-like attributes of each critical band and determining the sum total ability of the critical bands to mask the code frequencies. According to the illustrated example, the bandwidth of the critical bands increases with frequency. If the masking evaluator 3942 determines that code frequencies can be hidden in the audio 3804, the masking evaluator 3904 indicates the amplitude levels at which the code frequencies can be inserted within the audio 3804, while still remaining hidden and provides the amplitude information to the synthesizer 3916.

Some example the masking evaluators 3942 conduct the masking evaluation by determining a maximum change in energy $E_b$ or a masking energy level that can occur at any critical frequency band without making the change perceptible to a listener. The masking evaluation carried out by the masking evaluator 3942 may be carried out as outlined in the Moving Pictures Experts Group—Advanced Audio Encoding (MPEG-AAC) audio compression standard ISO/IEC 13818-7:1997, for example. The acoustic energy in each critical band influences the masking energy of its neighbors and algorithms for computing the masking effect are described in the standards document such as ISO/IEC 13818-7:1997. These analyses may be used to determine for each short block the masking contribution due to tonality (e.g., how much the audio being evaluated is like a tone) as well as noise like (i.e., how much the audio being evaluated is like noise) features. Further analysis can evaluate temporal masking that extends masking ability of the audio over short time, typically, for 50-100 milliseconds (ms). The resulting analysis by the masking evaluator 3942 provides a determination, on a per critical band basis, the amplitude of a code frequency that can be added to the audio 3804 without producing any noticeable audio degradation (e.g., without being audible).

Because a 256 sample block will appear in both the beginning of one short block and the end of the next short block and, thus, will be evaluated two times by the masking evaluator 3942, the masking evaluator makes two masking evaluations including the 256 sample block. The amplitude indication provided to the synthesizer 3916 is a composite of those two evaluations including that 256 sample block and the amplitude indication is timed such that the amplitude of the code inserted into the 256 samples is timed with those samples arriving at the combiner 3920.

Referring now to FIGS. 40-42, an example LUT 3932 is shown that includes one column representing symbols 4002 and seven columns 4004, 4006, 4008, 4010, 4012, 4014, 4016 representing numbered code frequency indices. The example LUT 3932 of FIGS. 40-42 includes 129 rows, 128 of which are used to represent data symbols and one of which is used to represent a synchronization symbol. Because the example LUT 3932 includes 128 different data symbols, data may be sent at a rate of seven bits per symbol. The frequency indices in the table may range from 180-656 and are based on a long block size of 9216 samples and a sampling rate of 48 kHz. Accordingly, the frequencies corresponding to these indices range between 937.5 Hz and 3126.6 Hz, which falls into the humanly audible range. A description of a process to generate a LUT, such as the example table 3932 of FIGS. 40-42 is provided in conjunction with FIGS. 44-47.

While an example LUT 3932 is shown in FIGS. 40-42, other sampling rates and frequency indices may be used to represent symbols. For example, frequency indices may be selected from a range representing 937.5 Hz to 5010.4 Hz, which falls in the humanly audible range. For example, one or more ranges of frequency indices may not be selected and/or not used to avoid interfering with frequencies used to carry other codes and/or watermarks. Moreover, the selected and/or used ranges of frequencies need not be contiguous. In some examples, frequencies in the ranges 0.8 kHz to 1.03 kHz and 2.9 kHz to 4.6 kHz are used. In other examples, frequencies in the ranges 0.75 kHz to 1.03 kHz and 2.9 kHz to 4.4 kHz are used.

In some example operations of the code frequency selector 3914, a symbol of 25 (e.g., a binary value of 0011001) is received from the symbol selector 3912. The code frequency selector 3914 accesses the LUT 3932 and reads row 25 of the symbol column 4002. From this row, the code frequency selector reads that code frequency indices 217, 288, 325, 403, 512, 548, and 655 are to be emphasized in the audio 3804 to communicate the symbol 25 to the decoder. The code frequency selector 3914 then provides an indication of these indices to the synthesizer 3916, which synthesizes the code signals by outputting Fourier coefficients corresponding to these indices.

The combiner 3920 receives both the output of the code synthesizer 3908 and the audio 3804 and combines them to form encoded audio. The combiner 3920 may combine the output of the code synthesizer 3908 and the audio 3804 in an analog or digital form. If the combiner 3920 performs a digital combination, the output of the code synthesizer 3908 may be combined with the output of the sampler 3902, rather than the audio 3804 that is input to the sampler 3902. For example, the audio block in digital form may be combined with the sine waves in digital form. Alternatively, the combination may be carried out in the frequency domain, wherein frequency coefficients of the audio are adjusted in accordance with frequency coefficients representing the sine waves. As a further alternative, the sine waves and the audio may be combined in analog form. The encoded audio may be output from the combiner 3920 in analog or digital form. If the output of the combiner 3920 is digital, it may be subsequently converted to analog form before being coupled to the transmitter 3806.

While an example manner of implementing the example encoder 3802 of FIG. 38 has been illustrated in FIG. 39, one or more of the interfaces, data structures, elements, processes and/or devices illustrated in FIG. 39 may be combined, divided, re-arranged, omitted, eliminated and/or implemented in any other way. Further, the example message generator 3910, the example symbol selector 3912, the example code frequency selector 3914, the example code signal synthesizer 3916, the example inverse Fourier transform 3918, the example combiner 3920, the example prior code detector 3904, the example overlapping short block maker 3940, the example masking evaluator 3942 and/or, more generally, the example encoder 3802 of FIG. 39 may be implemented by hardware, software, firmware and/or any combination of hardware, software and/or firmware. Thus, for example, any of the example message generator 3910, the example symbol selector 3912, the example code frequency selector 3914, the example code signal synthesizer 3916, the example inverse Fourier transform 3918, the example combiner 3920, the example prior code detector 3904, the example overlapping short block maker 3940, the example masking evaluator 3942 and/or, more generally, the example encoder 3802 may be implemented by one or more circuit(s), programmable processor(s), ASIC(s), PLD(s), FPLD(s), and/or FPGA(s), etc. When any apparatus claim of this patent incorporating one or more of these elements is read to cover a purely software and/or firmware implementation, at least one of the example message generator 3910, the example symbol selector 3912, the example code frequency selector 3914, the example code signal synthesizer 3916, the example inverse Fourier transform 3918, the example combiner 3920, the example prior code detector 3904, the example overlapping short block maker 3940, the example masking evaluator 3942 and/or, more generally, the example encoder 3802 are hereby expressly defined to include a tangible article of manufacture such as a tangible computer-readable medium such as those described above in connection with FIG. 17 storing the firmware and/or software. Further still, the example encoder 3802 may include interfaces, data structures, elements, processes and/or devices instead of, or in addition to, those illustrated in FIG. 39 and/or may include more than one of any or all of the illustrated interfaces, data structures, elements, processes and/or devices.

Figure 43:
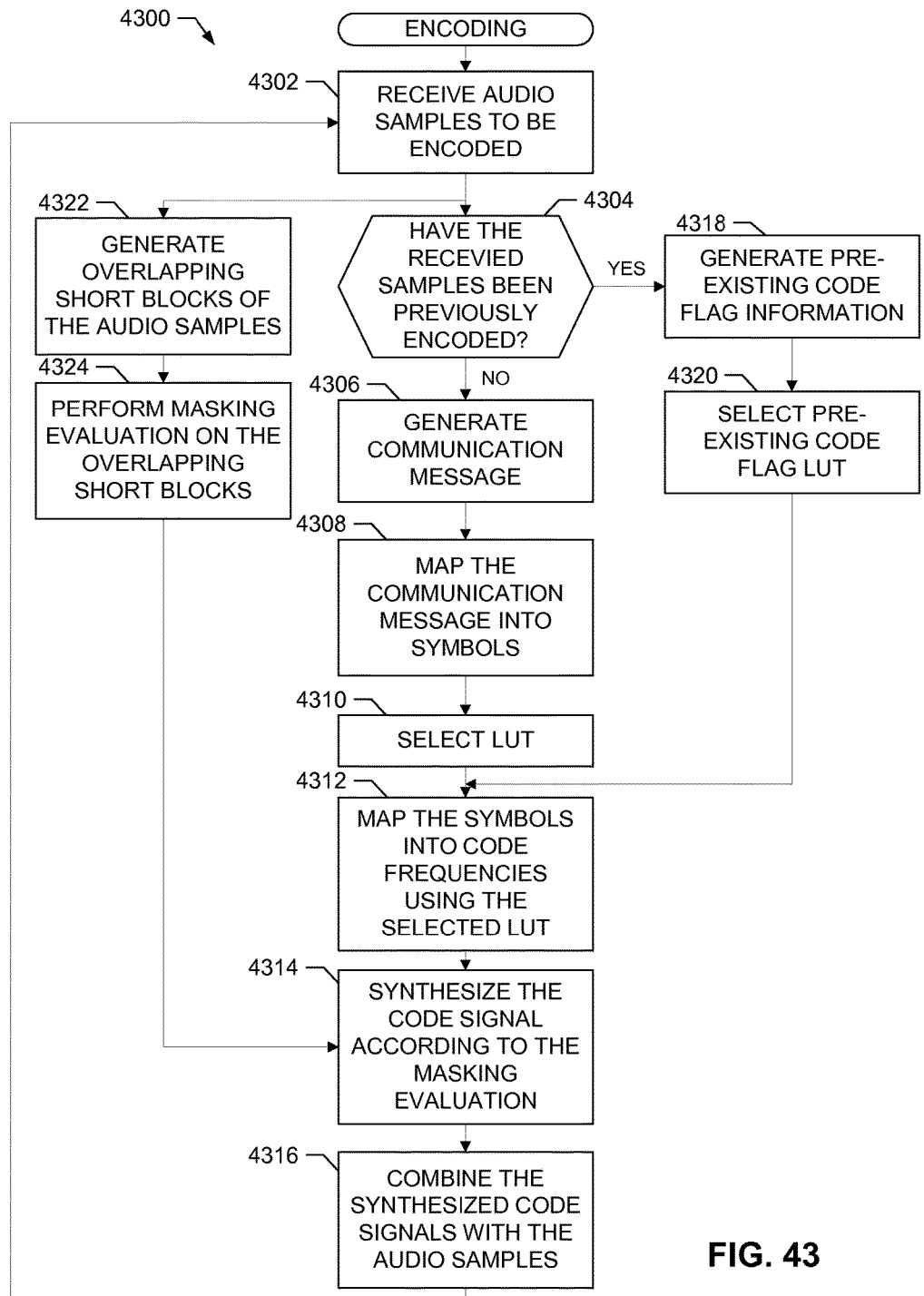
FIG. 43 illustrates example machine-accessible instructions that may be executed by, for example, a processor, to implement the example encoder of FIGS. 38 and 39.

FIG. 43 illustrates example machine-accessible instructions that may be executed to implement the example encoder 3802 of FIGS. 38 and 39. A processor, a controller and/or any other suitable processing device may be used and/or programmed to execute the example machine-accessible instructions of FIG. 43. For example, the machine-accessible instructions of FIG. 43 may be embodied in coded instructions stored on any combination of tangible article of manufacture such as a tangible computer-readable medium discussed above in connection with FIG. 17. Machine-readable instructions comprise, for example, instructions and data that cause a processor, a computer and/or a machine having a processor (e.g., the example processor platform P100 discussed above in connection with FIG. 24) to perform one or more particular processes. Alternatively, some or all of the example machine-accessible instructions of FIG. 43 may be implemented using any combination(s) of ASIC(s), PLD(s), FPLD(s), FPGA(s), discrete logic, hardware, firmware, etc. Also, some or all of the example processes of FIG. 43 may be implemented manually or as any combination of any of the foregoing techniques, for example, any combination of firmware, software, discrete logic and/or hardware. Further, many other methods of implementing the example operations of FIG. 43 may be employed. For example, the order of execution of the blocks may be changed, and/or one or more of the blocks described may be changed, eliminated, sub-divided, or combined. Additionally, any or all of the example machine-accessible instructions of FIG. 43 may be carried out sequentially and/or carried out in parallel by, for example, separate processing threads, processors, devices, discrete logic, circuits, etc.

The example process 4300 of FIG. 43 begins when audio samples to be encoded are received (block 4302). The process 4300 then determines if the received samples have been previously encoded (block 4304). This determination may be carried out, for example, by the prior code detector 3904 of FIG. 39, or by any suitable decoder configured to examine the audio to be encoded for evidence of a prior encoding.

If the received samples have not been previously encoded (block 4304), the process 4300 generates a communication message (block 4306), such as a communication message having the format shown in FIG. 39 at reference numeral 3922. In one particular example, when the audio has not been previously encoded, the communication message may include a synchronization portion and one or more portions including data bits. The communication message generation may be carried out, for example, by the message generator 3910 of FIG. 39.

The communication message is then mapped into symbols (block 4308). For example, the synchronization information need not be mapped into a symbol if the synchronization information is already a symbol. In another example, if a portion of the communication message is a series of bits, such bits or groups of bits may be represented by one symbol. As described above in conjunction with the symbol selector 3912, which is one manner in which the mapping (block 4308) may be carried out, one or more tables or encoding schemes may be used to convert bits into symbols. For example, some techniques may include the use of error correction coding, or the like, to increase message robustness through the use of coding gain. In one particular example implementation having a symbol space sized to accommodate 128 data symbols, seven bits may be converted into one symbol. Of course, other numbers of bits may be processed depending on many factors including available symbol space, error correction encoding, etc.

After the communication symbols have been selected (block 4308), the process 4300 selects a LUT that will be used to determine the code frequencies that will be used to represent each symbol (block 4310). In some examples, the selected LUT may be the example LUT 3932 of FIGS. 40-42, or may be any other suitable LUT. Additionally, the LUT may be any LUT generated as described in conjunction with FIGS. 44-46. The selection of the LUT may be based on a number of factors including the synchronization symbol that is selected during the generation of the communication message (block 4306).

After the symbols have been generated (block 4308) and the LUT is selected (block 4310), the symbols are mapped into code frequencies using the selected LUT (block 4312). In some examples in which the LUT 3932 of FIG. 40-42 is selected, a symbol of, for example, 35 would be mapped to the frequency indices 218, 245, 360, 438, 476, 541, and 651. The data space in the LUT is between symbol 0 and symbol 127 and symbol 128, which uses a unique set of code frequencies that do not match any other code frequencies in the table, is used to indicate a synchronization symbol. The LUT selection (block 4310) and the mapping (block 4312) may be carried out by, for example, the code frequency selector 3914 of FIG. 39. After the code frequencies are selected, an indication of the same is provided to, for example, the synthesizer 3916 of FIG. 39.

Code signals including the code frequencies are then synthesized (block 4314) at amplitudes according to a masking evaluation, which is described in conjunction with blocks 3940 and 3942 or FIG. 39, and is described in conjunction with the process 4300 below. In some examples, the synthesis of the code frequency signals may be carried out by providing appropriately scaled Fourier coefficients to an inverse Fourier process. For instance, three Fourier coefficients may be output to represent each code frequency in the code frequency signals. Accordingly, the code frequencies may be synthesized by the inverse Fourier process in a manner in which the synthesized frequencies are windowed to prevent spill over into other portions of the signal into which the code frequency signals are being embedded. An example configuration that may be used to carry out the synthesis of block 4314 is shown at blocks 3916 and 3918 of FIG. 39. Of course other implementations and configurations are possible.

After the code signals including the code frequencies have been synthesized, they are combined with the audio samples (block 4316). As described in conjunction with FIG. 39, the combination of the code signals and the audio is such that one symbol is inserted into each long block of audio samples. Accordingly, to communicate one synchronization symbol and 49 data bits, information is encoded into eight long blocks of audio information: one long block for the synchronization symbol and one long block for each seven bits of data (assuming seven bits/symbol encoding). The messages are inserted into the audio at two second intervals. Thus, the eight long blocks of audio immediately following the start of a message may be encoded with audio and the remaining long blocks that make up the balance of the two second of audio may be unencoded.

The insertion of the code signal into the audio may be carried out by adding samples of the code signal to samples of the host audio signal, wherein such addition is done in the analog domain or in the digital domain. Alternatively, with proper frequency alignment and registration, frequency components of the audio signal may be adjusted in the frequency domain and the adjusted spectrum converted back into the time domain.

The foregoing described the operation of the process 4300 when the process determined that the received audio samples have not been previously encoded (block 4304). However, in situations in which a portion of media has been through a distribution chain and encoded as it was processed, the received samples of audio processed at block 4304 already include codes. For example, a local television station using a courtesy news clip from CNN in a local news broadcast might not get viewing credit based on the prior encoding of the CNN clip. As such, additional information is added to the local news broadcast in the form of pre-existing code flag information. If the received samples of audio have been previously encoded (block 4304), the process generates pre-existing code flag information (block 4318). The pre-existing code flag information may include the generation of an pre-existing code flag synchronization symbol and, for example, the generation of seven bits of data, which will be represented by a single data symbol. The data symbol may represent a station identification, a time, or any other suitable information. For example, a media monitoring site (MMS) may be programmed to detect the pre-existing code flag information to credit the station identified therein.

After the pre-existing code flag information has been generated (block 4318), the process 4300 selects the pre-existing code flag LUT that will be used to identify code frequencies representative of the pre-existing code flag information (block 4320). In some examples, the pre-existing code flag LUT may be different than other LUTs used in non-pre-existing code conditions. For instance, the pre-existing code flag synchronization symbol may be represented by the code frequencies 220, 292, 364, 436, 508, 580, and 652.

After the pre-existing code flag information is generated (block 4318) and the pre-existing code flag LUT is selected (block 4320), the pre-existing code flag symbols are mapped to code frequencies (block 4312), and the remainder of the processing follows as previously described.

Sometime before the code signal is synthesized (block 4314), the process 4300 conducts a masking evaluation to determine the amplitude at which the code signal should be generated so that it still remains inaudible or substantially inaudible to human hearers. Accordingly, the process 4300 generates overlapping short blocks of audio samples, each containing 512 audio samples (block 4322). As described above, the overlapping short blocks include 50% old samples and 50% newly received samples. This operation may be carried out by, for example, the overlapping short block maker 3940 of FIG. 39.

After the overlapping short blocks are generated (block 4322), masking evaluations are performed on the short blocks (block 4324). For example, this may be carried out as described in conjunction with block 3942 of FIG. 39. The results of the masking evaluation are used by the process 4300 at block 4314 to determine the amplitude of the code signal to be synthesized. The overlapping short block methodology may yield two masking evaluation for a particular 256 samples of audio (one when the 256 samples are the "new samples," and one when the 256 samples are the "old samples"), the result provided to block 4314 of the process 4300 may be a composite of these masking evaluations. Of course, the timing of the process 4300 is such that the masking evaluations for a particular block of audio are used to determine code amplitudes for that block of audio.

Lookup Table Generation

A system 4400 for populating one or more LUTs with code frequencies corresponding to symbols may be implemented using hardware, software, combinations of hardware and software, firmware, or the like. The system 4400 of FIG. 44 may be used to generate any number of LUTs, such as the LUT of FIGS. 40-42. The system 4400 which operates as described below in conjunction with FIG. 44 and FIG. 45, results in a code frequency index LUT, wherein: (1) two symbols of the table are represented by no more than one common frequency index, (2) not more than one of the frequency indices representing a symbol reside in one audio critical band as defined by the MPEG-AA compression standard ISO/IEC 13818-7:1997, and (3) code frequencies of neighboring critical bands are not used to represent a single symbol. Criteria number 3 helps to ensure that audio quality is not compromised during the audio encoding process.

Figure 47:
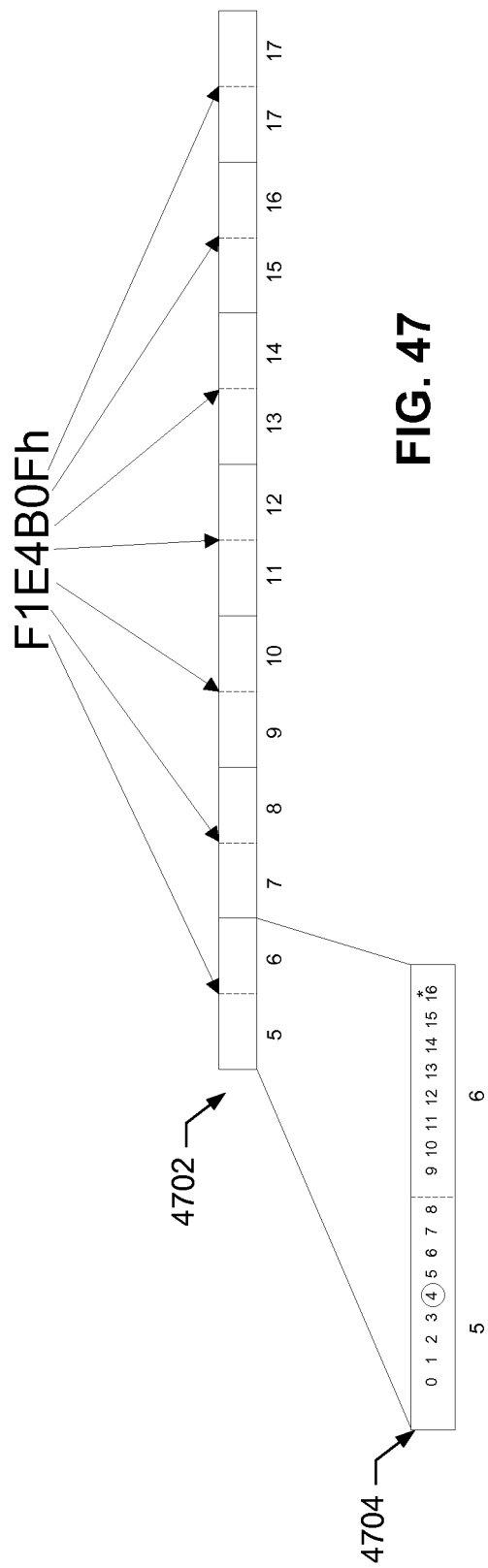
FIG. 47 illustrates the frequency relationship between the audio encoding indices.

A critical band pair definer 4402 defines a number (P) of critical band pairs. For example, referring to FIG. 46, a table 4600 includes columns representing AAC critical band indices 4602, short block indices 4604 in the range of the AAC indices, and long block indices 4606 in the range of the AAC indices. In some examples, the value of P may be seven and, thus, seven critical band pairs are formed from the AAC indices (block 4502). FIG. 47 shows the frequency relationship between the AAC indices. According to an example, as shown at reference numeral 4702 in FIG. 47 wherein frequencies of critical band pairs are shown as separated by dotted lines, AAC indices may be selected into pairs as follows: five and six, seven and eight, nine and ten, eleven and twelve, thirteen and fourteen, fifteen and sixteen, and seventeen and seventeen. The AAC index of seventeen includes a wide range of frequencies and, therefore, index 17 is shown twice, once for the low portion and once for the high portion.

A frequency definer 4404 defines a number of frequencies (N) that are selected for use in each critical band pair. In some examples, the value of N is sixteen, meaning that there are sixteen data positions in the combination of the critical bands that form each critical band pair. Reference numeral 4704 in FIG. 47 identifies the seventeen frequency positions are shown. The circled position four is reserved for synchronization information and, therefore, is not used for data.

A number generator 4406 defines a number of frequency positions in the critical band pairs defined by the critical band pair definer 4402. In some examples the number generator 4406 generates all $N^P$, P-digit numbers. For example, if N is 16 and P is 7, the process generates the numbers 0 through 268435456, but may do so in base 16-hexadecimal, which would result in the values 0 through 10000000.

A redundancy reducer 4408 then eliminates all number from the generated list of numbers sharing more than one common digit between them in the same position. This ensures compliance with criteria (1) above because, as described below, the digits will be representative of the frequencies selected to represent symbols. An excess reducer 4410 may then further reduce the remaining numbers from the generated list of numbers to the number of needed symbols. For example, if the symbol space is 129 symbols, the remaining numbers are reduced to a count of 129. The reduction may be carried out at random, or by selecting remaining numbers with the greatest Euclidean distance, or my any other suitable data reduction technique. In another example, the reduction may be carried out in a pseudorandom manner.

After the foregoing reductions, the count of the list of numbers is equal to the number of symbols in the symbol space. Accordingly, a code frequency definer 4412 defines the remaining numbers in base P format to represent frequency indices representative of symbols in the critical band pairs. For example, referring to FIG. 47, the hexadecimal number F1E4B0F is in base 16, which matches P. The first digit of the hexadecimal number maps to a frequency component in the first critical band pair, the second digit to the second critical band pair, and so on. Each digit represents the frequency index that will be used to represent the symbol corresponding to the hexadecimal number F1E4B0F.

Using the first hexadecimal number as an example of mapping to a particular frequency index, the decimal value of Fh is 15. Because position four of each critical band pair is reserved for non-data information, the value of any hexadecimal digit greater than four is incremented by the value of one decimal. Thus, the 15 becomes a 16. The 16 is thus designated (as shown with the asterisk in FIG. 47) as being the code frequency component in the first critical band pair to represent the symbol corresponding to the hexadecimal number F1E4B0F. Though not shown in FIG. 47, the index 1 position (e.g., the second position from the far left in the critical band 7 would be used to represent the hexadecimal number F1E4B0F.

A LUT filler 4414 receives the symbol indications and corresponding code frequency component indications from the code frequency definer 4412 and fills this information into a LUT.

Figure 44:
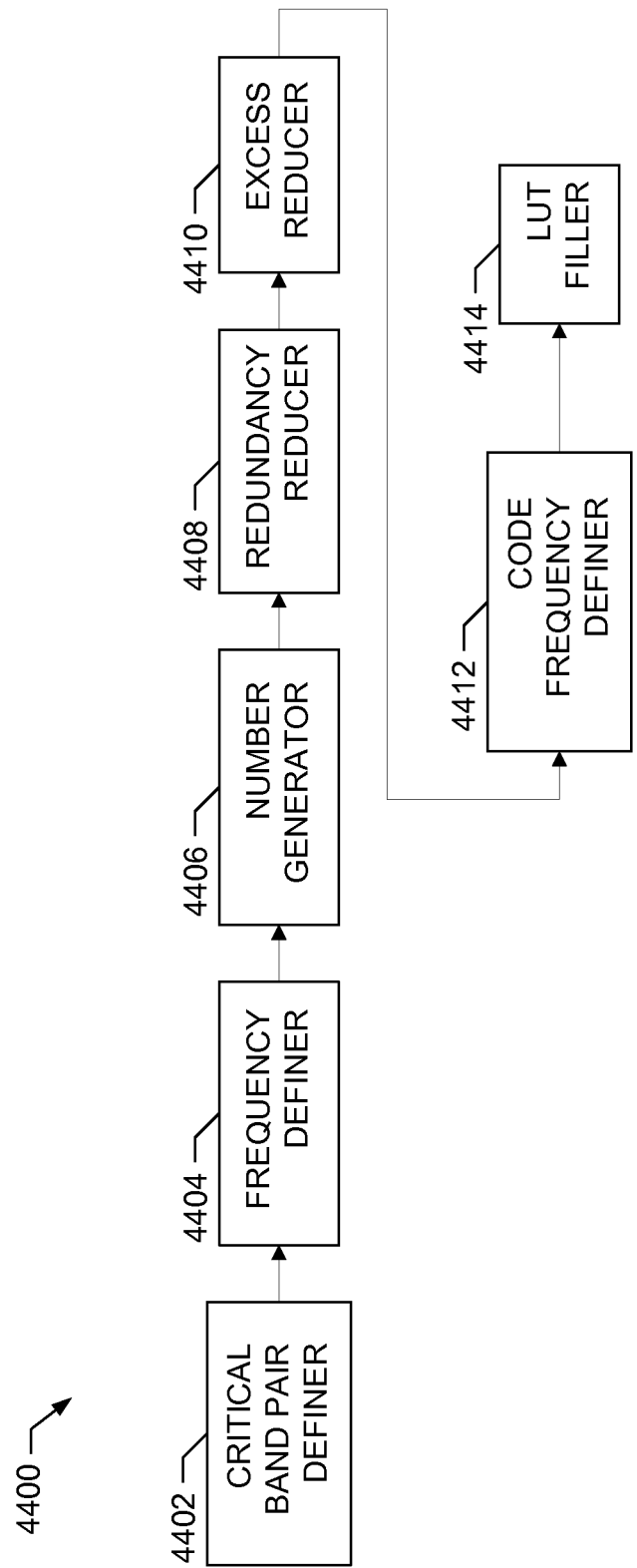
FIG. 44 illustrates an example system to generate a frequency index table.

While an example manner of implementing a LUT table generator 4400 is illustrated in FIG. 44, one or more of the interfaces, data structures, elements, processes and/or devices illustrated in FIG. 44 may be combined, divided, re-arranged, omitted, eliminated and/or implemented in any other way. Further, the example critical band pair definer 4402, the example frequency definer 4404, the example number generator 4406, the example redundancy reducer 4408, the example excess reducer 4410, the example code frequency definer 4412, the example LUT filler 4414 and/or, more generally, the example system 4400 of FIG. 44 may be implemented by hardware, software, firmware and/or any combination of hardware, software and/or firmware. Thus, for example, any of the example critical band pair definer 4402, the example frequency definer 4404, the example number generator 4406, the example redundancy reducer 4408, the example excess reducer 4410, the example code frequency definer 4412, the example LUT filler 4414 and/or, more generally, the example system 4400 may be implemented by one or more circuit(s), programmable processor(s), ASIC(s), PLD(s), FPLD(s), and/or FPGA(s), etc. When any apparatus claim of this patent incorporating one or more of these elements is read to cover a purely software and/or firmware implementation, at least one of the example critical band pair definer 4402, the example frequency definer 4404, the example number generator 4406, the example redundancy reducer 4408, the example excess reducer 4410, the example code frequency definer 4412, the example LUT filler 4414 and/or, more generally, the example system 4400 are hereby expressly defined to include a tangible article of manufacture such as a tangible computer-readable medium such as those described above in connection with FIG. 17 storing the firmware and/or software. Further still, the example system 4400 may include interfaces, data structures, elements, processes and/or devices instead of, or in addition to, those illustrated in FIG. 44 and/or may include more than one of any or all of the illustrated interfaces, data structures, elements, processes and/or devices.

Figure 45:
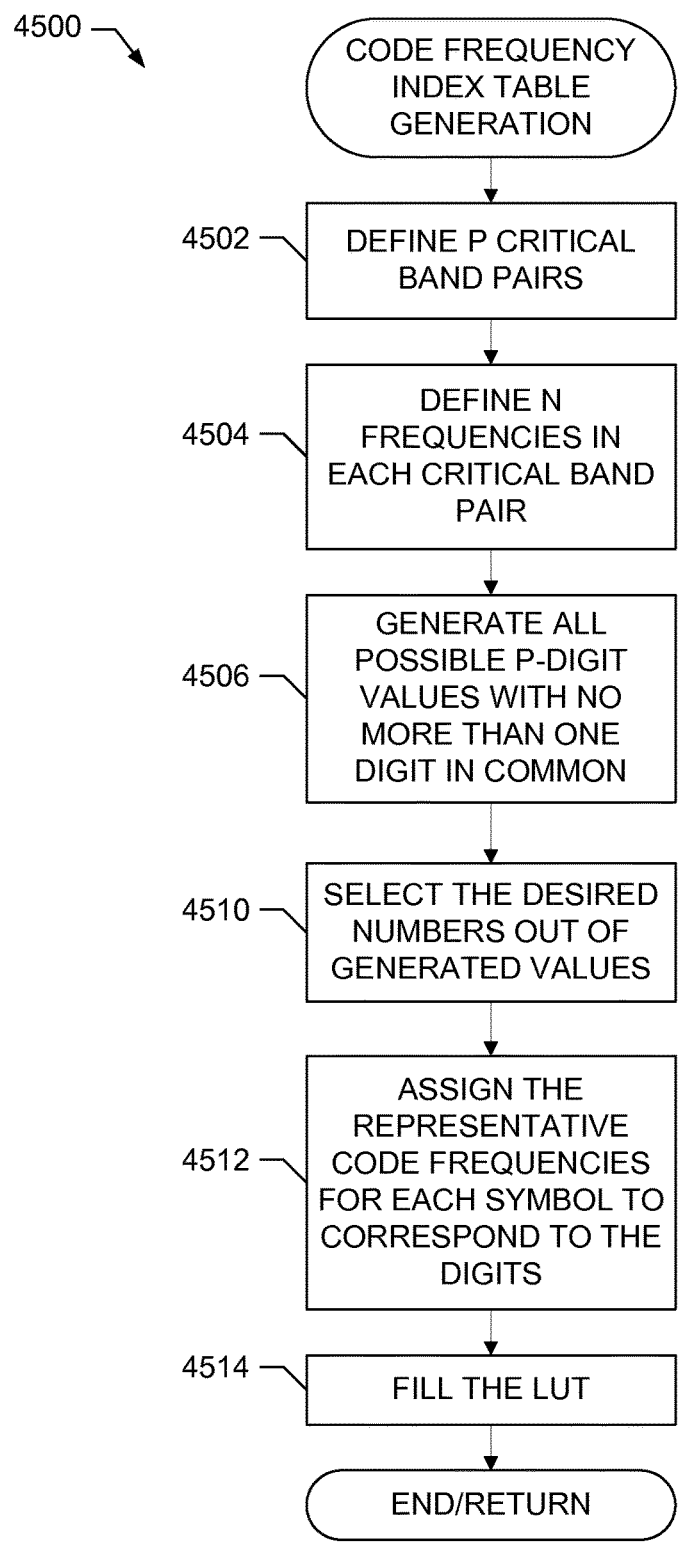
FIG. 45 illustrates example machine-accessible instructions that may be executed by, for example, a processor, to generate a frequency index table used in conjunction with the code frequency selector of FIG. 39.

FIG. 45 illustrates example machine-accessible instructions that may be executed to implement the example system 4400 of FIG. 44 and/or, more generally, to generate a code frequency index table. A processor, a controller and/or any other suitable processing device may be used and/or programmed to execute the example machine-accessible instructions of FIG. 45. For example, the machine-accessible instructions of FIG. 45 may be embodied in coded instructions stored on any combination of tangible article of manufacture such as a tangible computer-readable medium discussed above in connection with FIG. 17. Machine-readable instructions comprise, for example, instructions and data that cause a processor, a computer and/or a machine having a processor (e.g., the example processor platform P100 discussed above in connection with FIG. 24) to perform one or more particular processes. Alternatively, some or all of the example machine-accessible instructions of FIG. 45 may be implemented using any combination(s) of ASIC(s), PLD(s), FPLD(s), FPGA(s), discrete logic, hardware, firmware, etc. Also, some or all of the example processes of FIG. 45 may be implemented manually or as any combination of any of the foregoing techniques, for example, any combination of firmware, software, discrete logic and/or hardware. Further, many other methods of implementing the example operations of FIG. 45 may be employed. For example, the order of execution of the blocks may be changed, and/or one or more of the blocks described may be changed, eliminated, sub-divided, or combined. Additionally, any or all of the example machine-accessible instructions of FIG. 45 may be carried out sequentially and/or carried out in parallel by, for example, separate processing threads, processors, devices, discrete logic, circuits, etc.

The example machine-accessible instructions of FIG. 45 may be used to generate any number of LUTs, such as the LUT of FIGS. 40-42. While an example process 4500 is shown, other processes may be used. The result of the process 4500 is a code frequency index LUT, wherein: (1) two symbols of the table are represented by no more than one common frequency index, (2) not more than one of the frequency indices representing a symbol reside in one audio critical band as defined by the MPEG-AA compression standard ISO/IEC 13818-7:1997, and (3) code frequencies of neighboring critical bands are not used to represent a single symbol. Criteria number 3 helps to ensure that audio quality is not compromised during the audio encoding process.

The example process 4500 of FIG. 45 begins by defining a number (P) of critical band pairs. For example, referring to FIG. 46, a table 4600 includes columns representing AAC critical band indices 4602, short block indices 4604 in the range of the AAC indices, and long block indices 4606 in the range of the AAC indices. In some examples, the value of P may be seven and, thus, seven critical band pairs are formed from the AAC indices (block 4502). FIG. 47 shows the frequency relationship between the AAC indices. According to an example, as shown at reference numeral 4702 in FIG. 47 wherein frequencies of critical band pairs are shown as separated by dotted lines, AAC indices may be selected into pairs as follows: five and six, seven and eight, nine and ten, eleven and twelve, thirteen and fourteen, fifteen and sixteen, and seventeen and seventeen. The AAC index of seventeen includes a wide range of frequencies and, therefore, index 17 is shown twice, once for the low portion and once for the high portion.

After the band pairs have been defined (block 4502), a number of frequencies (N) is selected for use in each critical band pair (block 4504). In some examples, the value of N is sixteen, meaning that there are sixteen data positions in the combination of the critical bands that form each critical band pair. As shown in FIG. 47 as reference numeral 4704, the seventeen frequency positions are shown. The circled position four is reserved for synchronization information and, therefore, is not used for data.

After the number of critical band pairs and the number of frequency positions in the pairs is defined, the process 4500 generates all $N^P$, P-digit numbers with no more than one hexadecimal digit in common (block 4506). For example, if N is 16 and P is 7, the process generates the numbers 0 through 268435456, but may do so in base 16-hexadecimal, which would results in 0 through FFFFFFF, but does not include the numbers that share more than one common hexadecimal digit. This ensures compliance with criteria (1) above because, as described below, the digits will be representative of the frequencies selected to represent symbols.

According to an example process for determining a set of numbers that comply with criteria (1) above (and any other desired criteria), the numbers in the range from 0 to $N^P$-1 are tested. First, the value corresponding to zero is stored as the first member of the result set R. Then, the numbers from 1 to $N^P$-1 are selected for analysis to determine if they meet criteria (1) when compared to the members of R. Each number that meets criteria (1) when compared against all the current entries in R is added to the result set. In particular, according to the example process, in order to test a number K, each hexadecimal digit of interest in K is compared to the corresponding hexadecimal digit of interest in an entry M from the current result set. In the 7 comparisons not more than one hexadecimal digit of K should equal the corresponding hexadecimal digit of M. If, after comparing K against all numbers currently in the result set, no member of the latter has more than one common hexadecimal digit, then K is added to the result set R. The algorithm iterates through the set of possible numbers until all values meeting criteria (1) have been identified.

While the foregoing describes an example process for determining a set of numbers that meets criteria (1), any process or algorithm may be used and this disclosure is not limited to the process described above. For example, a process may use heuristics, rules, etc. to eliminate numbers from the set of numbers before iterating throughout the set. For example, all of the numbers where the relevant bits start with two 0's, two 1's, two 2's, etc. and end with two 0's, two 1's, two 2's, etc. could immediately be removed because they will definitely have a hamming distance less than 6. Additionally or alternatively, an example process may not iterate through the entire set of possible numbers. For example, a process could iterate until enough numbers are found (e.g., 128 numbers when 128 symbols are desired). In another implementation, the process may randomly select a first value for inclusion in the set of possible values and then may search iteratively or randomly through the remaining set of numbers until a value that meets the desired criteria (e.g., criteria (1)) is found.

The process 4500 then selects the desired numbers from the generated values (block 4510). For example, if the symbol space is 129 symbols, the remaining numbers are reduced to a count of 129. The reduction may be carried out at random, or by selecting remaining numbers with the greatest Euclidean distance, or my any other suitable data reduction technique.

After the foregoing reductions, the count of the list of numbers is equal to the number of symbols in the symbol space. Accordingly, the remaining numbers in base P format are defined to represent frequency indices representative of symbols in the critical band pairs (block 4512). For example, referring to FIG. 47, the hexadecimal number F1E4B0F is in base 16, which matches P. The first digit of the hexadecimal number maps to a frequency component in the first critical band pair, the second digit to the second critical band pair, and so on. Each digit represents the frequency index that will be used to represent the symbol corresponding to the hexadecimal number F1E4B0F.

Using the first hexadecimal number as an example of mapping to a particular frequency index, the decimal value of Fh is 15. Because position four of each critical band pair is reserved for non-data information, the value of any hexadecimal digit greater than four is incremented by the value of one decimal. Thus, the 15 becomes a 16. The 16 is thus designated (as shown with the asterisk in FIG. 47) as being the code frequency component in the first critical band pair to represent the symbol corresponding to the hexadecimal number F1E4B0F. Though not shown in FIG. 47, the index 1 position (e.g., the second position from the far left in the critical band 7 would be used to represent the hexadecimal number F1E4B0F.

After assigning the representative code frequencies (block 4512), the numbers are filled into a LUT (block 4514).

Of course, the systems and processes described in conjunction with FIGS. 45-47 are only examples that may be used to generate LUTs having desired properties in conjunction the encoding and decoding systems described herein. Other configurations and processes may be used. For example, LUTs may be generated using other code frequency plans.

Audio Decoding

Figure 48:
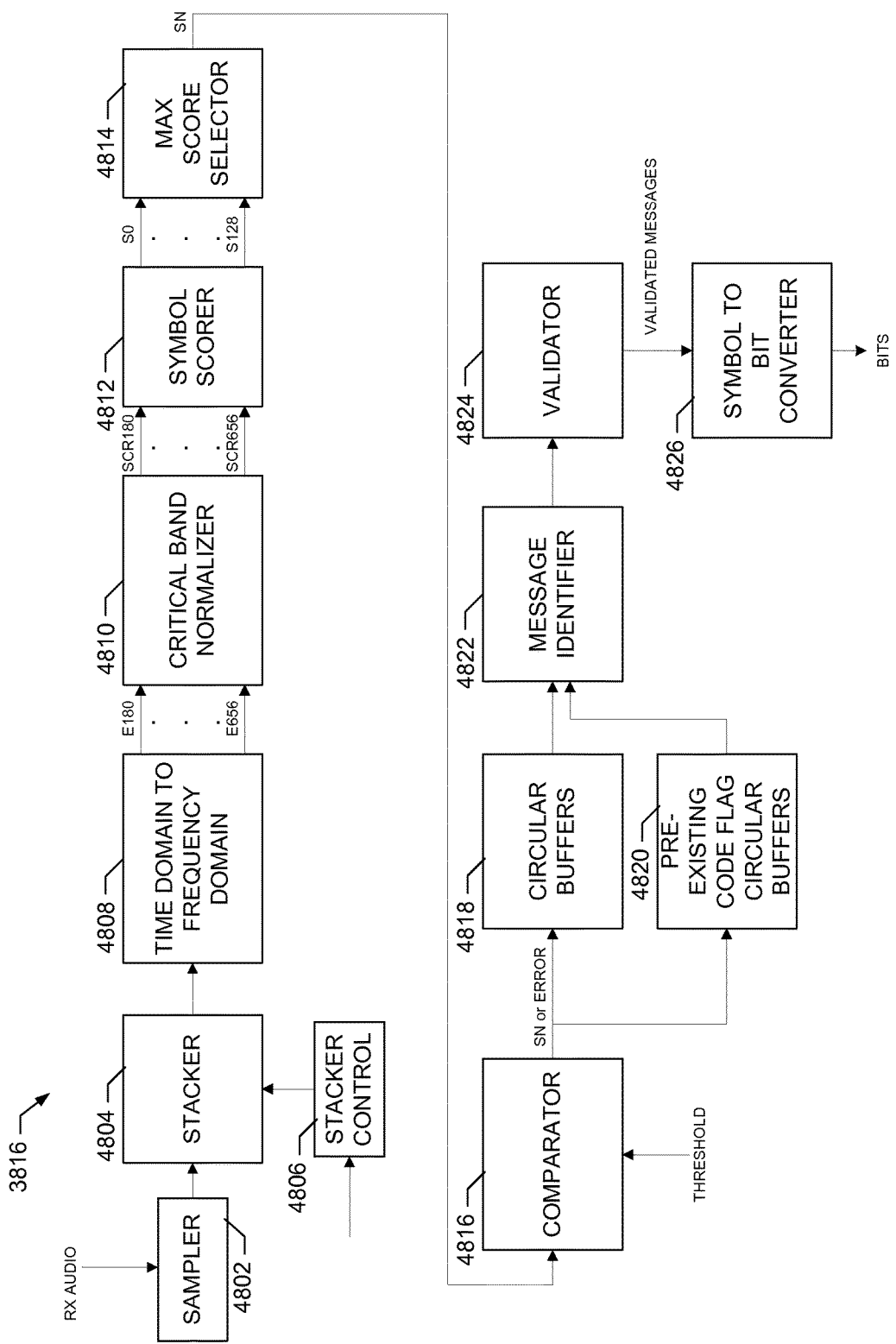
FIG. 48 illustrates an example manner of implementing the decoder of FIG. 38.

FIG. 48 illustrates an example manner of decoding Nielsen codes and/or implementing the example decoder 3816 of FIG. 38, the example decoder 310 of FIG. 3 and/or the example secondary content triggerer 180 of FIGS. 1 and 2. While the decoder illustrated in FIG. 38 may be used to implement any of the decoders 3816, 310 and 180, for ease of discussion the decoder of FIG. 38 will be referred to as decoder 3816. In some examples, two instances of the example decoder 3816 may be implemented. A first instance enables a stacker 4804 to enhance the decoding of a station identifier and a coarse time stamp that increments once every 64 seconds, and a second instance disables the stacker 4804 to decode variable data in a last 7 bit group 3932 representing time increments in seconds, which varies from message to message. In other examples, a single decoder 3816 instance is implemented with the stacker 4804 enabled or disabled as described below.

In general, the decoder 3816 detects a code signal that was inserted into received audio to form encoded audio at the encoder 3802. That is, the decoder 3816 looks for a pattern of emphasis in code frequencies it processes. Once the decoder 3816 has determined which of the code frequencies have been emphasized, the decoder 3816 determines, based on the emphasized code frequencies, the symbol present within the encoded audio. The decoder 3816 may record the symbols, or may decode those symbols into the codes that were provided to the encoder 3802 for insertion into the audio.

In one implementation, the example decoder 3816 of FIG. 48 may be implemented using, for example, a digital signal processor programmed with instructions to implement components of the decoder 3816. Of course, any other implementation of the example decoder 3816 is possible. For example, the decoder 3816 may be implemented using one or more processors, programmable logic devices, or any suitable combination of hardware, software, and firmware.

As shown in FIG. 48, an example decoder 3816 includes a sampler 4802, which may be implemented using an analog to digital converter (A/D) or any other suitable technology, to which encoded audio is provided in analog format. As shown in FIG. 38, the encoded audio may be provided by a wired or wireless connection to the receiver 3810. The sampler 4802 samples the encoded audio at, for example, a sampling frequency of 8 kHz or 12 kHz. Of course, other sampling frequencies may be advantageously selected in order to increase resolution or reduce the computational load at the time of decoding. At a sampling frequency of 8 kHz, the Nyquist frequency is 4 kHz and, therefore, all of the embedded code signals represented in the example LUT 3932 of FIGS. 40-41 are preserved because their spectral frequencies are lower than the Nyquist frequency. Were a frequency plan including higher frequencies utilized, a higher sampling frequency such as 12 kHz may be needed to ensure the Nyquist sampling criteria is satisfied.

The samples from the sampler 4802 are provided to a stacker 4804. In general, the stacker 4804 accentuates the code signal in the audio signal information by taking advantage of the fact that messages are repeated or substantially repeated (e.g., only the least significant bits are changed) for a period of time. For example, 42 bits (3926 of FIG. 39) of the 49 bits (3926 and 3924) of the previously described example message of FIG. 39 remain constant for 64 seconds (32 2-second message intervals) when the 42 bits of data 3926 in the message include a station identifier and a coarse time stamp which increments once every 64 seconds. The variable data in the last 7 bit group 3932 represents time increments in seconds and, thus, varies from message to message. The example stacker 4804 aggregates multiple blocks of audio signal information to accentuate the code signal in the audio signal information. In an example implementation, the stacker 4804 comprises a buffer to store multiple samples of audio information. For example, if a complete message is embedded in two seconds of audio, the buffer may be twelve seconds long to store six messages. The example stacker 4804 additionally comprises an adder to sum the audio signal information associated with the six messages and a divider to divide the sum by the number of repeated messages selected (e.g., six).

By way of example, a watermarked signal y(t) can be represented by the sum of the host signal x(t) and watermark w(t):

$$y(t) = x(t) + w(t)$$

In the time domain, watermarks may repeat after a known period T:

$$w(t) = w(t-T)$$

According to an example stacking method, the input signal y(t) is replaced by a stacked signal S(t):

$$S(t) = \frac{y(t) + y(t-T) + \ldots + y(t-(n-1)T)}{n}$$

In the stacked signal S(t), the contribution of the host signal decreases because the values of samples x(t), x(t-T), ..., x(t-nT) are independent if the period T is sufficiently large. At the same time, the contribution of the watermarks being made of, for example, in-phase sinusoids, is enhanced.

$$S(t) = \frac{x(t) + x(t-T) + \ldots + x(t-(n-1)T)}{n} + w(t)$$

Assuming x(t), x(t-T), ..., x(t-nT) are independent random variables drawn from the same distribution X with zero mean E[X]=0:

$$\lim_{n\to\infty} E\left[\frac{x(t)+x(t-T)+\ldots+x(t-(n-1)T)}{n}\right] \to 0,$$

and $$\text{Var}\left[\frac{x(t)+x(t-T)+\ldots+x(t-(n-1)T)}{n}\right] = \frac{\text{Var}(X)}{n}$$

Accordingly, the underlying host signal contributions x(t), . . . , x(t–nT) will effectively be canceling each other while the watermark is unchanged allowing the watermark to be more easily detected.

In the illustrated example, the power of the resulting signal decreases linearly with the number of stacked signals n. Therefore, averaging over independent portions of the host signal can reduce the effects of interference. The watermark is not affected because it will always be added in-phase.

Figure 49:
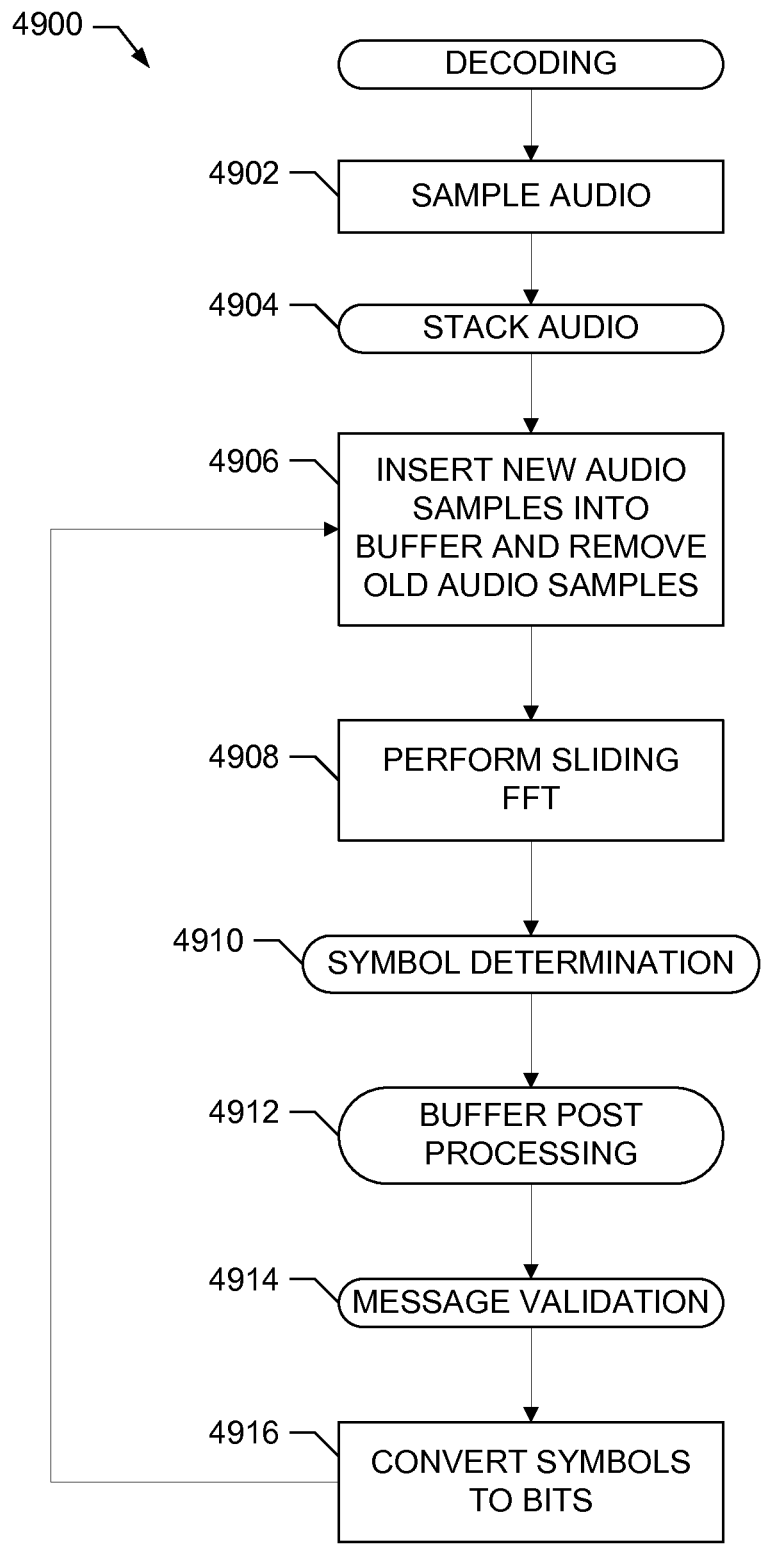
FIG. 49 illustrates example machine-accessible instructions that may be executed by, for example, a processor, to implement the example decoder of FIGS. 38 and 48.

An example process for implementing the stacker 4804 is described in conjunction with FIG. 49.

The decoder 3816 may additionally include a stacker controller 4806 to control the operation of the stacker 4804. The example stacker controller 4806 receives a signal indicating whether the stacker 4804 should be enabled or disabled. For example, the stacker controller 4806 may receive the received audio signal and may determine if the signal includes significant noise that will distort the signal and, in response to the determination, cause the stacker to be enabled. In another implementation, the stacker controller 4806 may receive a signal from a switch that can be manually controlled to enable or disable the stacker 4804 based on the placement of the decoder 3816. For example, when the decoder 3816 is wired to the receiver 3810 or the microphone 3820 is placed in close proximity to the speaker 3814, the stacker controller 4806 may disable the stacker 4804 because stacking will not be needed and will cause corruption of rapidly changing data in each message (e.g., the least significant bits of a timestamp). Alternatively, when the decoder 3816 is located at a distance from the speaker 3814 or in another environment where significant interference may be expected, the stacker 4804 may be enabled by the stacker controller 4806. Further, the stacker 4804 may be disabled when a) the sampling rate accuracy of the sampler 4802 and/or the highest frequency used to convey messages are selected such that the stacking may have limited effect, and/or b) the variable data in the last 7 bit group 3932 representing time increments in seconds, which varies from message to message, is to be decoded. Of course, any type of desired control may be applied by the stacker controller 4806.

The output of the stacker 4804 is provided to a time to frequency domain converter 4808. The time to frequency domain converter 4808 may be implemented using a Fourier transform such as a DFT, or any other suitable technique to convert time-based information into frequency-based information. In some examples, the time to frequency domain converter 4808 may be implemented using a sliding long block fast Fourier transform (FFT) in which a spectrum of the code frequencies of interest is calculated each time eight new samples are provided to the example time to time to frequency domain converter 4808. In some examples, the time to frequency domain converter 4808 uses 1,536 samples of the encoded audio and determines a spectrum therefrom using 192 slides of eight samples each. The resolution of the spectrum produced by the time to frequency domain converter 4808 increases as the number of samples used to generate the spectrum is increased. Thus, the number of samples processed by the time to frequency domain converter 4808 should match the resolution used to select the indices in the tables of FIGS. 40-42.

The spectrum produced by the time to frequency domain converter 4808 passes to a critical band normalizer 4810, which normalizes the spectrum in each of the critical bands. In other words, the frequency with the greatest amplitude in each critical band is set to one and all other frequencies within each of the critical bands are normalized accordingly. For example, if critical band one includes frequencies having amplitudes of 112, 56, 56, 56, 56, 56, and 56, the critical band normalizer would adjust the frequencies to be 1, 0.5, 0.5, 0.5, 0.5, 0.5, and 0.5. Of course, any desired maximum value may be used in place of one for the normalization. The critical band normalizer 4810 outputs the normalized score for each of the frequencies of the interest.

The spectrum of scores produced by the critical band normalizer 4810 is passed to the symbol scorer 4812, which calculates a total score for each of the possible symbols in the active symbol table. In an example implementation, the symbol scorer 4812 iterates through each symbol in the symbol table and sums the normalized score from the critical band normalizer 4810 for each of the frequencies of interest for the particular symbol to generate a score for the particular symbol. The symbol scorer 4812 outputs a score for each of the symbols to the max score selector 4814, which selects the symbol with the greatest score and outputs the symbol and the score.

The identified symbol and score from the max score selector 4814 are passed to the comparator 4816, which compares the score to a threshold. When the score exceeds the threshold, the comparator 4816 outputs the received symbol. When the score does not exceed the threshold, the comparator 4816 outputs an error indication. For example, the comparator 4816 may output a symbol indicating an error (e.g., a symbol not included in the active symbol table) when the score does not exceed the threshold. Accordingly, when a message has been corrupted such that a great enough score (i.e., a score that does not exceed the threshold) is not calculated for a symbol, an error indication is provided. In an example implementation, error indications may be provided to the stacker controller 4806 to cause the stacker 4804 to be enabled when a threshold number of errors are identified (e.g., number of errors over a period of time, number of consecutive errors, etc.).

The identified symbol or error from the comparator 4816 is passed to the circular buffers 4818 and the pre-existing code flag circular buffers 4820. An example implementation of the standard buffers 4818 is described in conjunction with FIG. 52. The example circular buffers 4818 comprise one circular buffer for each slide of the time domain to frequency domain converter 4808 (e.g., 192 buffers). Each circular buffer of the circular buffers 4818 includes one storage location for the synchronize symbol and each of the symbol blocks in a message (e.g., eight block messages would be stored in eight location circular buffers) so that an entire message can be stored in each circular buffer. Accordingly, as the audio samples are processed by the time domain to frequency domain converter 4808, the identified symbols are stored in the same location of each circular buffer until that location in each circular buffer has been filled. Then, symbols are stored in the next location in each circular buffer. In addition to storing symbols, the circular buffers 4818 may additionally include a location in each circular buffer to store a sample index indicating the sample in the audio signal that was received that resulted in the identified symbol.

The example pre-existing code flag circular buffers 4820 are implemented in the same manner as the circular buffers 4818, except the pre-existing code flag circular buffers 4820 include one location for the pre-existing code flag synchronize symbol and one location for each symbols in the pre-existing code flag message (e.g., an pre-existing code flag synchronize that includes one message symbol would be stored in two location circular buffers). The pre-existing code flag circular buffers 4820 are populated at the same time and in the same manner as the circular buffers 4818.

The example message identifier 4822 analyzes the circular buffers 4818 and the pre-existing code flag circular buffers 4820 for a synchronize symbol. For example, the message identifier 4822 searches for a synchronize symbol in the circular buffers 4818 and an pre-existing code flag synchronize symbol in the pre-existing code flag circular buffers 4820. When a synchronize symbol is identified, the symbols following the synchronize symbol (e.g., seven symbols after a synchronize symbol in the circular buffers 4818 or one symbol after an pre-existing code flag synchronize symbol in the pre-existing code flag circular buffers 4820) are output by the message identifier 4822. In addition, the sample index identifying the last audio signal sample processed is output.

The message symbols and the sample index output by the message identifier 4822 are passed to the validator 4824, which validates each message. The validator 4824 includes a filter stack that stores several consecutively received messages. Because messages are repeated (e.g., every 2 seconds or 16,000 samples at 8 kHz, or every 1.6 seconds at 12 kHz), each message may be compared with other messages in the filter stack that are separated by approximately the number of audio samples in a single message to determine if a match exists. If a match or substantial match exists, both messages are validated. If a message cannot be identified, it is determined that the message is an error and is not emitted from the validator 4824. In cases where messages might be affected by noise interference, messages might be considered a match when a subset of symbols in a message match the same subset in another already validated message. For example, if four of seven symbols in a message match the same four symbols in another message that has already been validated, the message can be identified as partially validated. Then, a sequence of the repeated messages can be observed to identify the non-matching symbols in the partially validated message.

Further, for each hypothetical long block that is analyzed during decoding, a score that represents the strength and/or probability that the decoding decision is correct may be computed. For example, for each of the seven frequencies that constitute a potential code pattern divide the power of that frequency by the average power of the other code frequencies in its code band. By summing this value across the seven frequencies a score for each potential pattern can be determined. The selected pattern is the code pattern with the highest score and that exceeds a certain minimum threshold. To improved decoding accuracy, the score of the winning pattern may be combined with that of the score(s) corresponding to the same pattern at a long block location that is exactly 3, 6, 9, etc. message slots away from the current location. If this long block is one of the 6 long blocks of the message that carries a substantially constant payload, the score of the winning pattern will be enhanced. However, such stacking does not help the $7^{th}$ long block which contains information that changes from message to message. By stacking, code detection accuracy may be increased by a factor of 2 or 3, without being sensitive to sampling rate inaccuracies and/or jitter. Other example methods and apparatus to increase the accuracy of watermark decoding are described in U.S. patent application Ser. No. 12/604,176, entitled "Methods and Apparatus to Extract Data Encoded in Media Content," and filed Oct. 22, 2009.

The validated messages from the validator 4824 are passed to the symbol to bit converter 4826, which translates each symbol to the corresponding data bits of the message using the active symbol table.

While an example manner of implementing the example decoder 3816 of FIG. 38 is illustrated in FIG. 48, one or more of the interfaces, data structures, elements, processes and/or devices illustrated in FIG. 48 may be combined, divided, re-arranged, omitted, eliminated and/or implemented in any other way. Further, the example sampler 4802, the example stacker 4804, the example stacker controller 4806, the example time domain to frequency domain 4808, the example critical band normalizer 4810, the example symbol scorer 4812, the example max score selector 4814, the comparator 4816, the example circular buffers 4818, the example pre-existing code flag circular buffers 4820, the example message identifier 4822, the example validator 4824, the example symbol to bit converter 4826 and/or, more generally, the example system decoder 3816 of FIG. 48 may be implemented by hardware, software, firmware and/or any combination of hardware, software and/or firmware. Thus, for example, any of the example sampler 4802, the example stacker 4804, the example stacker controller 4806, the example time domain to frequency domain 4808, the example critical band normalizer 4810, the example symbol scorer 4812, the example max score selector 4814, the comparator 4816, the example circular buffers 4818, the example pre-existing code flag circular buffers 4820, the example message identifier 4822, the example validator 4824, the example symbol to bit converter 4826 and/or, more generally, the example system decoder 3816 may be implemented by one or more circuit(s), programmable processor(s), ASIC(s), PLD(s), FPLD(s), and/or FPGA(s), etc. When any apparatus claim of this patent incorporating one or more of these elements is read to cover a purely software and/or firmware implementation, at least one of the example sampler 4802, the example stacker 4804, the example stacker controller 4806, the example time domain to frequency domain 4808, the example critical band normalizer 4810, the example symbol scorer 4812, the example max score selector 4814, the comparator 4816, the example circular buffers 4818, the example pre-existing code flag circular buffers 4820, the example message identifier 4822, the example validator 4824, the example symbol to bit converter 4826 and/or, more generally, the example system decoder 3816 are hereby expressly defined to include a tangible article of manufacture such as a tangible computer-readable medium such as those described above in connection with FIG. 17 storing the firmware and/or software. Further still, the example decoder 3816 may include interfaces, data structures, elements, processes and/or devices instead of, or in addition to, those illustrated in FIG. 48 and/or may include more than one of any or all of the illustrated interfaces, data structures, elements, processes and/or devices.

FIGS. 49-52 and 55 illustrate example machine-accessible instructions that may be executed to implement the example decoder 3816 of FIG. 48. A processor, a controller and/or any other suitable processing device may be used and/or programmed to execute the example machine-accessible instructions of FIGS. 49-52 and 55. For example, the machine-accessible instructions of FIGS. 49-52 and 55 may be embodied in coded instructions stored on any combination of tangible article of manufacture such as a tangible computer-readable medium discussed above in connection with FIG. 17. Machine-readable instructions comprise, for example, instructions and data that cause a processor, a computer and/or a machine having a processor (e.g., the example processor platform P100 discussed above in connection with FIG. 24) to perform one or more particular processes. Alternatively, some or all of the example machine-accessible instructions of FIGS. 49-52 and 55 may be implemented using any combination(s) of ASIC(s), PLD(s), FPLD(s), FPGA(s), discrete logic, hardware, firmware, etc. Also, some or all of the example processes of FIGS. 49-52 and 55 may be implemented manually or as any combination of any of the foregoing techniques, for example, any combination of firmware, software, discrete logic and/or hardware. Further, many other methods of implementing the example operations of FIGS. 49-52 and 55 may be employed. For example, the order of execution of the blocks may be changed, and/or one or more of the blocks described may be changed, eliminated, sub-divided, or combined. Additionally, any or all of the example machine-accessible instructions of FIGS. 49-52 and 55 may be carried out sequentially and/or carried out in parallel by, for example, separate processing threads, processors, devices, discrete logic, circuits, etc.

The example process 4900 of FIG. 49 begins by sampling audio (block 4902). The audio may be obtained via an audio sensor, a hardwired connection, via an audio file, or through any other suitable technique. As explained above the sampling may be carried out at 8,000 Hz, or any other suitable frequency.

As each sample is obtained, the sample is aggregated by a stacker such as the example stacker 4804 of FIG. 48 (block 4904). An example process for performing the stacking is described in conjunction with FIG. 50.

The new stacked audio samples from the stacker process 4904 are inserted into a buffer and the oldest audio samples are removed (block 4906). As each sample is obtained, a sliding time to frequency conversion is performed on a collection of samples including numerous older samples and the newly added sample obtained at blocks 4902 and 4904 (block 4908). In some examples, a sliding FFT may be used to process streaming input samples including 9215 old samples and the one newly added sample. In some examples, the FFT using 9216 samples results in a spectrum having a resolution of 5.2 Hz.

After the spectrum is obtained through the time to frequency conversion (block 4908), the transmitted symbol is determined (block 4910). An example process for determining the transmitted symbol is described in conjunction with FIG. 51.

After the transmitted message is identified (block 4910), buffer post processing is performed to identify a synchronize symbol and corresponding message symbols (block 4912). An example process for performing post-processing is described in conjunction with FIG. 52.

After post processing is performed to identify a transmitted message (block 4912), message validation is performed to verify the validity of the message (block 4914). An example process for performing the message validation is described in conjunction with FIG. 55.

After a message has been validated (block 4914), the message is converted from symbols to bits using the active symbol table (block 4916). Control then returns to block 4806 to process the next set of samples.

Figure 50:
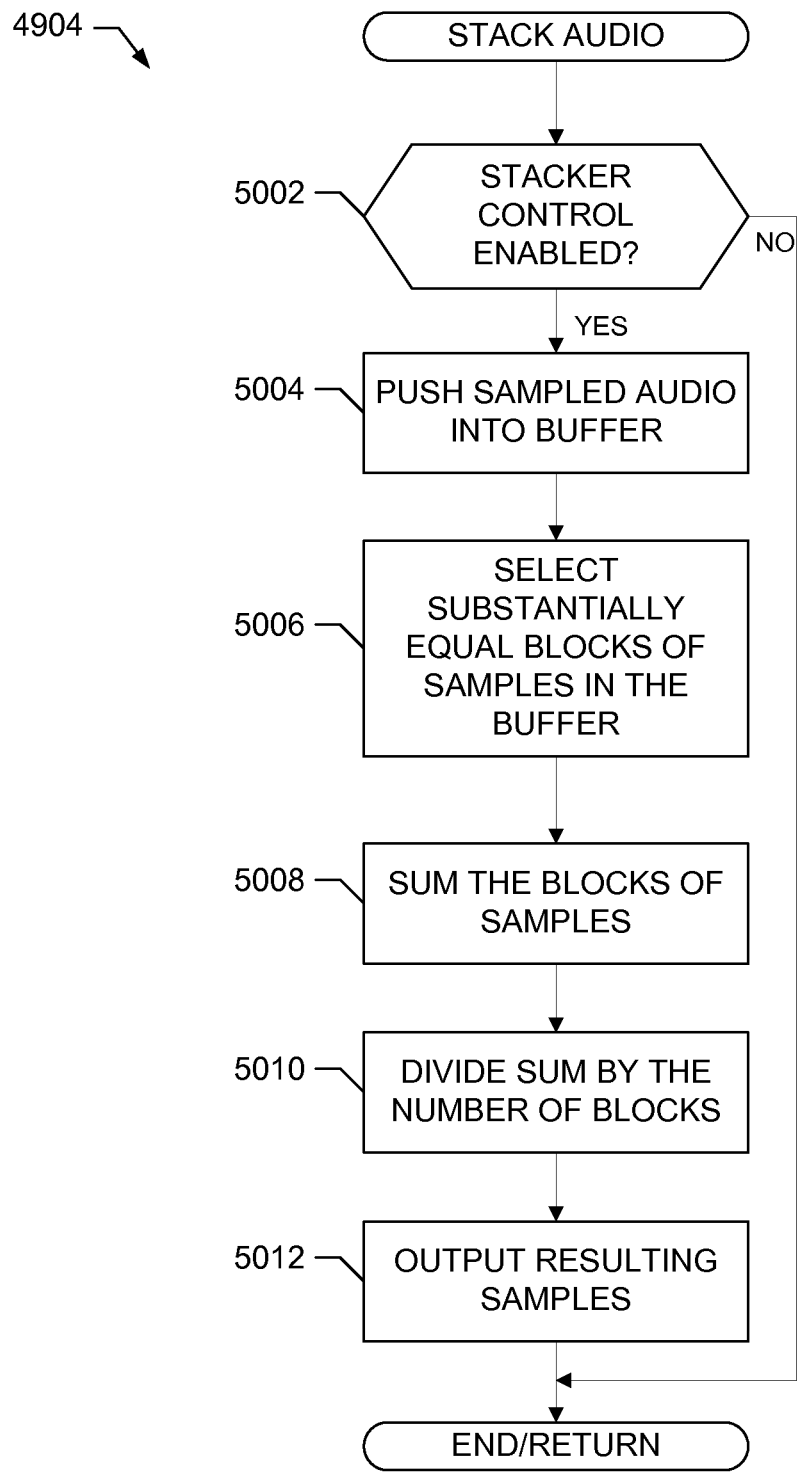
FIG. 50 illustrates example machine-accessible instructions that may be executed by, for example, a processor, to stack audio in the decoder of FIG. 48.

FIG. 50 illustrates an example process for stacking audio signal samples to accentuate an encoded code signal to implement the stack audio process 4904 of FIG. 49. The example process may be carried out by the stacker 4804 and the stacker controller 4806 of FIG. 48. The example process begins by determining if the stacker control is enabled (block 5002). When the stacker control is not enabled, no stacking is to occur and the process of FIG. 50 ends and control returns to block 4906 of FIG. 49 to process the audio signal samples unstacked.

When the stacker control is enabled, newly received audio signal samples are pushed into a buffer and the oldest samples are pushed out (block 5004). The buffer stores a plurality of samples. For example, when a particular message is repeatedly encoded in an audio signal every two seconds and the encoded audio is sampled at 8 kHz, each message will repeat every 16,000 samples so that buffer will store some multiple of 16,000 samples (e.g., the buffer may store six messages with a 96,000 sample buffer). Then, the stacker 4808 selects substantially equal blocks of samples in the buffer (block 5006). The substantially equal blocks of samples are then summed (block 5008). For example, sample one is added to samples 16,001, 32,001, 48,001, 64,001, and 80,001, sample two is added to samples 16,002, 32,002, 48,002, 64,002, 80,002, sample 16,000 is added to samples 32,000, 48,000, 64,000, 80,000, and 96,000.

After the audio signal samples in the buffer are added, the resulting sequence is divided by the number of blocks selected (e.g., six blocks) to calculate an average sequence of samples (e.g., 16,000 averaged samples) (block 5010). The resulting average sequence of samples is output by the stacker (block 5012). The process of FIG. 50 then ends and control returns to block 4906 of FIG. 49.

Figure 51:
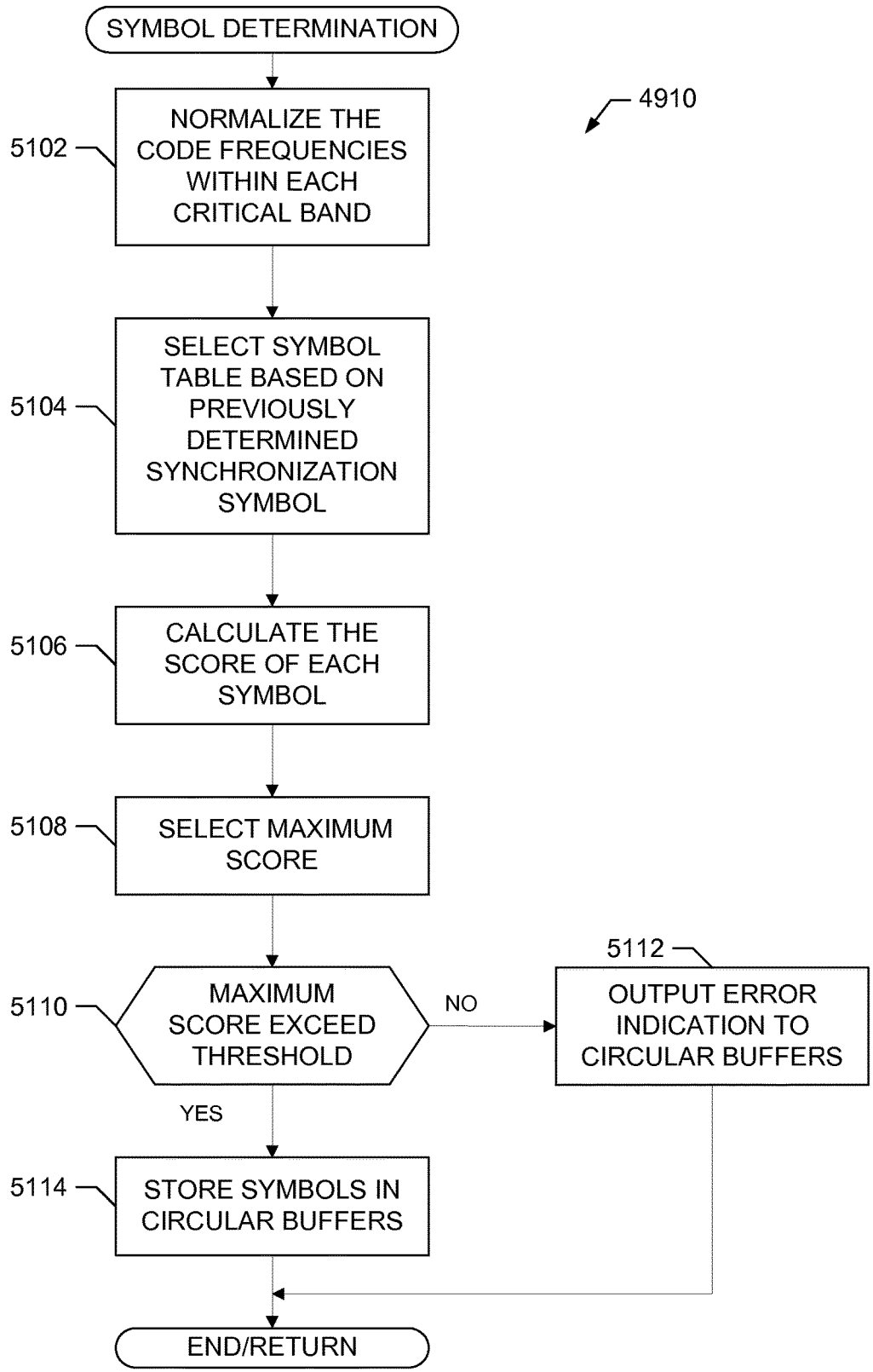
FIG. 51 illustrates example machine-accessible instructions that may be executed by, for example, a processor, to determine a symbol encoded in an audio signal in the decoder of FIG. 48.

FIG. 51 illustrates an example process for implementing the symbol determination process 4910 after the received audio signal has been converted to the frequency domain. The example process of FIG. 51 may be performed by the decoder 3816 of FIGS. 38 and 48. The example process of FIG. 51 begins by normalizing the code frequencies in each of the critical bands (block 5102). For example, the code frequencies may be normalized so that the frequency with the greatest amplitude is set to one and all other frequencies in that critical band are adjusted accordingly. In the example decoder 3816 of FIG. 48, the normalization is performed by the critical band normalizer 4810.

After the frequencies of interest have been normalized (block 5102). The example symbol scorer 4812 selects the appropriate symbol table based on the previously determined synchronization table (block 5104). For example, a system may include two symbol tables: one table for a normal synchronization and one table for an pre-existing code flag synchronization. Alternatively, the system may include a single symbol table or may include multiple synchronization tables that may be identified by synchronization symbols (e.g., cross-table synchronization symbols). The symbol scorer 4812 then computes a symbol score for each symbol in the selected symbol table (block 5106). For example, the symbol scorer 4812 may iterate across each symbol in the symbol table and add the normalized scores for each of the frequencies of interest for the symbol to compute a symbol score.

After each symbol is scored (block 5106), the example max score selector 4814 selects the symbol with the greatest score (block 5108). The example comparator 4816 then determines if the score for the selected symbol exceeds a maximum score threshold (block 5110). When the score does not exceed the maximum score threshold, an error indication is stored in the circular buffers (e.g., the circular buffers 4818 and the pre-existing code flag circular buffers 4820) (block 5112). The process of FIG. 51 then completes and control returns to block 4912 of FIG. 49.

When the score exceeds the maximum score threshold (block 5110), the identified symbol is stored in the circular buffers (e.g., the circular buffers 4818 and the pre-existing code flag circular buffers 4820) (block 5114). The process of FIG. 51 then completes and control returns to block 4912 of FIG. 49.

Figure 52:
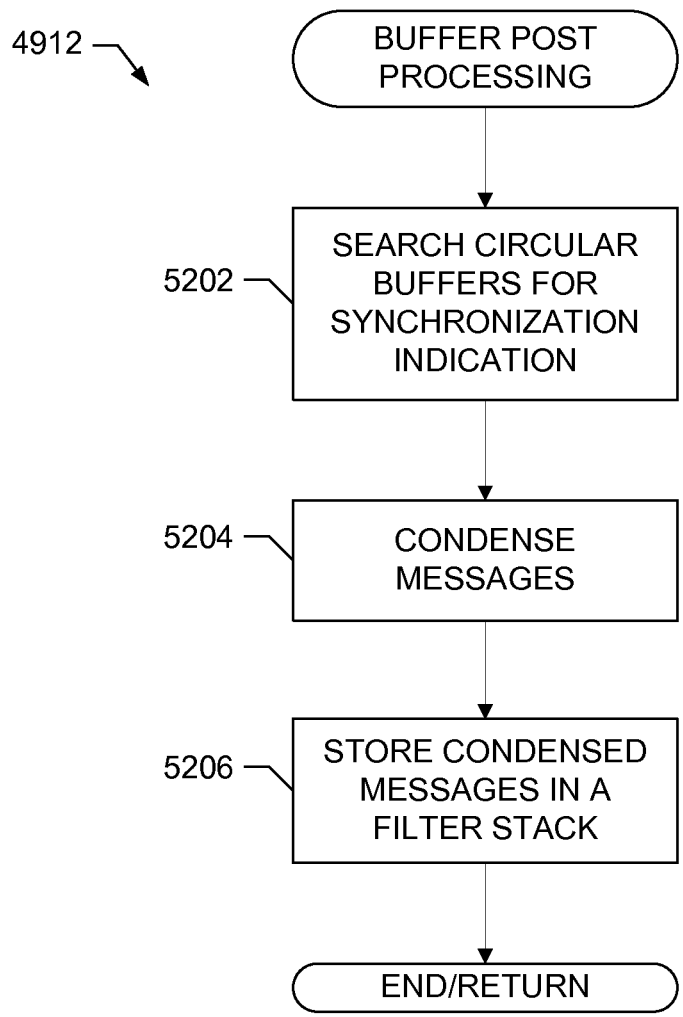
FIG. 52 illustrates example machine-accessible instructions that may be executed by, for example, a processor, to process a buffer to identify messages in the decoder of FIG. 48.

FIG. 52 illustrates an example process for implementing the buffer post processing 4912 of FIG. 49. The example process of FIG. 52 begins when the message identifier 4822 of FIG. 48 searches the circular buffers 4818 and the circular buffers 4820 for a synchronization indication (block 5202).

For example, FIG. 53 illustrates an example implementation of circular buffers 4818 and FIG. 54 illustrates an example implementation of pre-existing code flag circular buffers 4820. In the illustrated example of FIG. 53, the last location in the circular buffers to have been filled is location three as noted by the arrow. Accordingly, the sample index indicates the location in the audio signal samples that resulted in the symbols stored in location three. Because the line corresponding to sliding index 37 is a circular buffer, the consecutively identified symbols are 128, 57, 22, 111, 37, 23, 47, and 0. Because 128 in the illustrated example is a synchronize symbol, the message can be identified as the symbols following the synchronize symbol. The message identifier 4822 would wait until 7 symbols have been located following the identification of the synchronization symbol at sliding index 37.

The pre-existing code flag circular buffers 4820 of FIG. 54 include two locations for each circular buffer because the pre-existing code flag message of the illustrated example comprises one pre-existing code flag synchronize symbol (e.g., symbol 254) followed by a single message symbol. According to the illustrated example of FIG. 39, the pre-existing code flag data block 3930 is embedded in two long blocks immediately following the 7 bit timestamp long block 3928. Accordingly, because there are two long blocks for the pre-existing code flag data and each long block of the illustrated example is 1,536 samples at a sampling rate of 8 kHz, the pre-existing code flag data symbol will be identified in the pre-existing code flag circular buffers 3072 samples after the original message. In the illustrated example FIG. 54, sliding index 37 corresponds to sample index 38744, which is 3072 samples later than sliding index 37 of FIG. 53 (sample index 35672). Accordingly, the pre-existing code flag data symbol 68 can be determined to correspond to the message in sliding index 37 of FIG. 53, indicating that the message in sliding index 37 of FIG. 53 identifies an original encoded message (e.g., identifies an original broadcaster of audio) and the sliding index 37 identifies an pre-existing code flag message (e.g., identifies a re-broadcaster of audio).

Returning to FIG. 49, after a synchronize or pre-existing code flag synchronize symbol is detected, messages in the circular buffers 4818 or the pre-existing code flag circular buffers 4820 are condensed to eliminate redundancy in the messages. For example, as illustrated in FIG. 53, due to the sliding time domain to frequency domain conversion and duration of encoding for each message, messages are identified in audio data for a period of time (sliding indexes 37-39 contain the same message). The identical messages in consecutive sliding indexes can be condensed into a single message because they are representative of only one encoded message. Alternatively, condensing may be eliminated and all messages may be output when desired. The message identifier 4822 then stores the condensed messages in a filter stack associated with the validator 4824 (block 5206). The process of FIG. 52 then ends and control returns to block 4914 of FIG. 49.

Figure 55:
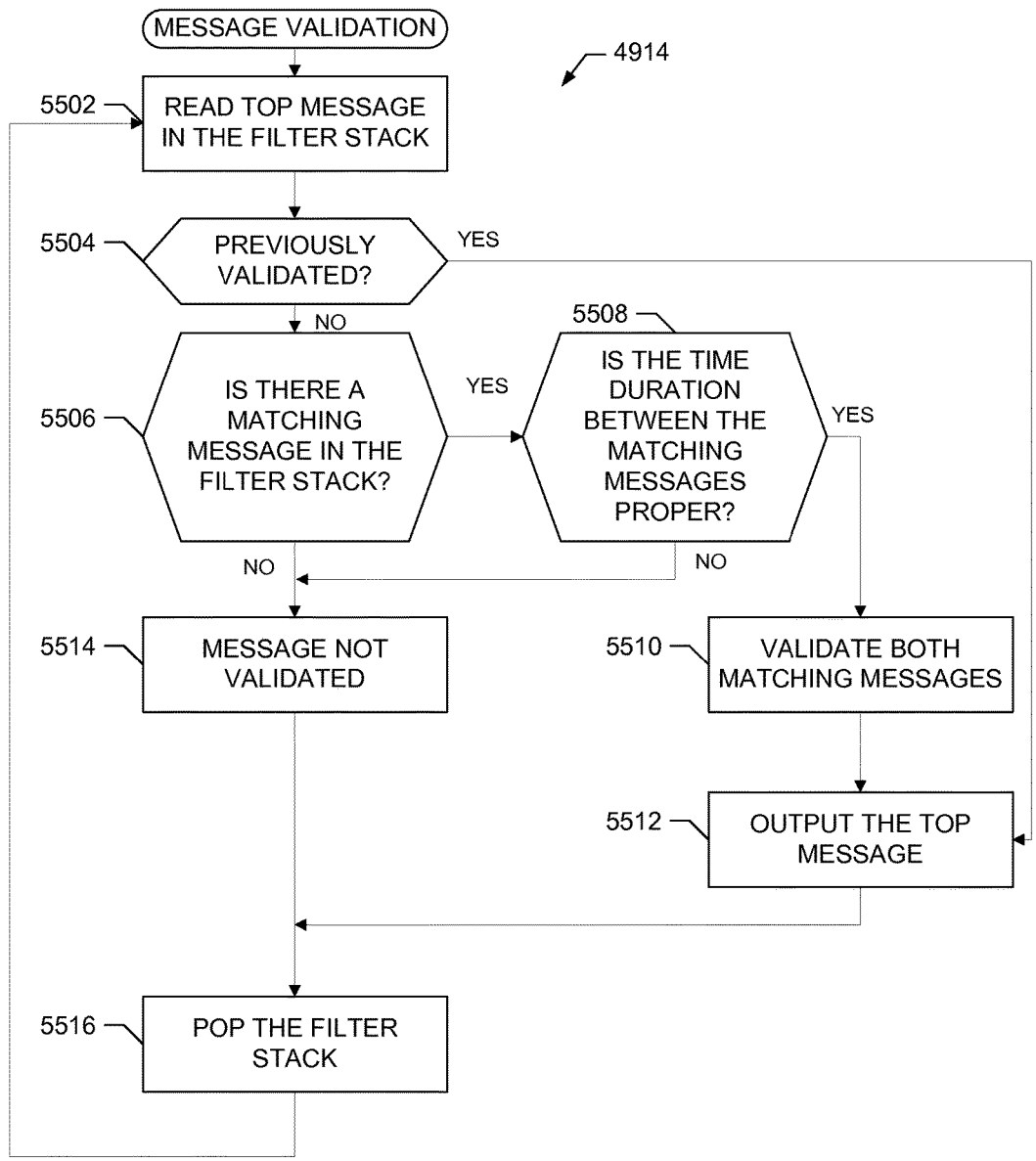
FIG. 55 illustrates example machine-accessible instructions that may be executed by, for example, a processor, to validate identified messages in the decoder of FIG. 48.

FIG. 55 illustrates an example process to implement the message validation process 4914 of FIG. 49. The example process of FIG. 49 may be performed by the validator 4824 of FIG. 48. The example process of FIG. 55 begins when the validator 4824 reads the top message in the filter stack (block 5502).

For example, FIG. 56 illustrates an example implementation of a filter stack. The example filter stack includes a message index, seven symbol locations for each message index, a sample index identification, and a validation flag for each message index. Each message is added at message index M7 and a message at location M0 is the top message that is read in block 5502 of FIG. 55. Due to sampling rate variation and variation of the message boundary within a message identification, it is expected that messages will be separated by samples indexes of multiples of approximately 16,000 samples when messages are repeated every 16,000 samples.

Returning to FIG. 56, after the top message in the filter stack is selected (block 5502), the validator 4824 determines if the validation flag indicates that the message has been previously validated (block 5504). For example, FIG. 56 indicates that message M0 has been validated. When the message has been previously validated, the validator 4824 outputs the message (block 5512) and control proceeds to block 5516.

When the message has not been previously validated (block 5504), the validator 4824 determines if there is another suitably matching message in the filter stack (block 5506). A message may be suitably matching when it is identical to another message, when a threshold number of message symbols match another message (e.g., four of the seven symbols), or when any other error determination indicates that two messages are similar enough to speculate that they are the same. According to the illustrated example, messages can only be partially validated with another message that has already been validated. When a suitable match is not identified, control proceeds to block 5514.

When a suitable match is identified, the validator 4824 determines if a time duration (e.g., in samples) between identical messages is proper (block 5508). For example, when messages are repeated every 16,000 samples, it is determined if the separation between two suitably matching messages is approximately a multiple of 16,000 samples. When the time duration is not proper, control proceeds to block 5514.

When the time duration is proper (block 5508), the validator 4824 validates both messages by setting the validation flag for each of the messages (block 5510). When the message has been validated completely (e.g., an exact match) the flag may indicate that the message is fully validated (e.g., the message validated in FIG. 56). When the message has only been partially validated (e.g., only four of seven symbols matched), the message is marked as partially validated (e.g., the message partially validated in FIG. 56). The validator 4824 then outputs the top message (block 5512) and control proceeds to block 5516.

When it is determined that there is not a suitable match for the top message (block 5506) or that the time duration between a suitable match(es) is not proper (block 5508), the top message is not validated (block 5514). Messages that are not validated are not output from the validator 4824.

After determining not to validate a message (blocks 5506, 5508, and 5514) or outputting the top message (block 5512), the validator 5516 pops the filter stack to remove the top message from the filter stack. Control then returns to block 5502 to process the next message at the top of the filter stack.

While example manners of implementing any or all of the example encoder 3802 and the example decoder 3816 have been illustrated and described above one or more of the data structures, elements, processes and/or devices illustrated in the drawings and described above may be combined, divided, re-arranged, omitted, eliminated and/or implemented in any other way. Further, the example encoder 3802 and example decoder 3816 may be implemented by hardware, software, firmware and/or any combination of hardware, software and/or firmware. Thus, for example, the example encoder 3802 and the example decoder 3816 could be implemented by one or more circuit(s), programmable processor(s), application specific integrated circuit(s) (ASIC(s)), programmable logic device(s) (PLD(s)) and/or field programmable logic device(s) (FPLD(s)), etc. For example, the decoder 3816 may be implemented using software on a platform device, such as a mobile telephone. If any of the appended claims is read to cover a purely software implementation, at least one of the prior code detector 3904, the example message generator 3910, the symbol selector 3912, the code frequency selector 3914, the synthesizer 3916, the inverse FFT 3918, the mixer 3920, the overlapping short block maker 3940, the masking evaluator 3942, the critical band pair definer 4402, the frequency definer 4404, the number generator 4406, the redundancy reducer 4408, the excess reducer 4410, the code frequency definer 4412, the LUT filler 4414, the sampler 4802, the stacker 4804, the stacker control 4806, the time domain to frequency domain converter 4808, the critical band normalize 4810, the symbol scorer 4812, the max score selector 4814, the comparator 4816, the circular buffers 4818, the pre-existing code flag circular buffers 4820, the message identifier 4822, the validator 4824, and the symbol to bit converter 4826 are hereby expressly defined to include a tangible medium such as a memory, DVD, CD, etc. Further still, the example encoder 3802 and the example decoder 3816 may include data structures, elements, processes and/or devices instead of, or in addition to, those illustrated in the drawings and described above, and/or may include more than one of any or all of the illustrated data structures, elements, processes and/or devices.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent either literally or under the doctrine of equivalents.

What is claimed is:

1. A method of decoding a code from an audio signal associated with first media output by a first media presentation device, the method comprising:
sampling the audio signal to generate a sampled audio signal;
transforming the sampled audio signal into a frequency domain representation;
determining characteristics of frequencies in a plurality of code bands of the frequency domain representation that may contain the code, the code representative of at least one of the first media or a broadcaster of the first media, the code, if present, being encoded in the audio signal using a plurality of frequency components across the plurality of code bands;
normalizing the characteristics of the frequencies of respective ones of the code bands, the characteristic frequencies of a first one of the code bands being normalized against a threshold characteristic of a first frequency in the first one of the code bands;
comparing sums of the normalized characteristics for groups of frequencies across the plurality of code bands to identify a first group of frequencies with a largest sum; and
determining that the first group of frequencies is representative of the code to decode the code from the first group of frequencies; and
transmitting a wireless signal to a second media presentation device, the wireless signal including the decoded code, the wireless signal to trigger the second media presentation device to A) transmit the decoded code to a ratings server to cause the ratings server to 1) obtain second media based on the decoded code and 2) determine audience rating information corresponding to presentation of the first media on the first media presentation device and presentation of the second media on the second media presentation device based on the decoded code, and B) present the second media at the second media presentation device.

2. The method as defined in claim 1, wherein the first media presentation device and the second media presentation device are at a same monitoring site.

3. The method as defined in claim 2, further including detecting presentation of the first media by the first media presentation device.

4. The method as defined in claim 1, wherein the decoded code is associated with at least one of a program identifier, a station identifier, or a timestamp.

5. The method as defined in claim 1, wherein the wireless signal includes at least one of a Bluetooth signal, a wireless local area network signal, or a cellular signal.

6. The method as defined in claim 1, wherein the audio signal includes embedded frequency components representing the decoded code, different sets of the frequency components representing respectively different information, one frequency component from each of the sets of frequency components being located in a code band, the code band being one of a plurality of code bands and spacing between adjacent code bands being equal to or less than the spacing between adjacent frequency components of each of the code bands, amplitudes of the frequency components representing the information and being selected based on a masking ability of the audio.

7. The method as defined in claim 1, wherein the audience rating information includes a first reach and a second reach, the first reach corresponding to presentation of the first media on the first media presentation device based on the decoded code, and the second reach corresponding to presentation of the second media on the second media presentation device based on the decoded code.

8. A tangible computer readable storage medium comprising instructions that, when executed, cause a machine to at least:
sample an audio signal associated with first media output by a first media presentation device to generate a sampled audio signal;
transform the sampled audio signal into a frequency domain representation;

determine characteristics of frequencies in a plurality of code bands of the frequency domain representation that may contain a code, the code representative of at least one of the first media or a broadcaster of the first media, the code, if present, being encoded in the audio signal using a plurality of frequency components across the plurality of code bands;

normalize the characteristics of the frequencies of respective ones of the code bands, the characteristic frequencies of a first one of the code bands being normalized against a threshold characteristic of a first frequency in the first one of the code bands;

compare sums of the normalized characteristics for groups of frequencies across the plurality of code bands to identify a first group of frequencies with a largest sum; and determine that the first group of frequencies is representative of the code to decode the code from the first group of frequencies; and transmit a wireless signal to a second media presentation device, the wireless signal including the decoded code, the wireless signal to trigger the second media presentation device to A) transmit the decoded code to a ratings server to cause the ratings server to 1) obtain second media based on the decoded code and 2) determine audience rating information corresponding to presentation of the first media on the first media presentation device and presentation of the second media on the second media presentation device based on the decoded code, and B) present the second media at the second media presentation device.

9. The tangible computer readable storage medium as defined of claim 8, wherein the first media presentation device and the second media presentation device are at a same monitoring site.

10. The tangible computer readable storage medium as defined of claim 9, further including detecting presentation of the first media by the first media presentation device.

11. The tangible computer readable storage medium as defined of claim 8, wherein the wireless signal includes at least one of a Bluetooth signal, a wireless local area network signal, or a cellular signal.

12. The tangible computer readable storage medium as defined of claim 8, wherein the decoded code is associated with at least one of a program identifier, a station identifier, or a timestamp.

13. The storage medium as defined in claim 8, wherein the audience rating information includes a first reach and a second reach, the first reach corresponding to presentation of the first media on the first media presentation device based on the decoded code, and the second reach corresponding to presentation of the second media on the second media presentation device based on the decoded code.

14. An apparatus comprising:
a decoder including:
a sampler to sample an audio signal associated with first media output by a first media presentation device to generate a sampled audio signal;
a time-to-frequency domain converter to transform the sampled audio signal into a frequency domain representation;
a code frequency monitor to:
determine characteristics of frequencies in a plurality of code bands of the frequency domain representation that may contain the code, the code representative of at least one of the first media or a broadcaster of the first media, the code, if present, being encoded in the audio signal using a plurality of frequency components across the plurality of code bands;

normalize the characteristics of the frequencies of respective ones of the code bands, the characteristic frequencies of a first one of the code bands being normalized against a threshold characteristic of a first frequency in the first one of the code bands;

compare sums of the normalized characteristics for groups of frequencies across the plurality of code bands to identify a first group of frequencies with a largest sum; and determine that the first group of frequencies is representative of the code and decode the code from the first group of frequencies; and a wireless interface to transmit a wireless signal to a second media presentation device, the wireless signal including the decoded code, the wireless signal to trigger the second media presentation device to A) transmit the decoded code to a ratings server to cause the ratings server to 1) obtain second media based on the decoded code and 2) determine audience rating information corresponding to presentation of the first media on the first media presentation device and presentation of the second media on the second media presentation device based on the decoded code, and B) present the second media at the second media presentation device.

15. The apparatus as defined in claim 14, wherein the first media presentation device and the second media presentation device are at a same monitoring site.

16. The apparatus as defined in claim 15, further including transmitting the first media to the first media presentation device.

17. The apparatus as defined in claim 14, wherein the wireless signal includes at least one of a Bluetooth signal, a wireless local area network signal, or a cellular signal.

18. The apparatus as defined in claim 14, wherein the audio signal includes embedded frequency components representing the decoded code, different sets of the frequency components representing respectively different information, one frequency component from each of the sets of frequency components being located in a code band, the code band being one of a plurality of code bands and spacing between adjacent code bands being equal to or less than the spacing between adjacent frequency components of each of the code bands, amplitudes of the frequency components representing the information and being selected based on a masking ability of the audio.

19. The apparatus as defined in claim 14, wherein the apparatus includes a customer-premises media server.

20. The apparatus as defined in claim 14, wherein the media presentation device includes at least one of a hand-held computer, a personal digital assistant (PDA), a cellular telephone, a smartphone, a laptop computer, a netbook computer, a hand-held media presentation device, or a mobile media presentation device.

21. The apparatus as defined in claim 14, wherein the audience rating information includes a first reach and a second reach, the first reach corresponding to presentation of the first media on the first media presentation device based on the decoded code, and the second reach corresponding to presentation of the second media on the second media presentation device based on the decoded code.

* * * * *